(12) United States Patent
Etter et al.

(10) Patent No.: US 7,346,847 B2
(45) Date of Patent: Mar. 18, 2008

(54) POWER TOOL CONTROL SYSTEM USER INTERFACE

(75) Inventors: Mark A. Etter, Humboldt, TN (US);
Melinda J. Hearn, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 518 days.

(21) Appl. No.: 10/632,559

(22) Filed: Jul. 31, 2003

(65) Prior Publication Data

US 2006/0102682 A1 May 18, 2006

Related U.S. Application Data

(63) Continuation of application No. 10/463,206, filed on Jun. 16, 2003, which is a continuation-in-part of application No. 10/445,290, filed on May 21, 2003, and a continuation-in-part of application No. 10/413,455, filed on Apr. 14, 2003.

(60) Provisional application No. 60/373,752, filed on Apr. 18, 2002, provisional application No. 60/414,200, filed on Sep. 27, 2002, provisional application No. 60/429,840, filed on Nov. 27, 2002.

(51) Int. Cl.
*G06F 3/00* (2006.01)

(52) U.S. Cl. .................. 715/740; 700/114; 700/170; 715/700; 33/286

(58) Field of Classification Search ............... 715/700, 715/734, 740; 33/286, 533; 250/208.1; 700/114, 170
See application file for complete search history.

(56) References Cited

U.S. PATENT DOCUMENTS

| 299,619 A | 6/1884 | Carson |
|---|---|---|
| 408,790 A | 7/1889 | Butler |
| 411,925 A | 10/1889 | Linderman |
| 714,098 A | 11/1902 | Caldwell |
| 1,476,238 A | 12/1923 | Bump |
| 1,804,764 A | 5/1931 | Grant |
| 2,077,828 A | 4/1937 | Dombrowski |
| 2,089,209 A | 8/1937 | Gotham et al. |
| 2,109,976 A | 3/1938 | Pierce, Jr. ................ 177/311 |
| 2,121,069 A | 6/1938 | Collins ..................... 143/36 |
| 2,146,906 A | 2/1939 | Moller ....................... 77/5 |

(Continued)

FOREIGN PATENT DOCUMENTS

DE         3324615         5/1984

(Continued)

OTHER PUBLICATIONS

"Product Picks from the National Hardware Show"; Fall Homes 1992; Sep. 23, 1992; 2 pages.

(Continued)

*Primary Examiner*—Leo Picard
*Assistant Examiner*—S. S. Rao
(74) *Attorney, Agent, or Firm*—Adan Ayala

(57) ABSTRACT

A power tool control system allows a user to operate a power tool through a graphical user interface communicatively coupled with a non-contact measurement and alignment device. The graphical user interface correlates user engageable selectors with a logically related menu of power tool setting options displayed on a display screen in a high quality and easily readable format. The non-contact measurement and alignment device uses one or more lasers to determine power tool settings and establish proper alignment based on user needs. The power tool control system further enables stud detection and visual indication of stud location.

12 Claims, 96 Drawing Sheets

U.S. PATENT DOCUMENTS

| | | |
|---|---|---|
| 2,299,262 A | 10/1942 | Uremovich ................ 143/36 |
| 2,307,820 A | 1/1943 | Butters ................ 143/168 |
| 2,357,194 A | 8/1944 | Hazelton et al. ........... 164/47 |
| 2,407,845 A | 9/1946 | Nemeyer ................ 116/124 |
| 2,465,000 A | 3/1949 | Turner ................ 143/132 |
| 2,488,947 A | 11/1949 | Vavrik ................ 143/43 |
| 2,518,684 A | 8/1950 | Harris ................ 143/45 |
| 2,557,029 A | 6/1951 | Griffin ................ 88/39 |
| 2,806,492 A | 9/1957 | Becker ................ 143/168 |
| 2,850,054 A | 9/1958 | Eschenburg ................ 143/36 |
| 2,855,679 A | 10/1958 | Gibble ................ 33/46 |
| 3,005,477 A | 10/1961 | Sherwen ................ 143/47 |
| 3,011,529 A | 12/1961 | Copp ................ 143/36 |
| 3,013,592 A | 12/1961 | Ambrosio et al. ........... 143/36 |
| 3,124,178 A | 3/1964 | Packard ................ 143/36 |
| 3,179,458 A | 4/1965 | Sconzo ................ 292/341.15 |
| 3,344,819 A | 10/1967 | Mitchell ................ 143/36 |
| 3,572,937 A | 3/1971 | Baldwin ................ 356/110 |
| 3,597,091 A | 8/1971 | Bowker ................ 356/106 |
| 3,635,108 A | 1/1972 | Prince ................ 82/1 |
| 3,713,746 A | 1/1973 | Luthy ................ 408/8 |
| 3,728,027 A | 4/1973 | Watanabe ................ 356/13 |
| 3,780,777 A | 12/1973 | Davies ................ 144/3 N |
| 3,837,757 A | 9/1974 | Levine ................ 408/14 |
| 3,854,386 A | 12/1974 | Weissman ................ 408/14 |
| 3,891,036 A | 6/1975 | Lagerstrom ................ 175/40 |
| 3,970,359 A | 7/1976 | Starkweather ................ 350/7 |
| 3,972,582 A | 8/1976 | Oosaka et al. ................ 350/7 |
| 3,976,384 A | 8/1976 | Matthews et al. ........... 356/200 |
| 4,002,094 A | 1/1977 | Erickson et al. |
| 4,046,985 A | 9/1977 | Gates ................ 219/121 L |
| 4,078,869 A | 3/1978 | Honeycutt ................ 408/16 |
| 4,184,394 A | 1/1980 | Gjerde ................ 83/477.1 |
| 4,255,056 A | 3/1981 | Peterson ................ 356/401 |
| 4,257,297 A | 3/1981 | Nidbella ................ 83/471.3 |
| 4,308,777 A | 1/1982 | Lawson |
| 4,319,403 A | 3/1982 | Stearns ................ 33/185 R |
| 4,338,723 A | 7/1982 | Benjamin ................ 33/174 L |
| 4,383,373 A | 5/1983 | Couturier ................ 33/286 |
| 4,386,532 A | 6/1983 | Benjamin ................ 73/862.04 |
| 4,407,262 A | 10/1983 | Wirz |
| 4,413,662 A | 11/1983 | Gregoire et al. ........... 144/356 |
| 4,438,567 A | 3/1984 | Raiha ................ 33/286 |
| 4,447,956 A | 5/1984 | Chung ................ 33/172 D |
| 4,450,627 A | 5/1984 | Morimoto ................ 30/391 |
| 4,468,992 A | 9/1984 | McGeehee ................ 83/56 |
| 4,469,318 A | 9/1984 | Slavic ................ 269/91 |
| 4,469,931 A | 9/1984 | Macken ................ 219/121 LG |
| 4,503,740 A | 3/1985 | Brand et al. ................ 83/521 |
| 4,534,093 A | 8/1985 | Jahnke et al. ........... 29/26 A |
| 4,566,202 A | 1/1986 | Hamar ................ 33/286 |
| 4,581,808 A | 4/1986 | Lawson et al. ........... 29/558 |
| 4,589,208 A | 5/1986 | Iwasaki et al. ........... 30/376 |
| 4,598,481 A | 7/1986 | Donahue ................ 33/288 |
| 4,599,927 A | 7/1986 | Eccardt et al. |
| 4,607,555 A | 8/1986 | Erhard ................ 83/471.2 |
| 4,651,732 A | 3/1987 | Frederick ................ 128/303 R |
| 4,676,130 A | 6/1987 | Nutt ................ 83/155 |
| 4,723,911 A | 2/1988 | Kurtz ................ 433/27 |
| 4,725,933 A | 2/1988 | Houk et al. ........... 362/287 |
| 4,775,205 A | 10/1988 | Muramatsu ................ 350/6.8 |
| 4,803,976 A | 2/1989 | Frigg et al. ................ 128/92 |
| 4,805,500 A | 2/1989 | Saito et al. ........... 83/277 |
| 4,817,839 A | 4/1989 | Weissman ................ 225/2 |
| 4,820,911 A | 4/1989 | Arackellian et al. ........ 235/467 |
| 4,833,782 A | 5/1989 | Smith ................ 30/392 |
| 4,836,671 A | 6/1989 | Bautista ................ 356/1 |
| 4,885,965 A | 12/1989 | Veissman ................ 83/100 |
| 4,885,967 A | 12/1989 | Bell et al. ................ 83/520 |
| 4,887,193 A | 12/1989 | Dieckmann ................ 362/89 |
| 4,934,229 A | 6/1990 | Greten et al. |
| 4,934,233 A | 6/1990 | Brundage et al. ........... 83/397 |
| 4,945,797 A | 8/1990 | Hahn ................ 83/75.5 |
| 4,964,449 A | 10/1990 | Conners ................ 144/286 R |
| 4,976,019 A | 12/1990 | Kitamura ................ 29/26 A |
| 4,978,246 A | 12/1990 | Quenzi et al. ................ 404/84 |
| 5,012,590 A | 5/1991 | Wagner et al. |
| 5,013,317 A | 5/1991 | Cole et al. ................ 606/96 |
| 5,031,203 A | 7/1991 | Trecha ................ 378/205 |
| 5,038,481 A | 8/1991 | Smith ................ 30/392 |
| 5,052,112 A | 10/1991 | MacDonald ................ 33/263 |
| 5,115,403 A | 5/1992 | Yoneda et al. |
| 5,148,232 A | 9/1992 | Duey et al. ................ 356/152 |
| 5,159,864 A | 11/1992 | Wedemeyer et al. ........... 83/13 |
| 5,159,869 A | 11/1992 | Tagliaferri ................ 83/862 |
| 5,161,922 A | 11/1992 | Malloy ................ 408/14 |
| 5,203,650 A | 4/1993 | McCourtney ................ 408/1 R |
| 5,207,007 A | 5/1993 | Cucinotta et al. ........... 33/640 |
| 5,212,720 A | 5/1993 | Landi et al. ................ 378/206 |
| 5,267,129 A | 11/1993 | Anderson ................ 362/96 |
| 5,283,808 A | 2/1994 | Cramer et al. ........... 378/206 |
| 5,285,708 A | 2/1994 | Bosten et al. ................ 83/520 |
| 5,316,014 A | 5/1994 | Livingston ................ 128/754 |
| 5,320,111 A | 6/1994 | Livingston ................ 128/754 |
| 5,327,653 A | 7/1994 | Pistorius et al. |
| 5,335,421 A | 8/1994 | Jones, Jr. |
| 5,357,834 A | 10/1994 | Ito et al. ................ 83/471.3 |
| 5,365,822 A | 11/1994 | Stapleton et al. ........... 83/745 |
| 5,375,495 A | 12/1994 | Bosten et al. ................ 83/520 |
| 5,387,969 A | 2/1995 | Marantette ................ 356/4.5 |
| 5,426,687 A | 6/1995 | Goodall et al. ........... 377/206 |
| 5,439,328 A | 8/1995 | Haggerty et al. ........... 408/1 R |
| 5,446,635 A | 8/1995 | Jehn ................ 362/259 |
| 5,461,790 A | 10/1995 | Olstowski ................ 30/391 |
| 5,481,466 A | 1/1996 | Carey ................ 364/474.09 |
| 5,484,026 A | 1/1996 | Susaki |
| 5,488,781 A | 2/1996 | Van Der Horst ........... 33/617 |
| 5,493,786 A | 2/1996 | Thomson |
| 5,495,784 A | 3/1996 | Chen ................ 83/471.2 |
| 5,512,808 A | 4/1996 | Clark et al. |
| 5,522,683 A | 6/1996 | Kakimoto et al. ........... 408/13 |
| 5,529,441 A | 6/1996 | Kosmowski et al. ........ 408/1 R |
| 5,546,840 A | 8/1996 | Supe-Dienes ................ 83/478 |
| 5,562,240 A | 10/1996 | Campbell |
| 5,579,102 A | 11/1996 | Pratt et al. ................ 356/3.12 |
| 5,593,606 A | 1/1997 | Owen et al. ........... 219/121.71 |
| 5,644,616 A | 7/1997 | Landi et al. ................ 378/206 |
| 5,661,775 A | 8/1997 | Cramer et al. ........... 378/206 |
| 5,662,017 A | 9/1997 | Mellon ................ 83/169 |
| 5,667,345 A | 9/1997 | Wiklund ................ 408/1 R |
| 5,675,899 A | 10/1997 | Webb ................ 30/390 |
| 5,720,213 A | 2/1998 | Sberveglieri ................ 83/471.3 |
| 5,735,054 A | 4/1998 | Cole |
| 5,741,096 A | 4/1998 | Olds ................ 408/1 R |
| 5,777,562 A | 7/1998 | Hoffman ................ 340/870.07 |
| 5,782,842 A | 7/1998 | Kloess et al. ................ 606/130 |
| 5,784,792 A | 7/1998 | Smith ................ 33/227 |
| 5,797,670 A | 8/1998 | Snoke et al. ................ 362/119 |
| 5,819,625 A | 10/1998 | Sberveglieri ................ 83/471.3 |
| 5,835,517 A | 11/1998 | Jayaraman et al. ........... 372/50 |
| 5,835,519 A | 11/1998 | Tsukamoto et al. ........... 372/55 |
| 5,862,727 A | 1/1999 | Kelly ................ 83/13 |
| 5,911,482 A | 6/1999 | Campbell et al. ........... 30/390 |
| 5,918,523 A | 7/1999 | Cutter ................ 83/520 |
| 5,943,931 A | 8/1999 | Stumpf et al. ........... 83/468.2 |
| 5,943,932 A | 8/1999 | Sberveglieri ................ 83/471.3 |
| 5,949,810 A | 9/1999 | Star et al. ................ 372/108 |
| 5,967,209 A | 10/1999 | Fukuda |
| 5,968,383 A | 10/1999 | Yamazaki et al. ...... 219/121.75 |
| 5,979,523 A | 11/1999 | Puzio et al. ................ 144/286.5 |
| 5,995,230 A | 11/1999 | Madlener et al. ........... 356/375 |
| 5,996,460 A | 12/1999 | Waite ................ 83/520 |
| 6,023,071 A | 2/2000 | Ogura et al. ................ 250/586 |
| 6,035,757 A | 3/2000 | Caluori et al. ................ 83/520 |

| Patent | Date | Inventor | Class |
|---|---|---|---|
| 6,076,445 A | 6/2000 | Kenyon et al. | 83/477.2 |
| 6,091,416 A | 7/2000 | Cragun | |
| 6,137,577 A | 10/2000 | Woodworth | 356/376 |
| 6,152,372 A | 11/2000 | Colley et al. | 235/472.01 |
| 6,209,597 B1 | 4/2001 | Calcote | 144/326 |
| 6,223,794 B1 | 5/2001 | Jones | 144/135.2 |
| 6,239,913 B1 | 5/2001 | Tanaka | 359/619 |
| 6,263,584 B1* | 7/2001 | Owens | 33/640 |
| 6,283,002 B1 | 9/2001 | Chiang | 83/477.1 |
| 6,301,997 B1 | 10/2001 | Welte | 81/54 |
| 6,322,365 B1 | 11/2001 | Shechter et al. | |
| 6,324,950 B1 | 12/2001 | Song | |
| 6,328,505 B1 | 12/2001 | Gibble | 408/16 |
| 6,332,891 B1 | 12/2001 | Himes | |
| 6,373,579 B1 | 4/2002 | Ober et al. | |
| 6,375,395 B1 | 4/2002 | Heintzeman | 408/16 |
| 6,413,022 B1 | 7/2002 | Sarh | 408/76 |
| 6,419,426 B1 | 7/2002 | Chalupa et al. | 408/1 R |
| 6,460,768 B2 | 10/2002 | Ring et al. | 235/462.43 |
| D465,165 S | 11/2002 | Doyle et al. | D10/65 |
| 6,493,955 B1 | 12/2002 | Moretti | 33/451 |
| 6,494,590 B1 | 12/2002 | Paganini et al. | 362/119 |
| 6,530,303 B1 | 3/2003 | Parks et al. | 83/477.1 |
| 6,536,536 B1 | 3/2003 | Gass et al. | 173/2 |
| 6,546,835 B2 | 4/2003 | Wang | 83/477.1 |
| 6,550,118 B2 | 4/2003 | Smith et al. | 29/26 A |
| 6,565,227 B1 | 5/2003 | Davis | 362/119 |
| 6,584,695 B1 | 7/2003 | Chang | 30/391 |
| 6,587,184 B2 | 7/2003 | Wursch et al. | 356/4.01 |
| 6,593,587 B2 | 7/2003 | Pease | 250/559.19 |
| 6,612,920 B1 | 9/2003 | Young | |
| 6,621,565 B2 | 9/2003 | Pratt et al. | 356/141.4 |
| 6,644,156 B2 | 11/2003 | Villacis | 83/425 |
| 6,644,825 B2 | 11/2003 | Lin | |
| 6,647,868 B2 | 11/2003 | Chen | 100/99 |
| 6,662,457 B2 | 12/2003 | Dameron | 33/286 |
| 6,664,499 B1 | 12/2003 | Brink et al. | |
| 6,684,750 B2 | 2/2004 | Yu | 83/473 |
| 6,688,203 B2 | 2/2004 | Chen | 83/520 |
| 6,692,200 B2 | 2/2004 | Peterson | |
| 6,717,166 B2 | 4/2004 | Pease | |
| 6,729,215 B2 | 5/2004 | Nishina | |
| 6,735,879 B2 | 5/2004 | Malard et al. | |
| 6,736,042 B2 | 5/2004 | Behne et al. | 83/440.2 |
| 6,736,044 B2 | 5/2004 | Chang | 83/473 |
| 6,736,303 B2 | 5/2004 | Bruins et al. | |
| 6,739,042 B2 | 5/2004 | Thorum | 29/832 |
| 6,750,884 B1 | 6/2004 | Steigerwald et al. | |
| 6,763,281 B2 | 7/2004 | Schauer et al. | |
| 6,763,597 B2 | 7/2004 | Lysen | 33/286 |
| 6,776,076 B2 | 8/2004 | Salazar | |
| 6,823,600 B1 | 11/2004 | Vaughan | |
| 6,851,487 B1 | 2/2005 | Shotey | |
| 6,878,954 B2 | 4/2005 | Butler et al. | |
| 6,889,441 B2 | 5/2005 | Seiffert | |
| 6,898,860 B2 | 5/2005 | Wu | |
| 6,899,006 B2 | 5/2005 | Jolkovski | |
| 6,915,581 B2 | 7/2005 | Harris | |
| 6,926,473 B2 | 8/2005 | Luebke | |
| 6,928,332 B2 | 8/2005 | Gass | |
| 6,934,667 B2 | 8/2005 | Kodosky et al. | |
| 6,937,336 B2 | 8/2005 | Garcia et al. | |
| 6,978,552 B1 | 12/2005 | Sluder | |
| 6,979,155 B2 | 12/2005 | Dils et al. | |
| 7,042,555 B1 | 5/2006 | Lawson | |
| 7,044,846 B2 | 5/2006 | Eilertsen | |
| 7,073,268 B1 | 7/2006 | Etter et al. | |
| 6,854,191 B2 | 2/2007 | Kim | |
| 7,226,179 B2 | 6/2007 | Garcia et al. | |
| 7,243,440 B2 | 7/2007 | DeKeyser | |
| 6,448,986 B1 | 9/2007 | Smith | |
| 2001/0028025 A1* | 10/2001 | Pease | 250/208.1 |
| 2001/0029819 A1 | 10/2001 | Okouchi | 83/13 |
| 2001/0034951 A1 | 11/2001 | Sears | 33/640 |
| 2001/0049988 A1 | 12/2001 | Ushiwata et al. | 83/520 |
| 2002/0000148 A1 | 1/2002 | Brun | 83/520 |
| 2002/0054491 A1 | 5/2002 | Casas | 362/119 |
| 2002/0059871 A1 | 5/2002 | Chen | 100/35 |
| 2002/0131267 A1 | 9/2002 | Van Osenbruggen | 362/109 |
| 2002/0146295 A1 | 10/2002 | Schaer et al. | 408/16 |
| 2002/0157511 A1 | 10/2002 | Lindenberger | |
| 2002/0164217 A1 | 11/2002 | Peterson | 408/1 R |
| 2002/0170404 A1 | 11/2002 | Peot et al. | 83/478 |
| 2003/0000355 A1 | 1/2003 | Butler et al. | 83/13 |
| 2003/0010173 A1 | 1/2003 | Hayden | 83/520 |
| 2003/0027353 A1 | 2/2003 | Bright et al. | 436/173 |
| 2003/0029050 A1 | 2/2003 | Fung et al. | 33/626 |
| 2003/0101857 A1 | 6/2003 | Chuang | 83/477.1 |
| 2003/0127086 A1 | 7/2003 | Brauninger et al. | |
| 2003/0150312 A1 | 8/2003 | Chang | 83/473 |
| 2003/0197138 A1 | 10/2003 | Pease et al. | 250/559.19 |
| 2003/0200851 A1 | 10/2003 | Yu | 83/471.3 |
| 2003/0209678 A1 | 11/2003 | Pease | 250/559.19 |
| 2003/0233921 A1 | 12/2003 | Garcia et al. | 83/520 |
| 2004/0032587 A1 | 2/2004 | Garcia et al. | 356/399 |
| 2004/0040169 A1 | 3/2004 | Davis | |
| 2006/0075867 A1 | 4/2006 | Etter et al. | |
| 2006/0101969 A1 | 5/2006 | Garcia et al. | |

FOREIGN PATENT DOCUMENTS

| | | |
|---|---|---|
| DE | 10206162 | 9/2003 |
| JP | 55125954 | 9/1980 |
| JP | 61061705 | 3/1986 |
| JP | 61131246 | 6/1986 |
| JP | 61159312 | 7/1986 |
| JP | 62166914 | 7/1987 |
| JP | 62274738 | 11/1987 |
| JP | 63162143 | 7/1988 |
| JP | 08197381 | 8/1996 |

OTHER PUBLICATIONS

"Delta, Building Trades and Home Shop Machinery"; Catalog published in Jan. 1993; (see generally pp. 5-25), 84 pages.

Craftsman Operator's Manual, "Laser Compound Miter Saw with Retractable Laser Trac® System, Model No. 137.212540," Part No. 137212540001; Sears, Roebuck and Co., Hoffman Estates, IL 60179; www.sears.com/craftsman; © Sears, Roebauck and Co.; 34 pages.

"Hitachi Model C 10FSH and C 10FSB Slide Compound Saw, Safety Instructions and Instruction Manual," issued by Hitachi Koki Co., Ltd., Shinagawa Intercity Tower A, 15-1, Konan 2-chome, Minato-ku, Tokyo 108-6020, Japan; pp. 1-30, 88, 90, and 92; 33 pages.

* cited by examiner

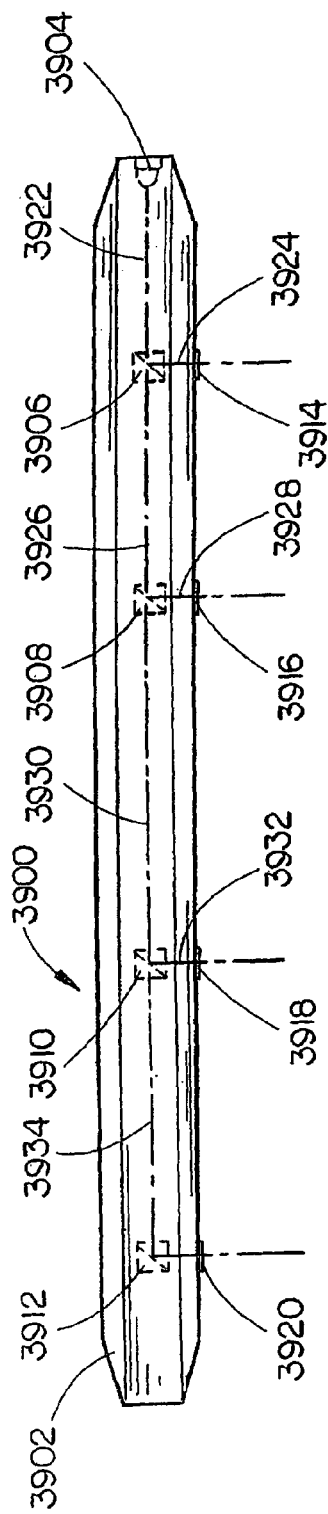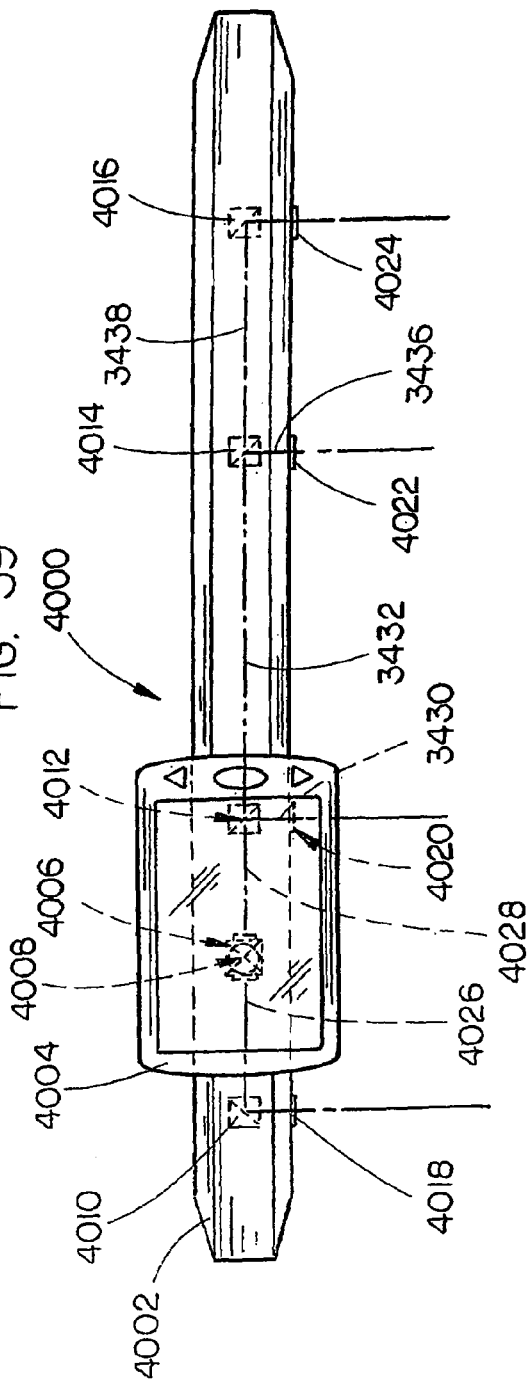
FIG. 39
FIG. 40

POWER TOOL CONTROL SYSTEM USER INTERFACE

CROSS REFERENCE TO RELATED APPLICATIONS

The present invention is a continuation of U.S. application Ser. No. 10/463,206, filed on Jun. 16, 2003, which is a continuation-in-part and claims priority under 35 U.S.C. § 120 to U.S. application Ser. No. 10/445,290, filed on May 21, 2003; which in-turn claims priority under 35 U.S.C. § 119 to U.S. Provisional Application Ser. No. 60/429,840, filed on Nov. 27, 2002, and is a continuation-in-part and claims priority under 35 U.S.C. § 120 to U.S. application Ser. No. 10/413,455, filed on Apr. 14, 2003; which in-turn claims priority under 35 U.S.C. § 119 to U.S. Provisional Application 60/414,200, filed on Sep. 27, 2002 and U.S. Provisional Application 60/373,752, filed on Apr. 18, 2002, all of which are herein incorporated by reference in their entireties.

The following commonly assigned United States Patents are herein encorporated by reference in their entirety: U.S. Pat. No. 5,285,708, entitled: *Miter Saw Alignment System*, and U.S. Pat. No. 5,375,495, entitled: *Optical Alignment System For Circular Power Saws*.

FIELD OF THE INVENTION

The present invention generally relates to the field of power tools, and particularly to a power tool control system for use with a variety of power tools, such as table saws, belt sanders, lathes, disc sanders, planers, wood shapers, boring machines, jointers, drill presses, and the like.

BACKGROUND OF THE INVENTION

Power tools are used to accomplish a variety of tasks. No matter the task, the production of accurate and precise work is a high priority. Unfortunately, the precision and accuracy of work performed on these power tools is limited by human error and sub-standard equipment. Even when equipment with the latest advances, such as laser guidance technology, is employed it is often the case that the use of such technology is difficult for the equipment operator. The difficulties experienced by an operator may be due to a variety of reasons, such as inadequate instructional aids available from the manufacturer or dealer, overly complex operational requirements, or a poorly designed and organized user interface. Such difficulties have rendered many valuable advances in tool technology unpopular or obsolete due to operator dissatisfaction and frustration.

Many power tools today have incorporated guidance mechanisms, such as laser guidance technology, into their power tool assembly. These mechanisms assist an operator in identifying and maintaining an accurate work product as the power tool executes a function upon a work piece. However, the operator is still required to establish the location of operation and this may result in imprecise and inaccurate work piece production due to imprecise measurements and settings established by the operator. Further, it is often necessary to perform different functions and then return to previous settings. Consequently, the operator is forced to establish and then re-establish settings, which may lead to further imprecision and inaccuracy in the work product produced due to operator error.

Additionally, the use of advanced technology such as the laser guidance systems often provide user interface technology which is limited in capabilities, lacks a coherent and easily understood organizational structure for the information it gathers and provides to the operator, and makes accessing the information made available by it use difficult due to low quality display mechanisms and user interaction assemblies. Many of the difficulties experienced by operator's when employing the user interface devices may primarily be the result of a focus on the technology and not the user. For example, the user interface may provide the ability to access numerous features but have a display mechanism that is so cluttered that it becomes burdensome to decipher the relevant information. Many times, to correct for this problem, the user interface is stripped of numerous capabilities and the user is left with insufficient resources to accomplish their tasks.

Therefore, it would be desirable to provide a power tool control system that enables a power tool operator to establish precise and accurate measurements and settings for a power tool and provide a user friendly user interface assembly in order to ensure work product of a high quality.

SUMMARY OF THE INVENTION

Accordingly, the present invention is a power tool control system that enables a user to operate a power tool through a graphical user interface communicatively coupled with a non-contact measurement and alignment device. The graphical user interface correlates user engageable selectors with a logically related menu of power tool setting options displayed on a display screen in a high quality and easily readable format. The non-contact measurement and alignment device uses one or more lasers to determine power tool settings and establish proper alignment based on user needs.

In a second aspect of the present invention a table saw comprising a frame coupled with a table, said table having an aperture. A trunion moveably and operatively connected to said frame, said trunion supporting a blade and drive assembly, said blade capable of being operatively extended from said table aperture, said blade being operatively tilted in at least one axis tangent to said table. A fence moveably coupled with said table and generally moveable parallel to said blade. A non-contact measurement and alignment device operative with said table saw, the non-contact measurement and alignment device for determining at least two of a table saw setting: (i) blade height, (ii) blade angle, and (iii) fence to blade distance. A graphical-user-interface communicatively coupled with the non-contact measurement and alignment device, the graphical-user-interface for user operation of said table saw for indicating at least two of a table saw setting: (i) blade height, (ii) blade angle, and (iii) fence to blade distance.

It is an object of the present invention to provide a user friendly power tool control system which presents information and options to the user in a logical manner and allows the user to move within the entire range of applications simply and easily. The correlation of the position of the user engaged selectors with the on screen display options provides an easy to follow progression of power tool setting options. By focusing on the user, the technology is designed to be accessible within a system that a typical person can access without having to spend time learning about the system and its capabilities. This may provide a significant advantage over prior or current systems where the technology is the focus and the user is a secondary consideration.

It is a further object of the present invention to provide power tools employing or capable of employing the power tool control system. In the present application, specific examples illustrate the use of the present invention with a table saw, belt sander, lathe, router, nail gun, drills, drill press, and the like. However, it should be understood that the present invention is contemplated for use with devices which require precise and accurate measurements and settings in order to accomplish a specific task and that would benefit from removing human error from the establishment of these measurements and settings.

It is a still further object of the present invention to provide a graphical user interface which enables the operation of a power tool through textual and graphical representations on a display screen. The user interface provides logically related menus and folders within the menus which contain various applications and functionality which are easily accessed and displayed in a clear format.

It is an additional object of the present invention to provide a power tool control system which may be interchanged with various power tool systems. Further, the power tool control system may receive application services which update the existing applications and may provide new applications.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 39 is an illustration of a laser apparatus with a single laser source providing a laser beam which is split to emit separate laser beams from the laser beam source assemblies located within the housing by optical splitters;

FIG. 40 is an illustration of the laser apparatus coupled with a computing system that provides a single laser beam which is split to emit separate laser beams from the laser beam source assemblies located within the housing by optical splitters;

DETAILED DESCRIPTION OF THE INVENTION

Reference will now be made in detail to the presently preferred embodiments of the invention, examples of which are illustrated in the accompanying drawings.

Figure 1:
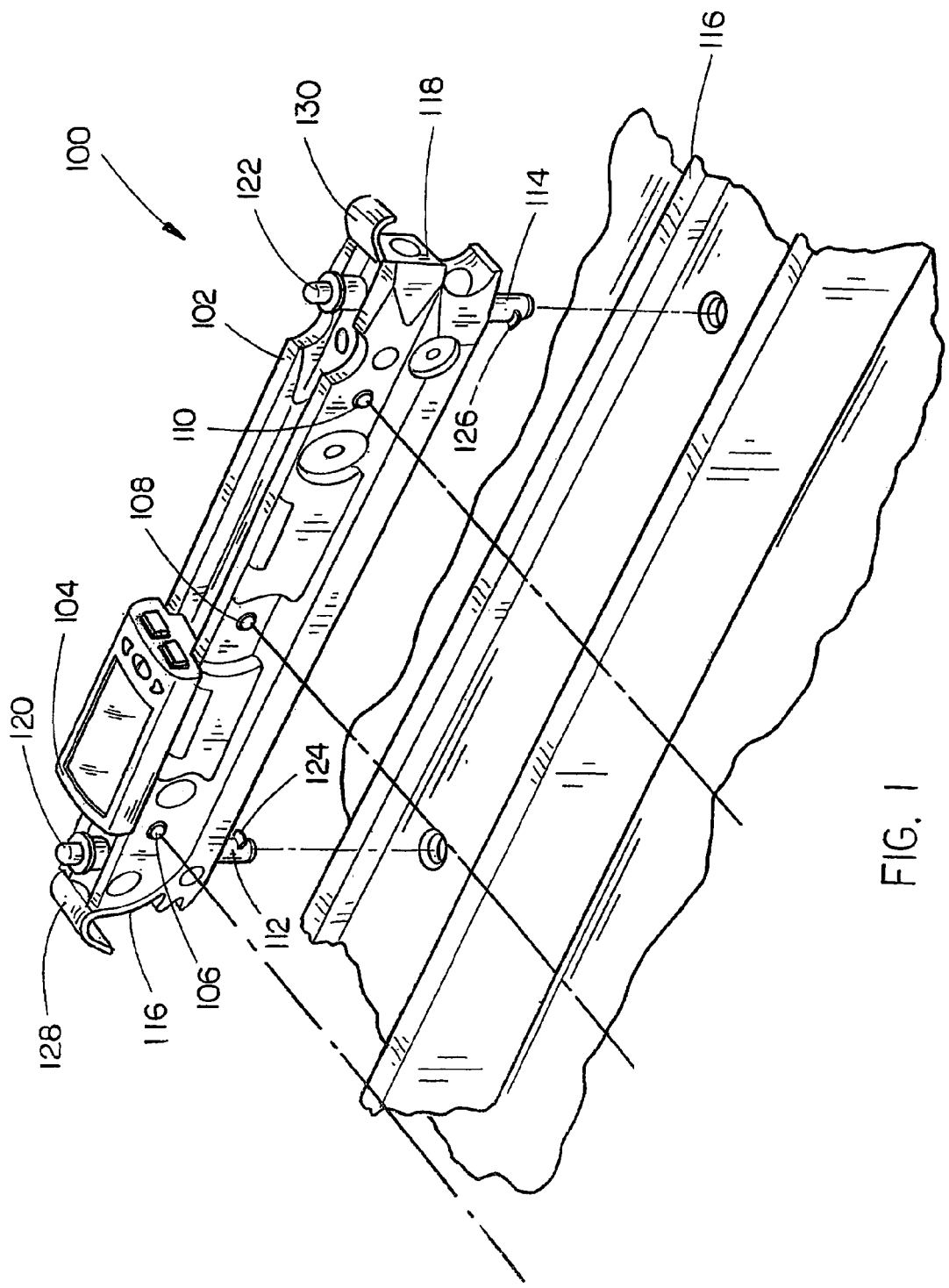
FIG. 1 is an illustration of a laser apparatus including a computing system in accordance with an exemplary embodiment of the present invention.

Referring generally now to FIG. 1, a laser apparatus 100 of the present invention is shown. In the present embodiment, the laser apparatus 100 comprises a housing 102 coupled with a computing system 104. Further, the housing 102 is disposed with a first laser source 106, a second laser source 108, and a third laser source 110. Alternatively, the housing 102 may include a greater or fewer number of laser beam sources in order to meet the needs of a manufacturer or consumer. Each of the three laser sources 106 through 110 is in communication with the computing system 104. In the current embodiment the communicative link is a wireless system, however, alternate systems, such as serial cable, infrared, or the like may be employed.

In the present embodiment, the laser sources 106 through 110 are enabled to emit infrared laser beams. These laser beams are invisible to the human eye, however, light emitting diodes may be linked to the laser beam in order to provide a visual indicator of the travel of the laser beam. In an alternate embodiment the laser sources may be enabled to emit various types of laser beams, such as an ultraviolet laser beam, or the like without departing from the scope and spirit of the present invention.

Additionally, a first mounting member 112 and a second mounting member 114 are coupled with the housing 102. The number, location, and configuration of the mounting members may vary as contemplated by one of ordinary skill in the art. The mounting members are suitable for connecting the housing 102 to another device such as a power tool. The power tool may be a table saw, a belt sander, a planer, a disc sander, a lathe, a drill press, and the like. In the current embodiment the laser apparatus 100 is shown being suitable for mounting on a fence 116 which would normally be coupled with a table saw. As shown, the mounting members 112 and 114 include a first latch 124 and a second latch 126 which slide through and latch the housing 102 to a mounting assembly, power tool, or other devices. In the current embodiment the first and second latches 124 and 126 are compression latches. However, it is understood that the current latch system may be a variety of latching mechanisms without departing from the scope and spirit of the present invention.

The latches 124 and 126 are operably coupled with a first release mechanism 120 and a second release mechanism 122, respectively. In the present embodiment, the first and second release mechanisms 120 and 122 are depression buttons, operable by a user by pressing down on the buttons. However, other release mechanisms, such as switches, rotation knobs, or the like, may be employed without departing from the scope and spirit of the present invention. By depressing the buttons 120 and 122 the latches 124 and 126 are retracted into the mounting member upon which they are disposed. This allows the user to engage and remove the housing 102, of the laser apparatus 100, from the mounting assembly, power tool, or other device the user is currently operating. The location and number of release mechanisms may vary as determined by the number of mounting members and latches disposed on the laser apparatus 100.

The housing further provides the user a first grip 128 and a second grip 130 proximally located next to the buttons 120 and 122. The two grips 128 and 130 are ergonomically shaped to provide the user a secure location with which to grip the housing 102 for depressing the first and second buttons 120 and 122 and releasing the compression latches 124 and 126. The two grips may also be used in transporting the laser apparatus 100.

Figure 10:
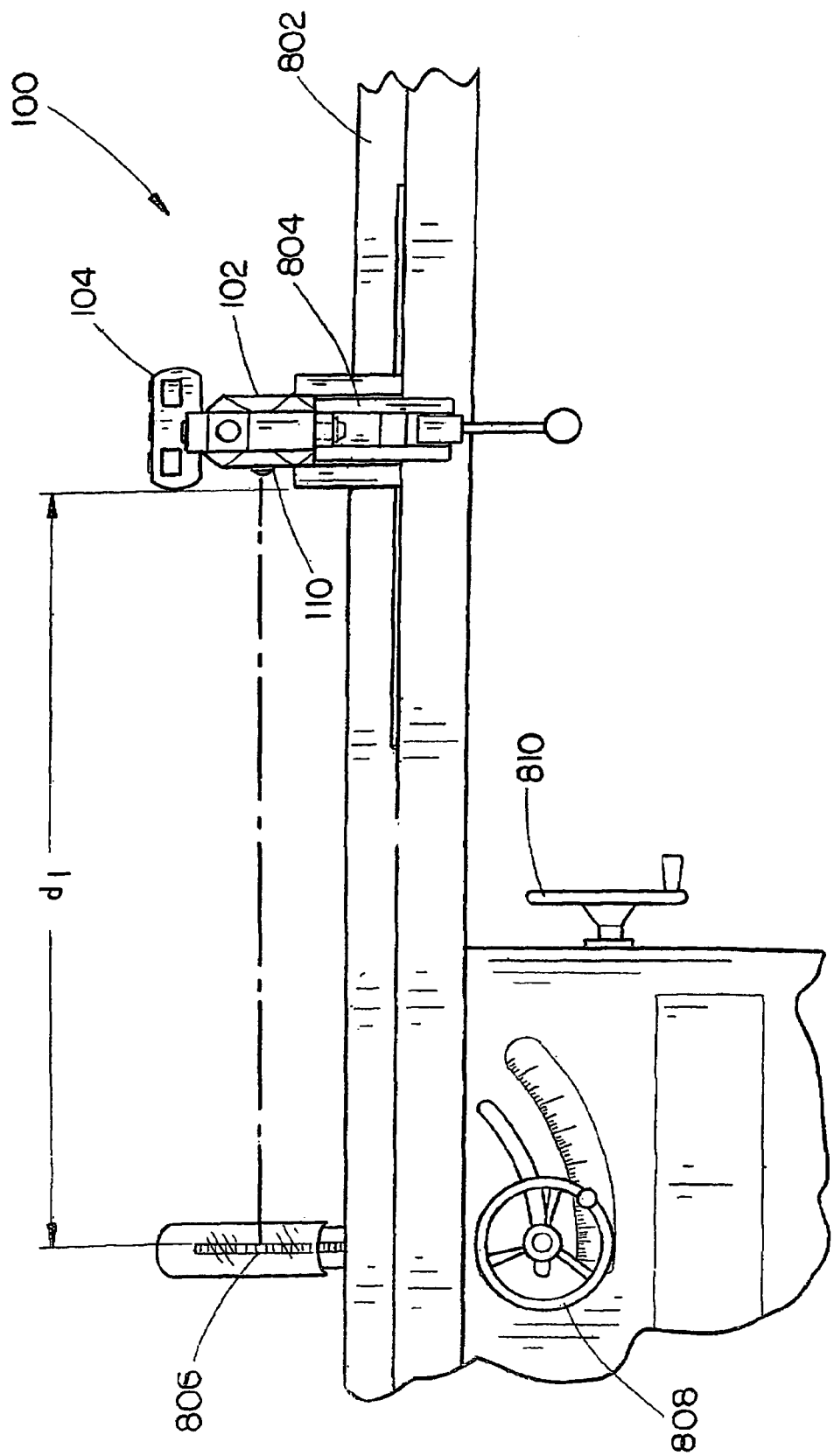
FIG. 10 is a side elevation view of the table saw system of FIG. 8 illustrating the laser apparatus emitting a single laser beam for establishing a distance measurement.

It is further contemplated that the laser apparatus 100 may include a laser source which emits an incident laser beam from either a first end 116 or a second end 118 of the housing 102. Such a configuration may be desirable in situations where a user needs only one laser beam to produce a finished work product, such as when working on a lathe machine as shown in FIG. 10.

In an alternate embodiment, the three laser beam sources 106, 108, and 110, may comprise modular laser source units. The modular laser source units may be capable of being removed from and inserted into the housing 102. The modular laser source units may be locked in position, once inserted into the housing 102, by use of a variety of system, such as a latch system, compression system, or the like. There may be a variety of modular laser source units disposed with laser sources of varying power. Further, the modular laser source units may include a dithering assembly enabling the laser source to provide dithering functionality. For further discussion on dithering assemblies see FIGS. 21 through 24 below.

Further, the laser apparatus 100 may be comprised of a single laser source. The single laser source may emit an incident laser beam through the housing 102. The single laser source may be attached at either the first end 116 or the second end 118 of the housing 102. Alternatively, the single laser source may be included in the computing system 104. In a single laser source configuration optical splitters, optical reflectors, and photomultipliers may be employed in order to facilitate the functional capabilities of the laser apparatus 100. A detailed discussion of the single laser source design, including the use of optical splitters, optical reflectors, and photomultipliers, is provided in FIGS. 36 through 40.

In the present embodiment, the computing system 104 controls the functioning of each of the three laser sources 106 through 110. A user interacts with the computing system 104 and directs the emitting of a laser beam from each of the three laser sources. Additionally, the computing system 104 monitors the laser beams and provides a display to the user of relevant information.

The information provided on the display may include distance measurements, blade height measurements, blade angle, and the like. Additionally, the laser beams may provide information regarding the truing of the machine and a work piece, and the indexing of the work piece. For example, in a belt sander apparatus as will be shown and discussed in FIG. 11, the user may ensure that the angle of the sander matches the desired specifications using the laser apparatus. Further, a work piece to be presented to the sander may be verified by the laser apparatus to be in the correct position for presentation to the sander. The laser apparatus may also provide an indexing functionality by determining the leading edge of the work piece and monitoring the distance traveled by the work piece. It is contemplated that other information relevant to a variety of power tools may also be provided by the computing system to the user.

Figure 2:
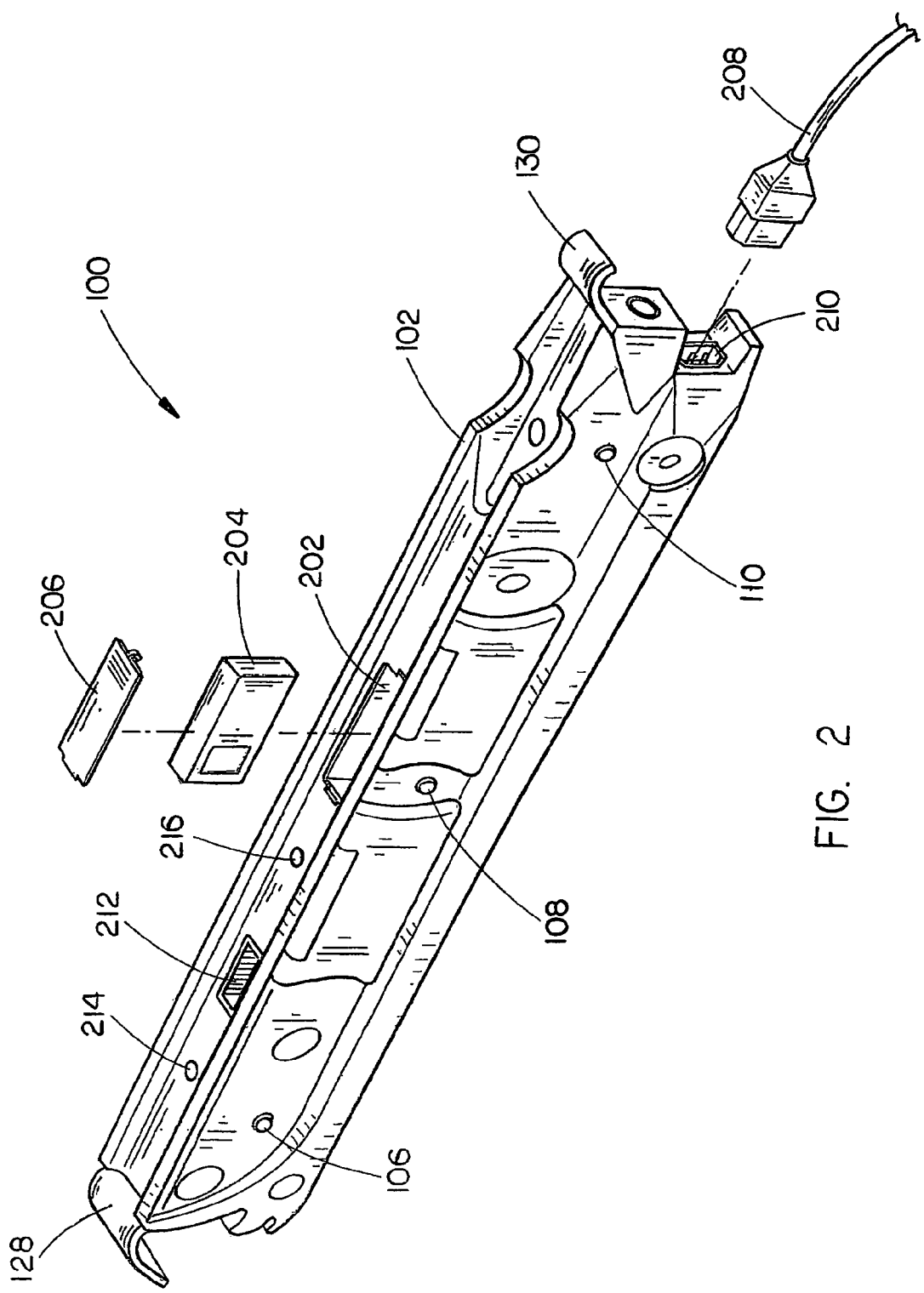
FIG. 2 is an illustration of the laser apparatus showing alternative power supply embodiments.

Referring now to FIG. 2, the laser apparatus 100 is shown. The housing 102 includes a first receptor port 202 suitable for receiving a portable power source 204. The portable power source 204 provides power for the operation of the laser sources disposed within the housing 102. The first receptor port 202 further includes a removable hatch 206 which fastens in place over the opening of the first receptor port 202. The portable power source 204 may be a variety of devices, such as a rechargeable battery or the like, without departing from the scope and spirit of the present invention.

Also shown in FIG. 2 is an alternate configuration of the housing 102 where power may be received via a power cord 208 which engages a second receptor port 210. It is understood that typically only one of the above mentioned power source configurations will be employed on the laser apparatus 100 and that FIG. 2 is only an exemplary embodiment of two possible configurations. Further, the location and configuration of the first and second receptor ports 202 and 210 may be varied as contemplated by one of ordinary skill in the art.

Additionally, a communication port 212 is included in the housing 102 of the laser apparatus 100. The communication port 212 provides a communicative link to the computing system 104, allowing the computing system to communicate with the laser sources 106 through 110 disposed within the housing 102. The location and configuration of the communication port 212 may vary as contemplated by one of ordinary skill in the art without departing from the scope and spirit of the present invention. Further, a first coupling port 214 and a second coupling port 216 are included on the housing 102 for coupling with the computing system 104 as will be further described in FIG. 6.

Figure 3:
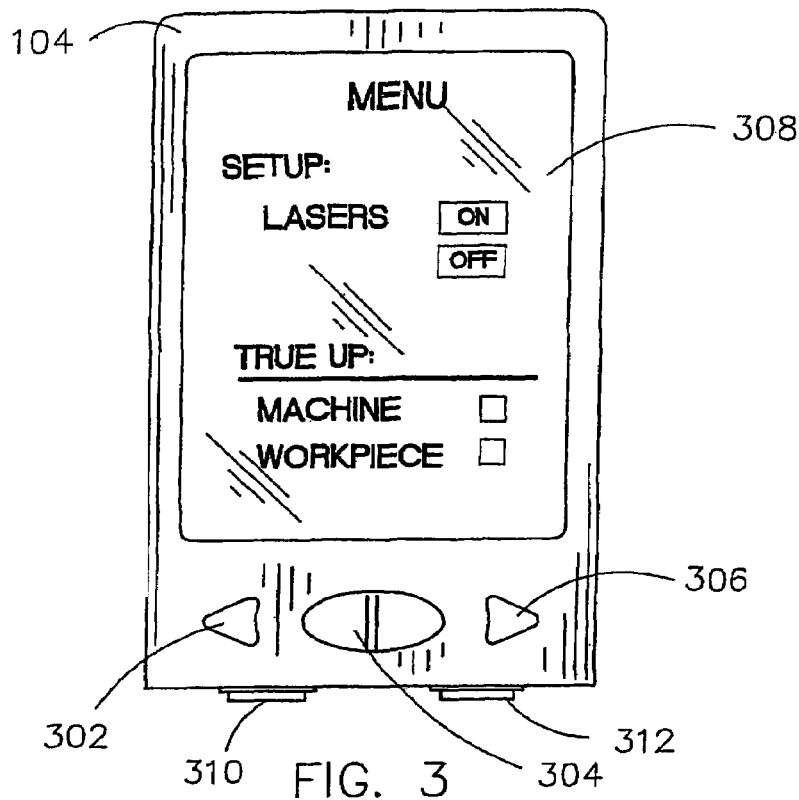
FIGS. 3 and 4 illustrate the computing system shown in FIG. 1, including display screens.
Figure 4:
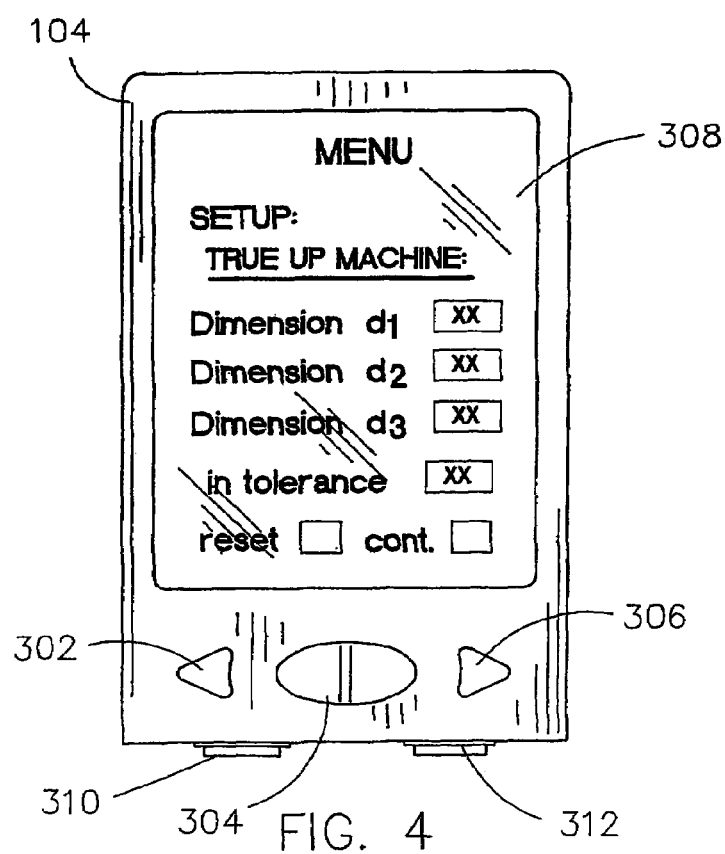

FIGS. 3 and 4 show exemplary displays on the computing system 104. Being an interactive system, the computing system 104 includes a first selector 302, a second selector 304, and a third selector 306. The first selector 302 and the third selector 306 allow a user to scroll through choices presented on a display screen 308 of the computing system 104. The second button 304 allows a user to select the desired application choice presented on the display screen 308. For example, in FIG. 3 a user may choose to turn on or turn off the lasers by using the first and third buttons 302 and 306 to select the desired function and then pressing the second button 304 to execute the function. In FIG. 4 the display screen 308 is providing a user with the readouts determined during the process of truing the machine. The user may accept these dimensions by selecting the "cont." function or reject these dimensions by selecting the "reset" function. It is understood that the displays presented on the display screen 308 are exemplary and may not be read as exclusive. A variety of displays and interactive functionalities may be presented on display screen 308 without departing from the scope and spirit of the present invention.

Various configurations of the computing system 104 may be employed without departing from the scope and spirit of the present invention. Ergonomic shaping and providing additional capabilities is contemplated. The display screen may be a liquid crystal display, back lit monitor, or the like, while the selector features may include rollers, ball knobs, or the like.

In the current embodiment, on one end of the computing system 104 are coupled a first button 310 and a second button 312. Preferably, these buttons are depression buttons, however, other systems as contemplated by one of ordinary skill in the art may be employed. The two buttons are used in the coupling and uncoupling of the computing system 104 with the housing 102 of the laser apparatus 100, as will be described in FIGS. 5 and 6.

Figure 5:
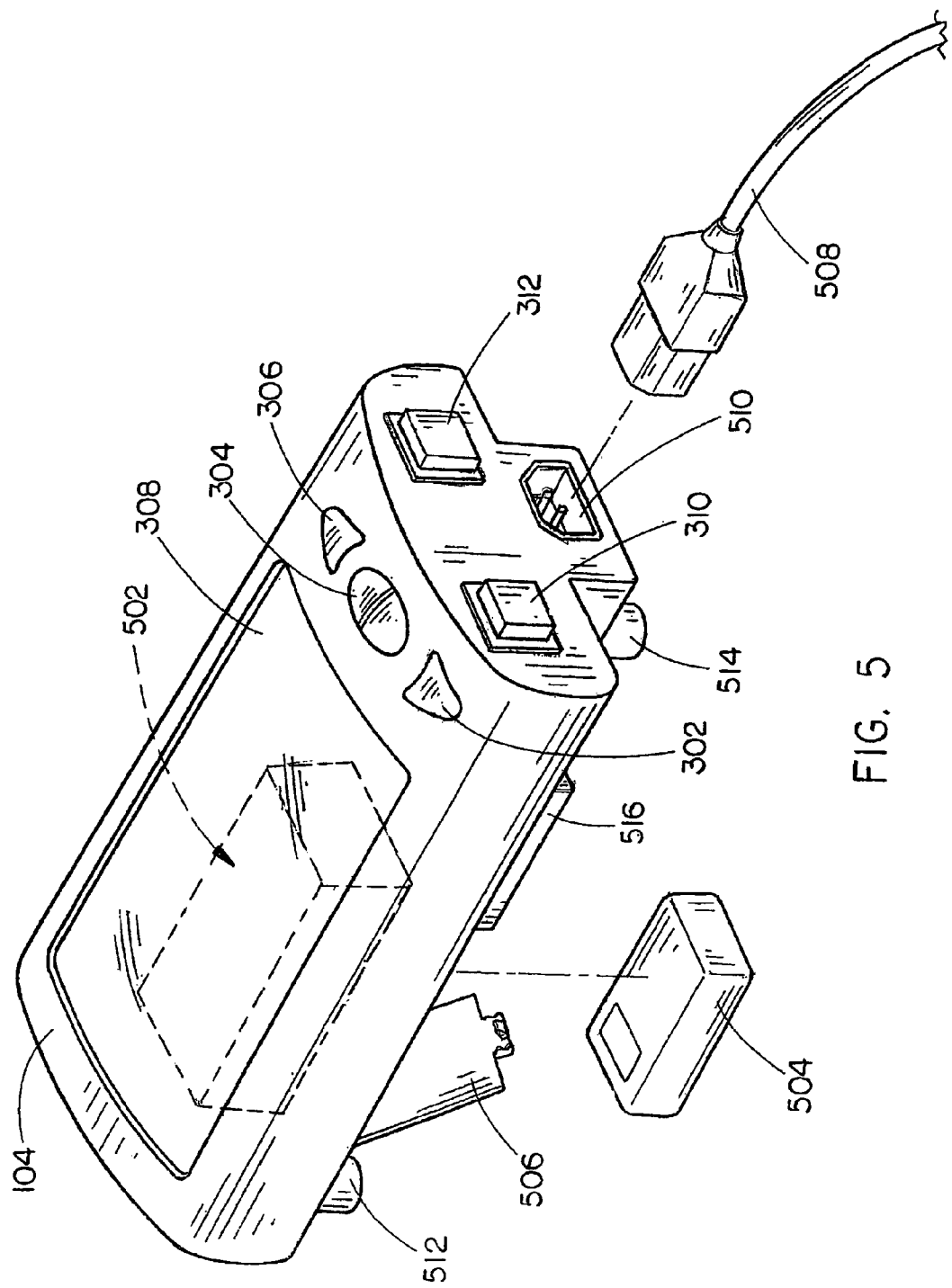
FIG. 5 is an illustration of the computing system showing alternative power supply embodiments.

In FIG. 5 the computing system 104 includes a first receptor port 502 suitable for receiving a portable power source 504. The portable power source 504 provides power for the operation of the computing system 104 that may be coupled to the housing 102 and is in communication with the laser sources. The first receptor port 502 further includes a removable hatch 506 which fastens in place over the opening of the first receptor port 502. As described for the portable power source 204 of the housing 102, the portable power source 504 may be a variety of devices, such as a rechargeable battery or the like, without departing from the scope and spirit of the present invention. In an alternate configuration the computing system 104 may receive power from a power cord 508 which engages a second receptor port 510. The location and configuration of the first and second receptor ports 502 and 510 may be varied as contemplated by one of ordinary skill in the art.

Additionally, the computing system 104 includes a first mounting member 512 and a second mounting member 514. These two mounting members couple with the housing 102 of the laser apparatus 104. It is contemplated that a latch and release mechanism is disposed within one of the two mounting members and operably connects with the two buttons 310 and 312. Further, the computing system 104 includes a communication adapter 516 that engages with the communication port 212, shown in FIG. 2, disposed on the housing 102.

Figure 6:
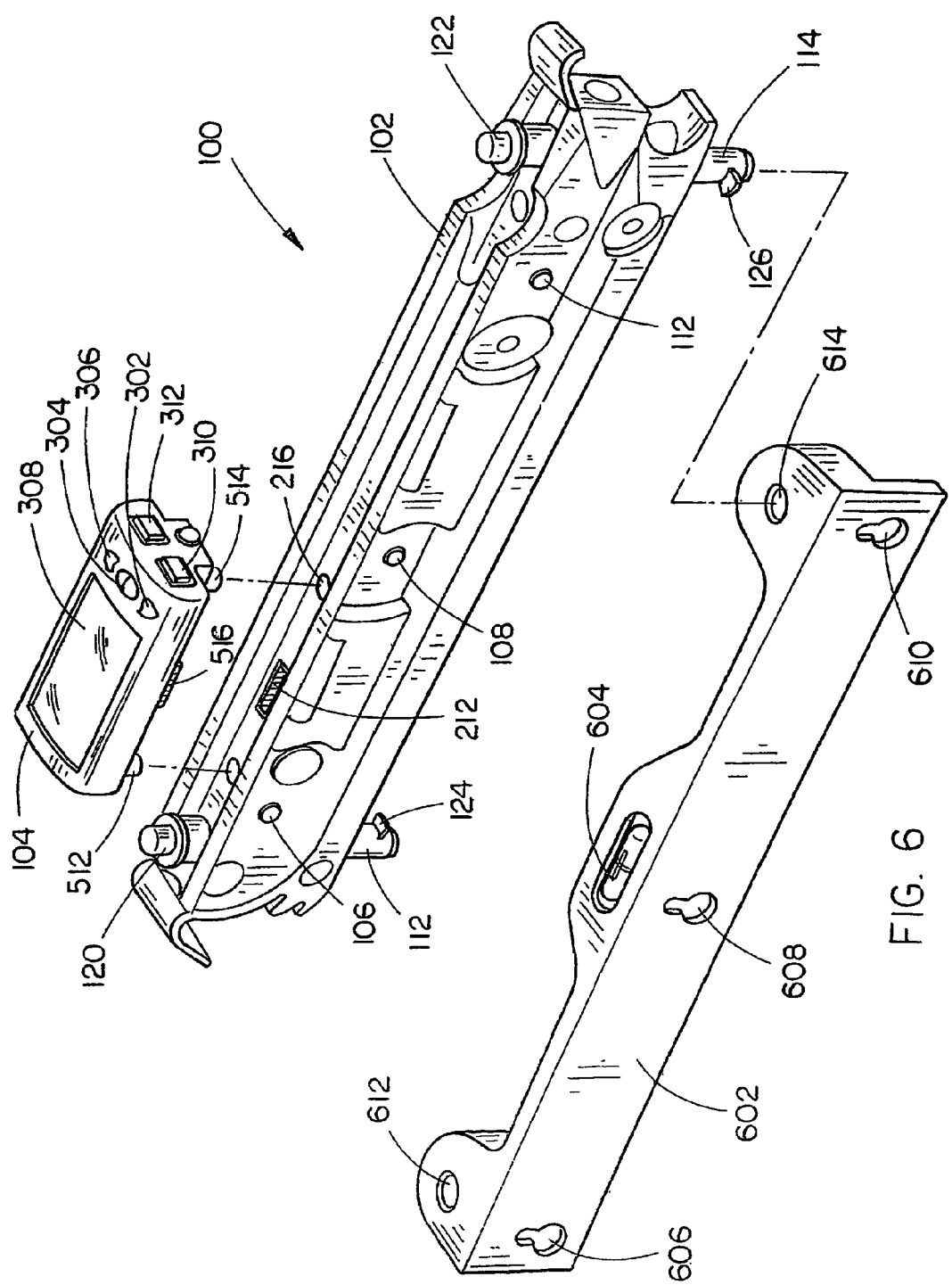
FIG. 6 is an illustration of the laser apparatus coupled to a leveling assembly in accordance with an exemplary embodiment of the present invention.

Referring to FIG. 6, the laser apparatus 100 is shown with computing system 104 in vertical orientation over the communication port 212 and the first and second coupling ports 214 and 216. The first and second mounting members 512 and 514, disposed on the computing system 104, are positioned to engage with the first and second coupling ports 214 and 216, respectively. The communication adapter 516 is positioned to engage with the communication port 212. In this preferred embodiment, a user must supply sufficient force to couple the computing system 104 with the housing 102. As discussed above in FIG. 3, the first and second buttons 310 and 312 are operably engaged as part of a latch and release mechanism which locks the computing system 104 in place. A latch or latches may be located on the mounting members 512 and/or 514, and as the computing system 104 is pressed into place they may engage with the inside of the coupling ports 214 and/or 216. In order to remove the computing system 104 form the housing 102, the user will depress one or both of the first and second buttons 310 and 312, which will release the latches from the coupling ports allowing the computing system 104 to release from the housing 102. Other systems may be employed to affix the computing system 104 to the housing 102 without departing from the scope and spirit of the present invention.

The laser apparatus 100 is shown engaging a mounting assembly 602. Preferably, the mounting assembly 602 includes a leveling device 604. The mounting assembly includes a first mounting port 606, a second mounting port 608, and a third mounting port 610. Initially the mounting assembly 602 is mounted to a power tool or other desired device by using the mounting ports. It is contemplated that the mounting ports may be a variety of configurations as contemplated by one of ordinary skill in the art. Before the laser apparatus 100 is connected a user may establish that the mounting assembly 602 is in a level position by checking the leveling device 604. In this way the user may ensure that the laser apparatus 100 is level once it is connected to the mounting assembly 602. The mounting assembly 602 further includes a first coupling port 612 and a second coupling port 614 which engage the mounting members 112 and 114 of the laser apparatus 100.

Figure 7:
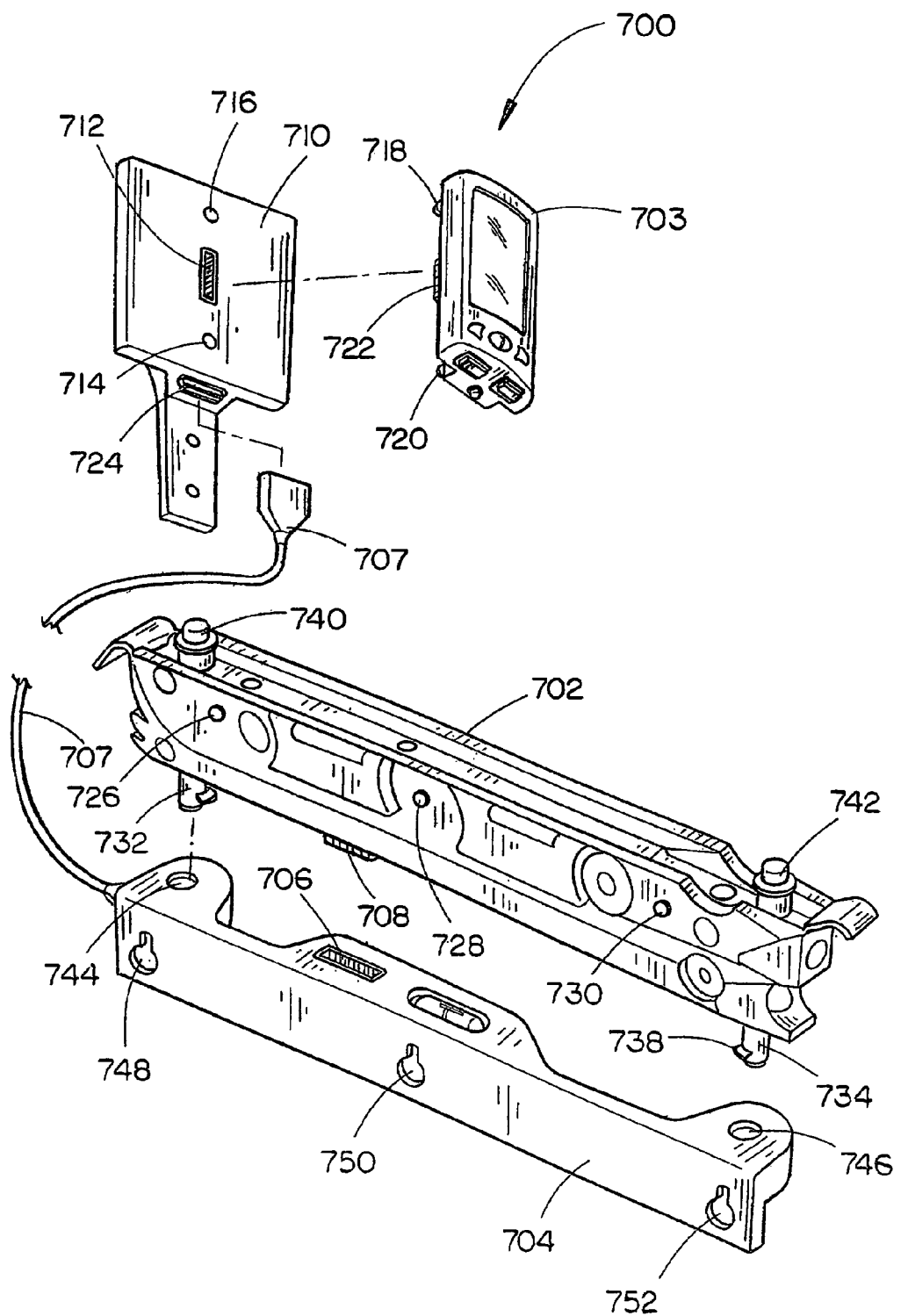
FIG. 7 is an illustration of a laser apparatus coupled to a level assembly and in communication with a remote computing system.

Referring now to FIG. 7, a laser apparatus 700 is shown. The laser apparatus 700 includes a housing member 702 in communication with a remote computing system 703. The housing member 702 is disposed with a first laser source 726, a second laser source 728, and a third laser source 730. Additionally, a mounting assembly 704 capable of connecting with the housing member 702 and providing a communication link between the housing member 702 and the remote computing system 703, is included.

The housing member 702 is similar to that shown and described in FIGS. 1, 2, and 6, except that the housing member 702 further includes a communication adapter 708 and does not include the communication port shown in FIGS. 2 and 6. The communicative adapter 708 communicatively couples with the remote computing system 703 by engaging the communication adapter 708 in the communicative coupling point 706. This communicative linking allows a user of the laser apparatus 700 to control the laser sources 726 through 730 through the use of the remote computing system 703. Additionally, the housing member includes a first mounting member 732 and a second mounting member 734. The first mounting member 732 is disposed with a compression latch 736 and is operably engaged with a first depression button 740. The second mounting member 734 is disposed with a compression latch 738 and is operably engaged with a second depression button 742. The first mounting member 732 couples with a first coupling port 744 disposed on the mounting assembly 704, and the second mounting member 734 couples with a second coupling port 746 disposed on the mounting assembly 704. As described previously the first and second depression buttons allow the user to remove the housing member 702 from the mounting assembly 704.

The remote computing system 703 is similar to that shown and described in FIGS. 1, and 3 through 6 except that it couples with a remote mounting member 710. The remote mounting member 710, preferably, mounts to a stationary surface, such as a wall, and provides a first communication port 712 for coupling with a communication adapter 722 disposed on the remote computing system 703. Additionally, the remote mounting member 710 includes a first coupling port 714 and a second coupling port 716 for coupling with a first mounting member 718 and second mounting members 720 of the remote computing system 703. Further, the remote mounting member 710 includes a second communication port 724 which couples with a communication adapter 707 connected to the mounting assembly 704.

The mounting assembly 704 is similar to the mounting assembly shown in FIG. 6, except that the mounting assembly 704 further includes a communicative coupling port 706 and a communication adapter 707. The communication adapter 708, disposed on the housing member 702, engages with the communication port 706 providing a communicative link. The communicative link from the housing member 702 to the remote computing system 703 is completed through the coupling of the communication adapter 707 with the second communication port 724 of the remote mounting member 710. The mounting assembly 704 includes a first mounting port 748, a second mounting port 750, and a third mounting port 752. These mounting ports allow the mounting assembly 704 to be coupled to a variety of devices such as power tools and the like.

Figure 8:
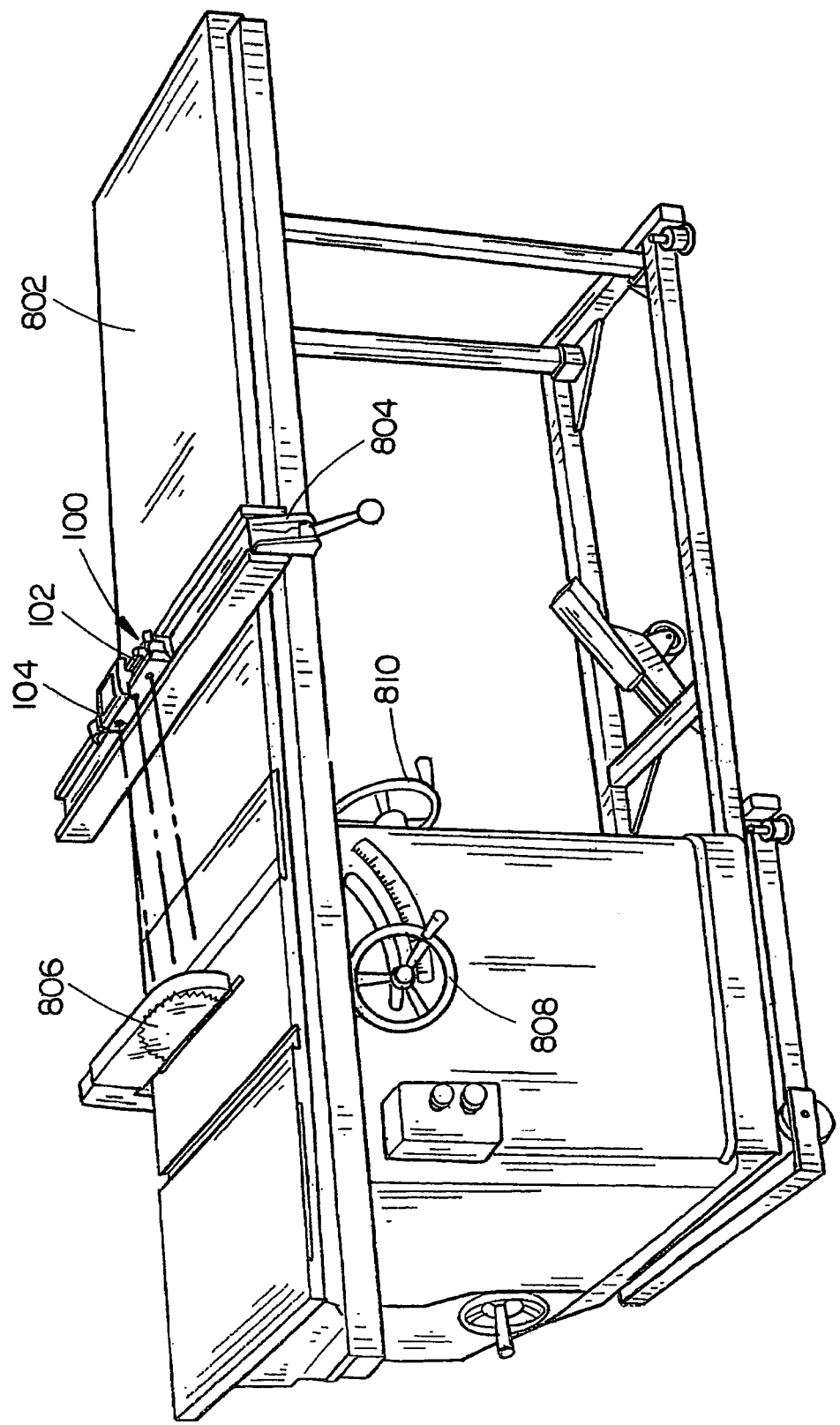
FIG. 8 is an isometric illustration of a table saw system including the laser apparatus shown in FIG. 1 coupled to a fence connected to a table saw emitting three laser beams.
Figure 9:
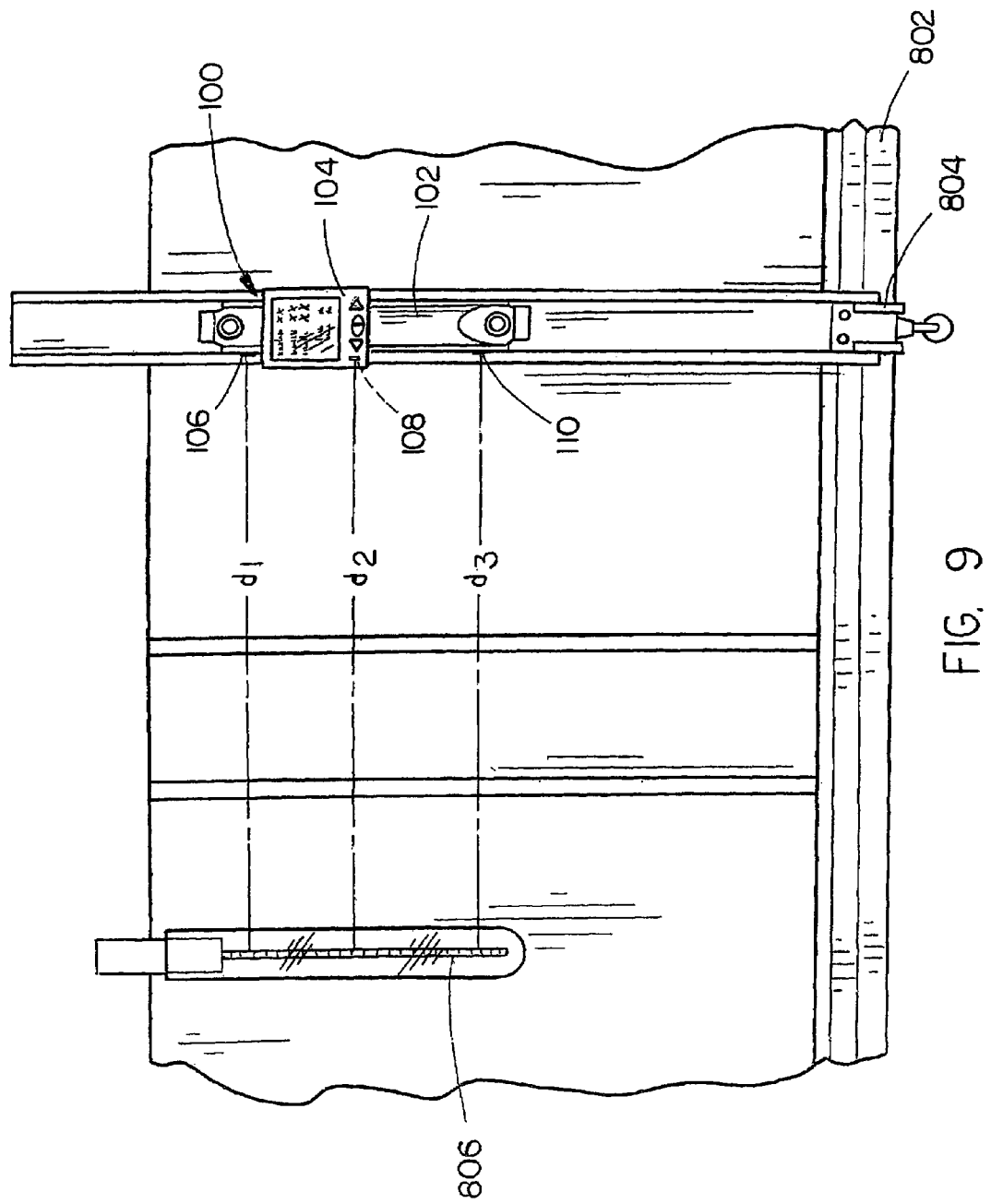
FIG. 9 is a top plan view of the table saw system of FIG. 8 illustrating the laser apparatus emitting three laser beams for establishing distance measurements in accordance with an exemplary embodiment of the present invention.

A table saw system 800 including the laser apparatus 100 mounted on a fence 804 which is connected to a table saw 802, is shown in FIGS. 8, 9, and 10. Preferably, the laser apparatus 100 provides three laser beams. The laser beams may be used to establish three distance measurements indicated by d1, d2, and d3. These measurements are displayed to the user on the computing system 104. Additionally, the laser beams in communication with the computing system 104 may display a variety of information, such as circular saw blade height, circular saw blade angle, or the like. The table saw 802 further includes a circular saw blade 806, a first adjustment mechanism 808, and a second adjustment mechanism 810. In the present embodiment, the first adjustment mechanism 808 enables a user of the table saw 802 to adjust the angle of the circular saw blade 806 relative to the operational field of the table saw 802. The operational field may be defined as that area of the table saw 802 upon which a work piece may be placed and the circular saw blade 806 may perform a cut upon the work piece. In other embodiments where the laser apparatus 100 is mounted or connected to another power tool or device the operational field may include the area where the work piece is placed and a function is performed upon the work piece. The second adjustment mechanism 810 enables a user to adjust the height which the circular saw blade 806 extends above the surface of the operation field of the table saw 802.

Referring now to FIGS. 9 and 10, the laser apparatus 100 coupled to a table saw 802 is shown. The laser apparatus 100 includes the housing 102 coupled with the computing system 104. The housing 102 is mounted to a fence 804 connected to the table saw 802. In FIG. 10 the single laser source 110 is shown, the laser source 110 is being used to measure the distance d1 from the fence 804 to a circular saw blade 806. In FIG. 9 the housing 102 includes the first laser source 106, the second laser source 108, and the third laser source 110 each emitting a laser beam across the operational field of the table saw 802, from the fence 804 to the circular saw blade 806.

Figure 11:
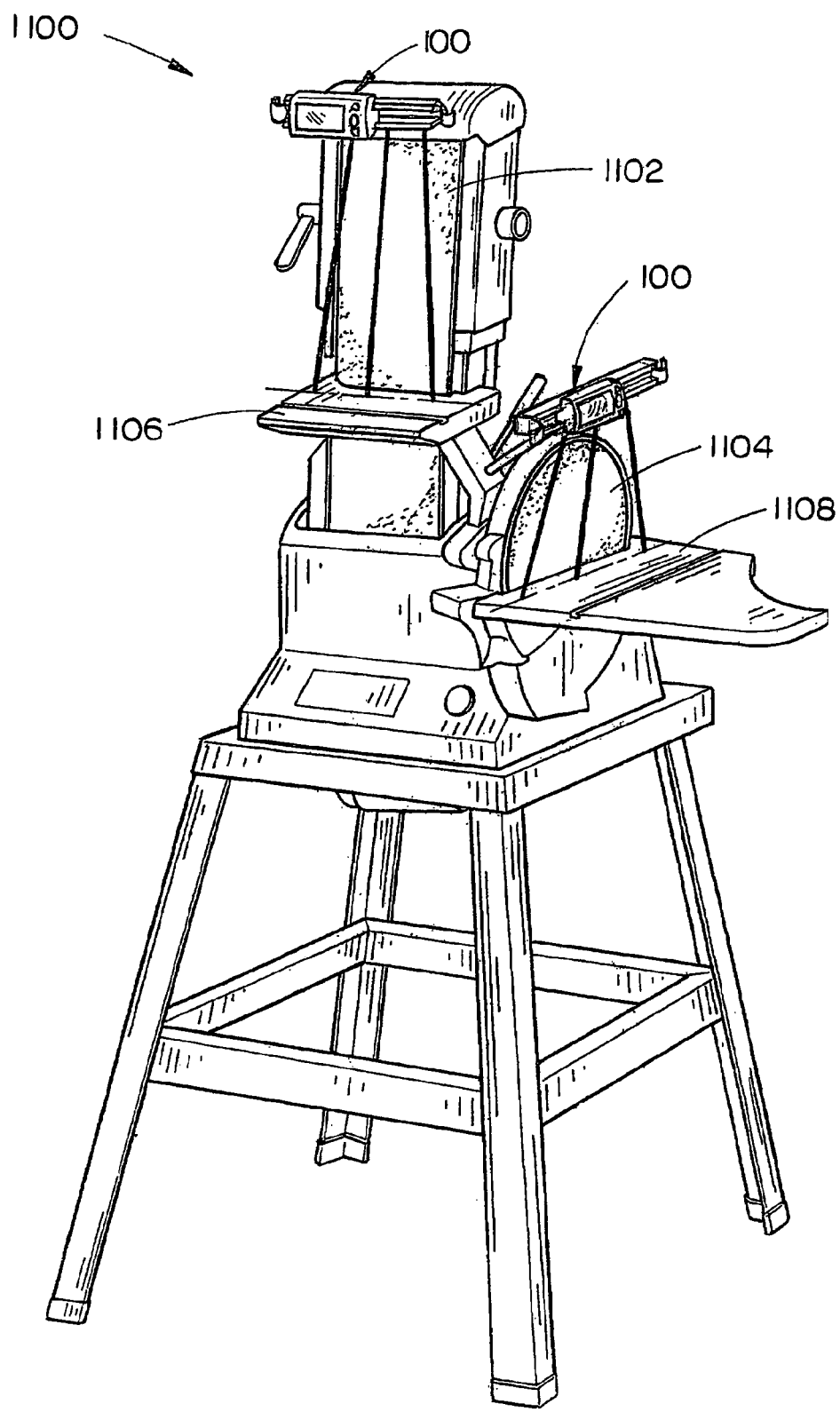
FIG. 11 is an illustration of the laser apparatus coupled with a combination belt sander and disc sander power tool.
Figure 12:
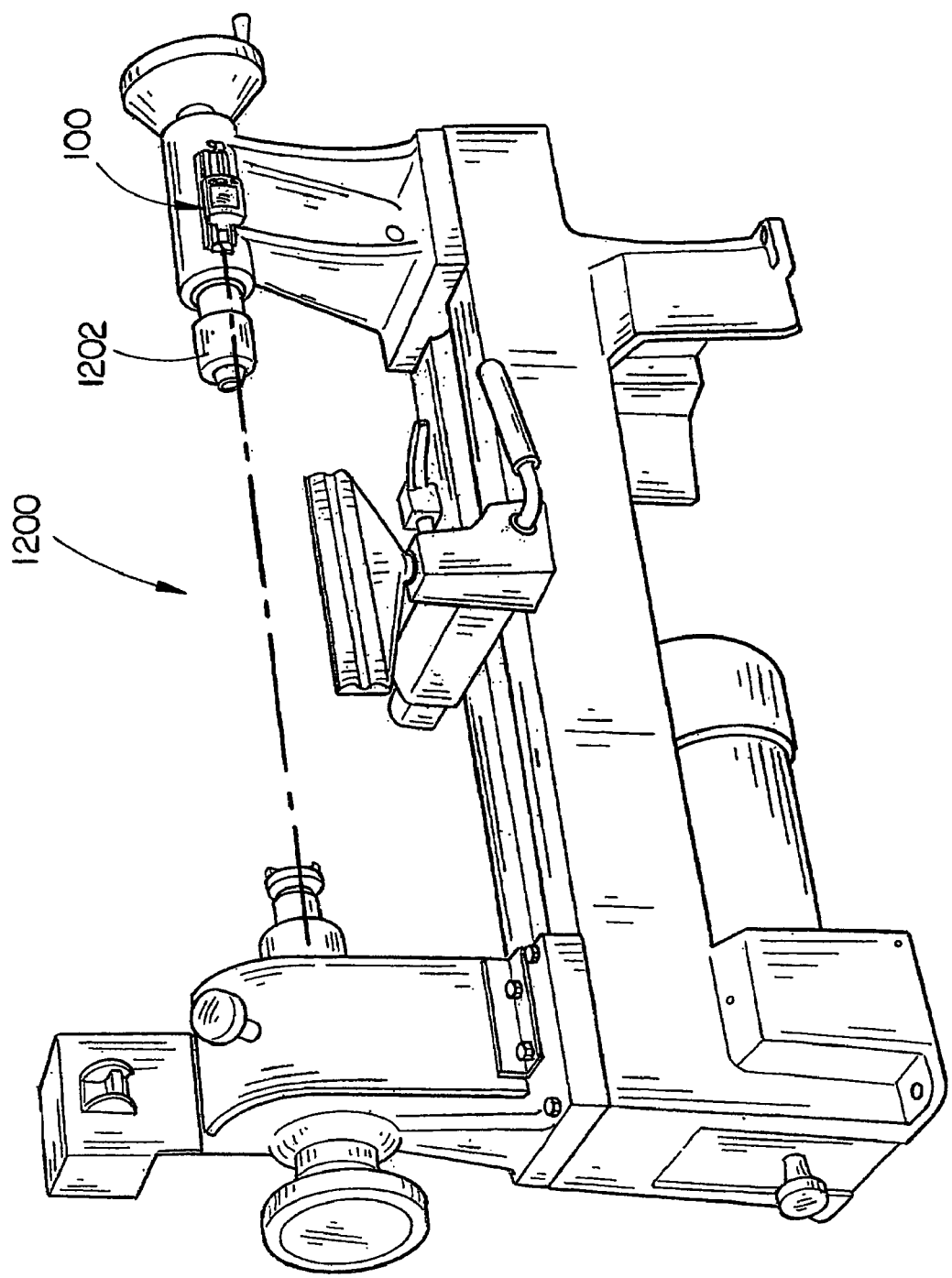
FIG. 12 is an illustration of the laser apparatus coupled with a lathe.

Referring now to FIGS. 11 and 12, the laser apparatus 100 is shown coupled to a sander system 1100 and a lathe system 1200. In FIG. 11 the sander system 1100 includes a belt sander 1102 with an operational field 1106 and a disc sander 1104 with an operational field 1108. In the current embodiment, two of the laser apparatus 100 systems are employed. One is mounted upon the belt sander 1102 and the other is mounted upon the disc sander 1104. The laser apparatus 100 may provide information on the angle of the sander relative to the operational field and the height the sander extends above the operational field. In FIG. 12 the laser apparatus 100 is coupled to the lathe 1202 and employs a single laser source configuration. The laser source emits a single laser beam which travels down one side of the operational field of the lathe 1202. The laser source may monitor the size of the work piece coupled with the lathe and indicate to the user when the desired work piece size has been reached. In both FIGS. 11 and 12 the location and configuration of the laser apparatus 100 may vary as contemplated by one of ordinary skill in the art.

Figure 13:
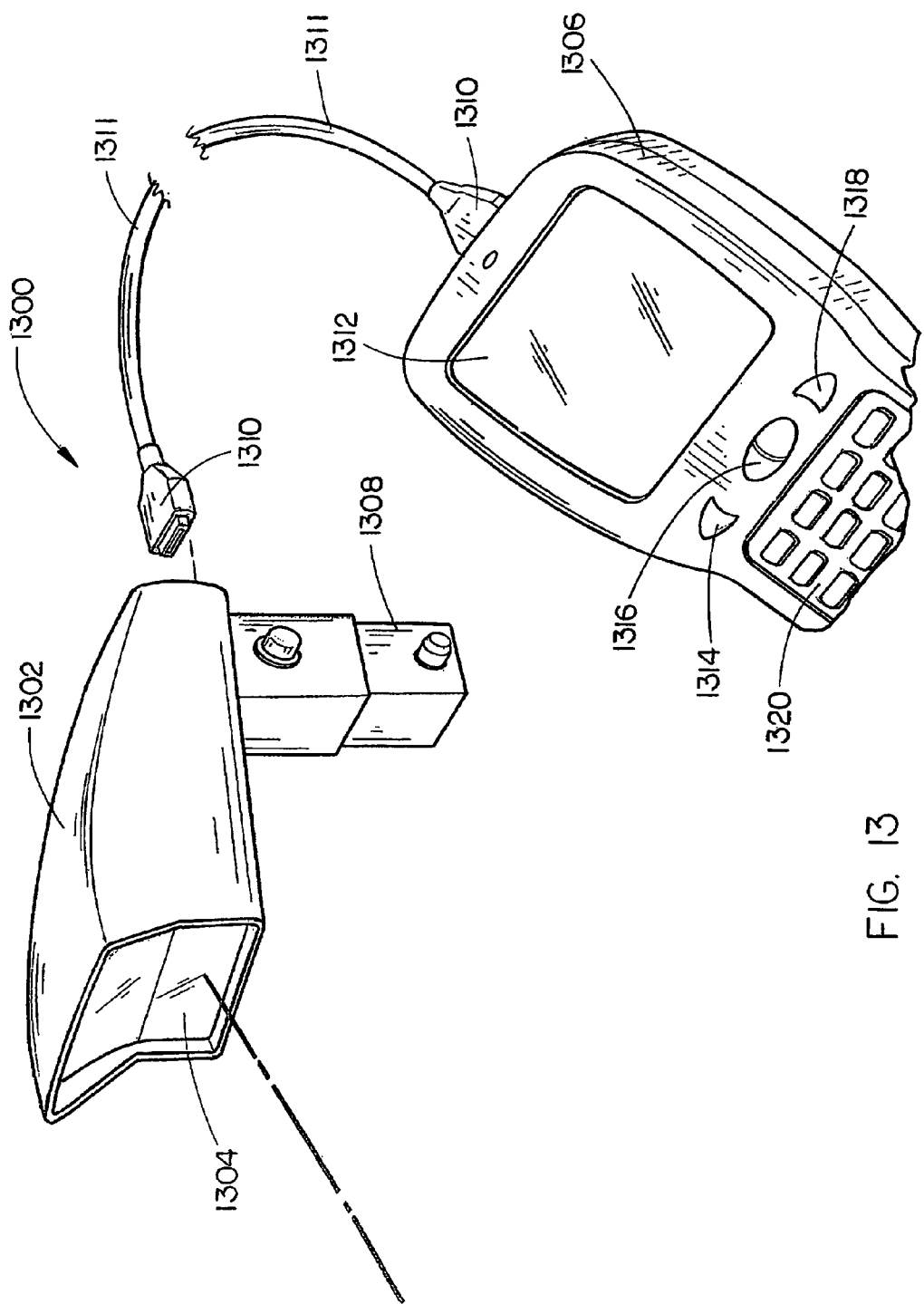
FIG. 13 is an illustration of a laser light indicia and reading assembly coupled with a computing system in accordance with an exemplary embodiment of the present invention.

Referring now to FIGS. 13 a laser light indicia and reading assembly 1300 is shown. In the current embodiment, the laser light indicia and reading assembly 1300 comprises a housing 1302 which includes a laser source 1304 in communication with a computing system 1306. The housing 1302 is coupled with a mounting member 1308. A communication adapter 1310 communicatively couples the computing system 1306 with the laser source 1304 disposed within the housing 1302 through a cable 1311. The type of cable employed in the present embodiment is a standard serial cable. However, it is contemplated that a variety of connection mechanisms may be employed, such as wireless, infrared, or the like. The computing system 1306 is similar to the computing system 104 in that it provides a display screen 1312, a first selector 1314, a second selector 1316, and a third selector 1318. Additionally, the computing system 1306 may further include a keypad 1320, as shown in the current embodiment. The keypad 1320 may enable increased functionality of the computing system, such as increased control over the laser source.

Figure 14:
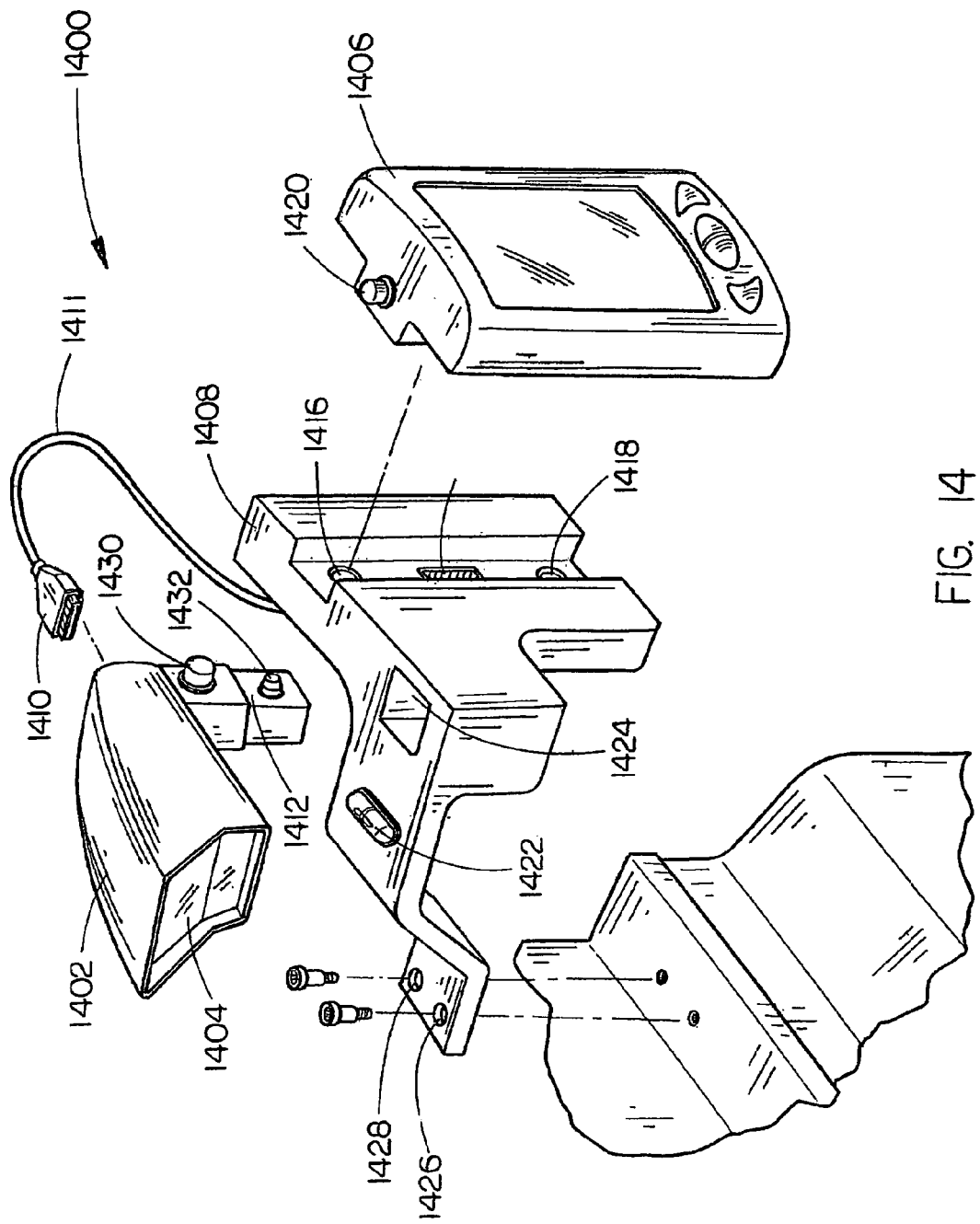
FIG. 14 is an illustration of the laser light indicia and reading assembly coupled to a level assembly, the computing system being coupled to the level assembly and in communication with the laser scanning apparatus.

In FIG. 14 a laser light indicia and reading assembly 1400 is shown. In the present embodiment, the laser light indicia and reading assembly 1400 comprises a housing 1402 which includes a laser source 1404, a computing system 1406, and a mounting assembly 1408. The housing 1402 is coupled with a mounting member 1412 for coupling with the mounting assembly 1408. The mounting assembly 1408 further includes a communication adapter 1410 which couples with the laser source 1404 through the housing 1402. Preferably, the communication adapter 1410 is coupled with a cable 1411 which connects to the mounting assembly 1408. It is understood that the configuration of the communication adapter 1410 and type of cable 1411 employed may vary as contemplated by one of ordinary skill in the art. Through the serial cable 1411 the communication adapter 1410 is further communicatively coupled with the communication port 1414.

In the present embodiment, the communication port 1414 is designed to couple with the computing system 1406 when it is mounted to the mounting assembly 1408. Further, a first coupling port 1416 and a second coupling port 1418 are disposed on the mounting assembly 1408 and further engage with the computing system 1406 when the computing system 1406 is mounted to the mounting assembly 1408. The computing system 1406 is similar to the computing system 104 shown and described previously, except that the computing system 1406 includes an indicator 1420. The indicator 1420 is a light emitting diode (LED) which provides indication to the user of the system 1400 when the computing system 1406 is properly mounted and engaged with the mounting assembly 1408. It is contemplated that the computing system 1406 may not include indicator 1406. However, a variety of configurations may be employed for indicator 1420 without departing from the scope and spirit of the present invention.

A leveling device 1422 is disposed within mounting assembly 1408. As shown and described previously in FIGS. 6 and 7 the leveling assembly ensures that the laser light indicia and reading assembly 1400 is level with the device to which it is connected. A first mounting port 1426 and a second mounting port 1428 are employed to connect the mounting assembly 1408 with the desired device. In the present embodiment the mounting ports allow for screws to be inserted and fastened to the device and the mounting assembly 1408. However, it is contemplated that a variety of fastening devices and configurations may be employed.

The mounting assembly 1408 further comprises a laser source coupling port 1424. The laser source coupling port 1424 is designed to receive the mounting member 1412 which is coupled to the housing 1402 disposed with the laser source 1404. The mounting member 1412 includes a release mechanism comprised of a button 1430 disposed on the housing 1402, and a latch 1432. The button 1430 is a depression button, operably engaged with the latch 1432, which the user may depress in order to activate the latch 1432. The latch 1432 is a compression latch which retracts back into the mounting member 1412 when the button 1430 is depressed. The latch 1432 is extended away from the mounting member 1412 and engages the inner surface of the laser source coupling point 1424 to affix the housing 1402 to the mounting assembly 1408.

In the preferred embodiment, the laser source for both FIGS. 13 and 14 is enabled as a standard single laser beam producing laser source. Alternatively, the laser source in both FIGS. 13 and 14 may be enabled as a scanning module.

Figure 15A:
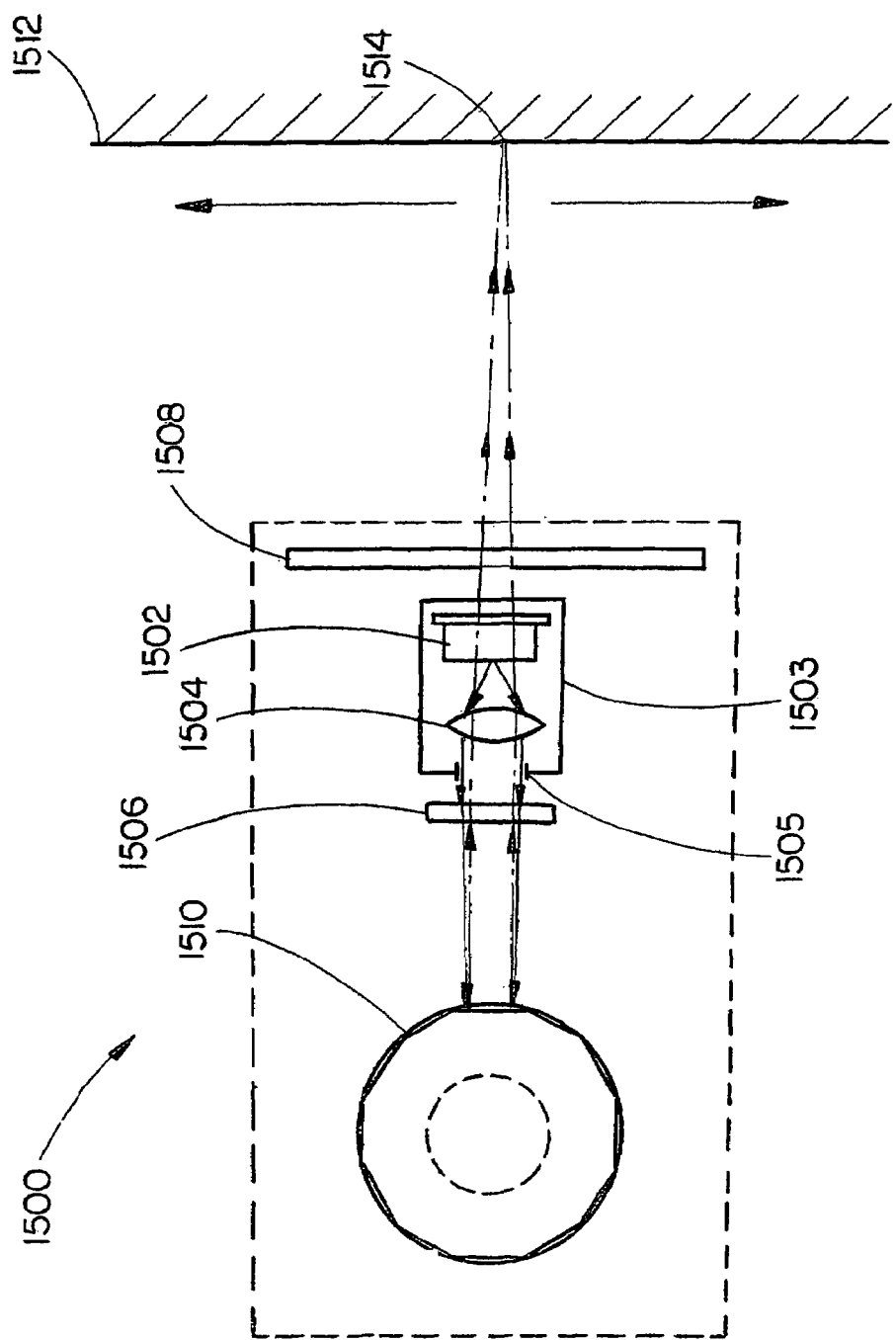
FIGS. 15A, 15B, and 15C illustrate a known scanning module which may be employed in the laser light indicia and reading assembly in accordance with an exemplary embodiment of the present invention.
Figure 15B:
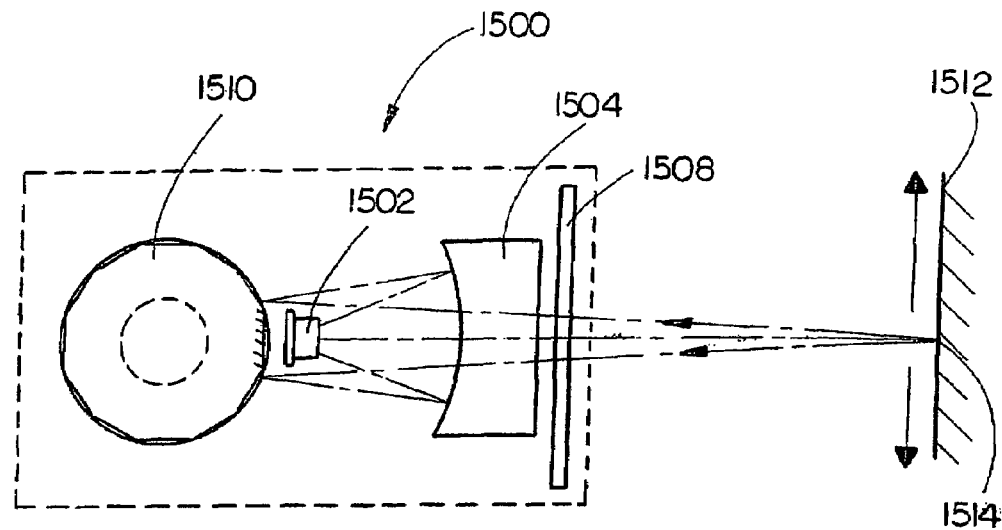
Figure 15C:
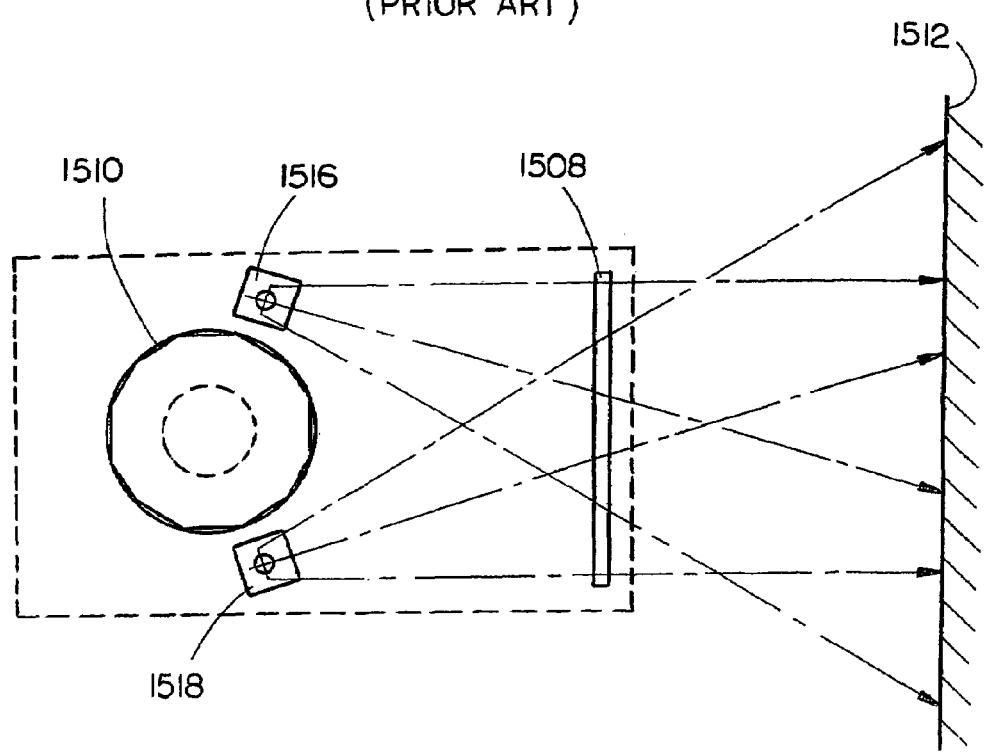

A known scanning module 1500 is shown in FIGS. 15A, 15B, and 15C. The scanning module 1500 comprises a laser source 1502 with a spherical lens 1504 disposed in a housing 1503. The housing 1503 includes an aperture 1505 through which a laser beam, emitted from the laser source 1502 through the spherical lens 1504, passes. The laser beam travels through a cylindrical lens 1506 and strikes a multifaceted polygon deflector 1510. The multifaceted polygon deflector 1510 deflects the incident laser beam emitted by the laser source through the cylindrical lens 1508 and out to a surface 1512. The surface 1512 is a nominal plane and the incident laser beam is provided a first focus 1514. As indicated by the arrows the scanning module 1500 moves the focused laser beam along the surface 1512. The scanning module may further include two light emitting diode assemblies 1516 and 1518. These assemblies emit a visible light that tracks the position of the laser beam providing an indicator for a user of the scanning module.

The laser beam from the scanning module 1500 may appear as a continuous line defined by the angle of incidence with which the laser beam strikes the multifaceted polygon deflector 1510. As such, the light emitting diodes would provide the visual indication of the defined area to the user.

The scanning module 1500 receives the reflected laser beams through the cylindrical lens 1508. The reflected laser beams may travel directly to the photodetector 1520 or the laser beams may travel to the multifaceted polygon deflector. The laser beams which strike the multifaceted polygon deflector are deflected to a collecting mirror 1522 where they are reflected to the photodetector 1520. In this manner the scanning module 1500 is enabled to read a surface it is scanning.

Figure 16:
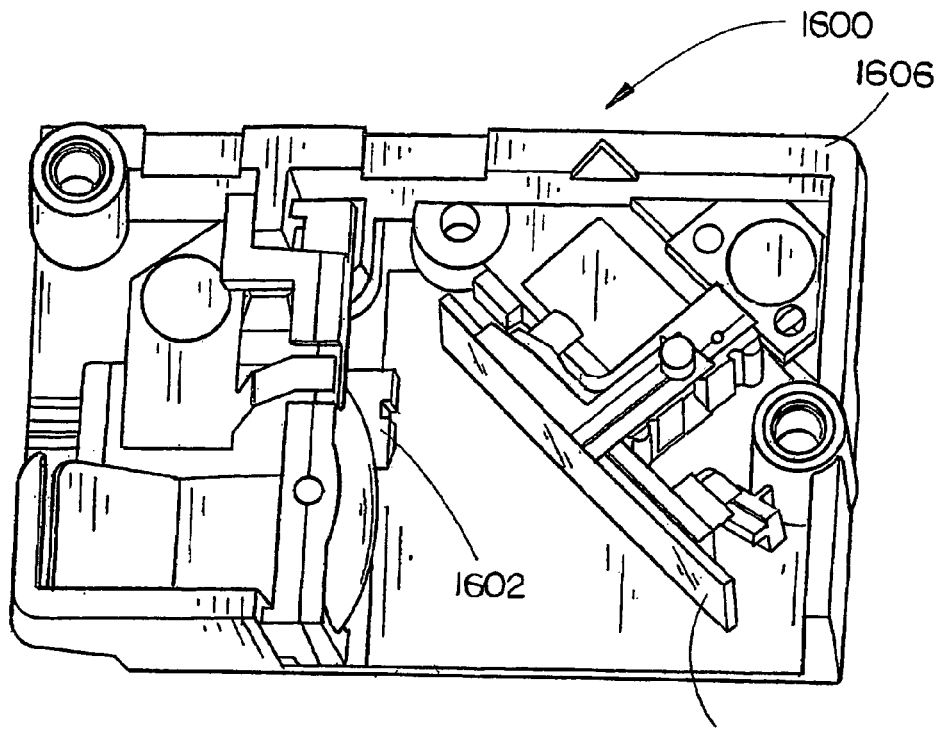
FIG. 16 is a top plan view of a known scanning module employing a dithering assembly.
Figure 17:
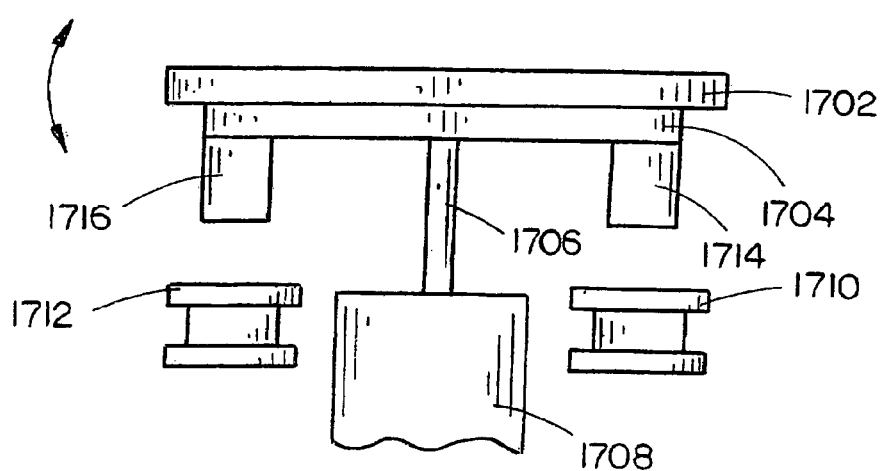
FIG. 17 is an illustration of a known dithering assembly employing a drive coil and drive magnet to provide mirror oscillation.

It is contemplated that the laser source(s) employed in the laser light indicia and reading assembly and the laser apparatus may include a dithering assembly. A typical dithering assembly 1600, known in the art, is shown in FIG. 16. The dithering assembly 1600 includes a laser source 1602 and a mirror 1604 disposed within a housing 1606 and may be employed to establish a laser beam which presents as a continuous line upon a surface. Further, it is known that dithering assemblies may comprise a pair of magnets and a pair of magnetic coils. As shown in FIG. 17 a mirror 1702 is coupled to a base 1704 which is connected to a flexible support arm 1706 that is connected to a support member 1708. A drive coil 1710 is positioned on one side of the flexible support arm 1706 and a feedback coil 1712 is positioned on the opposite side of the flexible support arm 1706. A drive magnet 1714 is connected to the base 1704 and proximally located to the drive coil 1710 while a feedback magnet 1716 is connected to the base 1704 and proximally located to the feedback coil 1712. A drive current (e.g., an oscillating drive current) is run through the drive coil 1710 and causes the mirror 1702 to rotate. The rotation imparted to the mirror 1702 causes a change in the angle of incidence of the laser beam striking the mirror, and thus imparts a change in the angle of reflection imparted to the incident laser beam. As a result, the reflected laser beam appears as a continuous line defined by the rotational range of the mirror 1702.

Figure 18:
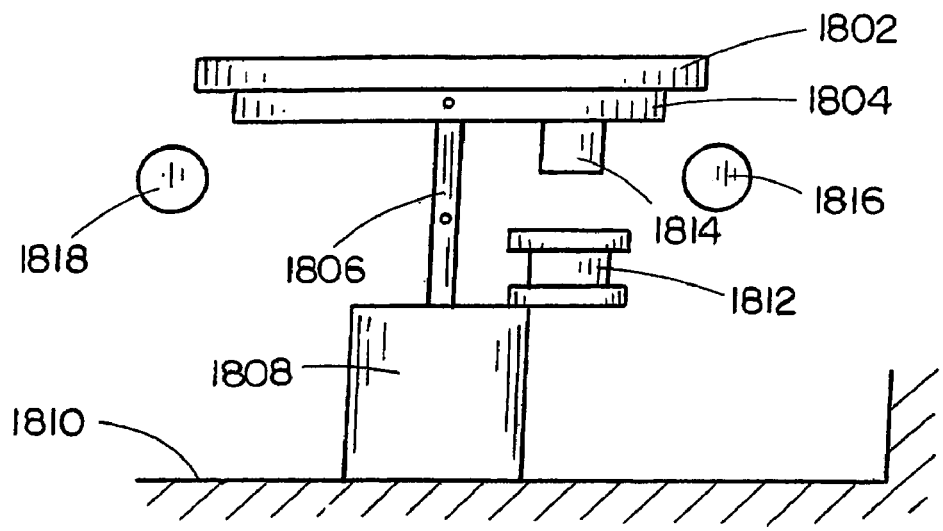
FIG. 18 is an illustration of a known dithering assembly employing travel stops to control the range of rotational travel imparted to the mirror.

Additionally, dithering assemblies which control the range of rotation of the mirror are known. FIG. 18 shows one such assembly where a mirror 1802 is connected to a base 1804, which is connected to a flexible support arm 1806 that is connected to a support member 1808 coupled to a surface 1810. A drive coil 1812 is coupled to the support member 1808 in proximal relation to a drive magnet 1814 which is coupled with the base 1804. A first travel stop 1816 and a second travel stop 1818 are disposed in a desired location relative to the mirror 1802 to provide a limited range of rotation by the mirror 1802.

Figure 19:
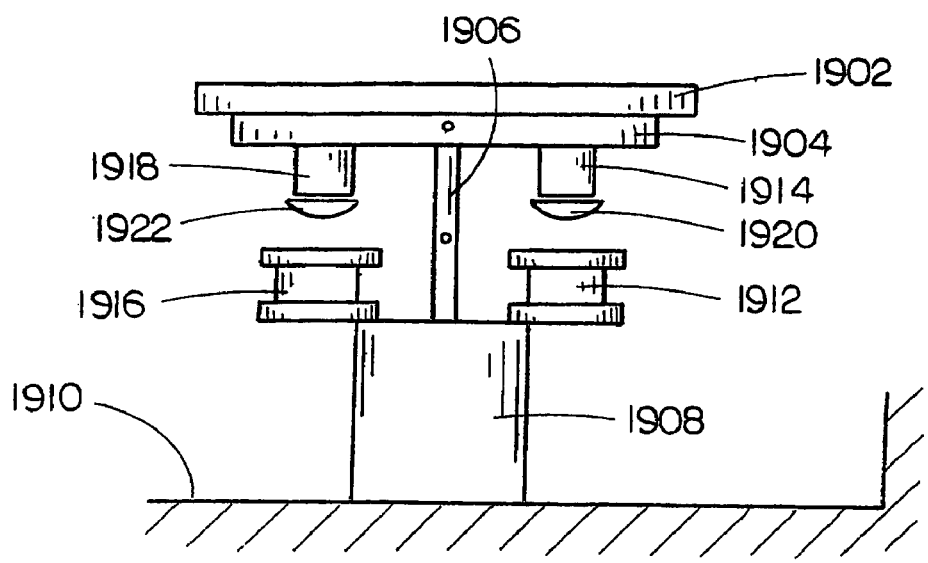
FIG. 19 is an illustration of a known dithering assembly employing pads connected to drive and feedback magnets to control the range of rotational travel imparted to the mirror.

Alternative methods for controlling the range of rotation of the mirror in a dithering assembly may include the use of pads, as shown in FIG. 19. The mirror 1902 is connected to a base 1904, which is connected to a flexible support arm 1906 that is connected to a support member 1908 coupled to a surface 1910. A drive coil 1912 is coupled to the support member 1908 in proximal relation to a drive magnet 1914 which is connected to the base 1904. A feedback coil 1916 is coupled to the support member 1908 in proximal relation to a feedback magnet 1918, which is connected to the base 1904. A first pad 1920 is coupled with the drive magnet 1914, and a second pad 1922 is coupled with the feedback magnet 1918. The pads, which impact with the drive and feedback coils, limit the rotation range of motion of the mirror 1902.

In many dithering assemblies the effects of feedback between the drive coil/magnet and the feedback coil/magnet may have harmful effects, such as increased noise and unstable rotational amplitude production. A feedback sensor, such as a Hall sensor, may be employed to monitor electrical potential in a dithering assembly and trigger a switching of the polarity of the drive current in the drive coil at the appropriate time in relation to the position of the mirror. This switching of polarities reverses the drive force being exerted on the drive magnet and the mirror.

Figure 20:
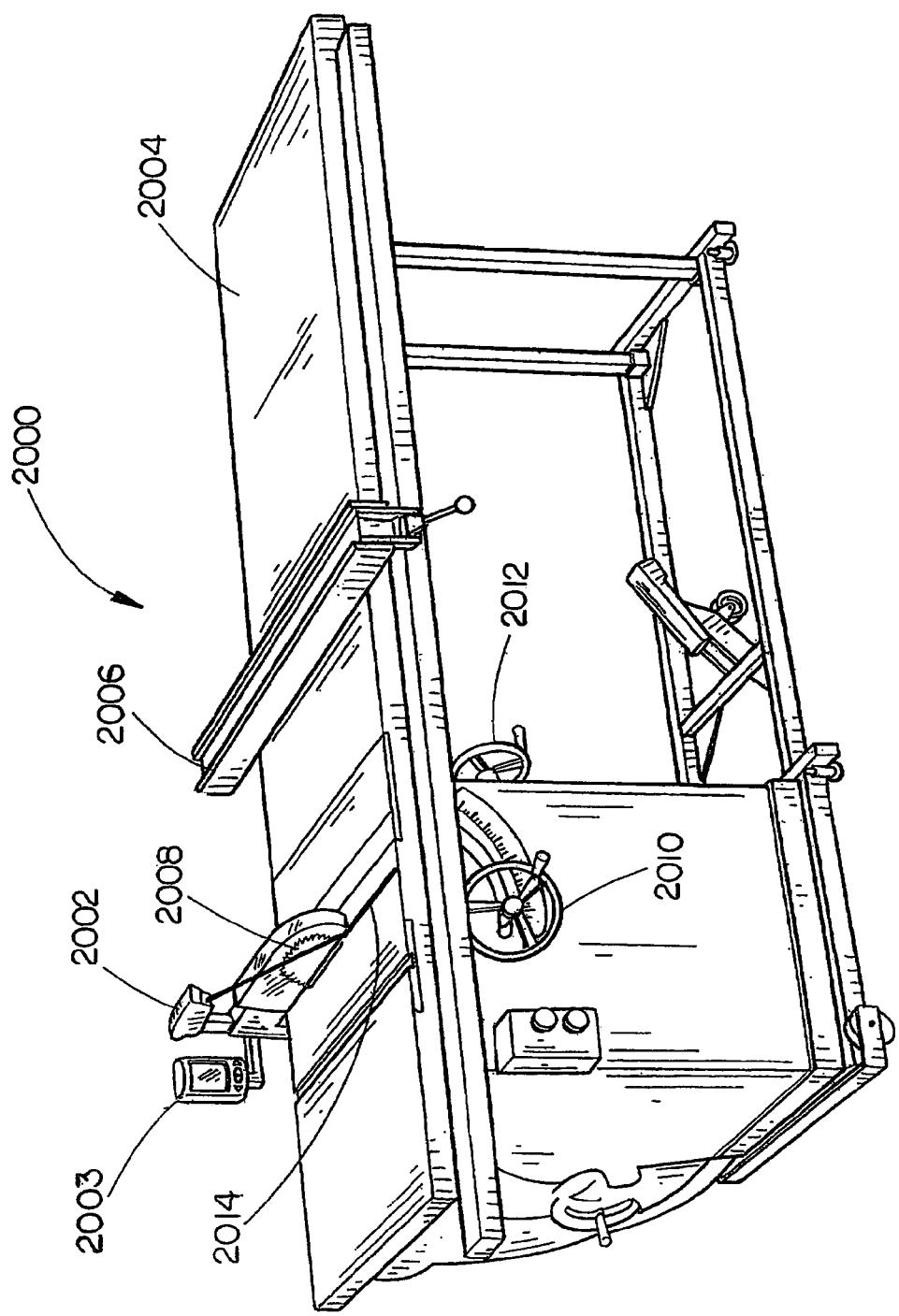
FIG. 20 is an illustration of the laser light indicia and reading assembly coupled with a table saw and establishing a laser light cut line.

Referring now to FIG. 20, a table saw system 2000 including a laser light indicia and reading assembly 2002, is shown. The laser light indicia and reading assembly 2002 is similar to the laser light indicia and reading assembly 1300 and 1400 shown in FIGS. 13 and 14, and includes a computing system 2003 similar to that shown in FIGS. 13 and 14. In the current embodiment, the table saw system 200 further includes a table 2004, a fence 2006, and a circular saw blade 2008. Additionally, a first adjustment mechanism 2010 and a second adjustment mechanism 2012 are included in the table saw system 200 and operably engage with the circular saw blade 2008 to adjust blade angle and blade height relative to the operational field of the table saw system 2000, as described previously in FIG. 8.

In this embodiment the laser light indicia and reading assembly 2002 establishes a continuous laser beam line 2014. The laser beam line 2014 is laid down across the operational field of the table saw system 2000 and provides a cut line for a user of the system. It is contemplated that the laser light indicia and reading assembly 2002 will establish a laser beam line that tracks the position of the circular saw blade 2008. For example, if the user adjusts the angle of the circular saw blade 2008 relative to the operational field of the table saw system 2000, the laser light indicia and reading assembly 2002 will monitor that change and establish a laser beam line that tracks the position of the circular saw blade 2008.

In an alternate embodiment the laser beam line 2014 may be established using optically activated indicators that are integrated with the table 2004 in positions proximal to the circular saw blade 2008. For example, the table 2004 may be integrated with sensors which respond by illuminating upon being struck by light from the laser light indicia and reading assembly 2002. Alternately, optically activated cables may be integrated into the table saw to provide a laser line. Regardless of the type of optically activated indicators, their positioning relative to the circular saw blade 2008 and the lines of cut that may be established through use of the adjustment mechanisms provides a user an easily ascertained path to guide the cutting of the work piece by.

Figure 21:
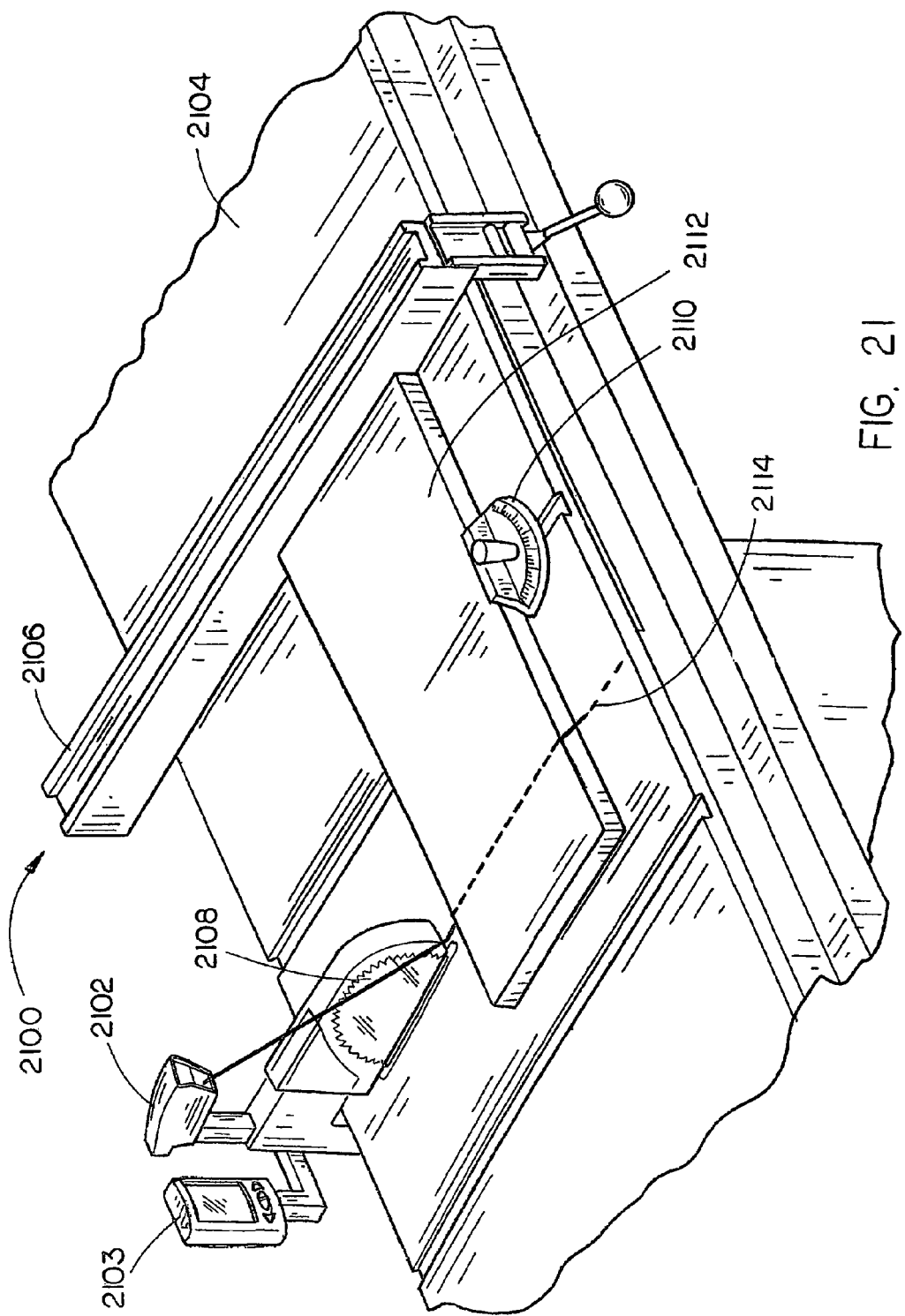
FIG. 21 is an illustration of the laser light indicia and reading assembly coupled with the table saw and establishing a laser light cut line on a work piece.

Referring now to FIG. 21, a table saw system 2100 is shown. The table saw system 2100 comprises a laser light indicia and reading assembly 2102, a table 2104, a fence 2106, and a circular saw blade 2108. The laser light indicia and reading assembly 2102 is coupled to a computing system 2103, similar to that previously described in FIGS. 13 and 14. Additionally, a work piece 2112 is located within the operation field of the table saw system 2100 and is being guided by the fence 2106 and an angular adjustment mechanism 2110. The angular adjustment mechanism 2110 may position the work piece 2112 in a desired angular setting and then guide the work piece 2112 through the circular saw blade 2108 at the set angle. In the current embodiment the laser light indicia and reading assembly establishes a laser beam light line 2114 across the work piece 2112. This laser beam light line 2114 may be used by the user as the cut line and followed throughout the cut.

It is contemplated that the laser light indicia and reading assemblies 2002 and 2102 of FIGS. 20 and 21 may include an indexing and truing functionality. An example of the truing of a work piece may include a user attempting to make a forty five degree angled cut on the work piece. The user may enter this information into the computing system in communication with the laser light indicia and reading assembly and when the work piece is set into the operational field of the table saw system, the laser light indicia and reading assembly may emit a laser beam which identifies the angle that the work piece is set at in relation to the circular saw blade. An example of the indexing of a work piece may include a user attempting to make a notch cut into a work piece that does not run the length or width of the work piece. When the work piece is set into the operational field of the table saw system, the laser light indicia and reading assembly may emit a laser beam which determines the position of the leading edge of the work piece. As the work piece is passed across the circular saw blade, the laser beam enables the laser light indicia and reading assembly to monitor the rate of travel imparted to the work piece and the overall distance of travel across the circular saw by the work piece. In this manner the laser light indicia and reading assembly may communicate to the computing system when the desired length of cut has been accomplished, and have that information passed on the user.

The user may be notified as to the truing and indexing information through the computing system, as previously discussed. Alternatively, the laser light indicia and reading assembly may be provided with an indicator to communicate to the user that the desired specifications have been accomplished. For example, a red light emitting diode may be coupled to the housing of the laser light indicia and reading assembly for indicating to the user that the desired function has not been accomplished. A green light emitting diode, coupled to the housing of the laser light indicia and reading assembly, may indicate to the user that the desired function has been accomplished and it is time to proceed or remove the work piece from the field of operation. Other indication systems as contemplated by one of ordinary skill in the art may be employed without departing from the scope and spirit of the present invention.

Figure 22:
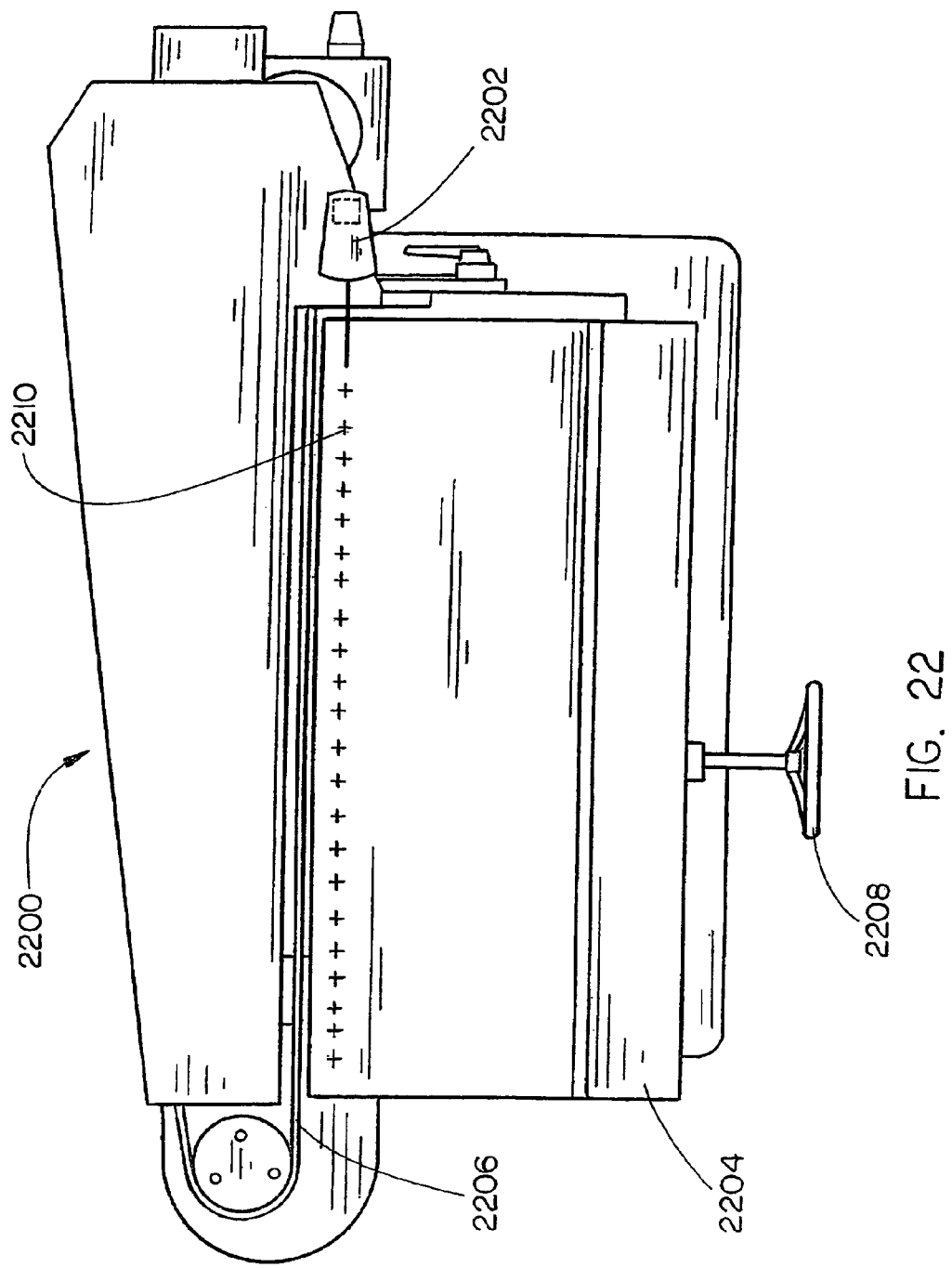
FIG. 22 is an illustration of the laser light indicia and reading assembly coupled with a belt sander and establishing a laser beam line.
Figure 23:
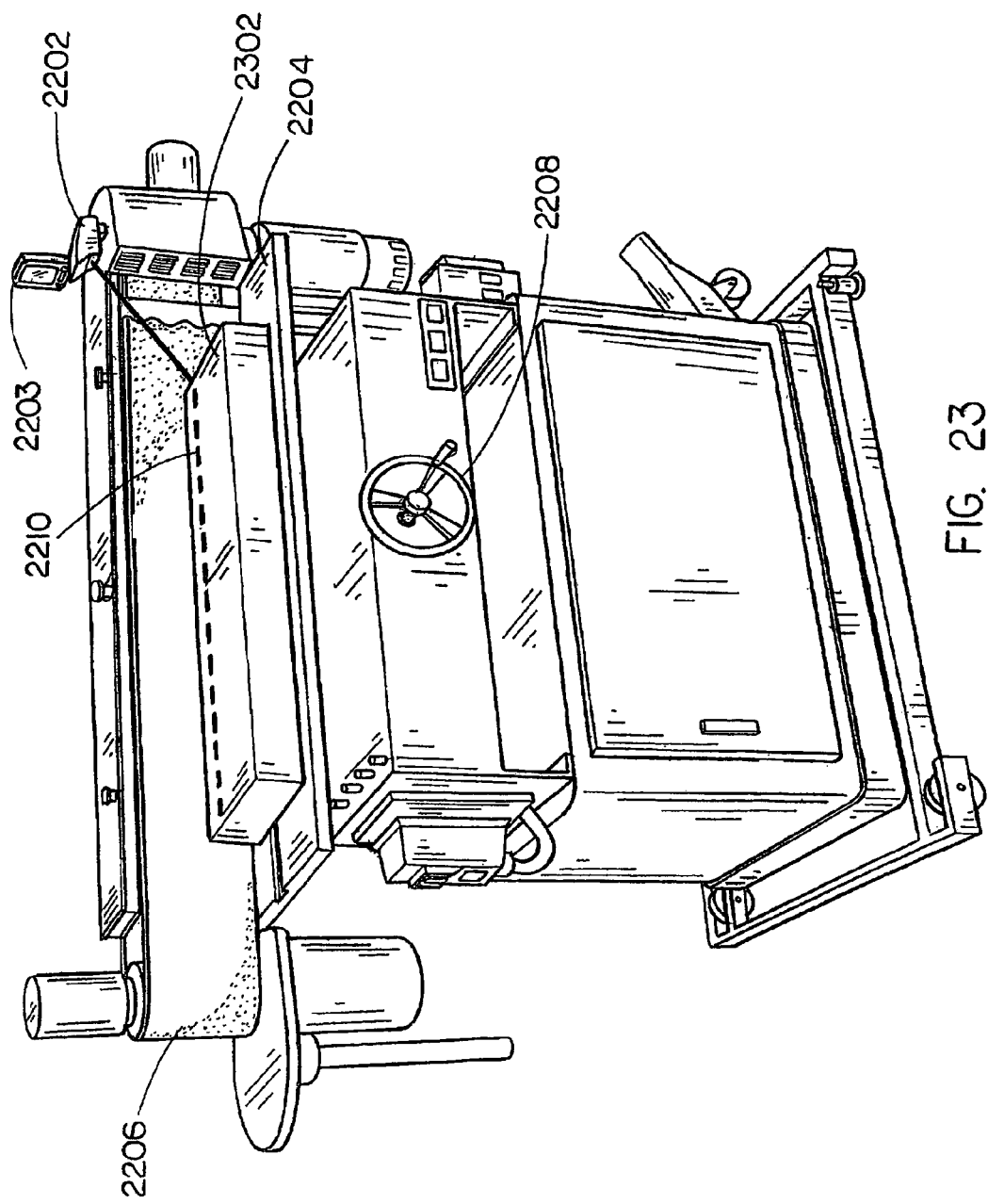
FIG. 23 is an illustration of the laser light indicia and reading assembly coupled with the belt sander and establishing a laser beam line on a work piece.

Referring now to FIGS. 22 and 23, an edge sander system 2200, is shown. In the current embodiment, the edge sander system 2200 includes a laser light indicia and reading assembly 2202, a work table 2204, belt sand paper 2206, and an adjustment mechanism 2208. A computing system 2203 is coupled to the laser light indicia and reading assembly 2202. The laser light indicia and reading assembly 2202 and the computing system 2203 are similar to those shown in FIGS. 13 and 14. The laser light indicia and reading assembly 2202 may be enabled for truing and indexing of the edge sander and a work piece (such as work piece 2302 shown in FIG. 23) as previously described in FIGS. 20 and 21. For example, a user of the edge sander system 2200 may be attempting to sand off a one-quarter inch segment from a work piece. In the process of sanding, one end of the work piece may be receiving greater pressure than the other resulting in an uneven depth of sanding. The laser light indicia and reading assembly 2200 may indicate to a user that uneven pressure is being applied and identify the end where this is occurring and the corrections that need to be made to true the work piece.

Figure 24:
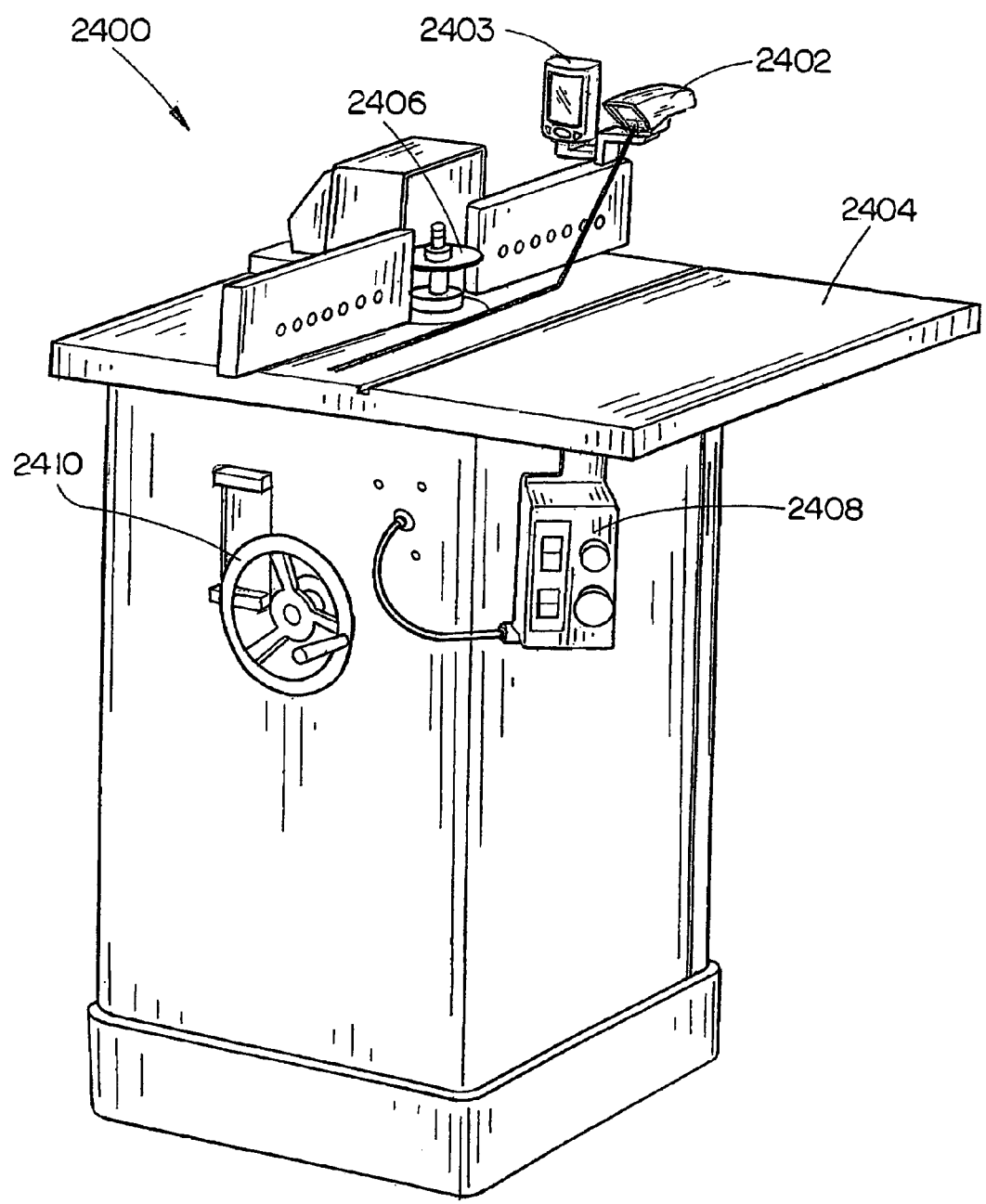
FIG. 24 is an illustration of the laser light indicia and reading assembly coupled with a wood shaper and establishing a laser beam line.

Referring now to FIG. 24, a wood shaper system 2400 is shown. In the present embodiment, the wood shaper system 2400 includes a laser light indicia and reading assembly 2402, a work table 2404, a bit 2406, an on/off mechanism 2408, and an adjustment mechanism 2410. A computing system 2403 is coupled to the laser light indicia and reading assembly 2402. The laser light indicia and reading assembly 2402 may be enabled to determine the angle of presentation and the size of the bit 2406. Additionally, the laser light indicia and reading assembly 2402 may be enabled for truing and indexing of the wood shaper system and a work piece being operated upon by the wood shaper system as described previously.

Figure 25:
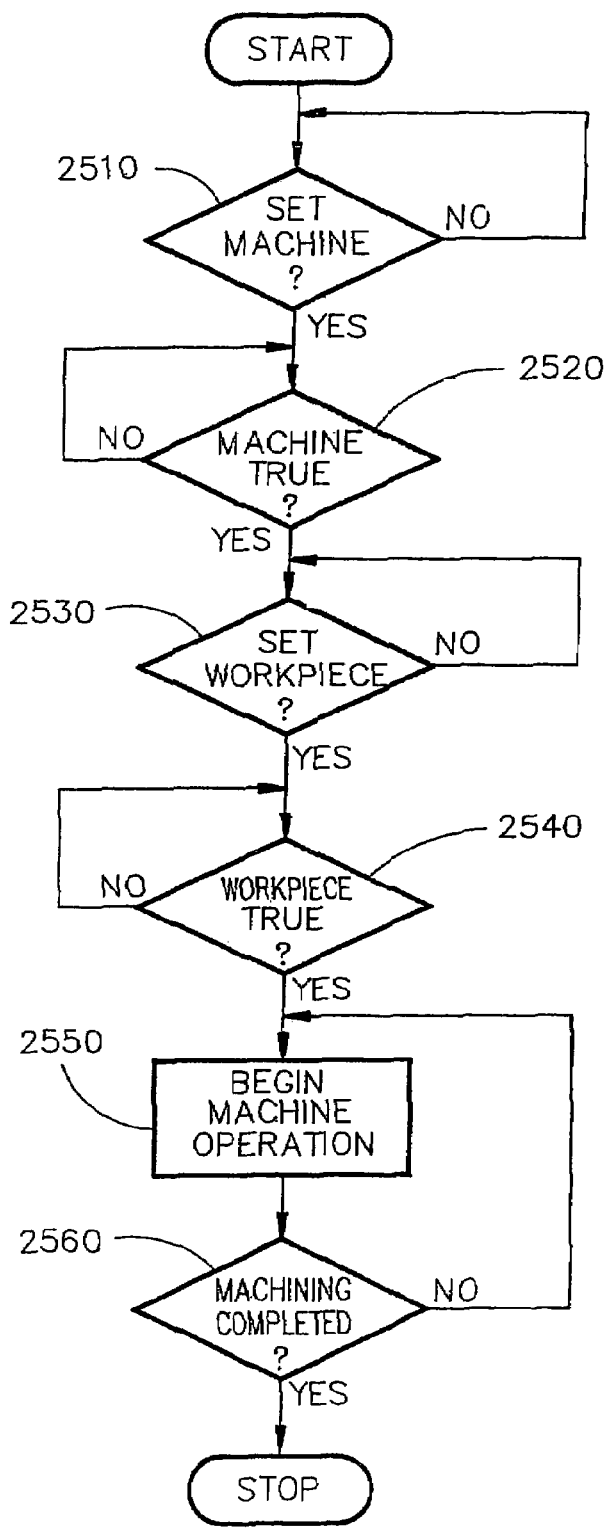
FIG. 25 is a flowchart illustrating functional steps which are accomplished by the laser apparatus and the laser light indicia and reading assembly of the present invention.

A flowchart illustrating functional steps which may be accomplished using the laser apparatus of FIGS. 1 through 12 and the laser light indicia and reading assembly of FIGS. 13 through 24, is shown in FIG. 25. The first step 2510 involves the setting of the machine. This involves mounting the laser apparatus to the power tool being utilized. As discussed previously, the laser apparatus may be directly mounted to a power tool or mounted to a separate mounting assembly which is connected to the power tool. Once the laser apparatus has been properly set then in step 2520 the laser apparatus must be trued in order to provide accurate results. This may be accomplished by checking the leveling mechanism as described previously, if such a mounting assembly is being employed or using the laser beams to determine the correct alignment. If the laser apparatus determines that the mounting is untrue it notifies the user. Once the laser apparatus determines it is truly aligned then in step 2530 the work piece is set. Once the laser apparatus determines that the work piece has been set then in step 2540 it determines if the setting of the work piece is true. Once the work piece is trued the user begins operation of the power tool in step 2550. When it is determined that the machining of the work piece is completed in step 2560 operation of the power tool is halted.

It is contemplated that an optically reflective material may be disposed upon a surface that is struck by the laser beam emitted from the laser apparatus or the laser light indicia and reading assembly. In this manner when the laser beams are emitted they will strike the optically reflective material and be reflected. In one embodiment the reflected laser beams may be received by an optical detector disposed within the housing of the laser apparatus or the laser light indicia and reading assembly. The optical detector may be in communication with the computing system and the computing system may process the laser beam information to determine measurements and other setting information. In alternate embodiments the reflected laser beam may be received by one or several optical detector(s) remotely located with respect to the laser apparatus or the laser light indicia and reading assembly, but in communication with the computing system. As stated above the optical detector will relay the information gathered from the laser beam to the computing system where it may be processed and displayed to a user as measurement of setting information. For example, an optically reflective material may be circumferentially disposed about a circular saw blade of a table saw. The table saw may be disposed with a fence that has a laser apparatus (as described in FIG. 1) mounted upon it. The laser apparatus may emit one or more incident laser beams which strike the optically reflective material on the circular saw blade and, if the circular saw blade is perpendicular to the incident laser beams, are reflected back towards the laser apparatus. The laser apparatus may be disposed with one or more optical detectors to receive the reflected laser beam(s) and communicate the information gathered to the computing system for processing and display to a user. The type and configuration of the optically reflective material may vary as contemplated by one of ordinary skill in the art.

It is further contemplated that the laser apparatus or the laser light indicia and reading assembly may establish a communicative link with their respective computing systems through a communication system disposed within the device, to which the laser apparatus or the laser light indicia and reading assembly are mounted, itself. In this manner a mounting assembly as shown in FIGS. 6, 7, and 14 would not be necessary and the laser apparatus or the laser light indicia and reading assembly may be directly mounted to the device. Additionally, the laser apparatus or the laser light indicia and reading assembly may be enabled to accept power from the device to which they are mounted, thus, reducing the need to have a separate power source or power source connection. For example, a fence mounted to a table saw system may be disposed to connect with the laser apparatus or the laser light indicia and reading assembly. The fence may include a communication port, as shown and described on the mounting assemblies of FIGS. 7 and 14, which couples with a communication adapter disposed on the housing of the laser apparatus or the laser light indicia and reading assembly. The fence may further include a communication adapter which may be coupled with the computing system, thereby enabling the computing system to be in communication with the laser apparatus or the laser light indicia and reading assembly. Further, the power source for the table saw system may include an outlet on the fence which may be engaged by the laser apparatus or the laser light indicia and reading assembly to provide power to either system.

Heat build-up within the laser apparatus or the laser light indicia and reading assembly is an important concern. Overheating may result in malfunctioning of the laser source(s) within the housing and cause damage to the laser source or housing necessitating expensive repair and lost time. In one embodiment of the present invention the laser source may be a low power and low intensity laser source to minimize the heat build up with the housing. Such an embodiment is suitable for situations where the use of the laser apparatus and the laser light indicia and reading assembly is sporadic and limited. However, in a situation where the laser apparatus or the laser light indicia and reading assembly are in constant use over prolonged periods of time even a low power and intensity laser source may experience significant heat build up which may damage the system.

To effectively handle a situation where the heat build up is significant, the laser apparatus and the laser light indicia and reading assembly may include a cooling system. In one embodiment, the housing of either system may include vents to allow heat to escape and cooler air to be drawn into the housing to help cool the laser sources. In an alternate embodiment, the cooling system may be comprised of a fan assembly mounted within the housing to blow air through the housing and over the laser source(s). The housing may include a vent located at an end opposite the fan to allow the blown air and heat to escape. In a third embodiment a cooling system may comprise an inert coolant being run through the housing of the laser apparatus or the laser light indicia and reading assembly. The coolant system may include a tank of the inert coolant connected to the housing through tubing and then an exhaust system connected to the housing for removing and disposing of the inert coolant after it has run through the housing. It is contemplated that a coolant system may be disposed within a device to which the laser apparatus and the laser light indicia and reading assembly are connected. The inert coolant may be presented and exhausted through the mounting connection between the device and the laser apparatus or the laser light indicia and reading assembly. For example, the laser apparatus of FIG. 1, may include connection portals in the mounting members. When the mounting members are secured to a fence, such as shown in FIGS. 8 through 10, tubing, which is connected to a tank of the inert coolant, may be connected to one of the mounting members. The inert coolant may be pumped into the housing through the mounting member and then exhausted through the other mounting member. It is contemplated that a variety of coolant systems, as may be contemplated by one of ordinary skill in the art, may be employed without departing from the scope and spirit of the present invention.

Figure 26:
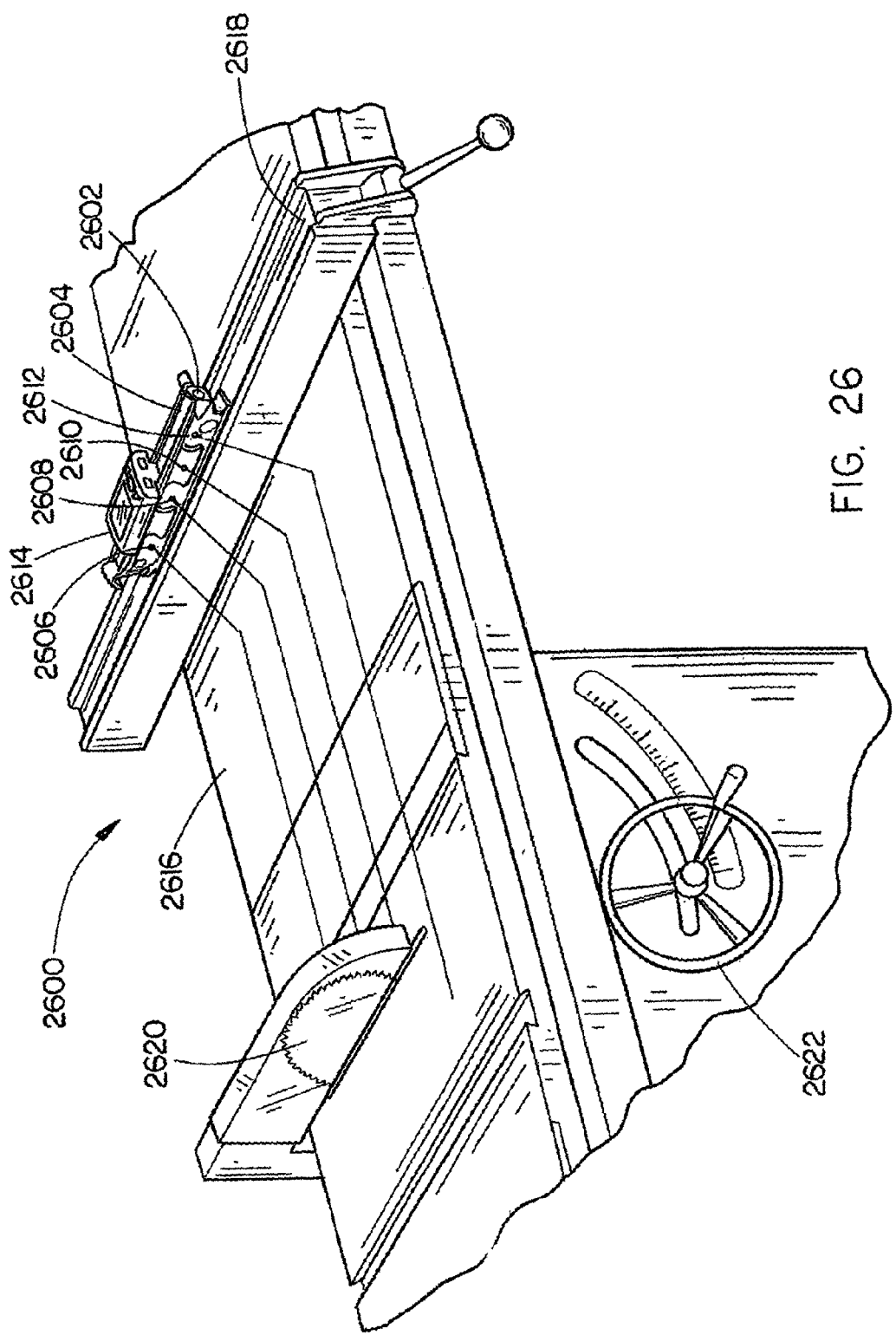
FIG. 26 is an illustration of a laser apparatus connected to a fence on a table saw, whereupon each laser source includes a dithering assembly.

Referring now to FIG. 26 a table saw system 2600 including a laser apparatus 2602, is shown. The table saw system 2600 further includes a work surface 2616, a fence 2618, a circular saw blade 2620, and an adjustment mechanism 2622. The laser apparatus 2602 is similar to the laser apparatus of FIG. 1 with a housing 2604 and a computing system 2614. However, the laser apparatus 2602 includes four laser sources 2606, 2608, 2610, and 2612 disposed within the housing 2604 and each laser source includes a dithering assembly. In the present embodiment, the laser sources establish multiple laser beam lines across the operational field of the table saw system 2600. The laser beams provide information on distance of the fence 2618 from the circular saw blade 2620, the angle of the circular saw blade 2620 relative to the work surface 2616, and have the ability to sense when a work piece has entered the operational field of the table saw system 2600. It is understood that the laser apparatus 2602 may gather a variety of other information as discussed in FIGS. 1 through 12, without departing from the scope and spirit of the present invention.

Figure 27:
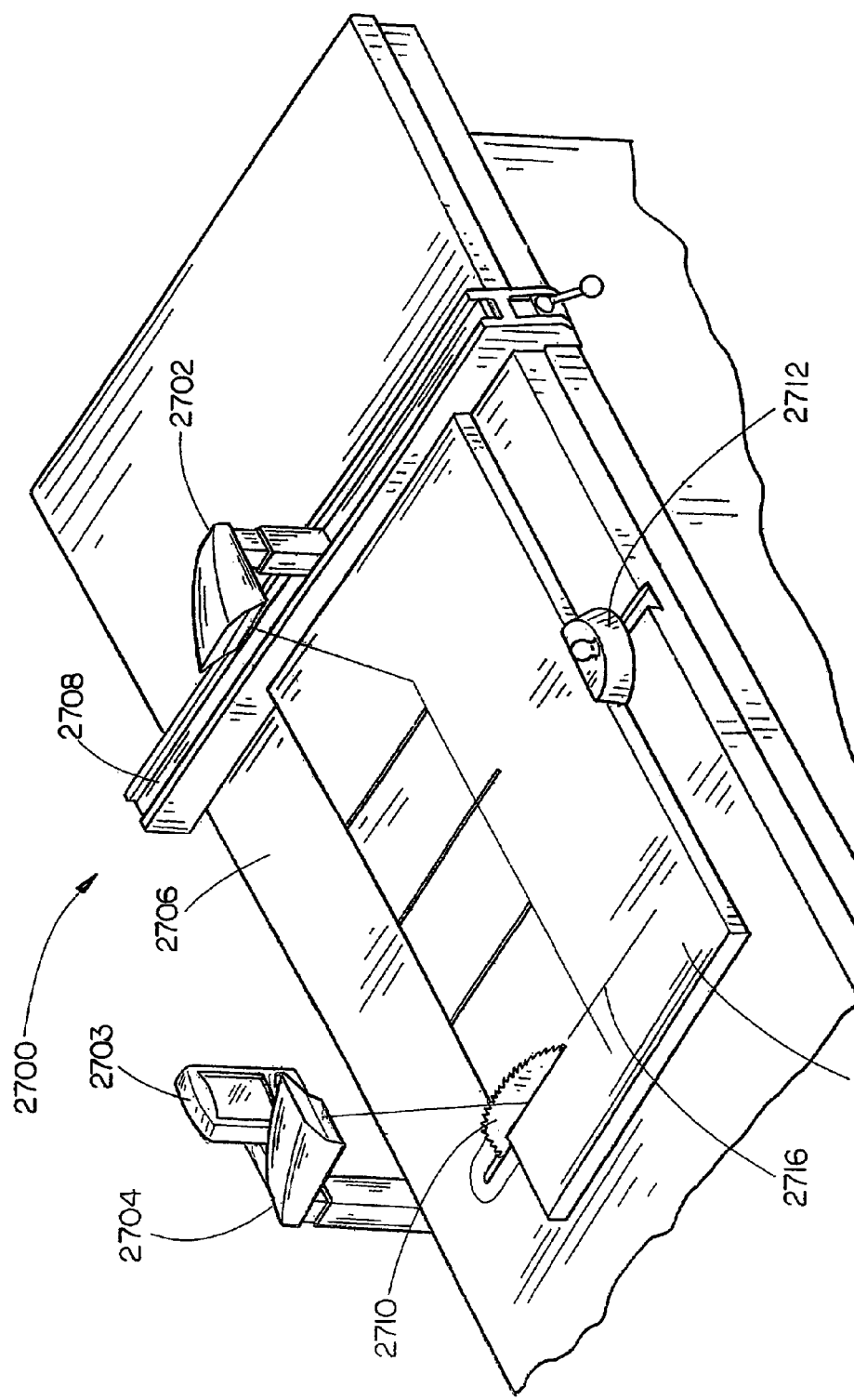
FIG. 27 is an illustration of multiple laser light indicia and reading assemblies connected to a table saw emitting a laser beam grid produced by laser sources with dithering assemblies.

Referring now to FIG. 27, a table saw system 2700 including a first laser light indicia and reading assembly 2702 and a second laser light indicia and reading assembly 2704, is shown. Both the first and the second laser light indicia and reading assemblies 2702 and 2704 are coupled to a computing system 2703. The computing system controls the functionality of both laser light indicia and reading assemblies. Alternatively, each laser light indicia and reading assembly may be coupled with a separate computing system. The table saw system 2700 further includes a work surface 2706, a fence 2708, a circular saw blade 2710, and an angle adjustment mechanism 2712. The angle adjustment mechanism is similar to that discussed in FIG. 21. In the present embodiment, the first and second laser light indicia and reading assemblies are similar to the laser light indicia and reading assembly shown and described in FIG. 13, except that each of the housings is disposed with a plurality of laser sources. The plurality of laser sources may be enabled as scanning modules or include dithering assemblies to produce a laser beam grid 2716 upon a work piece 2714. Alternately, the laser beam grid 2716 may be established upon a work surface 2706 of the table saw system 2700. Using the first and second laser light indicia and reading assemblies a user of the table saw system 2700 is enabled to establish multiple cut lines and grid points by intersecting the laser beam lines produced. The exact location of the grid points may be determined by the user and entered into the computing system which controls the laser light indicia and reading assemblies. It is contemplated that a single computing system may be enabled to control both laser light indicia and reading assemblies or that a separate and independent computing system may be used to control each laser light indicia and reading assembly. In an alternate embodiment the laser light indicia and reading assemblies may be disposed with a single laser source as described in FIG. 13.

Figure 28:
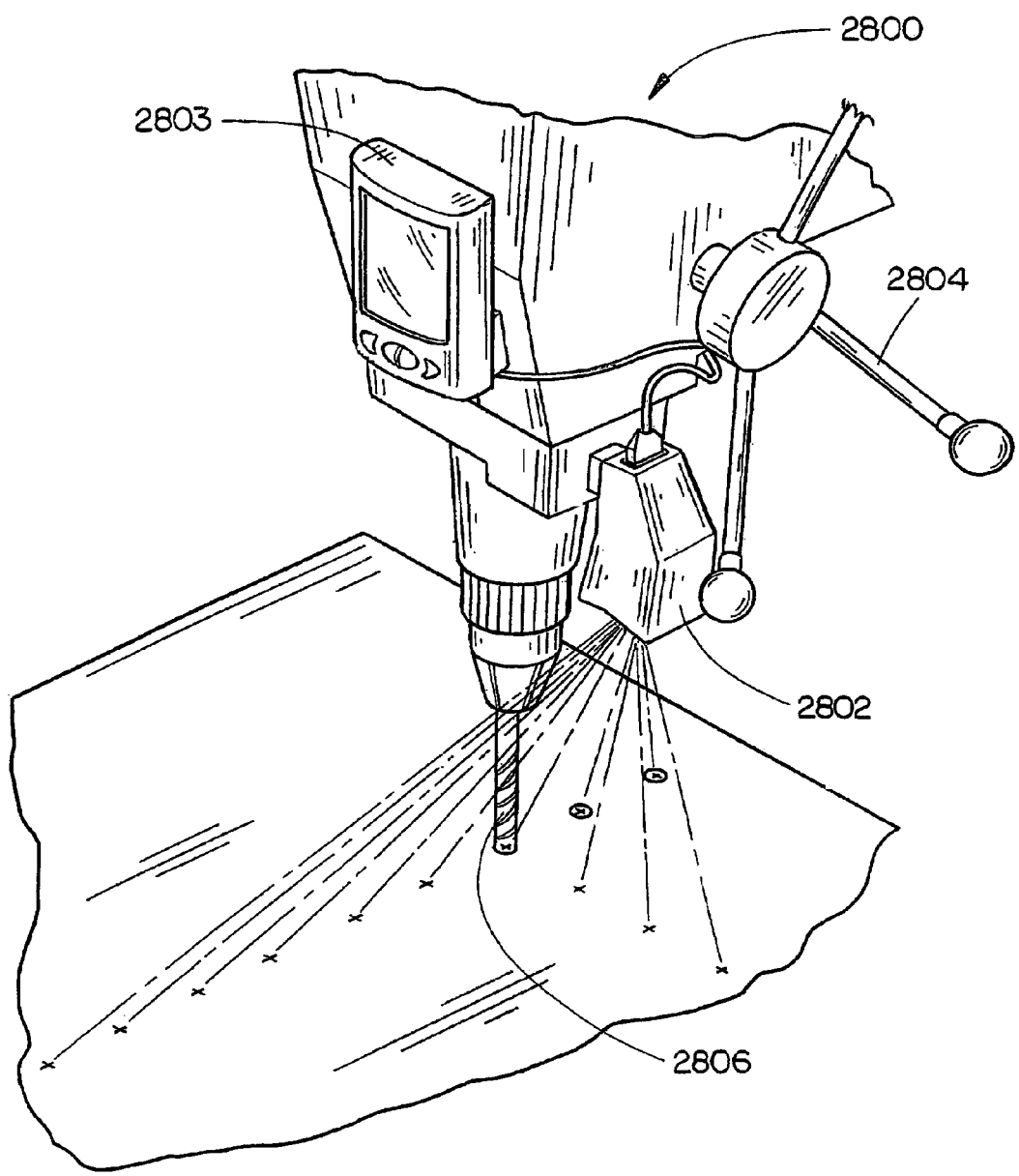
FIG. 28 is an illustration of a laser light indicia and reading assembly connected to a drill press establishing multiple laser beam drill points in a horizontal plane.

Referring now to FIG. 28, a drill press system 2800 including a laser light indicia and reading assembly 2802, is shown. The drill press system 2800 includes a housing 2803 disposed with an engagement device 2804 and a drill bit 2806. In the present embodiment, the laser light indicia and reading assembly 2802 is disposed with a laser source enabled to provide a plurality of drill points along two axes. This may be accomplished by a single laser source rotating identification points in series or multiple laser sources may be included within the laser light indicia and reading assembly 2802 to provide multiple identification points. Alternately, the laser light indicia and reading assembly 2802, with a single laser source, may establish a single continuous identification point. A computing system 2803 is coupled to the laser light indicia and reading assembly 2802 and mounted on the housing 2803. Alternatively, the computing system 2803 may be remotely located and couple with the laser light indicia and reading assembly 2802 via a wireless system.

Figure 29:
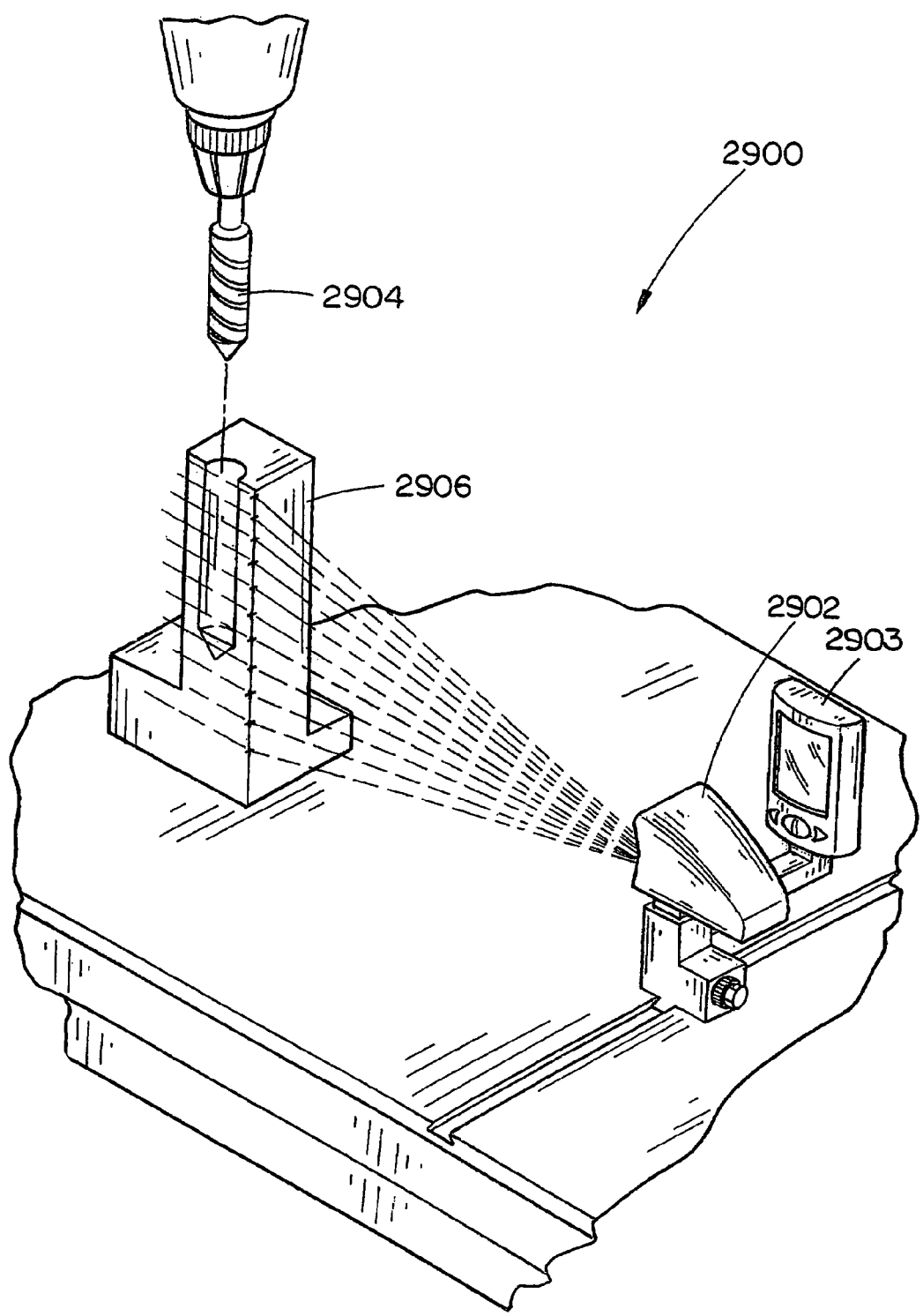
FIG. 29 is an illustration of a laser light indicia and reading assembly establishing multiple laser beam drill points in a vertical plane.

Referring now to FIG. 29, a laser light indicia and reading assembly 2902 included in a boring device system 2900, is shown. The laser light indicia and reading assembly 2902 is coupled to a computing system 2903 and may establish one or a plurality of depth indication points. This may be accomplished by a single laser source rotating identification points in series or multiple laser sources may be included within the laser light indicia and reading assembly 2902 to provide multiple identification points. As the boring bit 2904 proceeds through the work piece 2906 the laser light indicia and reading assembly is enabled to monitor the progress. When the boring bit 2904 reaches the desired depth the laser light indicia and reading assembly will provide an indication to the user of the boring device system 2900. As discussed previously, the indication may be provided through light emitting diodes, or the like.

A rotating laser apparatus 3000 including a first housing member 3002, a second housing member 3004, and a computing system 3006 is shown in FIGS. 30 through 37. The first housing member 3002 includes a first laser source 3014, a second laser source 3016, a communication port 3018, a first coupling port 3020, a second coupling port 3022, and a grip 3024. The first housing member may include a mounting member, a latch, and a release mechanism as described previously in FIG. 1. The second housing member 3004 includes a third laser source 3026, a fourth laser source 3028, and a grip 3030. The second housing member 3004 may also include a mounting member, a latch, and a release mechanism as described previously in FIG. 1. The communication port 3018 provides communicative linkage to all four laser sources disposed within the first and the second housing members.

In the current embodiment, the computing system 3006 is coupled with the first housing member 3002. The computing system 3006 is similar to the computing system 104 described previously. The computing system includes a first selector 3032, a second selector 3034, and a third selector 3036. Further, a display screen 3038 provides an interactive medium for a user who is operating the rotating laser apparatus 3000. Additionally, the computing system 3006 includes a communication adapter 3038 for coupling with the communication port 3018 disposed on the first housing member 3002. The computing system also includes a first mounting member 3040 and a second mounting member 3042 for engaging with the first and second coupling ports 3020 and 3022 disposed on the first housing member 3002. A first button 3044 and a second button 3046 operably engage with the first and second mounting members to perform a latch and release function enabling a user to secure the computing system 3006 to the first housing member 3002 and remove the computing system 3006 from the first housing member 3002. An indicator 3048 is included on the computing system 3006 to provide a user feedback on whether the computing system 3006 is in communication with the four laser sources.

The two housing members 3002 and 3004 are coupled by a rotation mechanism 3008. The rotation mechanism 3008 comprises a joint 3010 coupled with an angle measurement device 3012. The angle measurement device 3012 includes teeth along the outer edge, away from the joint 3010. The teeth of the angle measurement device are engaged by a ratchet arm 3050 coupled on one end with a coiled compression spring mechanism 3052 and an activation mechanism 3054 on the other end. In the present embodiment, the ratchet arm 3050 and the coiled compression spring mechanism 3052 are disposed on the inside of the second housing member 3004 in a position proximal to the angle measurement device 3012. The activation mechanism 3054 extends through the second housing member 3004 allowing the user to depress an activation push button and adjust the angle of the second housing member 3004 relative to the first housing member 3002.

Preferably, joint 3010 is a hinge that allows the first and second housing members to be rotated along two axes, as shown in FIGS. 31 through 35. It is understood that the joint 3010 may be a variety of devices which enable such functionality as may be contemplated by one of ordinary skill in the art. Further, the angle measurement device 3012 indicates to a user of the rotating laser apparatus 3000 the degree that the first housing member 3002 is relative to the second housing member 3004. The position of the angle measurement device 3012 is fixed relative to the first housing member 3002. The fixed positioning of the angle measurement device 3012 may be accomplished by coupling the angle measurement device 3012 to the first housing member 3002, the joint 3010, or other methods as may be contemplated by one of ordinary skill in the art. The second housing member 3004 is allowed to slide freely over the angle measurement device 3012 as it is rotated relative to the first housing member 3002.

Alternatively, the rotation mechanism may be comprised of a variety of systems, such as a hydraulic system, compression system, or the like. Further, the user engagement device (i.e., the activation push button of the exemplary embodiment) may be other mechanisms as contemplated by one of ordinary skill in the art. Additionally, the rotation mechanism may be engaged directly by the user, as described above, or the rotation mechanism may be in communication with the computing system and the user may enter the desired angle and the rotation mechanism may set the rotating laser apparatus 3000 in the desired position.

Figure 35:
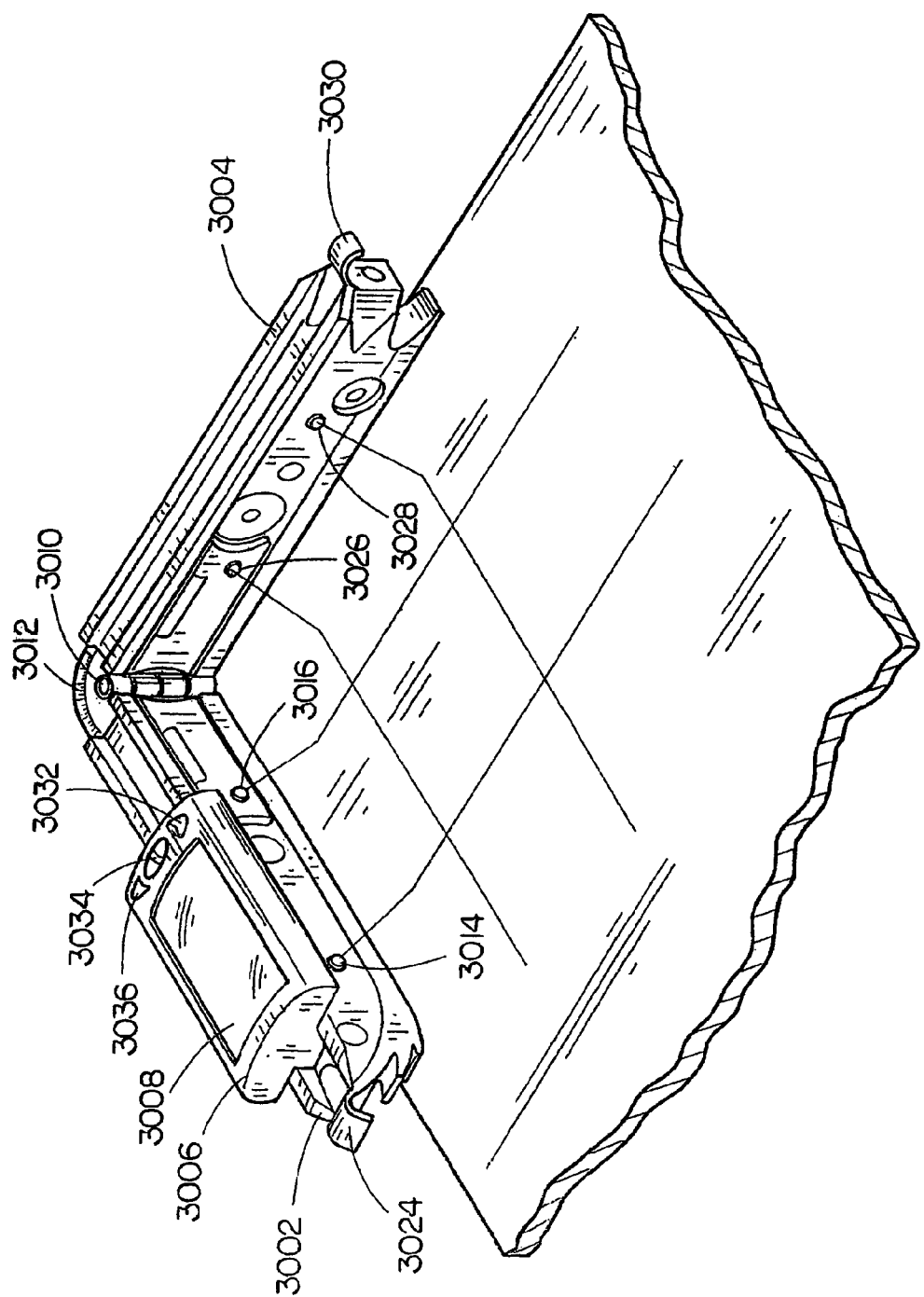
FIG. 35 is an illustration of the rotating laser apparatus with laser beams produced by laser sources with dithering assemblies.

In the present embodiment, each of the two housing members include two laser sources. The first housing member 3002 includes a first laser source 3014 and a second laser source 3016. The second housing member 3004 includes a third laser source 3026 and a fourth laser source 3028. As shown in FIG. 35, the laser sources 3014, 3016, 3026, and 3028 may form a virtual grid allowing the user to specify a particular location for the execution of a function. Alternatively, the rotating laser apparatus 3000 may include a fewer or greater number of laser sources disposed within each of the housing members.

Figure 31:
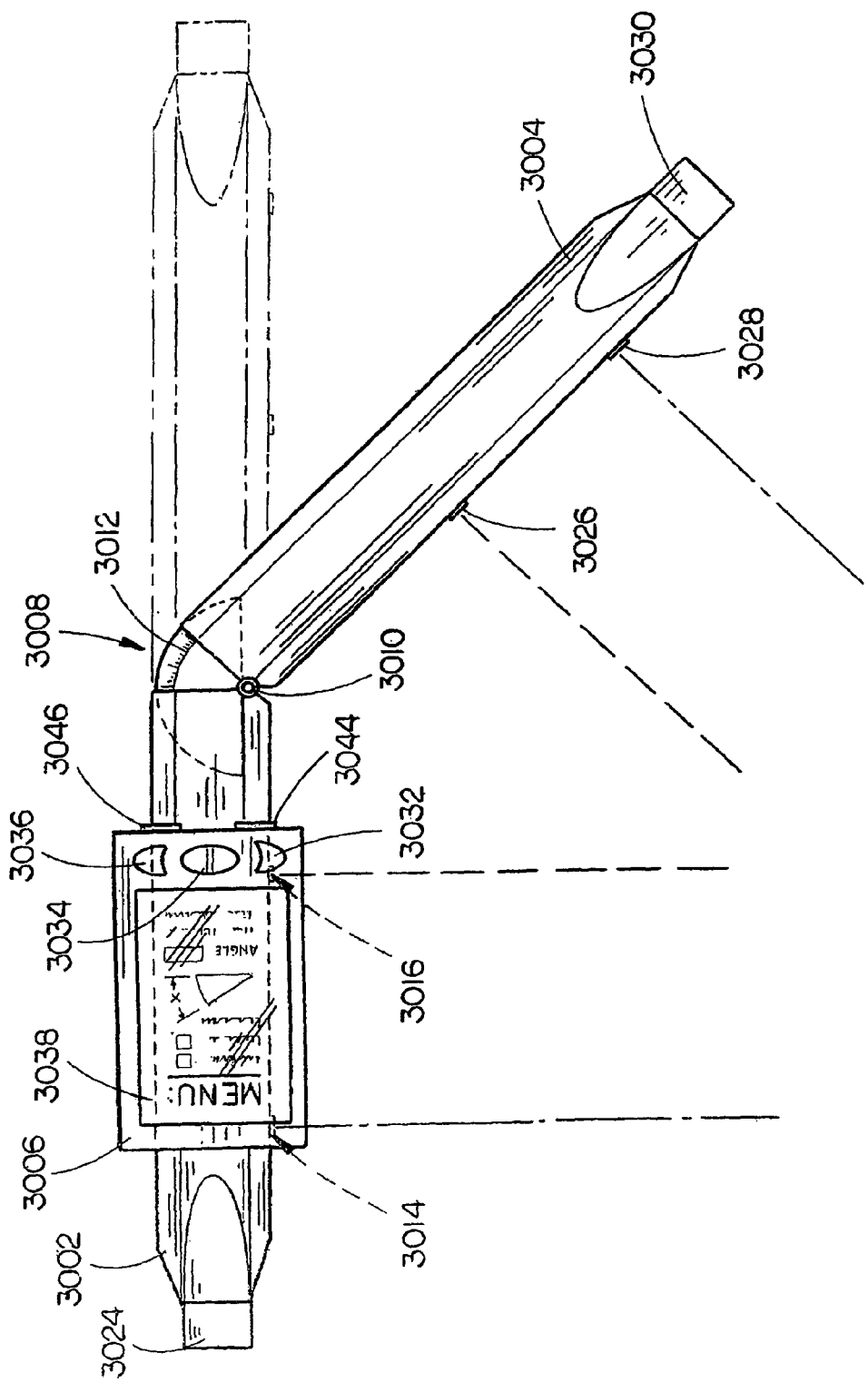
FIG. 31 is an illustration of the rotating laser apparatus including a display menu and an angle measurement device.
Figure 32:
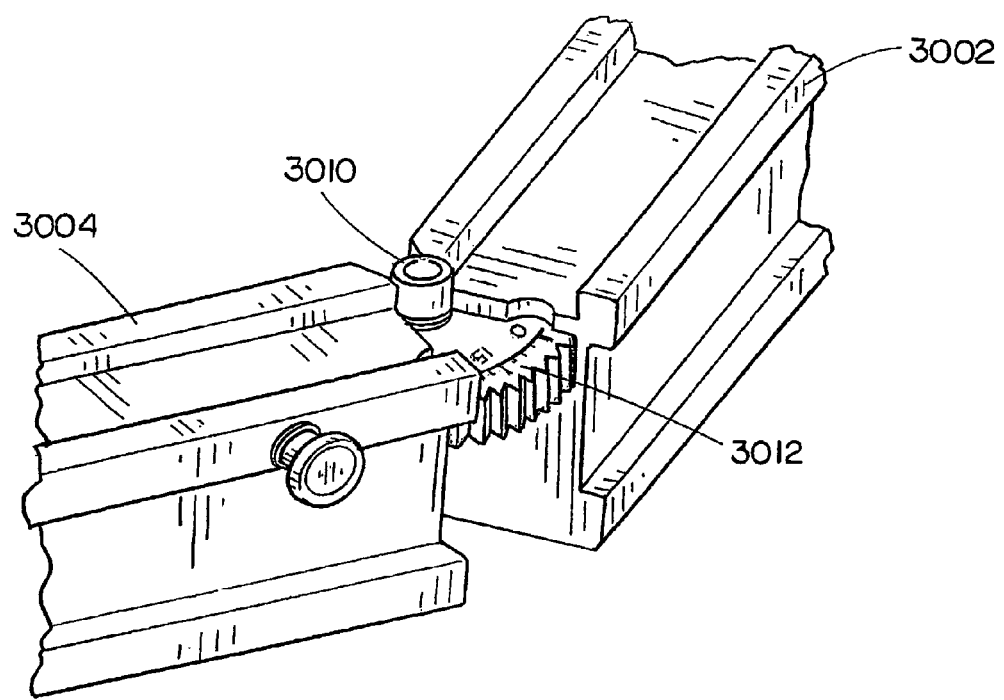
FIGS. 32 and 33 illustrate the rotation assembly including the angle of measurement device and a lock and release unit operable by the user.
Figure 33:
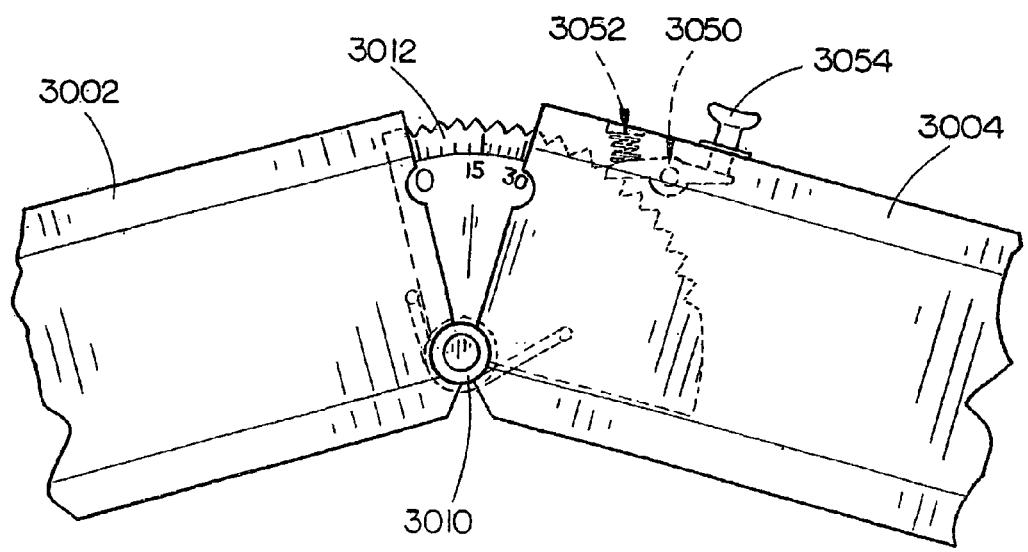
Figure 34:
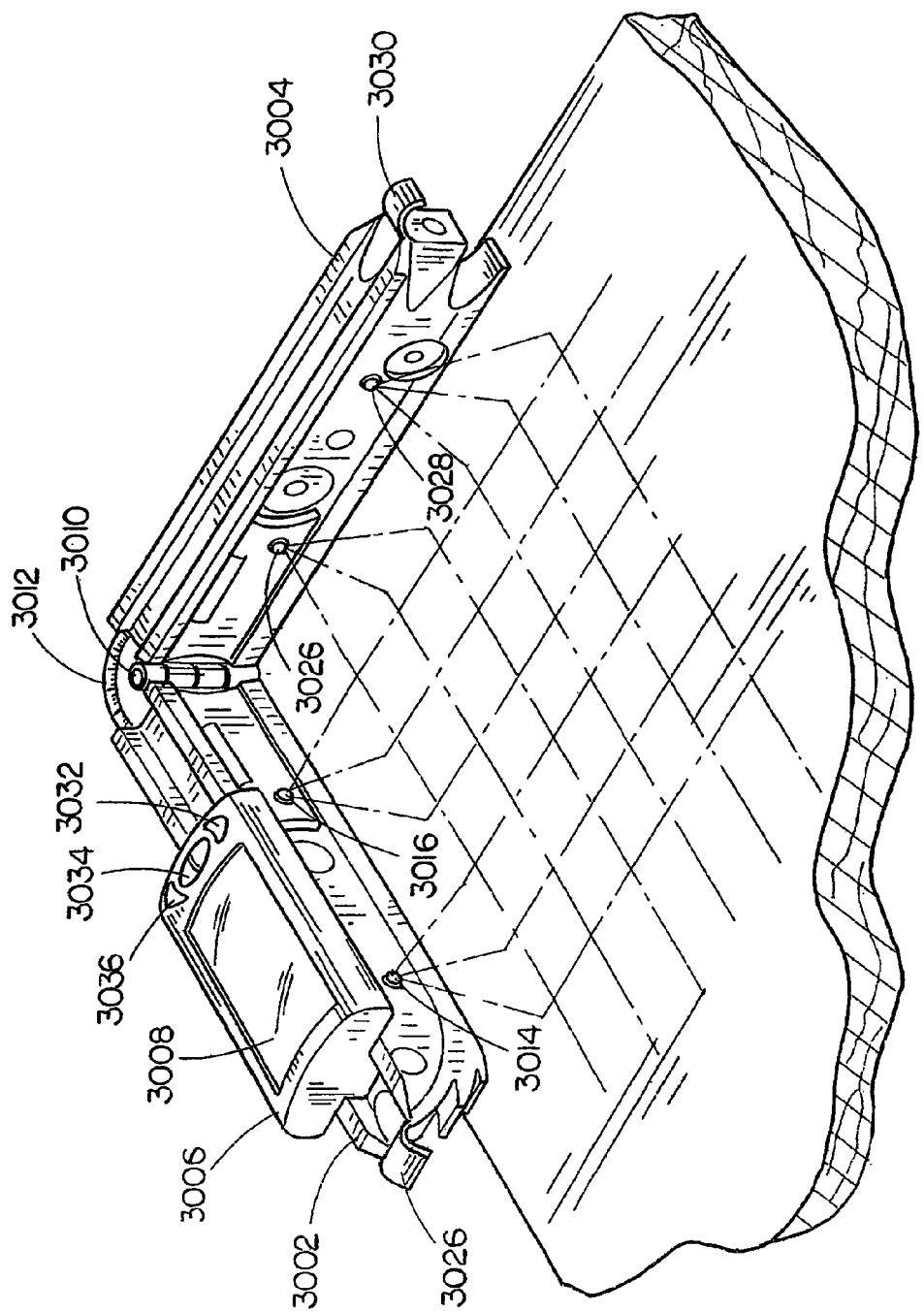
FIG. 34 is an illustration of the rotating laser apparatus in operation.
Figure 36:
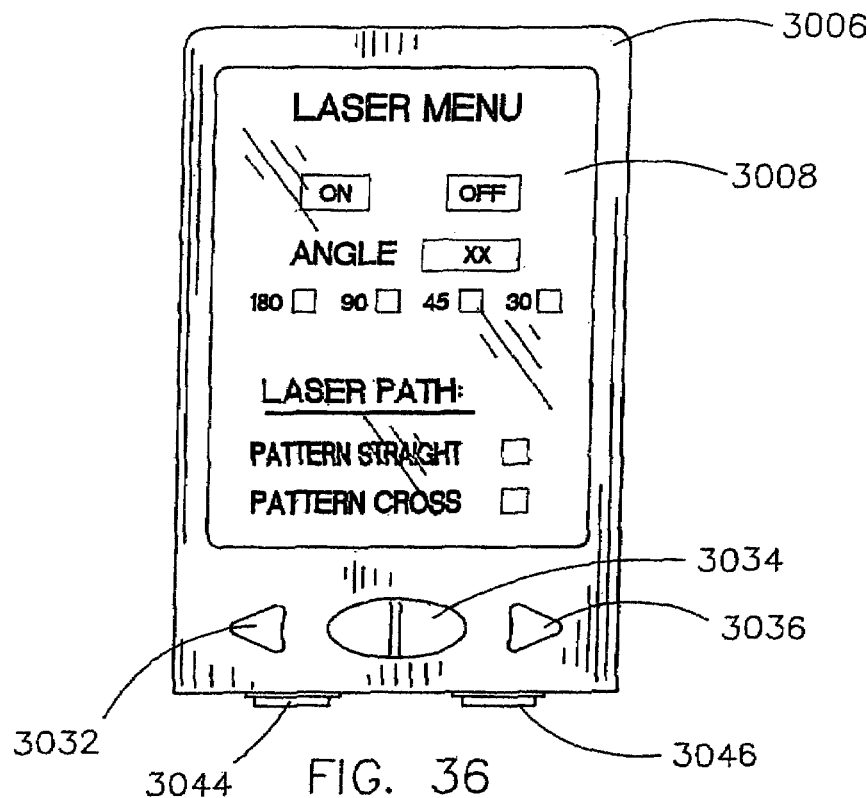
FIGS. 36 and 37 are illustrations of a computing system of the laser apparatus showing display menus available.
Figure 37:
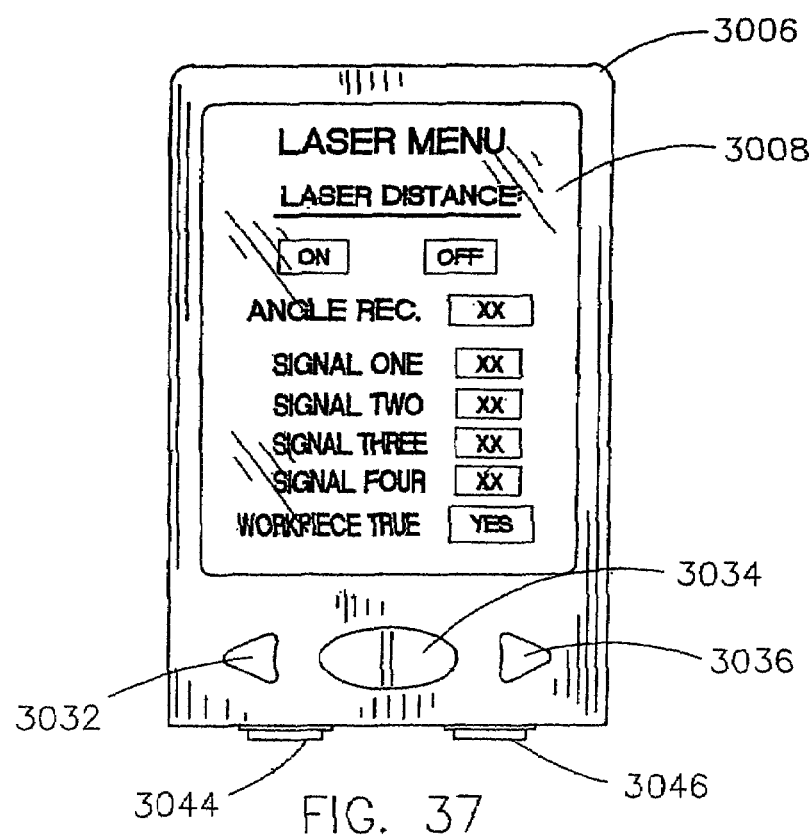

As discussed above, the computing system 3006 is similar to the computing system described previously in FIGS. 1 through 29. In the present embodiment, the computing system 3006 is in communication with the laser sources 3014, 3016, 3026, and 3028, and mounts upon the first housing member 3002. It is contemplated that the coupling of the computing system 3006 may occur upon the second housing member 3004. Exemplary interactive displays, readable on the computing system 2405, are shown in FIGS. 31, 36 and 37. The interactive displays may provide the user a display of the status of the laser source(s), the angle between the first and second housing members, the type of pattern to established, and gather information from the laser beams. Further, when the computing system 3006 is in communication with the rotation mechanism 3008 an interactive display on the computing system 3006 may allow the user to enter the desired angle and have the rotation mechanism set to that angle.

Figure 38:
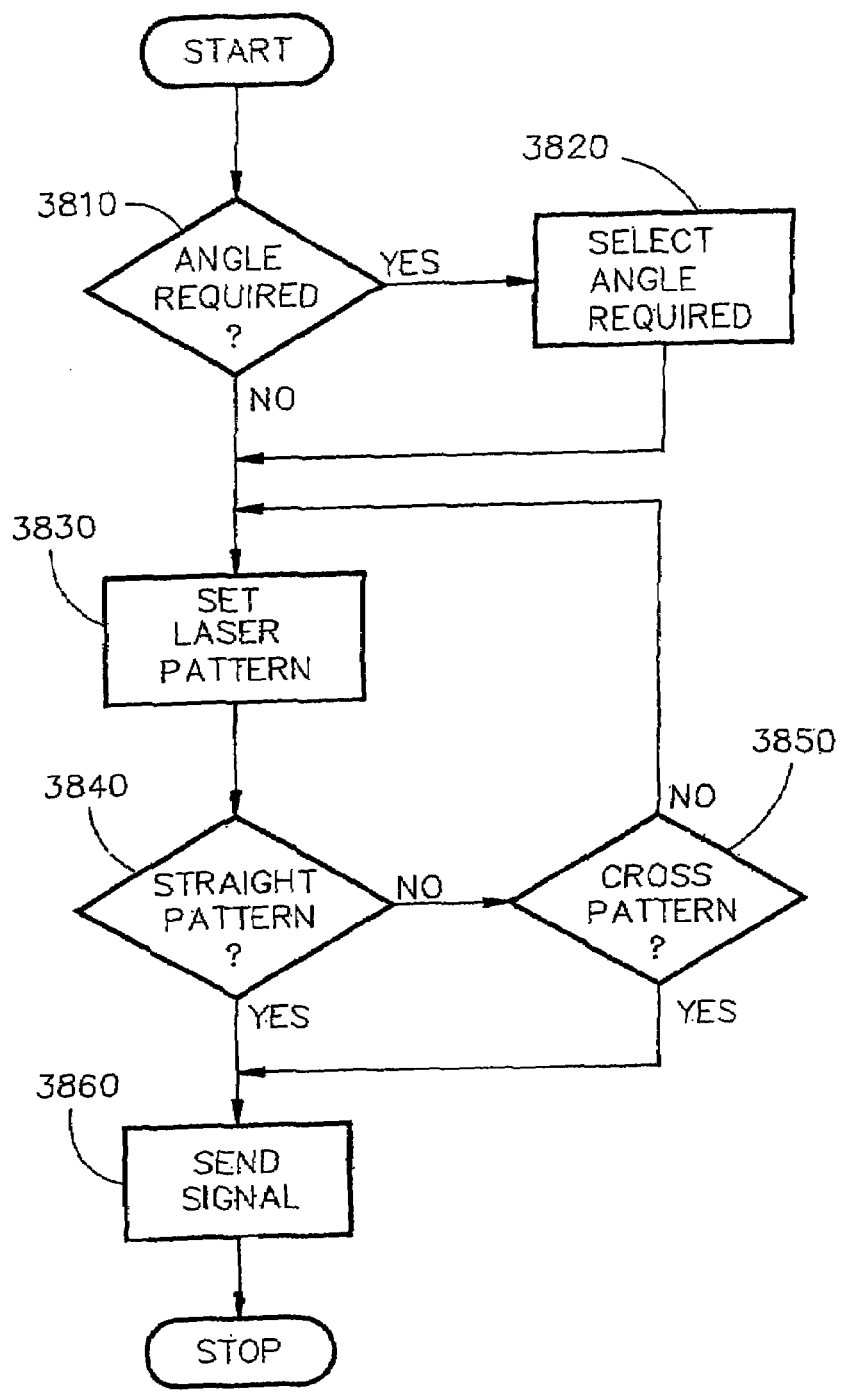
FIG. 38 is a flowchart illustrating functional steps which are accomplished by the rotating laser apparatus.

Referring now to FIG. 38, a flowchart illustrating the functional steps achieved using the interactive display of the computing system 3006 of the rotating laser apparatus 3000, is shown. In step 3810 the interactive display 3008 of the computing system 3006 asks the user to specify if an angle is required for the current assignment. The angle referred to is the angle that the first housing member 3002 is at relative to the second housing member 3004. If the user responds in the affirmative to this query then the user is asked to specify the angle required in step 3820. After the angle has been specified or if no angle is required for the current assignment, as directed by the user inputting the information through the interactive display 3008 of the computing system 3006, then in step 3830 the laser pattern is established.

Establishing the laser pattern occurs by the user being asked on the interactive display to specify the laser pattern required. In step 3840 the user is asked if the laser pattern is a straight laser pattern. If the user responds affirmatively, indicating that a straight laser pattern is to be established, then in step 3860 the laser signal is sent to establish the straight pattern. If in step 3840 a user indicates that a straight pattern is not desired then the user is asked, in step 3850, if a cross pattern is to be established. If the user responds to this query by indicating that a cross pattern is not to be established then the computing system 3006 returns to step 3830 and the interactive display prompts the user that the laser pattern setting must be established. It is contemplated that the computing system 3006, through the interactive display 3008, may allow for the user to manually enter a laser pattern to be established. If the user responds to the query of step 3850 in the affirmative, indicating that a cross pattern is to be established, then in step 3860 the laser signal is sent to establish the cross pattern.

Referring now to FIG. 39, a laser apparatus 3900, is shown. In the current embodiment, the laser apparatus 3900 comprises a housing 3902 and a laser source 3904 coupled with the housing 3902. The housing 3902 further includes a first optical splitter 3906, a second optical splitter 3908, and a third optical splitter 3910. Further, the housing includes a first optical reflector 3912. Each of the optical splitters and the optical reflector is disposed within the housing 3902 in proximal location to a first emitter 3914, a second emitter 3916, a third emitter 3918, and a fourth emitter 3920, respectively.

The optical splitters function to split an incident laser beam received into two or more refracted laser beams. For example, in FIG. 39, an incident laser beam 3922 from the laser source 3904 strikes the first optical splitter 3906 whereupon the incident laser beam is divided into a first laser beam 3924 and a second laser beam 3926. The first laser beam 3924 is directed to the first emitter 3314 where it is emitted from the housing across an operational field. The operational field may be a variety of work area, such as those found on a table saw, drill press, belt sander, lathe, or the like. The second refracted laser beam 3926 is directed towards the second optical splitter 3908. In effect, the second laser beam 3926 is the incident laser beam for the second optical splitter 3908 whereupon striking the second optical splitter the second refracted laser beam is divided into a third laser beam 3928 and a fourth laser beam 3930. The third laser beam 3928 is directed to the second emitter 3916 where it is emitted form the housing across the operational field. The fourth laser beam 3930 becomes the incident laser beam for the third optical splitter 3910. The third optical splitter 3910 divides the laser beam into a fifth laser beam 3932 and a sixth laser beam 3934. The fifth laser beam 3932 is directed to the third emitter 3918 where it is emitted from the housing across the operational field. The sixth laser beam 3934 becomes the incident laser beam for the first optical reflector 3912. The first optical reflector 3912 directs the laser beam to the fourth emitter 3920 where it is emitted from the housing across the operational field.

A single laser source may reduce the power consumption of the current invention and provide a more effective way to deal with heat build up, which is inherent within a laser beam generating source. In an alternate embodiment the laser source may be a modular laser source capable of being inserted and removed from the housing of the laser apparatus. This may increase operational safety and provide an easier method of caring for the laser source by being able to remove it and store it in a separate location. Additionally, a variety of laser sources may be enabled to couple with the housing of the laser apparatus of the current invention. Thus, the user of the laser apparatus with a modular laser source has the capability of inserting the appropriate laser source for the job to be accomplished. For example, the user may need a simple laser source for one job and then require a laser source with a dithering assembly for another job. Additionally, the user may require a smaller output laser source in one situation and a larger output laser source in another. The needed functionality required by the user may be easily enabled with multiple modular laser sources with differing functional capabilities.

Referring now to FIG. 40, a laser apparatus 4000 is shown. In the present embodiment the laser apparatus 4000 comprises a housing 4002 coupled with a computing system 4004. Preferably, the computing system 4004 is similar to the computing systems described previously, except that in the present embodiment the computing system 4004 includes a laser source 4006. The housing includes a first optical splitter 4008, a first optical reflector 4010, a second optical splitter 4012, a third optical splitter 4014, and a second optical reflector 4016. The housing further includes a first emitter 4018, a second emitter 4020, a third emitter 4022, and a fourth emitter 4024.

The laser source 4006 emits an incident laser beam into the housing 4002 which is then split by a first optical splitter 4008 into a first laser beam 4026 and a second laser beam 4028. The first laser beam 4026 is directed to the first optical reflector 4010 where it is reflected through the first optical emitter 4018 and emitted across an operational field. The second laser beam 4028 is directed to the second optical splitter 4008 which divides the second laser beam into a third laser beam 4030 and a fourth laser beam 4032. The third laser beam 4030 is directed through the second emitter 4020 across the operational field and the fourth laser beam 4032 becomes the incident laser beam for the third optical splitter 4012. The third optical splitter 4010 divides the fourth laser beam 4032 into a fifth laser beam 4034 and a sixth laser beam 4036. The fifth laser beam 4034 is directed through the third emitter 4022 across the operation field and the sixth laser beam 4036 becomes the incident laser beam for the second optical reflector 4014. Upon striking the second optical reflector 4014, the sixth laser beam 4036 is reflected through the fourth optical emitter 4024 and emitted across the operational field.

In an additional embodiment, the laser apparatus may include an optical splitter control mechanism. This mechanism may allow a user to determine the number of laser beams emitted from the housing of the laser apparatus. This may be beneficial when the laser apparatus is being used in situations where the size of the work surface and other components are constantly changing. For example, on a table saw all four emitters may need to be engaged to cover the work surface presented. However, a drill press may have a much smaller working surface and using more than two emitters may not be beneficial to gathering the needed information as they may be outside the scope of the work surface available.

Figure 41:
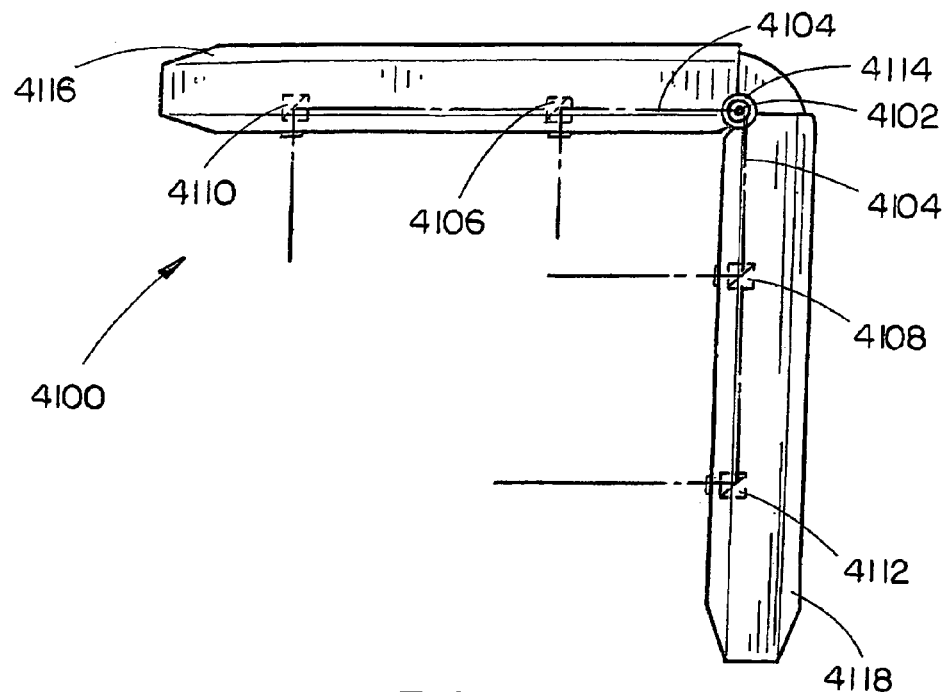
FIG. 41 is an illustration of a rotating laser apparatus with a single laser source.

Referring now to FIG. 41, a rotation laser apparatus 4100 including a single laser source 4102, is shown. The single laser source 4102 emits an incident laser beam 4104 which is split by a first optical splitter 4106 and a second optical splitter 4108. The laser beam is also reflected by a first optical reflector 4110 and a second optical reflector 4112. The optical splitters and reflectors function in the same manner as described previously in FIGS. 39 and 40. In the present embodiment the single laser source 4102 is located within the joint 4114 connecting a first housing member 4116 to a second housing member 4118. Power may be provided through a portable power source or a power cord as described in previous figures.

A rotation laser apparatus 4200 including a first laser source 4202 and a second laser source 4204, is shown in FIG. 39. In the present embodiment a first housing member 3606 is disposed on one end with the first laser source 3602 and connected at the opposite end, through joint 3608, to a second housing member 3610. The second housing member 3610 is disposed on the opposite end of its connection to the joint 3608 with the second laser source 3604. The first housing member 3606 further includes a first optical splitter 3612 and a first optical reflector 3614. The second housing member 3610 further includes a second optical splitter 4216 and a second optical reflector 4218. The operation of the splitters and reflectors is similar to that previously described in FIGS. 39 and 40.

Figure 42:
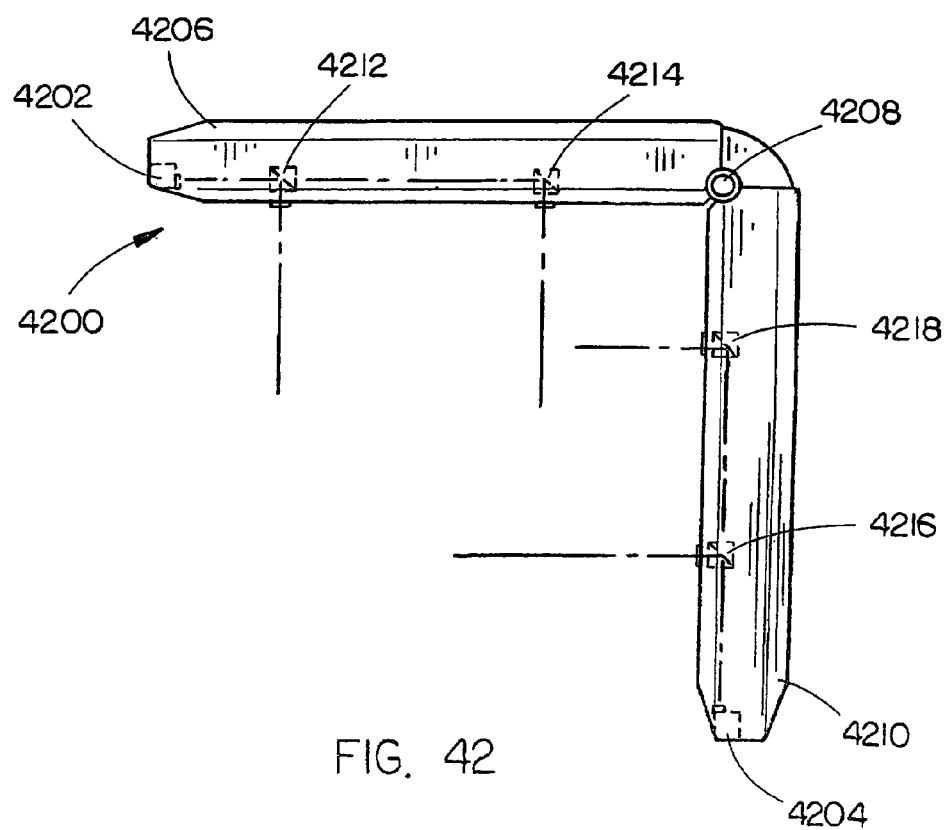
FIG. 42 is an illustration of a rotating laser apparatus with a first and a second laser source.

In both FIGS. 41 and 42 the number and configuration of optical splitters and reflectors may vary as contemplated by one of ordinary skill in the art. It is understood that the laser sources shown in the present embodiments are exemplary and may not be read as limiting or exclusive. As discussed in FIGS. 39 and 40 the laser apparati of FIGS. 41 and 42 may includes photo multipliers of various configurations in order to provide additional functionality to the laser apparatus. Alternatively, the laser sources provided in FIGS. 41 and 42 may be modular. The laser sources may be removed from the joint or the housing members and replaced with alternate laser sources.

Figure 43:
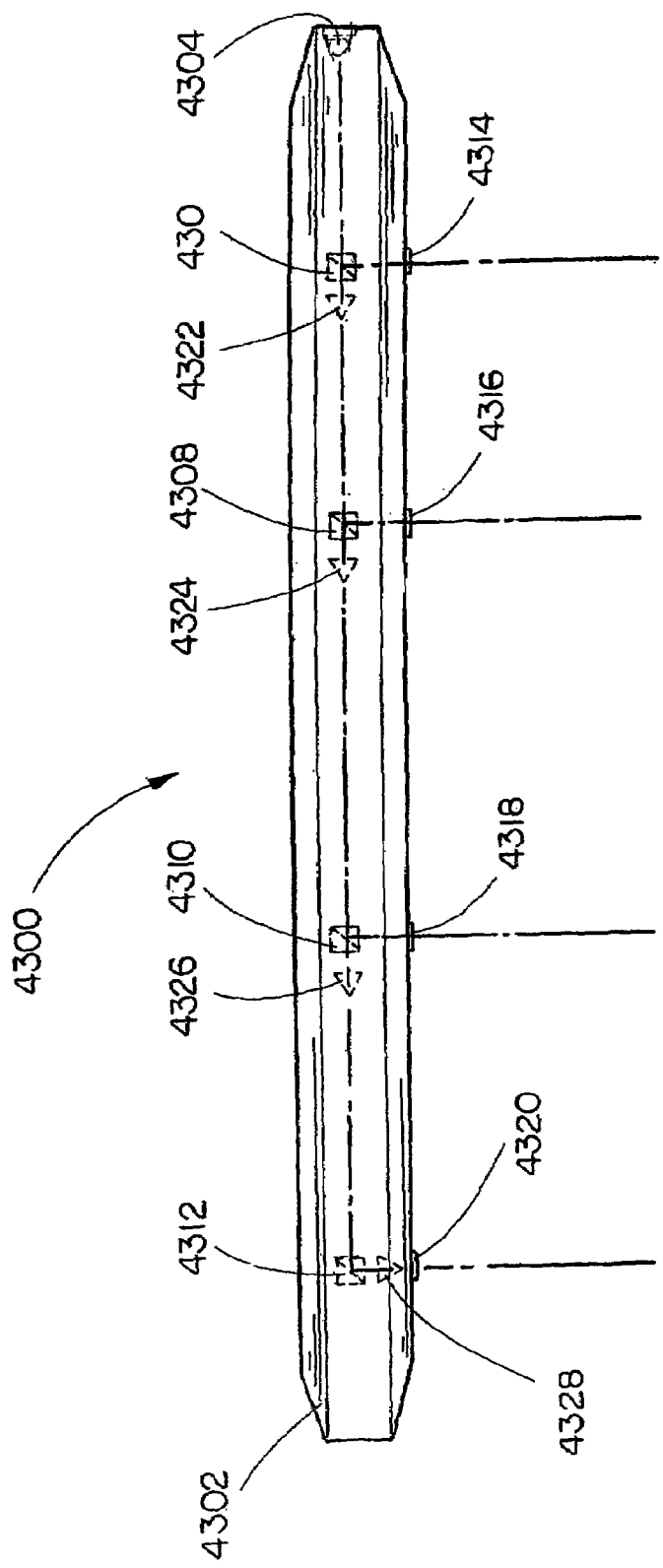
FIG. 43 is an illustration of the laser apparatus in FIG. 39, including a plurality of photo multipliers disposed within a housing of the laser apparatus.

Referring now to FIG. 43, a laser apparatus 4300 is shown. The laser apparatus 4300 comprises a housing 4302 disposed with a laser source 4304. The housing is further disposed with a first optical splitter 4306, a second optical splitter 4308, a third optical splitter 4310, and an optical reflector 4312. The functionality of the optical splitters and the optical reflector is similar to that described in FIGS. 39 through 42. Additionally, the housing includes a first emitter 4314, a second emitter 4316, a third emitter 4318 and a fourth emitter 4320.

In the present embodiment, a plurality of light signal enhancing instruments 4322, 4324, 4326, and 4328. These light signal enhancing instruments may be photomultipliers comprising a variety of designs, such as photomultiplier end-on tubes, side-on photomultipliers, or the like. The photomultipliers may accept an incident laser beam and intensify the light signal by increasing the number of electrons in order to maintain sufficient light signal strength as the laser beam is being passed down from one optical splitter to the next. Further, the light signal enhancing instruments may be positioned in front of the emitters in order to provide optimum light signal output.

Alternatively, the light signal enhancing instruments may include a secondary laser source, such that the incident laser beam received has its signal strength increased. For example, a low power laser source may be included within the light signal enhancing instrument which contributes a second light signal to the existing laser beam in order to make up for a loss of light signal intensity. Such a system of multiple light signal enhancing instruments may decrease production costs by substituting low power laser sources for separate and independent laser sources located throughout the laser apparatus. It is understood that the configuration and numbers of light signal enhancing instruments may vary as contemplated by one of ordinary skill in the art.

Figure 44:
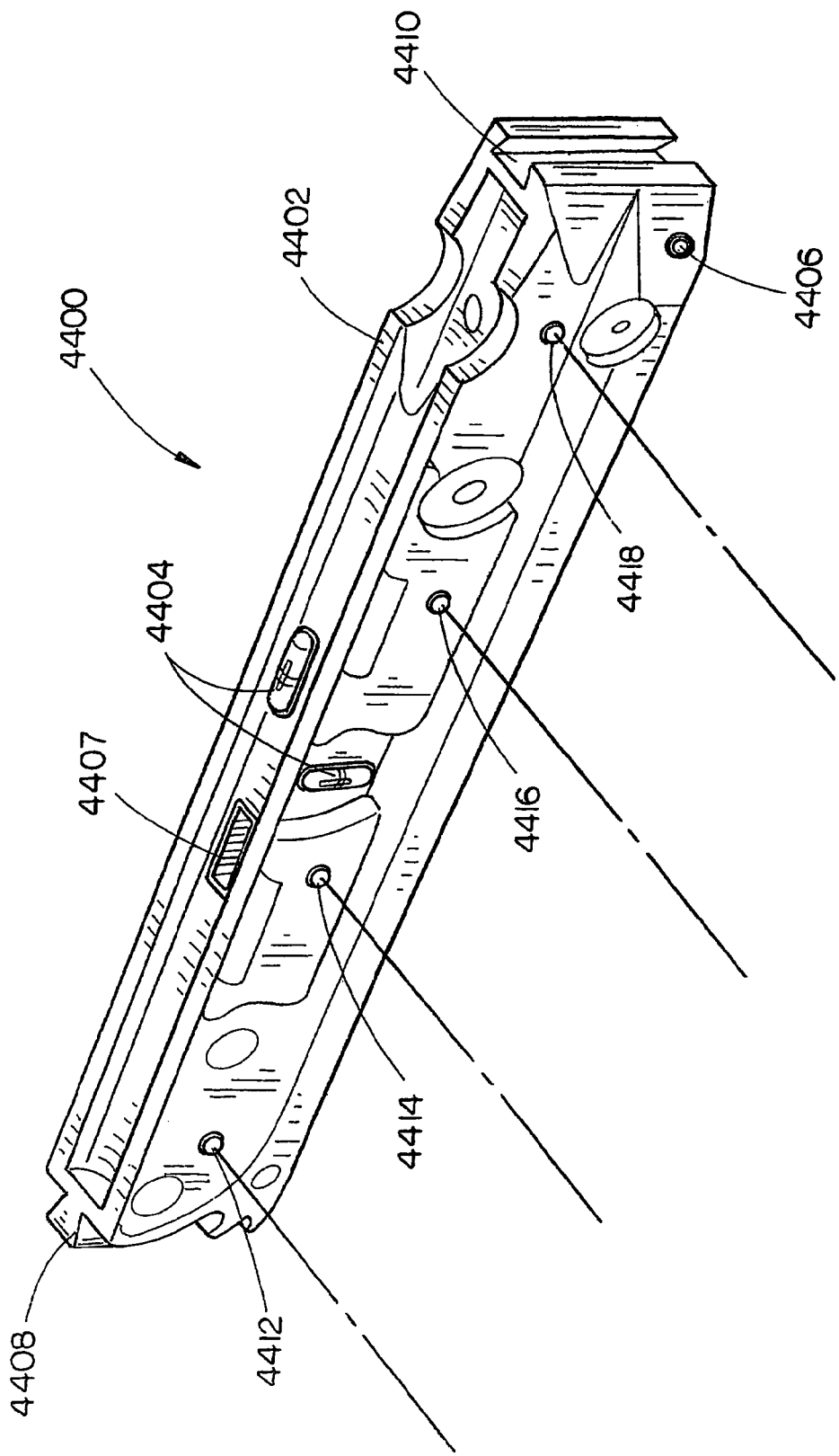
FIG. 44 is an illustration of a laser apparatus including a leveling mechanism in accordance with an exemplary embodiment of the present invention.
Figure 45:
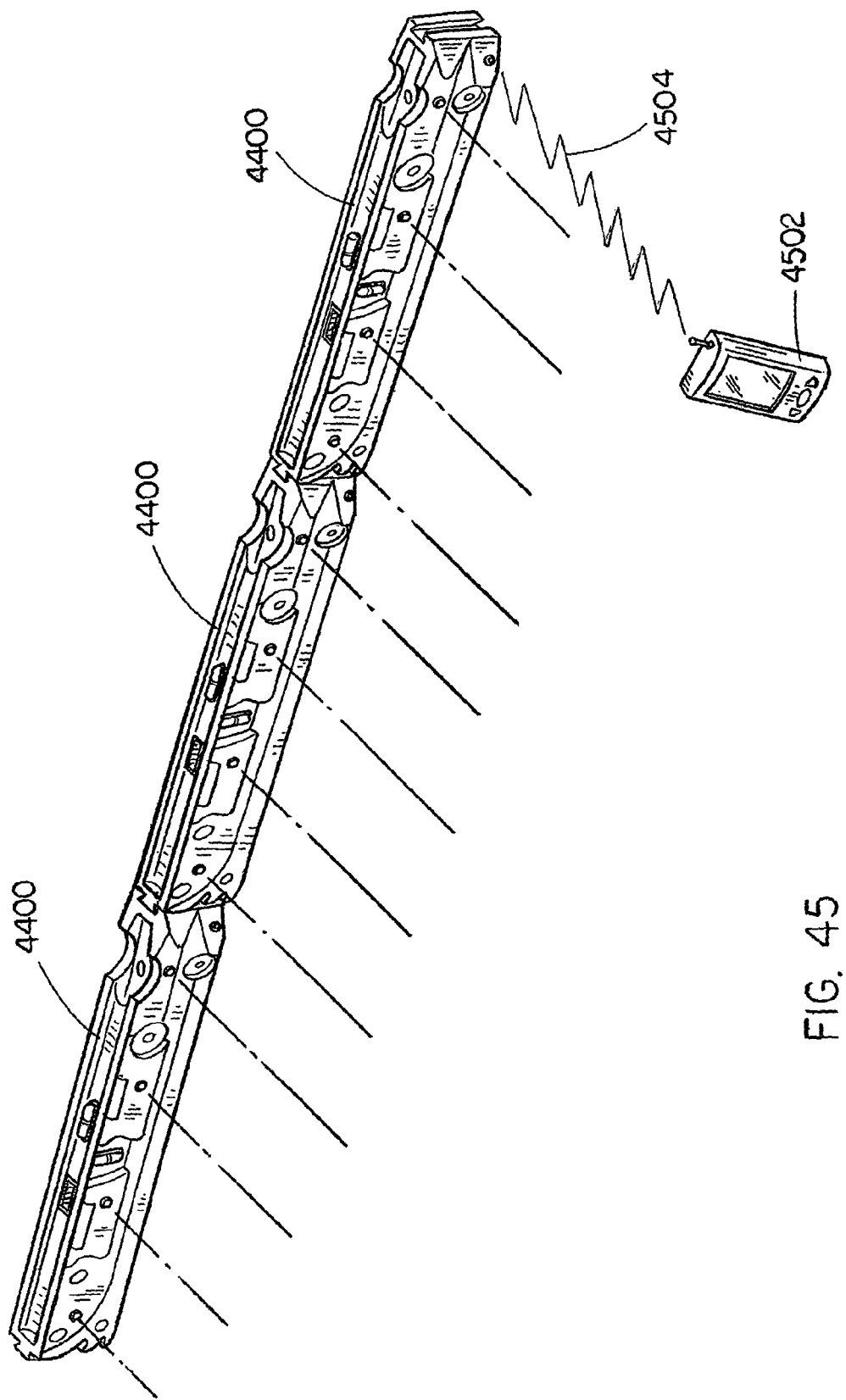
FIG. 45 is an illustration of a plurality of the laser apparatus, shown in FIG. 44, coupled with one another.
Figure 46:
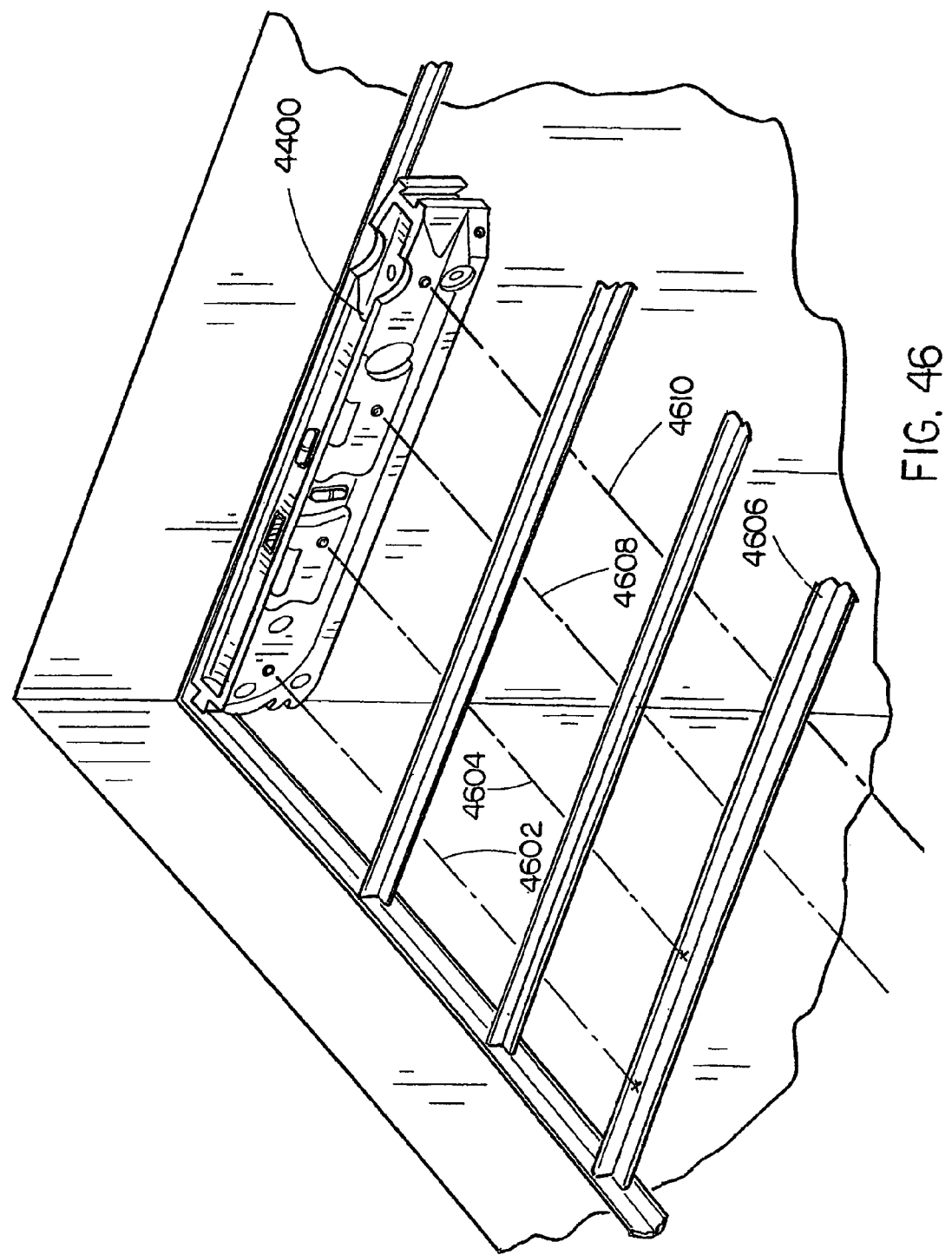
FIG. 46 is an illustration of the laser apparatus in FIG. 44, providing leveling readings to a drop ceiling assembly.

Referring now to FIGS. 44, 45, and 46, a laser apparatus 4400 is shown. In the current embodiment, the laser apparatus 4400 comprises a housing 4402 including a leveling mechanism 4404 and a wireless receiver 4406. The housing 4402 further includes a communication port 4407, an attachment adapter 4408, and an attachment receiver 4410. Additionally, the housing 4402 includes a first laser source 4412, a second laser source 4414, a third laser source 4416, and a fourth laser source 4418.

The leveling mechanism 4404 enables a user to determine the level characteristics of the laser apparatus 4400 in any location. Previous embodiments of the laser apparatus showed the leveling mechanism within the mounting assembly. By placing the leveling mechanism within the housing 4402, the user may establish accurate placements in locations such as on a wall for use in mounting a drop ceiling, as shown in FIG. 46.

The laser sources 4412 through 4418 are similar to the laser sources shown and described previously. It is contemplated that a laser source may be located to emit a laser beam from either end of the housing 4402. For example, a laser source may be positioned within the attachment adapter 4408. By placing the laser source at either end of the housing the laser apparatus 4400 may be enabled to determine the level characteristics of objects located along a flat surface to which the laser apparatus 4400 is mounted, such as a picture on a wall or the like.

The wireless receiver 4406 enables communication between the laser apparatus 4400 and a computing device 4502, shown in FIG. 45. In alternate embodiments the computing system may be communicatively coupled to the laser apparatus using a variety of systems, such as serial cable, Bluetooth, Infrared, or the like. The wireless communication system allows a user to mount the laser apparatus 4400 in a remote location, such as that shown in FIG. 46, and receive information on the computing system 4502. For example, shown in FIG. 46, the laser apparatus 4400 is mounted to a wall to provide leveling information for a drop ceiling. A first laser beam 4602 and a second laser beam 4604 are shown striking a support rail 4606 for the drop ceiling. In this situation the laser apparatus may communicate to the computing system that the support rail 4606 is not level at the two identified points. A third laser beam 4608 and a fourth laser beam 4610 may provide no such indication that the support rail 4606 is out of level. Thus, a user is informed not only of the misalignment but also where along the support rail 4606 the misalignment is occurring.

The attachment adapter 4408 and the attachment receiver 4410 enable linking of one laser apparatus to another. As shown in FIG. 45, a plurality of laser apparatus 4400 may be connected. In this embodiment, the multiple laser apparatus are in communication with the computing system 4502. It is contemplated that the attachment adapter and attachment receiver provide a communicative link between each of the laser apparatus 4400 allowing a single computing system to control all connected laser apparatus. Alternately, each laser apparatus may receive the wireless signal 4504 being sent out by the computing system 4502.

Figure 30:
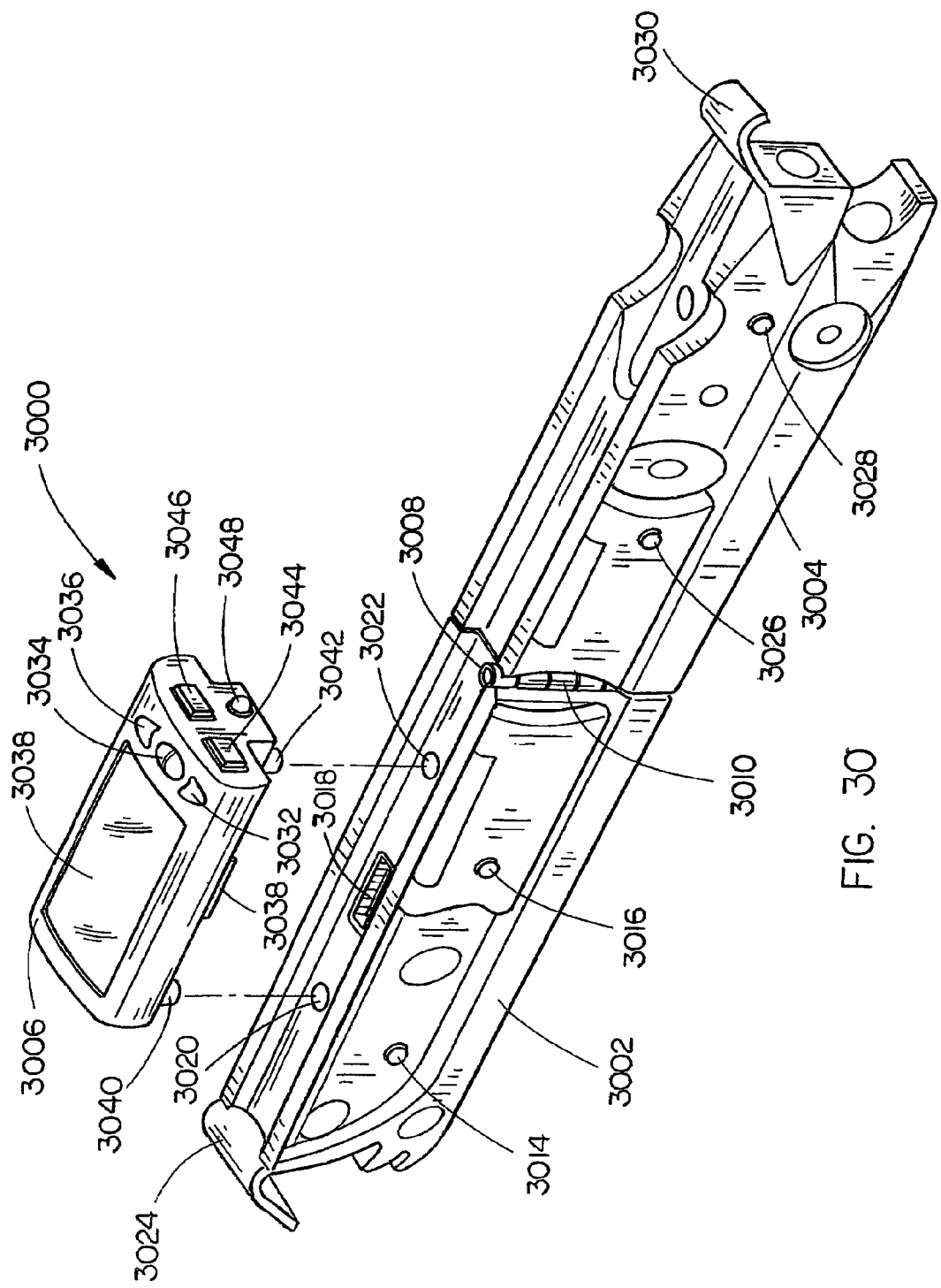
FIG. 30 is an isometric illustration of a rotating laser apparatus including a computing system and rotation assembly in accordance with an exemplary embodiment of the present invention.

It is understood that the leveling mechanism 4404 may be disposed within any of the previous embodiments of the laser apparatus, shown in FIG. 1 or 30. It is further understood that the laser apparatus 4400 may include mounting members and latch and release mechanisms, such as those previously shown and described in FIG. 1. Additionally, a mounting assembly for connecting the laser apparatus 4400 to a wall or other vertical surface is contemplated. The communication port 4407 enables a computing system to communicate with the laser sources 4412 through 4418. The housing 4402 of the laser apparatus 4400 may be disposed with both the wireless receiver 4406 and the communication port 4407 or one or the other.

Smooth and easy operational control over a complex technological system, such as a laser guidance, measurement, and alignment system, may be critical to the success of any device. In the power tool field, this is even more critical as a user of power tools employing complex technology is often faced with a chaotic and dangerous working environment filled with loud noises, many moving parts, dust and debris which hamper visual capabilities, and a variety of different operations which require their attention. Therefore, the control device that the user employs to control the power tool must be simple and yet effectively provide the capability to control numerous complex tasks. In the field of power tools, the control device may be referred to as the user interface. The user interface of the present invention is designed to better serve the user by focusing on providing complex technology in an easy to understand or intuitive format.

Many times when complex technologies are incorporated into existing devices, such as laser systems with power tools, the focus is on the technology and the user is forced to comprehend a bewildering array of new standards and display terminology. With the present invention the technology serves the user by joining the complexity of the laser system with a user interface that provides simple to follow and easy to understand textual and/or graphical representations. Out-of-the-box implies a level of user friendliness with the idea being that any user may take the present invention and by simply turning it on, start using it with ease. For example, when a user interface in accordance with an exemplary embodiment of the present invention is first turned on it may provide a calibration of the current settings of a power tool environment without being prompted by the user. From the calibration the user interface logically organizes and communicates the information to the user. Additionally, the user interface may present the user with operational choices logically related through easy to identify monikers providing a smooth flow to the user's navigation through the various user interface applications. Another example of the ease of use of the current user interface may involve the use of circular saws. All circular saw blades establish a kerf during their cut. A kerf is the area of material removed by the blade during the cut. While the kerf may be a minimal value it is not always an insignificant value and a user may wish to have the ability to account for the kerf of the cut when establishing settings. The user interface of the present invention may provide an operator the capability of determining the kerf for the circular saw blade through a user selectable menu of choices with pre-programmed kerf information. In the alternative, the user interface may establish the kerf of the circular saw blade being used without operator input and adjust all settings made to account for the kerf. Another embodiment of the present invention may be the user interface being able to determine the kerf of the circular saw blade being used through identification of a marker on the blade, such as a bar code imprinted on the blade. It is understood that adaptation of the user interface for use with other types of power tools may also include the ability to account for the amount of material removed by the power tool when establishing settings for the power tool.

The correlation by the user interface of the selectors engaged by the user with the information the user sees on the display screen is an example of focusing on the user. This simple and effective design gives the user both qualitative and quantitative feedback on the various types of information the user may wish to see or adjust. The selectors may be buttons located on any surface of the user interface which provides for the appropriate correlation of the buttons with the icons on the display screen. Providing a display screen using liquid crystal display (LCD) technology is another example of focusing on the user. The LCD provides a visual field which has been proven to effectively reduce visual identification stress for a user. The color scheme and font types for the textual and graphical representations are designed to increase ease of use, even in the often dynamic working environments within which the user interface may be employed. Providing a backlit display screen also highlights the focus of the present invention, which is on the user.

Powering the user interface of the present invention may occur through the use of batteries which are received in a battery cavity within the user interface. The user interface allows for the use of standard types of batteries for easy replacement and cost reduction. It is understood that the user interface may employ a variety of power sources, such as AC power through the use of a standard AC cord or fuel cells. Regardless of the power source used, the user interface provides a clear display to the user of the status of the power source. This may be helpful to avoid unnecessary delays caused by power failures which may have been avoided had the operator of the user interface known the status of the remaining power supply.

The user interface of the present invention may provide a computing system capable of executing applications which are visualized for the operator on a display. Thus, the user interface is enabled to receive updates to its current applications inventory or replacement of applications should the need arise. For example, the user interface may execute a specific range of applications for the operation of a power tool such as a table saw, or the like. However, the operator may wish to retro-fit the user interface on a belt sander. The belt sander will have different operating requirements and capabilities than a table saw and therefore the user interface may need to download an application set directed for the operation of a belt sander. Accomplishing this updating or replacing of applications may occur using a variety of different technologies. For instance, the user interface of the present invention may include a docking station which, when the user interface is docked, allows for a communicative link to be established between the user interface and a peripheral computing system. Thus, information may be downloaded to the user interface from the peripheral computing system and the user interface may upload information to the peripheral computing system. The user interface may be disposed with communications ports, such as a serial cable port, infrared port, RF port, Bluetooth port, and the like, which allow it to network with peripheral computing systems.

Through a user interface of the present invention, an operator of a power tool, such as a table saw, may establish the settings and measurements to be used with the power tool. For example, a user of the table saw may set a desired fence to blade distance, blade height, blade angle, etc., through the user interface. When the feedback from the laser apparatus 100 indicates that the desired orientation has been reached it may provide an indication to the user, through the user interface. Indicators may include visual and audio feedback, and the like. For example, a sound feedback mechanism provided by a user interface of the present invention may present an audible signal to a user when a tool is in the selected position (e.g., when a saw blade has a desired height or angle, when a fence is in a desired distance from a saw blade, or the like). In a variation of this mechanism, the sound feedback mechanism may emit via a microphone/speaker a series of beeps or other noises to a user that guide the user in the positioning of the tool. For example, the beeps may become louder, more frequent, and/or change in pitch the closer the tool is to the desired position. Alternatively, a user interface of the present invention may provide visual feedback mechanism (not shown) which presents a visual signal on its display. For example, this visual signal may be as simple as a light or other symbol being displayed on the display of the user interface when the tool is in the desired position. In a variation of the visual feedback mechanism, arrows or other visual direction-guiding signals may be presented on the display to guide the user to the desired position of the tool.

A user interface in accordance with the present invention may be coupled with a laser measurement and alignment device. The laser measurement and alignment device may comprise the laser apparatus 100 and computing system 104 shown and described in FIGS. 1 through 46 or may comprise a variety of systems as contemplated by one of ordinary skill in the art. The coupling may enable the user interface to be selectively or permanently detached from the laser measurement and alignment device. The user interface may communicate with the laser measurement and alignment device via a physical communication line (such as a cable) or via a wireless signal. It is contemplated that the user interface may couple directly with the laser apparatus 100 or may communicatively couple with the computing system 104 which in turn is coupled with the laser apparatus 100. The communicative coupling may allow the user interface to operatively control the laser apparatus 100 from a remote location. Thus, the user interface may control a power tool, upon which the laser measurement and alignment device is coupled, from a remote location.

In an exemplary embodiment, the interface may include its own power supply so that the interface may transmit signals to the laser measurement and alignment device when detached therefrom. Alternatively, the interface and the laser measurement and alignment device may share a single power source. The power source may be batteries, fuel cells, or the like. In a further embodiment of the present invention, the user interface may include laser sources, similar to those shown and described for the computing system 104. Moreover, the software loaded onto a user interface may be updated through a diskette, a DVD, a CD, the Internet, a network, or the like.

According to an exemplary embodiment of the present invention, a user interface may include a display which shows exemplary screens 4700 through 5300 shown in FIG. 47 through 53. As shown in FIG. 47 through 53, each screen includes four tabs: a home tab (labeled with a "home" icon), a settings tab (labeled with a "gear" icon), a calibration tab (labeled with a "reversed triangle" icon), and a save tab (labeled with a "diskette" icon). A user may toggle among different screens by touching an appropriate tab.

Figure 47:
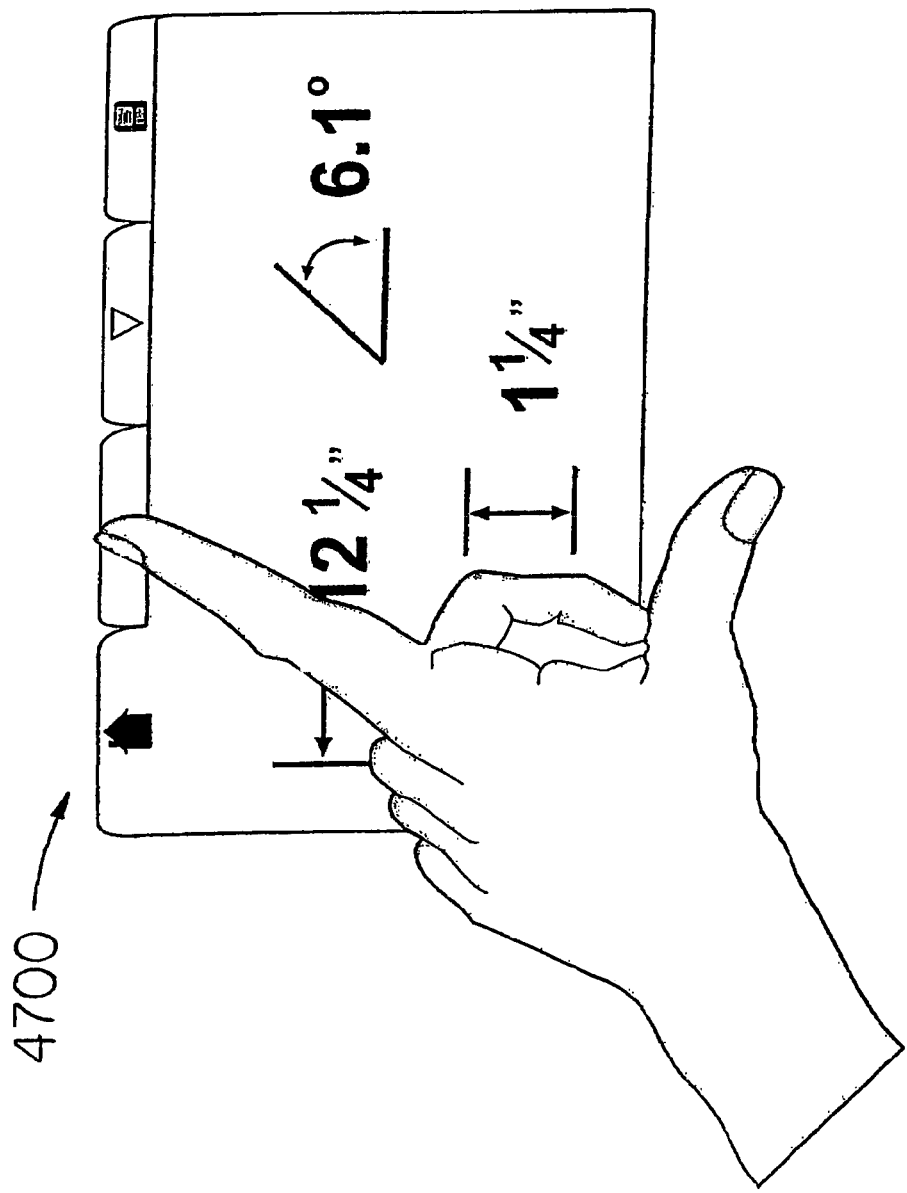
FIG. 47 shows an exemplary home screen shown on a display of an exemplary user interface in accordance with an exemplary embodiment of the present invention.
Figure 48:
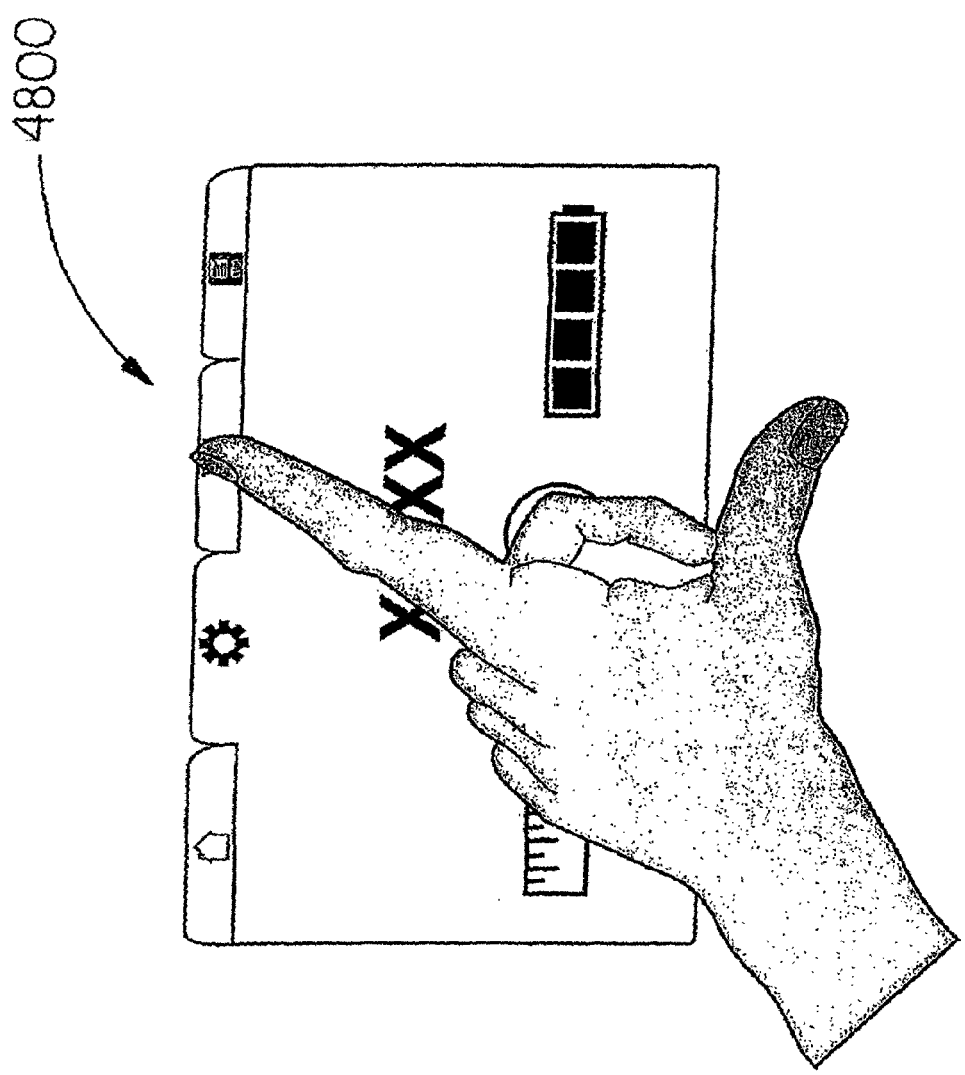
FIG. 48 shows an exemplary settings screen shown on a display of an exemplary user interface in accordance with an exemplary embodiment of the present invention.
Figure 49:
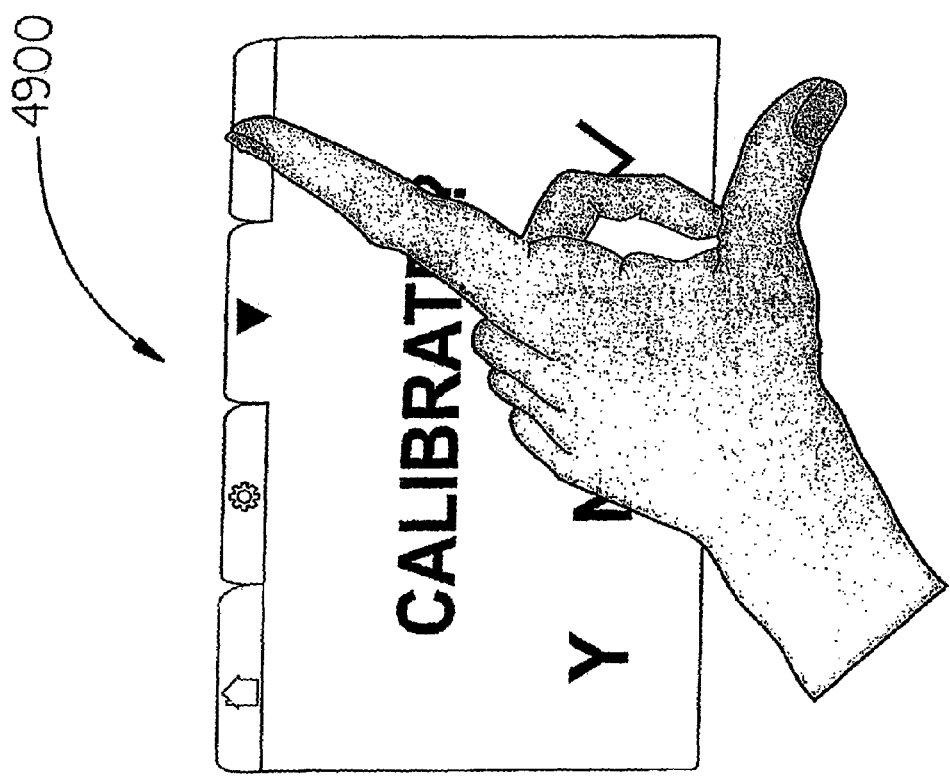
FIG. 49 shows an exemplary calibration screen shown on a display of an exemplary user interface in accordance with an exemplary embodiment of the present invention.
Figure 50:
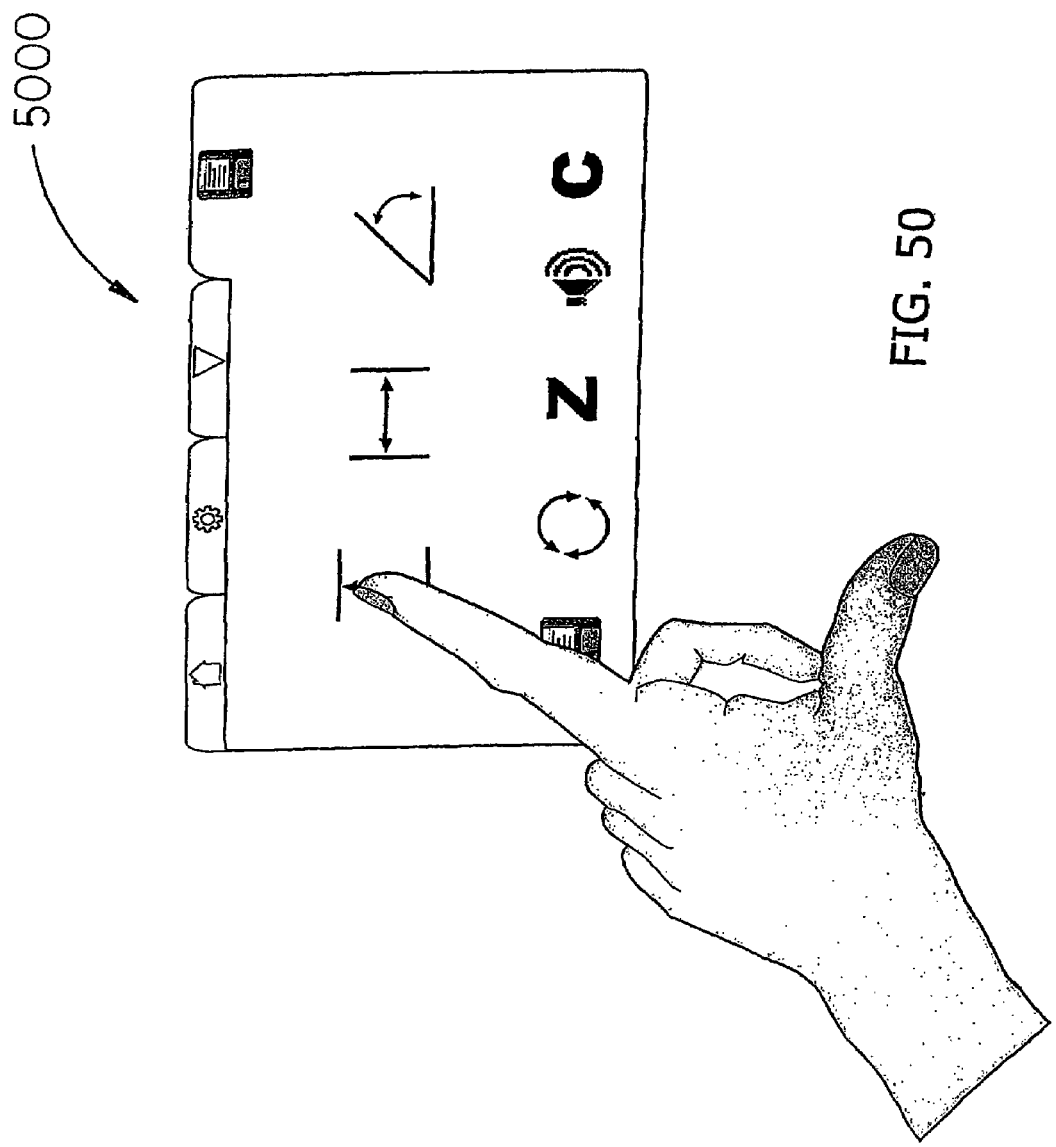
FIG. 50 shows an exemplary save screen shown on a display of an exemplary user interface in accordance with an exemplary embodiment of the present invention.
Figure 51:
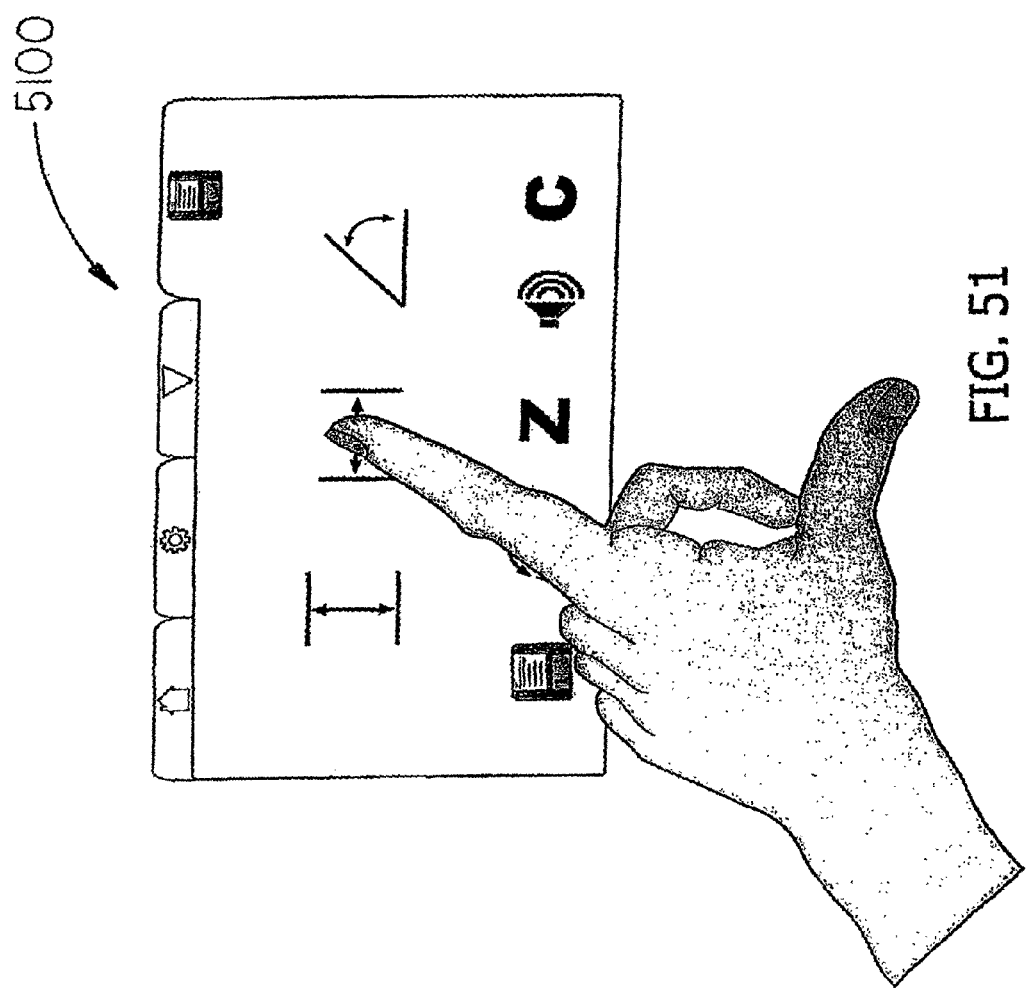
FIG. 51 shows an additional exemplary save screen shown on a display of an exemplary user interface in accordance with an exemplary embodiment of the present invention.
Figure 52:
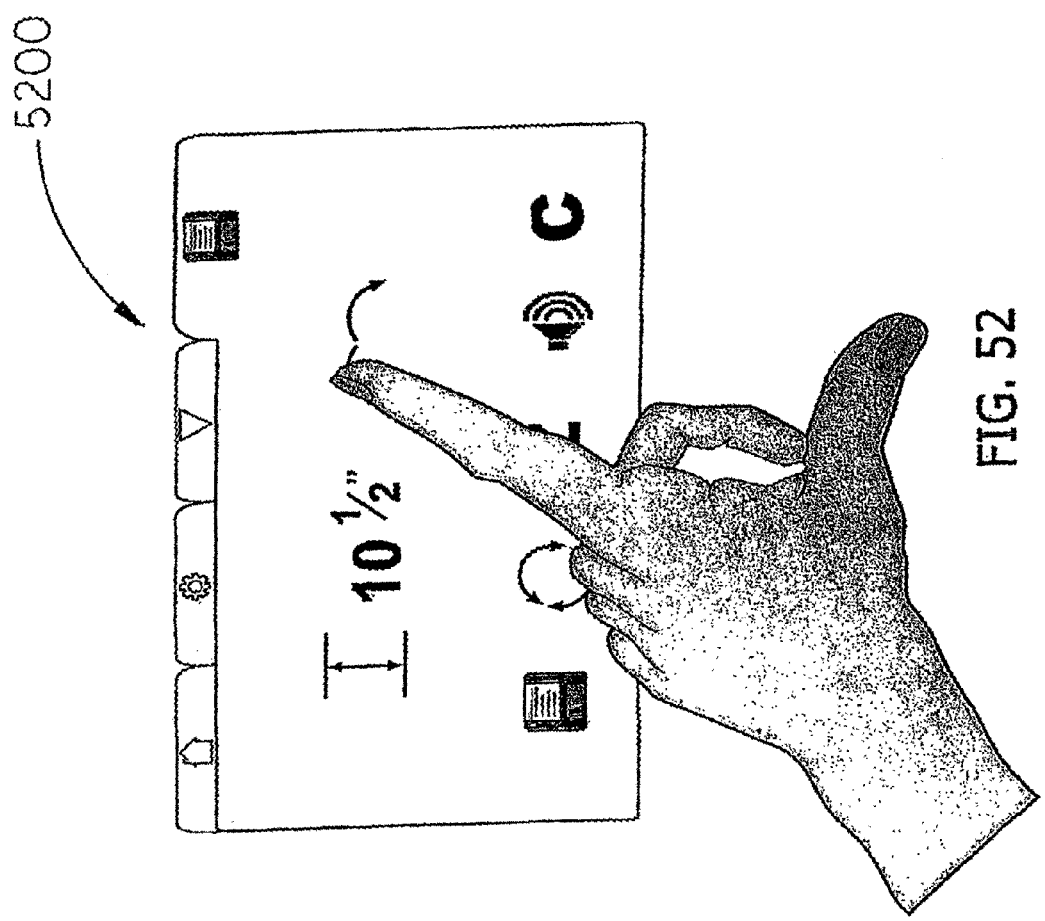
FIG. 52 shows a further exemplary save screen shown on a display of an exemplary user interface in accordance with an exemplary embodiment of the present invention.
Figure 53:
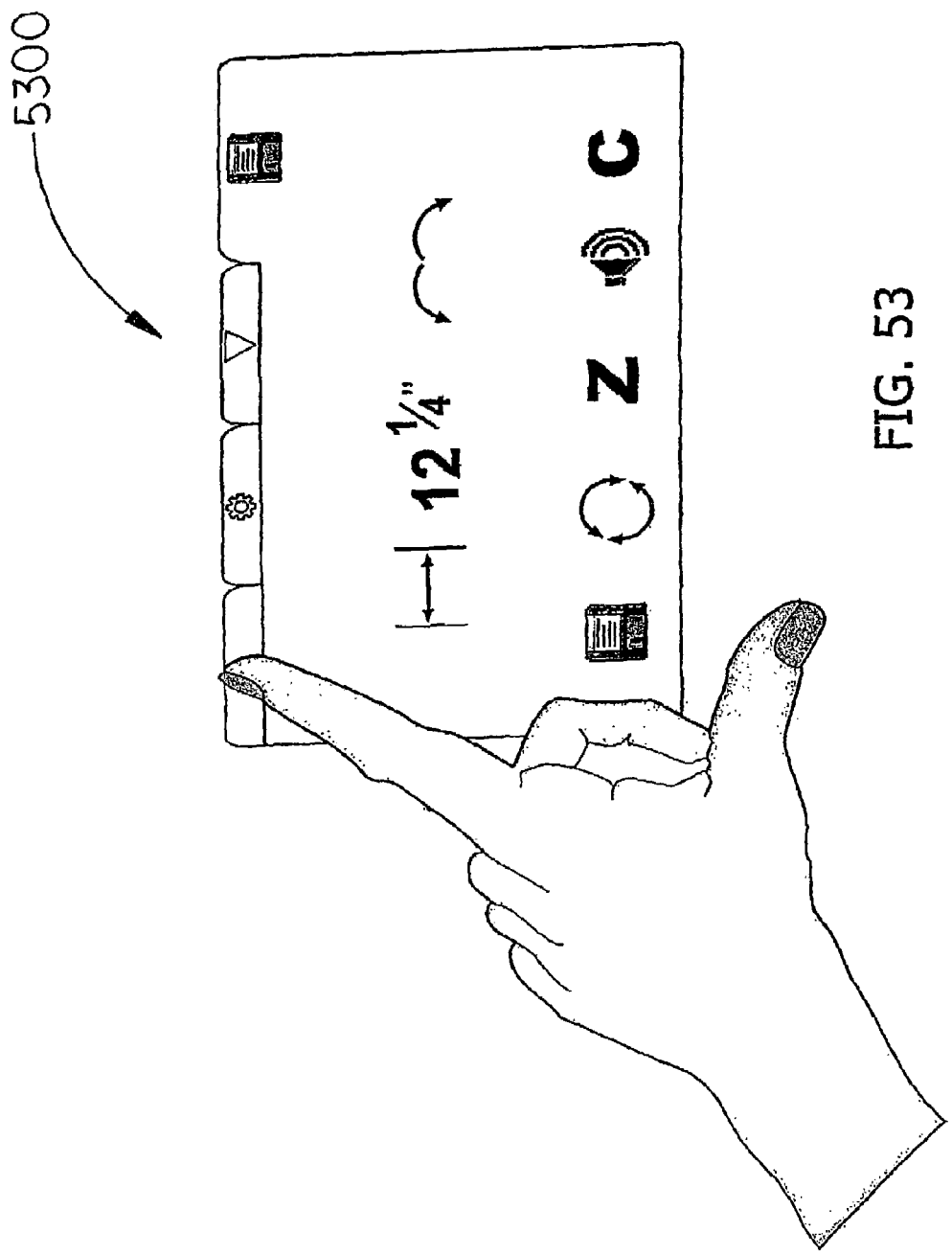
FIG. 53 shows a still further exemplary save screen shown on a display of an exemplary user interface in accordance with an exemplary embodiment of the present invention.

As shown in FIG. 47, an exemplary home screen 4700 is shown. The screen 4700 shows a distance icon and its corresponding value ("12¼""), an angle icon and its corresponding value (6.1°), and a height icon and its corresponding value ("1¼""). From the screen 4700 shown in FIG. 47, when the settings tab is touched, the screen 4700 may be replaced with a settings screen 4800 shown in FIG. 48. The screen 4800 may show information such as the battery status of the user interface or the laser measurement and alignment device, and the like. From the screen 4800 shown in FIG. 48, when the calibration tab is touched, the screen 4800 may be replaced with a calibration screen 4900 shown in FIG. 49. Through the calibration screen 4900, a user may calibrate the laser measurement and alignment device. From the screen 4900 shown in FIG. 49, when the save tab is touched, the screen 4900 may be replaced with a save screen 5000 shown in FIG. 50, through which a user may save a height. FIG. 51 shows an additional exemplary save screen 5100, through which a user may save a distance. FIG. 52 shows a further exemplary save screen 5200, through which a user may save an angle. FIG. 53 shows a still further exemplary save screen 5300, which shows various other exemplary icons (e.g., a speak icon for adjusting the volume of the speaker, and the like).

It is understood that the foregoing-described screens shown in FIGS. 47 through 53 are intended as exemplary only and not as a limitation to the present invention. Those of ordinary skill in the art will appreciate that various combinations and arrangements may be employed without departing from the scope and spirit of the present invention.

Figure 54A:
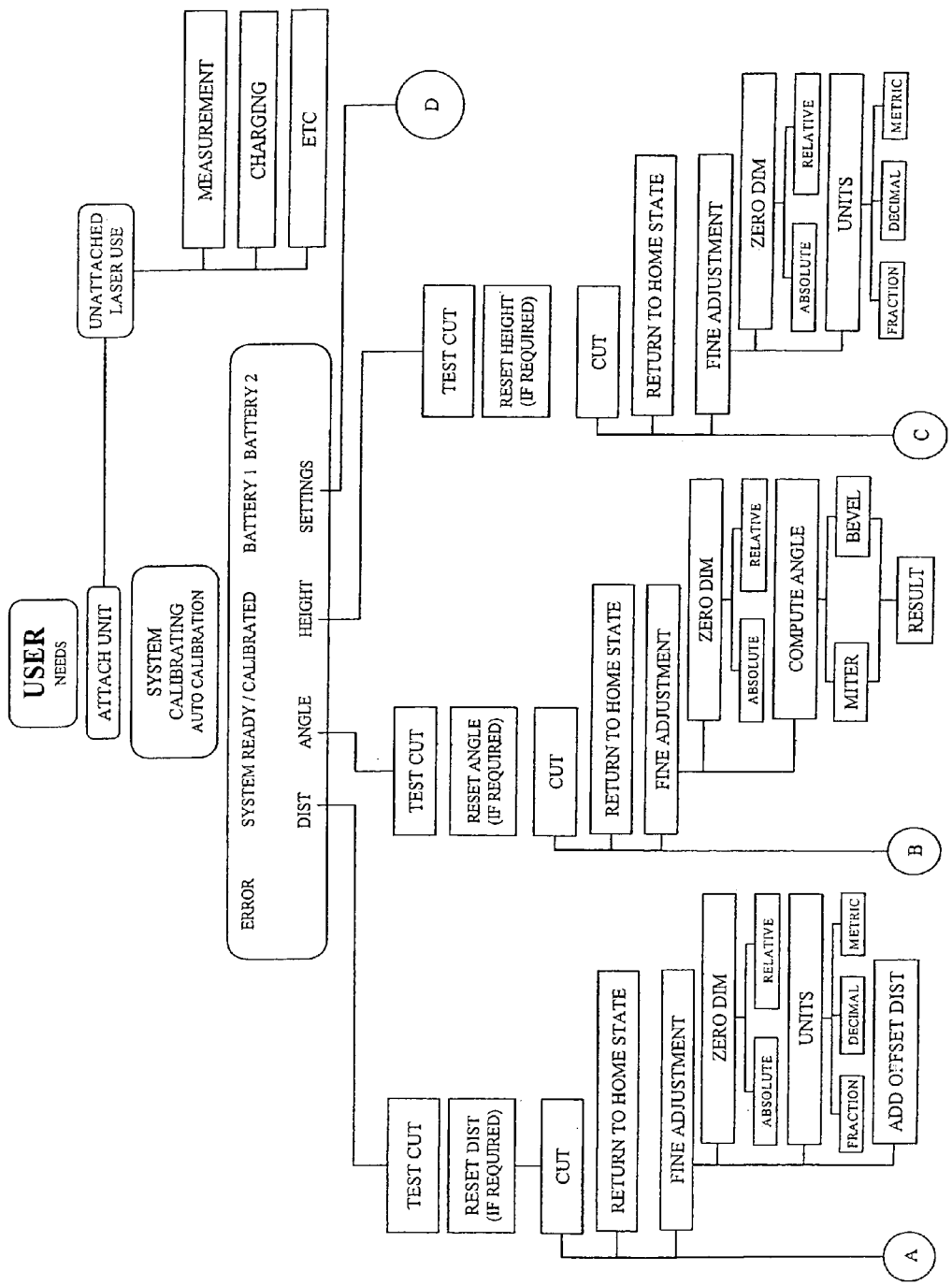
FIGS. 54A and 54B illustrate an exemplary scheme according to which a user interface may operate in accordance with an exemplary embodiment of the present invention.
Figure 54B:
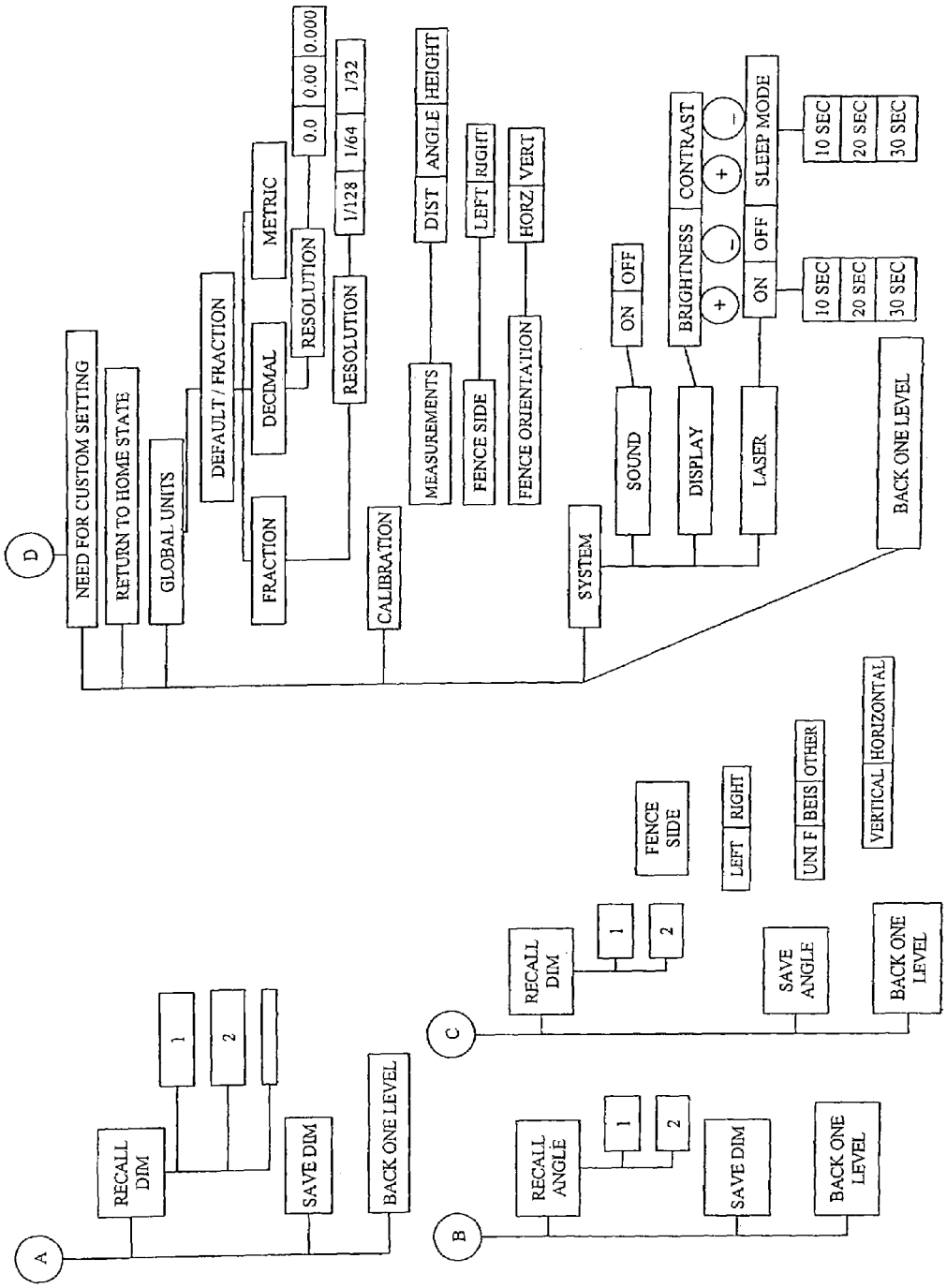

A user interface coupled with a laser measurement and alignment device in accordance with an exemplary embodiment of the present invention may operate according to a scheme 5400 shown in FIGS. 54A and 54B. As shown in FIGS. 54A and 54B, when a laser measurement and alignment device and a user interface are not attached to a power tool (e.g., a table saw, belt sander, lathe, drill press, nailer, router table, and the like), the laser measurement and alignment device and the user interface may be used to do other measurements unrelated to the power tool or may be recharged. Additionally, the software loaded onto the user interface may be updated. For instance, the user interface may include a disk drive for loading software applications and saving information onto a removeable memory media. Alternatively, the user interface may include a drive for a DVD, a CD-ROM, flash memory devices, and the like, for receiving software updates. When a laser measurement and alignment device and a user interface are attached to a power tool (e.g., a table saw, or the like), the laser measurement and alignment device and the user interface may be used to perform measurements on the power tool. Additionally, the laser measurement and alignment device may be automatically calibrated through the user interface.

In one embodiment of the present invention, a user interface may include four operational modes: distance, angle, height, and settings, as shown in FIGS. 54A and 54B.

In a distance mode, a user may set a desired distance, e.g., a distance between a saw blade and fence of a table saw through the user interface. In the exemplary embodiment shown in FIGS. 54A and 54B, the user interface in a distance mode may include five options: (1) return to home state; (2) fine adjustment; (3) recall dimension (i.e., recall a previous saved distance); (4) save dimension (i.e., save the current distance); and (5) back one level. Under the fine adjustment option, the user interface may include three options: (1) zero dimension, either absolute or relative; (2) units (fraction, decimal, or metric); and (3) add offset distance.

In an angle mode, a user may set a desired angle, e.g., an angle between a saw blade and a line perpendicular to a table surface of a table saw through the user interface. As shown in FIGS. 54A and 54B, the user interface in an angle mode may include five options: (1) return to home state; (2) fine adjustment; (3) recall angle (i.e., recall a previous saved angle); (4) save dimension (i.e., save the current angle); and (5) back one level. Under the fine adjustment option, the user interface may include two options: (a) zero dimension (either absolute or relative); and (b) compute an angle (a result based on miter and bevel).

In a height mode, a user may set a desired height, e.g., a height of a saw blade over a table surface of a table saw through the user interface. As shown in FIGS. 54A and 54B, the user interface in a height mode may include five options: (1) return to home state (the interface directly returns to a home screen when this option is chosen); (2) fine adjustment; (3) recall dimension (i.e., recall a previous saved height); (4) save dimension (i.e., save the current height); and (5) back one level (the interface goes back one level when this option is chosen). Under the fine adjustment option, the user interface may include two options: (a) zero height (either absolute or relative); and (b) units (fraction, decimal, or metric).

In a settings mode, a user may set desired settings for the user interface. As shown in FIGS. 54A and 54B, the user interface in a settings mode may include five options: (1) return to home state; (2) global units; (3) calibration; (4) system; and (5) back one level. Under the global units option, the user interface may include three options: (a) fraction; (b) decimal; and (c) metric. The default unit may be fraction. Under the fraction unit, a user may choose a resolution such as 1/128, 1/64, 1/32, or the like. Under the decimal unit, a user may choose a resolution such as 0.0, 0.00, 0.000, or the like. Under the calibration option, the user interface may include three options: (a) measurements (distance, angle or height); (b) fence side (either left or right); (c) fence orientation (either horizontal or vertical). Under the system option, the user interface may include three options: (a) sound (either on or off); (b) display (to adjust brightness and contrast of the display); and (c) laser. Under the laser option, the user interface may include three options: (i) on (laser is on for 10 seconds, 20 seconds, 30 seconds, or the like); (ii) off (laser is off); and (iii) sleep mode (laser falls asleep after laser is on for 10 seconds, 20 seconds, 30 seconds, or the like. Additionally, under the system option, a user may update the software loaded onto the user interface.

It is understood that the number of modes and options available under each mode and the variety of operations which may be performed by the user interface may vary without departing from the scope and spirit of the present invention. For instance, other options under the save dimension option, found under the distance mode, angle mode, and height mode, may include: (1) save to diskette, (2) save to CDR, and (3) save to flash media. Additionally, each screen in a particular mode may include an icon for accessing the other modes directly. For example, under the distance mode each screen presented to the user of the user interface may include an icon for the angle mode, height mode, and setting mode. By selecting the individual icon the user may be taken directly to the selected mode and presented with the series of options available under that mode.

Figure 55:
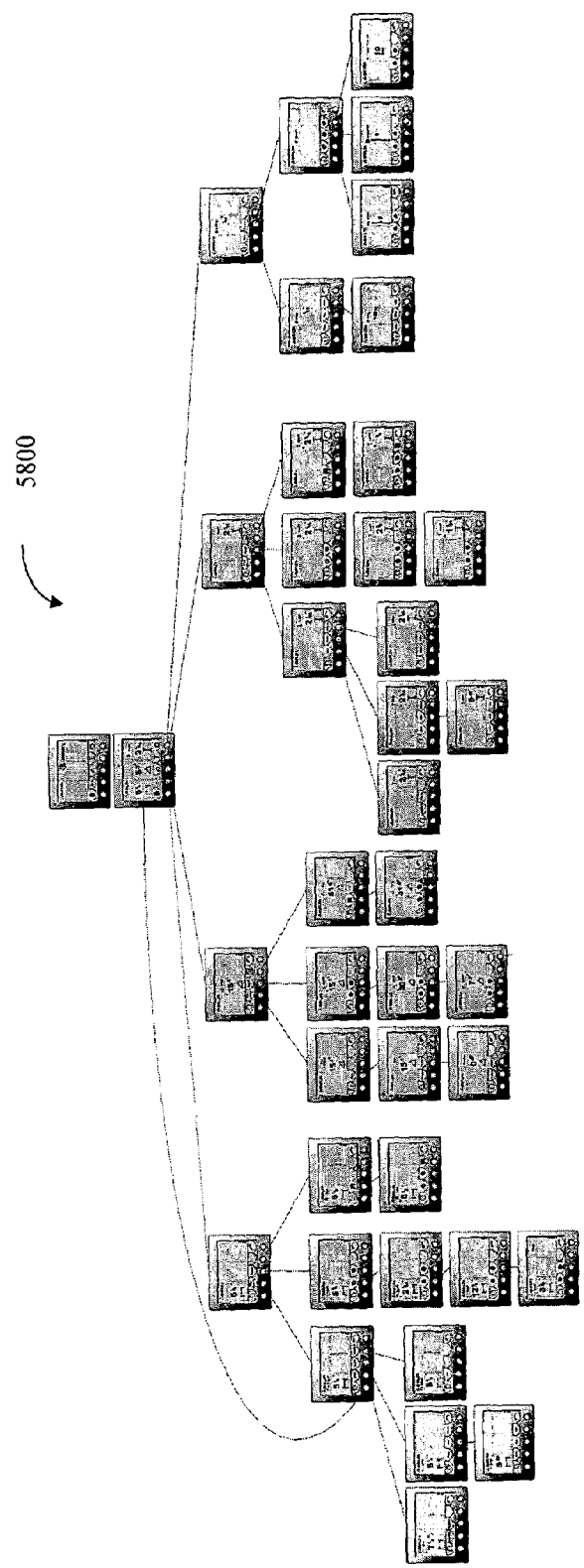
FIG. 55 shows an exemplary user interface with different screens in accordance with an exemplary embodiment of the present invention, which user interface may execute the scheme shown in FIGS. 54A and 54B.
Figure 56:
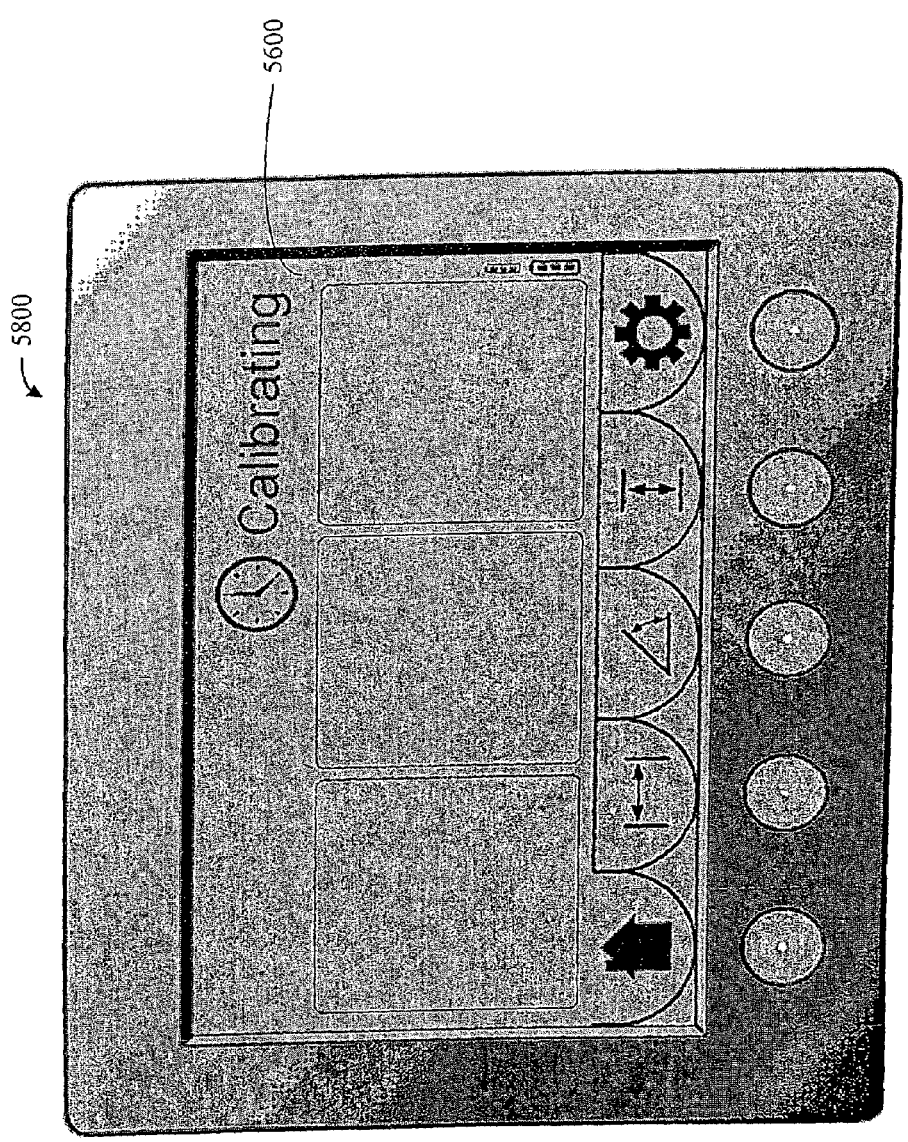
FIG. 56 shows an exemplary calibration screen in accordance with an exemplary embodiment of the present invention.
Figure 57:
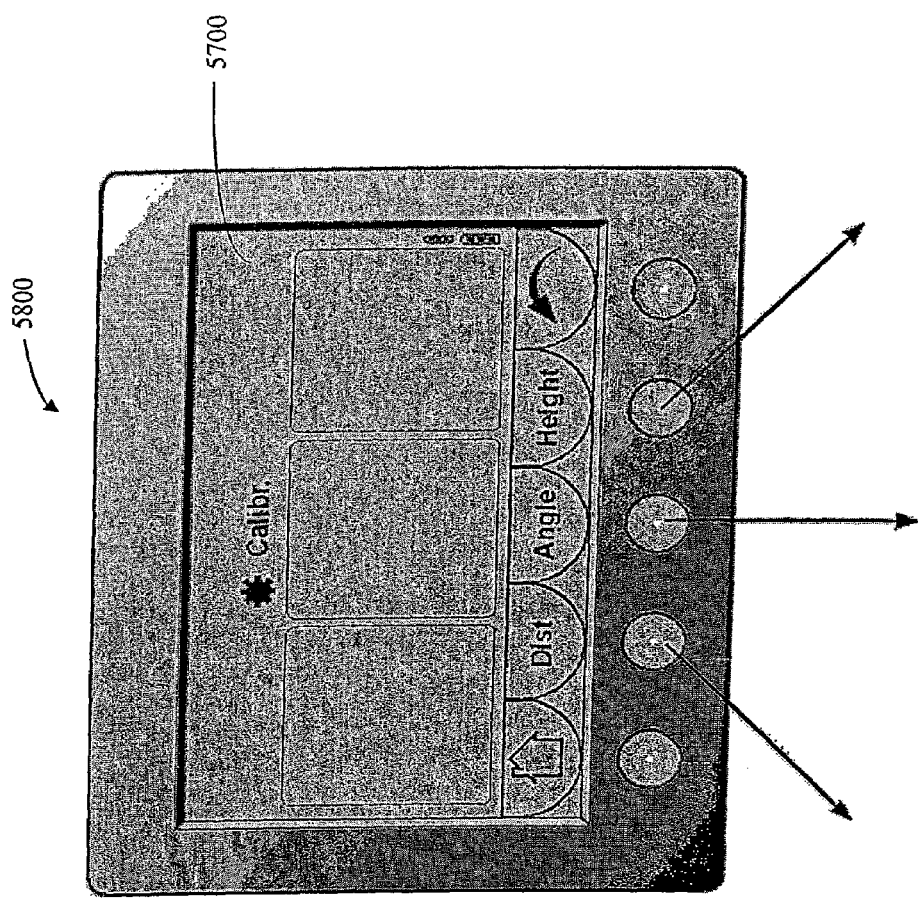
FIG. 57 shows an additional exemplary calibration screen in accordance with an exemplary embodiment of the present invention.

FIG. 55 shows an exemplary user interface 5800 with different exemplary screens which may execute the scheme 5400 shown in FIGS. 54A and 54B. FIG. 56 shows the user interface 5800 with an exemplary calibration screen, and FIG. 57 shows the user interface 5800 with an additional exemplary calibration screen. The user interface 5800 will be described in detail along with FIG. 58.

Figure 58:
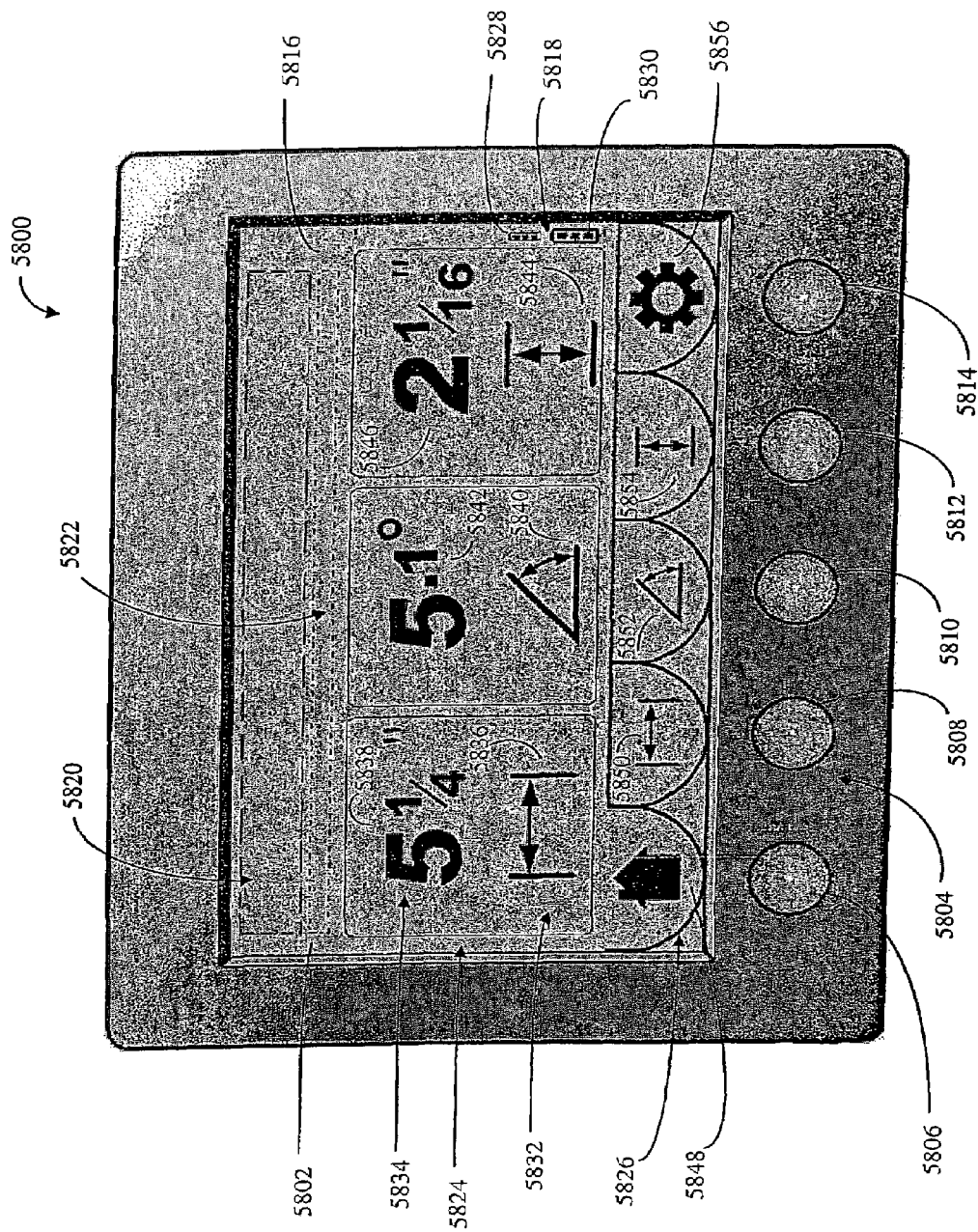
FIG. 58 illustrates an exemplary home screen in accordance with an exemplary embodiment of the present invention.
Figure 59:
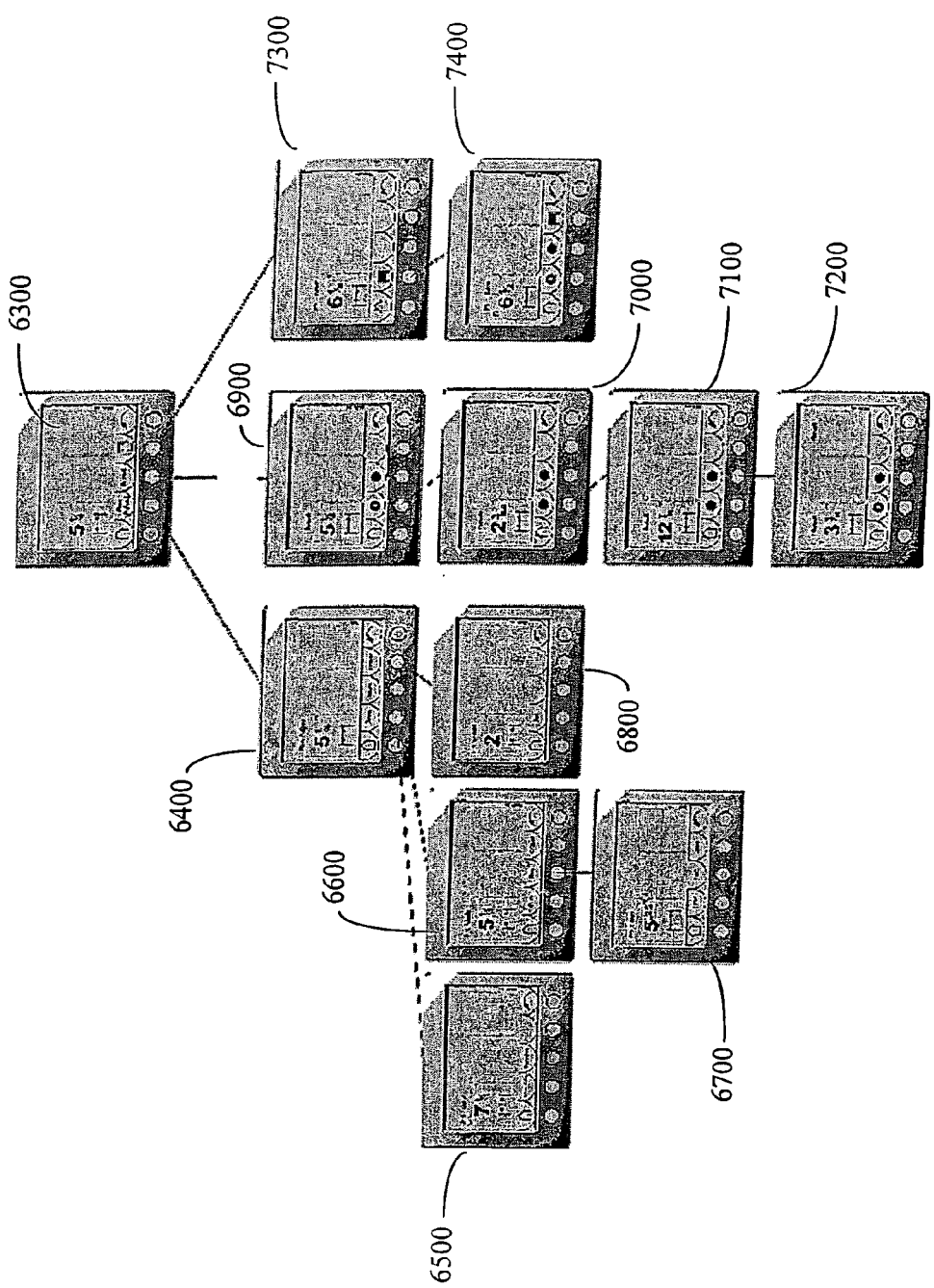
FIG. 59 illustrates various exemplary screens in a distance mode in accordance with an exemplary embodiment of the present invention.
Figure 60:
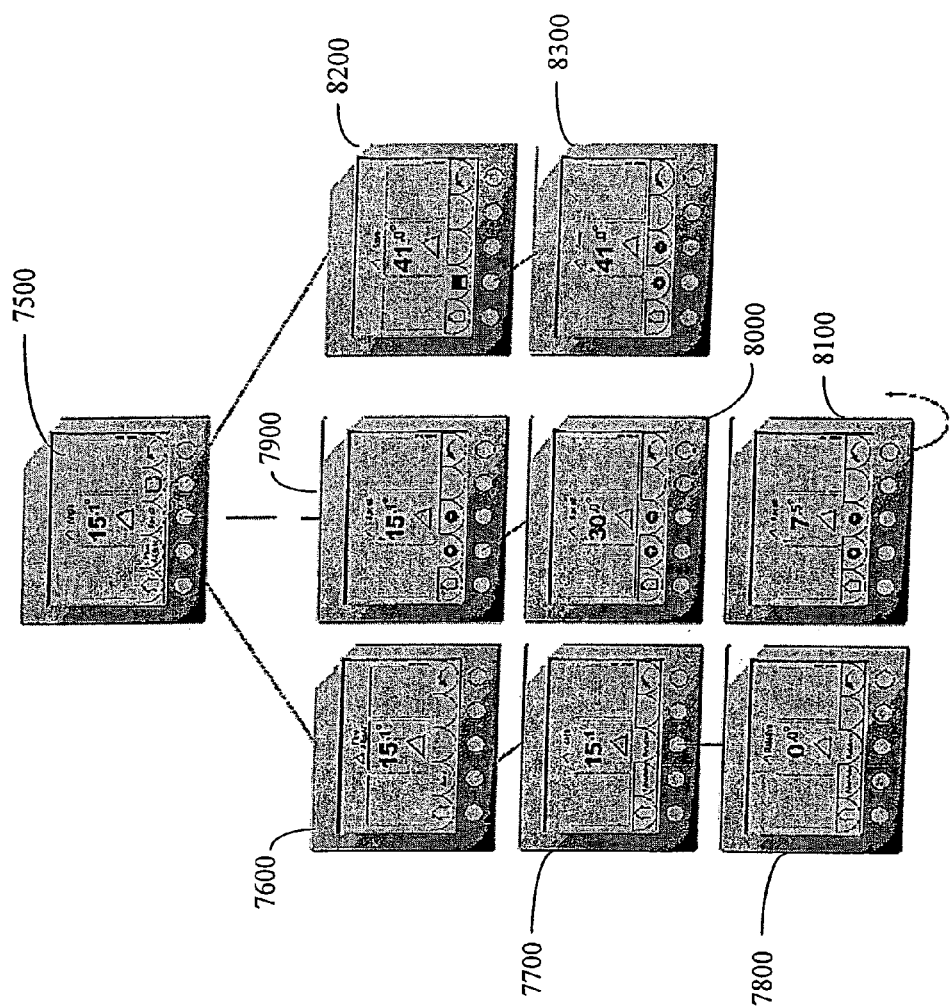
FIG. 60 illustrates various exemplary screens in an angle mode in accordance with an exemplary embodiment of the present invention.
Figure 61:
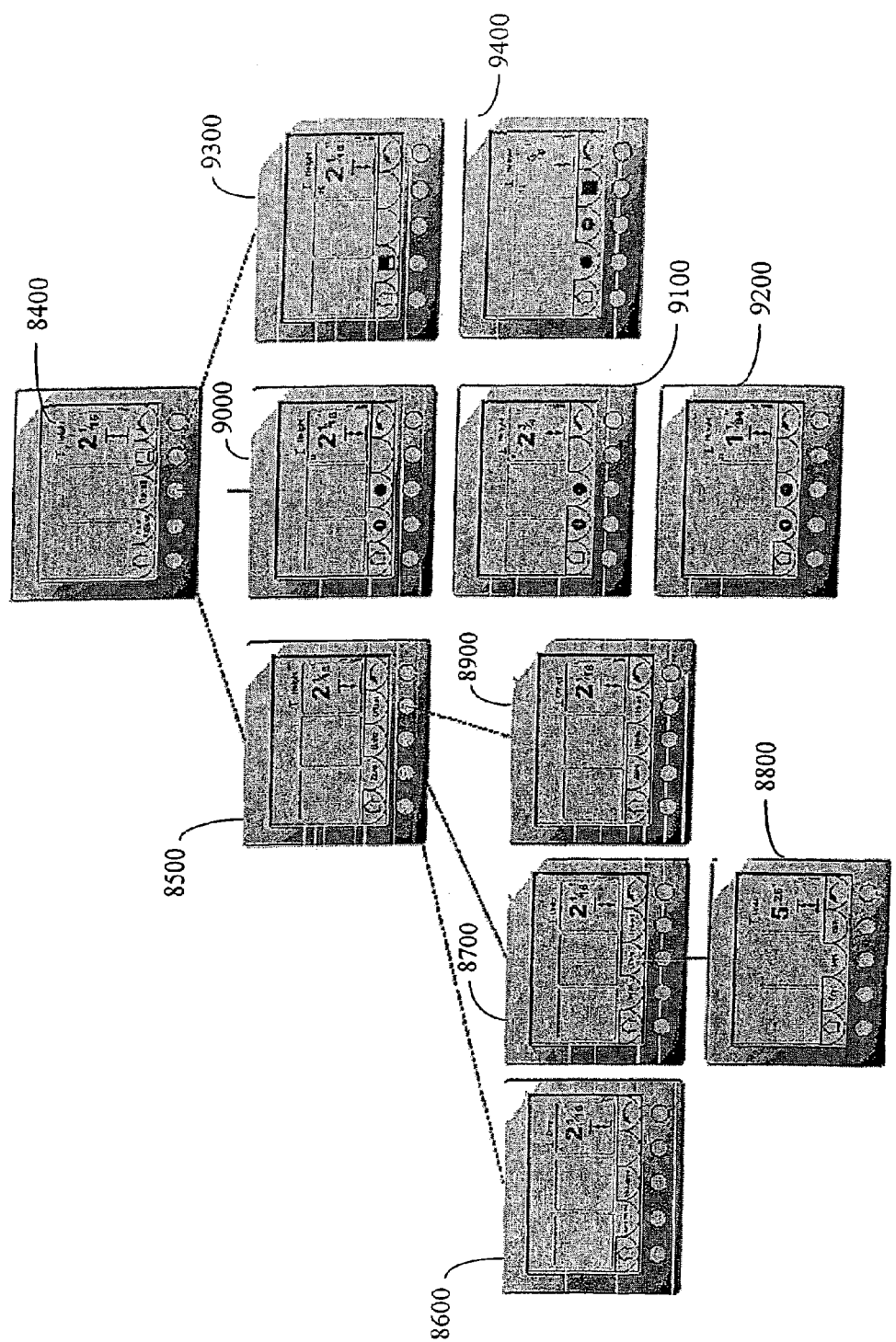
FIG. 61 illustrates various exemplary screens in a height mode in accordance with an exemplary embodiment of the present invention.
Figure 62:
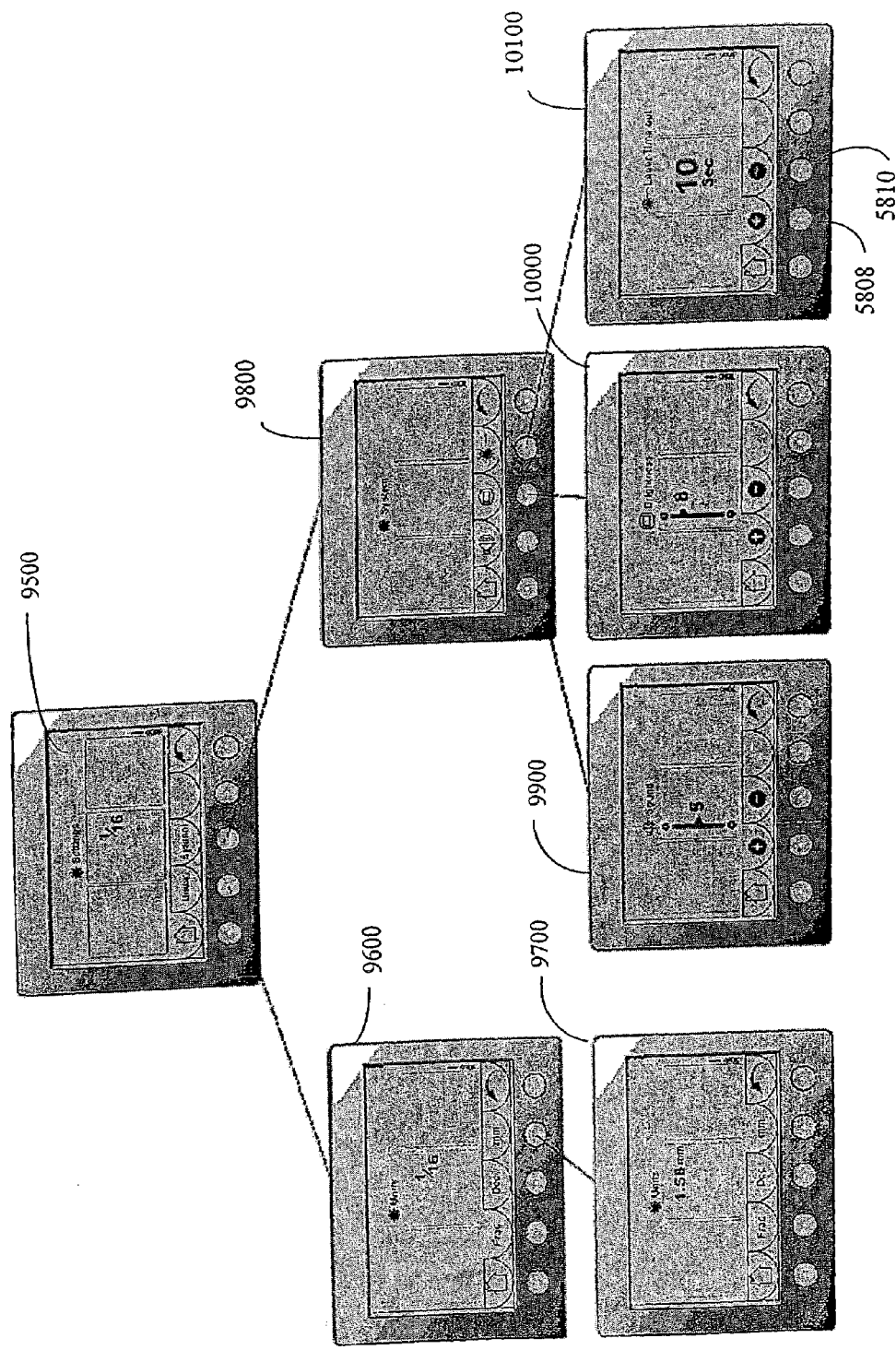
FIG. 62 illustrates various exemplary screens in a settings mode in accordance with an exemplary embodiment of the present invention.

Referring now to FIG. 58, the exemplary user interface 5800 will be described in more detail. The interface 5800 includes a display 5802 and a plurality of user input controls, which are generally indicated at 5804. The display 5802 may be LCD (liquid crystal display), a pixel-based display, or the like. As shown, the controls 5804 include a plurality of push (or enter) buttons 5806, 5808, 5810, 5812 and 5814. The buttons 5806 through 5814 enable a user to toggle between the screens and modes displayable on the display 5802, and to select and input values for any of the available options, as discussed in more detail subsequently. In FIG. 58, the buttons 5806 through 5814 are positioned at the bottom of the interface 5800 and correlate with an option on the display 5802 available for selection by the user. However, the buttons 5806 through 5814 may be positioned anywhere on the interface 5800 as may be contemplated by a person of ordinary skill in the art. In the exemplary embodiment shown, the buttons 5806 through 5814 are all enter buttons. However, it is within the scope of the present invention that other configurations and numbers of buttons may be used. Similarly, other forms of user input controls may be used, such as slides, track balls, switches, and pointing devices. Of course, although the described user interface is relatively large and complex, it is also possible to provide a much smaller user interface with less information displayed at a time.

FIG. 58 illustrates a default, or home, screen 5816 of the display 5802. This is the screen that is most often displayed to a user, and to which the controller defaults after user inputs are completed on any of the subsequently described screens. As shown, the display 5802 (and hence each screen of the display 5802, including the home screen 5816) includes a battery region 5818, a developer region 5820, a current-screen region 5822, a settings region 5824 and an available-option region 5826.

The battery region 5818 provides a user with information about the status of batteries used to provide power to the laser measurement and alignment device and the user interface 5800. This feature is useful to allow a user to monitor the status of the battery during use. In particular, a user may want to check the remaining battery capacity before starting a project that may require more battery reserve than currently available. As shown, the battery region 5818 includes a small battery icon 5828 and a large battery icon 5830. Each of the icons 5828 and 5830 has incremental bar-graph-like readings representing the theoretical amount of battery life remaining. It is understood other textual or symbolic representations may be used without departing from the scope and spirit of the present invention. The icon 5828 may be used to indicate the status of the battery used to provide power to one of the user interface 5800 and the laser measurement and alignment device (e.g. the user interface 5800), and the icon 5830 may be used to indicate the status of the battery used to provide power to the other of the user interface 5800 and the laser measurement and alignment device (e.g., the laser measurement and alignment device). Alternatively, the battery region 5818 may include a single icon of a battery with incremental bar-graph-like readings representing the theoretical amount of battery life remaining when the battery is used to provide power to both the laser measurement and alignment device and the user interface 5800. It is understood that the battery region 5818 may be positioned on the display 5802 as may be contemplated by a person of ordinary skill in the art.

The developer region 5820 provides information about the developer of the user interface 5800. As shown, the user interface 5800 is developed by Delta International Machinery Corp. Alternatively, the developer region 5820 may be not included in the display 5802 at all in order to save space. In another embodiment the developer region 5820 may provide an indication of ownership of the individual user interface. For example, a user may place a specific logo in this region to identify the user interface as their own. It is understood that the location of the developer region on the display 5802 may vary. Further, each user interface may be enabled with a security feature which allows the individual unit to be protected from unauthorized use by another. For example, the security feature may include a user being able to enter a password into the user interface which is required before operation of the user interface will be allowed. It is contemplated that other security features may be incorporated into the present invention as contemplated by one of ordinary skill in the art.

The current-screen region 5822 is used to show the screen status of the user interface 5800 and will be described in more detail subsequently. As shown in FIG. 58, the current-screen region 5822 of the home screen 5816 is empty. Alternatively, the current-screen region 5822 of the home screen 5816 may include graphic and/or textual representations indicating that the present screen is the home screen.

The settings region 5824 displays information to the user about the current setup of programmed and user-selected modes for the tool (e.g., a table saw, or the like). As shown in FIG. 58, the region 5824 includes at least one mode icon 5832 and its (their) corresponding value(s) 5834. For example, as shown in FIG. 58, three operational mode icons are shown on the home screen 5816, each of which has at least one value. The three illustrated mode icons are distance 5836, angle 5840, and height 5844, each of which having a corresponding value 5838, 5842, and 5846, respectively, and may trigger the display of one or more additional screens, as described in more detail subsequently. It should be understood that the textual names for the modes may be used in place of or in conjunction with the mode icons. Additionally, although FIG. 58 shows a mode icon positioned below its corresponding value, other arrangements may be utilized as may be contemplated by a person of ordinary skill in the art. For example, a mode icon (and/or textual name) may be positioned to the left, to the right, or above its corresponding value without departing from the scope and spirit of the present invention.

Preferably, the distance value 5838, the angle value 5842, and the height value 5846 in the settings region 5824 are all displayed in a clear fashion to a user so that the user is not confused by the numbers inside these values. Different fonts, sizes, and/or color may be used to distinguish different numbers. It is understood that visual clarity and the ease with which an operator of the user interface can view the information presented on the display 5802 may implicitly establish a preferable range of fonts, sizes, and colors used by the user interface. Further, the amount of information to be presented on each screen of the display 5802 may determine/establish a range of fonts, sizes, and colors to be used. This is another example of the user focus of the present invention, making complex technology available in a simple and effective manner. If a number is presented as an integer plus a fraction, the integer may be preferably presented in a larger font than a numerator and a denominator of the fraction. For example, as shown in FIG. 58, the distance value 5838 is "5¼"" in which the number "5¼" is an integer "5" plus a fraction "¼, and the height value is "2¹⁄₁₆" in which the number "2¹⁄₁₆" is an integer "2" plus a fraction "¹⁄₁₆". The integers "5" and "2" are presented in a larger font than the numerator "1" and the denominators "4" and "6" so that a user is not confused by the numbers in the values 5838 and 5846. Moreover, if a value includes a decimal expansion of a number, the decimal digit(s) before the decimal point may be preferably presented in a larger font than the decimal digit(s) after the decimal point. For example, as shown in FIG. 58, the angle value 5842 includes a decimal expansion "5.¹". The decimal digit "5" before the decimal point is presented in a larger font than the decimal point "1" after the decimal point so that a user is not confused by the numbers in the value 5842. It is understood that other methods as may be contemplated by a person of ordinary skill in the art may be used to distinguish numbers in a value 5834 so that a user is not confused by those numbers.

For each screen of the display 5802 of the interface 5800, the available-option region 5826 has a plurality of tabs used to show available options a user may have from the current screen. Each of the tabs may use an icon, textual, and/or graphic representation to indicate an option available from the current screen. Each of the tabs is correlated to a user input control (e.g., a button, touch pad, and the like). To choose an option representing a tab, a corresponding user input control may be operated on (e.g., a corresponding button is pushed, or the like). In a preferred embodiment, as shown in FIG. 58, each tab is correlated to a button directly below. This correlation of location, establishing a user input control in direct physical proximity to the tab, provides an ease of use of the present invention generally not seen in the art.

On the home screen 5816 shown in FIG. 58, the available-option region 5826 has five tabs 5848, 5850, 5852, 5854, and 5856, each of them is correlated to a button directly below. It is noted that although each tab on the home screen 5816 as shown in FIG. 58 uses an icon to represent an available option, any of the tabs may alternatively use a textual and/or graphic representation to indicate an available option without departing from the scope and spirit of the present invention.

As shown in FIG. 58, the tab 5848 is labeled with a "home" icon filled with color different from the background, indicating the current screen is the home screen 5816. Moreover, the tab 5848 may be marked differently from the four other tabs (e.g., the tab 5848 in FIG. 58 has no horizontal line above the "home" icon) to indicate that the current screen is the home screen 5816. The tab 5848 is correlated to the button 5806. When the button 5806 is pushed, the home screen 5816 remains (since the current screen is the home screen).

As shown in FIG. 58, the tab 5850 has a "distance" icon representing an option of setting the distance between the saw blade and the fence and is correlated to the button 5808. From the home screen 5816 shown in FIG. 58, when the button 5808 is pushed, the home screen 5816 is replaced with a distance screen 6300 shown in FIG. 63, and the user interface 5800 enters into a distance mode. The distance screen 6300 may then be replaced with other exemplary screens in a distance mode shown in FIG. 59 and FIGS. 64 through 74 when an appropriate button (or buttons) is pushed.

As shown in FIG. 58, the tab 5852 has an "angle" icon representing an option of setting the angle between the saw blade and a line perpendicular to the surface of the saw table (usually less than 90°) and is correlated to the button 5810. From the home screen 5816 shown in FIG. 58, when the button 5810 is pushed, the home screen 5816 is replaced with an angle screen 7500 shown in FIG. 75, and the user interface 5800 enters into an angle mode. The angle screen 7500 may then be replaced with other exemplary screens in an angle mode shown in FIG. 60 and FIGS. 76 through 83 when an appropriate button (or buttons) is pushed.

As shown in FIG. 58, the tab 5854 has a "height" icon representing an option of setting the height of the saw blade over the saw table surface and is correlated to the button 5812. From the home screen 5816 shown in FIG. 58, when the button 5812 is pushed, the home screen 5816 is replaced with a height screen 8400 shown in FIG. 84, and the user interface 5800 enters into a height mode. The height screen 6300 may then be replaced with other exemplary screens in a height mode shown in FIG. 61 and FIGS. 85 through 94 when an appropriate button (or buttons) is pushed.

As shown in FIG. 58, the tab 5856 has a "gear" icon representing an option of adjusting the settings of the graphic user interface 5800 and/or the laser measurement and alignment device and is correlated to the button 5814. From the home screen 5816 shown in FIG. 58, when the button 5814 is pushed, the home screen 5816 is replaced with a settings screen 9500 shown in FIG. 95, and the user interface 5800 enters into a settings mode. The settings screen 9500 may then be replaced with other exemplary screens in a settings mode shown in FIG. 62 and FIGS. 96 through 101 when an appropriate button (or buttons) is pushed.

The focus of the user interface is to provide a system which enables complex operations through an easy to use controller. In order to accomplish this goal the present invention has employed the standard of logically relating the folders which contain the various operational functions enabled by the user interface. For instance, after the user interface is calibrated a home screen 5816 provides access to distance mode FIGS. 63 through 74, angle mode FIGS. 75 through 83, height mode FIGS. 84 through 94, and settings mode FIGS. 95 through 101. When one of the modes is selected it provides access to the relevant operations pertaining to that mode in a clear and concise manner. Thus, the navigation through the complex user interface is made simple and provides a smooth flow of operation.

Figure 63:
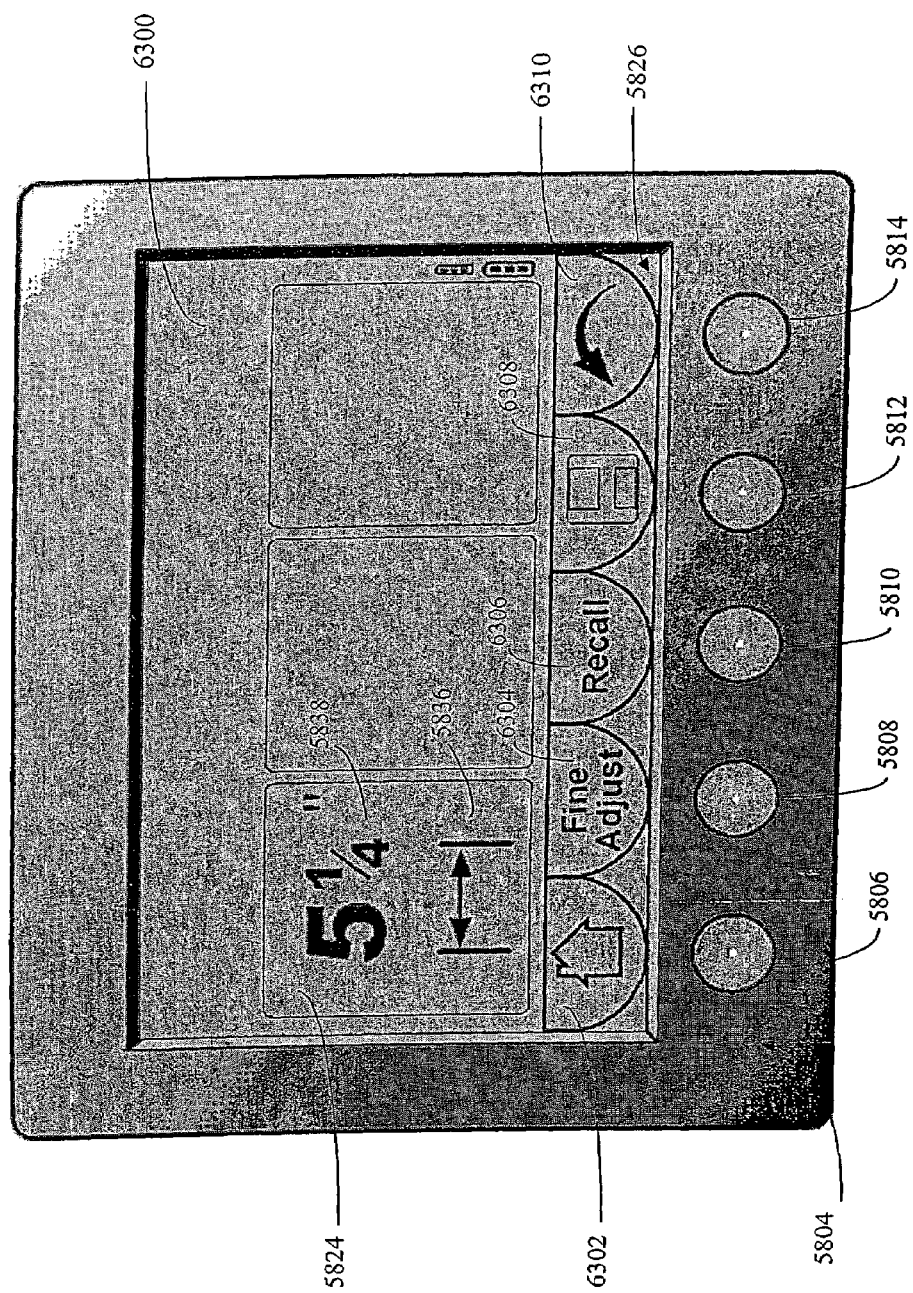
FIG. 63 shows an exemplary distance screen in accordance with an exemplary embodiment of the present invention.

Referring generally now to FIGS. 63 through 74, various exemplary screens 6300 through 7400 of the display 5802 of the user interface 5800 in a distance mode are shown. Referring to FIG. 63, the distance screen 6300 is similar to the home screen 5816 shown in FIG. 58. However, in its settings region 5824 the distance screen 6300 shows the distance mode icon 5836 and its corresponding value 5838 only. In a preferred embodiment, when the user interface 5800 is in a distance mode, only the distance mode icon 5836 and its corresponding value 5838 are shown in the settings region 5824 (see, e.g., FIGS. 63 through 74). Preferably, a user sets only a desired distance between a saw blade and a fence of a table saw through the user interface 5800 when the user interface 5800 is in a distance mode. Because a user does not set an angle or a blade height in a distance mode, the angle and the height mode icons 5840, 5844 and their corresponding values 5842, 5846 do not need to be displayed on the screen in order to save battery power. Moreover, a screen in a distance mode showing only the distance mode icon 5836 and its corresponding value 5838 in the settings region 5824 may help a user to focus attention on setting the distance.

As shown in FIG. 63, the distance screen 6300 has in its available-option region 5826 five tabs 6302, 6304, 6306, 6308, and 6310 different from the five tabs shown in FIG. 58. The tab 6302 has a "home" icon unfilled with color representing an option of "returning to home directly" and is correlated to the button 5806 directly below. When the button 5806 is pushed, the distance screen 6300 is replaced with the home screen 5816 shown in FIG. 58. The tab 6304 represents an option of "fine adjustment" and is correlated to the button 5808 directly below. The tab 6306 represents an option of "recall" and is correlated to the button 5810 directly below. The tab 6308 has a "diskette" icon representing an option of "save" and is correlated to the button 5812 directly below. As mentioned previously, it is contemplated that other removable memory media may be employed with the present invention, such as a DVD, CDR, flash media device, and the like. Therefore, the "diskette" icon may be altered to provide an alternative image more directly reflecting the current memory media being employed. Further, it is understood that the user interface may incorporate the usage of more than one type of memory media and thus include multiple memory media drives.

The tab 6310 has a "back arrow" icon representing an option of "back one level" and is correlated to the button 5814 directly below. That is, when the button 5814 is pushed, the interface 5800 goes back one level and the distance screen 6300 is replaced with the home screen 5816 shown in FIG. 58.

Figure 64:
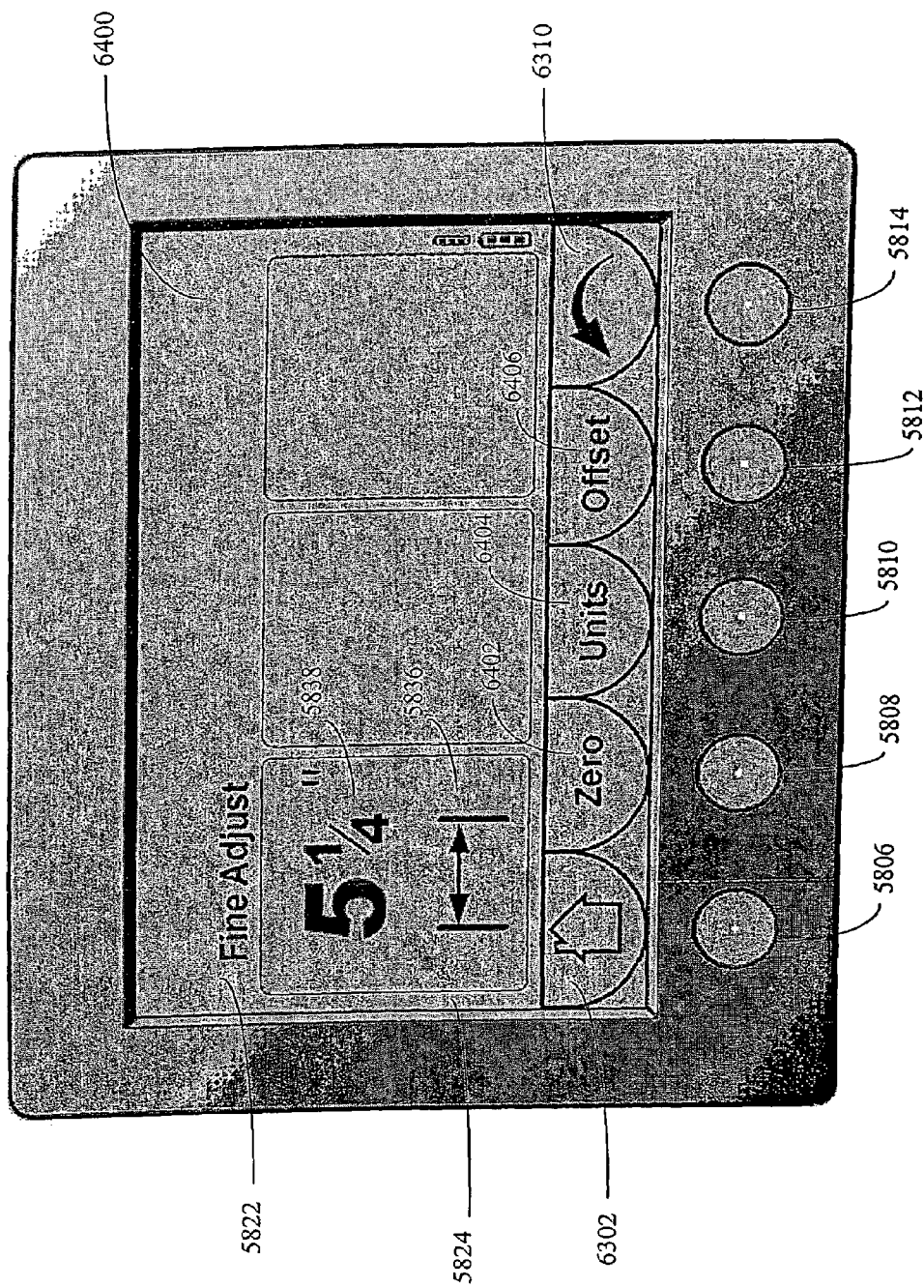
FIG. 64 shows an exemplary distance fine adjustment screen in accordance with an exemplary embodiment of the present invention.

From the distance screen 6300 shown in FIG. 63, when the button 5808 is pushed, the distance screen 6300 is replaced with a distance fine adjustment screen 6400 shown in FIG. 64. As shown, the screen 6400 shows in its current-screen region 5822 a textual representation "Fine Adjust", indicating to a user that the current screen is for fine adjustment of a distance. The screen 6400 has five tabs: the tabs 6302 and 6310 (as shown in FIG. 63), a tab 6402 for a "Zero" option correlated to the button 5808, a tab 6404 for "Units" option correlated to the button 5810, and a tab 6406 for "Offset" option correlated to the button 5812. When the tab 6302 is chosen (e.g., by pushing the button 5806) from the screen 6400, the interface 5800 directly returns to home and the screen 6400 is replaced with the home screen 5816 shown in FIG. 58. When the tab 6310 is chosen (e.g., by pushing the button 5814) from the screen 6400, the interface 5800 goes back one level and the screen 6400 is replaced with the distance screen 6300 shown in FIG. 63.

Figure 65:
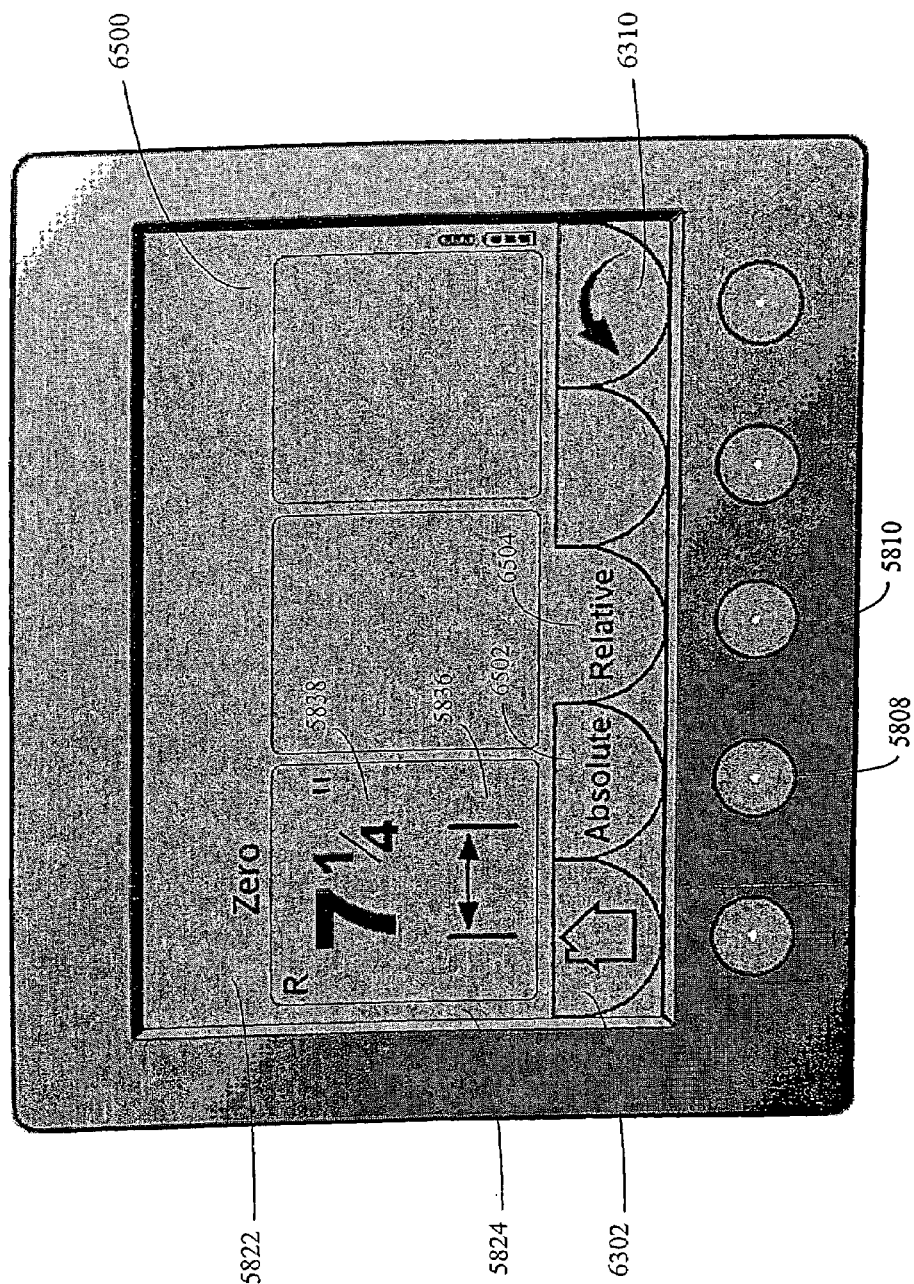
FIG. 65 shows an exemplary distance relative zero screen in accordance with an exemplary embodiment of the present invention.

When the "Zero" option is chosen (e.g., by pushing the button 5808) from the screen 6400, the screen 6400 is replaced with a distance relative zero screen 6500 shown in FIG. 65. As shown in FIG. 65, the screen 6500 has in its current-screen region 5822 a word "Zero", indicating the current screen 6500 is a distance zero screen. Additionally, the screen 6500 has in its settings region 5824 a letter "R", indicating that the current screen 6500 is a distance relative zero screen. This is further shown by different representations of two new tabs 6502 and 6504 on the screen 6500, where the tab 6504 representing a distance relative zero option does not have a horizontal line above the word "Relative", indicating the distance relative zero option is chosen. Using the buttons 5808 and 5810, a user may toggle between the distance relative zero screen 6500 shown in FIG. 65 and a distance absolute zero screen (not shown).

Figure 66:
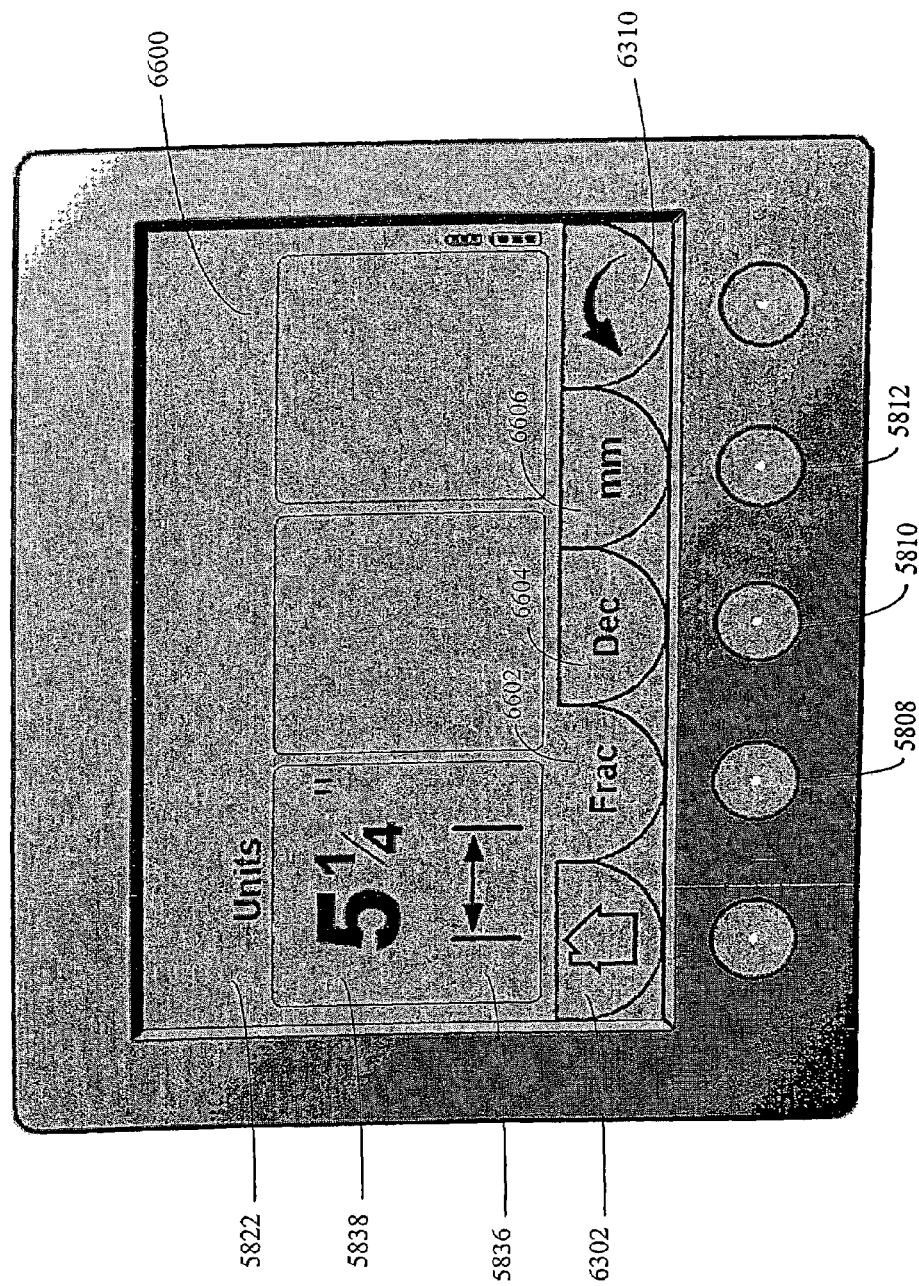
FIG. 66 shows an exemplary default distance units screen in accordance with an exemplary embodiment of the present invention.

When the "Units" option is chosen (e.g., by pushing the button 5810) from the screen 6400, the screen 6400 is replaced with a default distance units screen 6600 shown in FIG. 66. As shown in FIG. 66, the screen 6600 has in its current-screen region 5822 a distance icon and a word "Units", indicating the current screen 6600 is a distance units screen. The screen 6600 includes three new tabs 6602 (Frac), 6604 (Dec) and 6606 (mm), which represent a fraction unit option, a decimal unit option, and a metric unit option, respectively. The tab 6602 representing a fraction unit option does not have a horizontal line above "Frac", indicating the fraction unit option is chosen. As a result of this option, the number in the distance value 5838 is displayed in a format of "integer+fraction" (see, e.g., "5¼" in FIG. 66).

Figure 67:
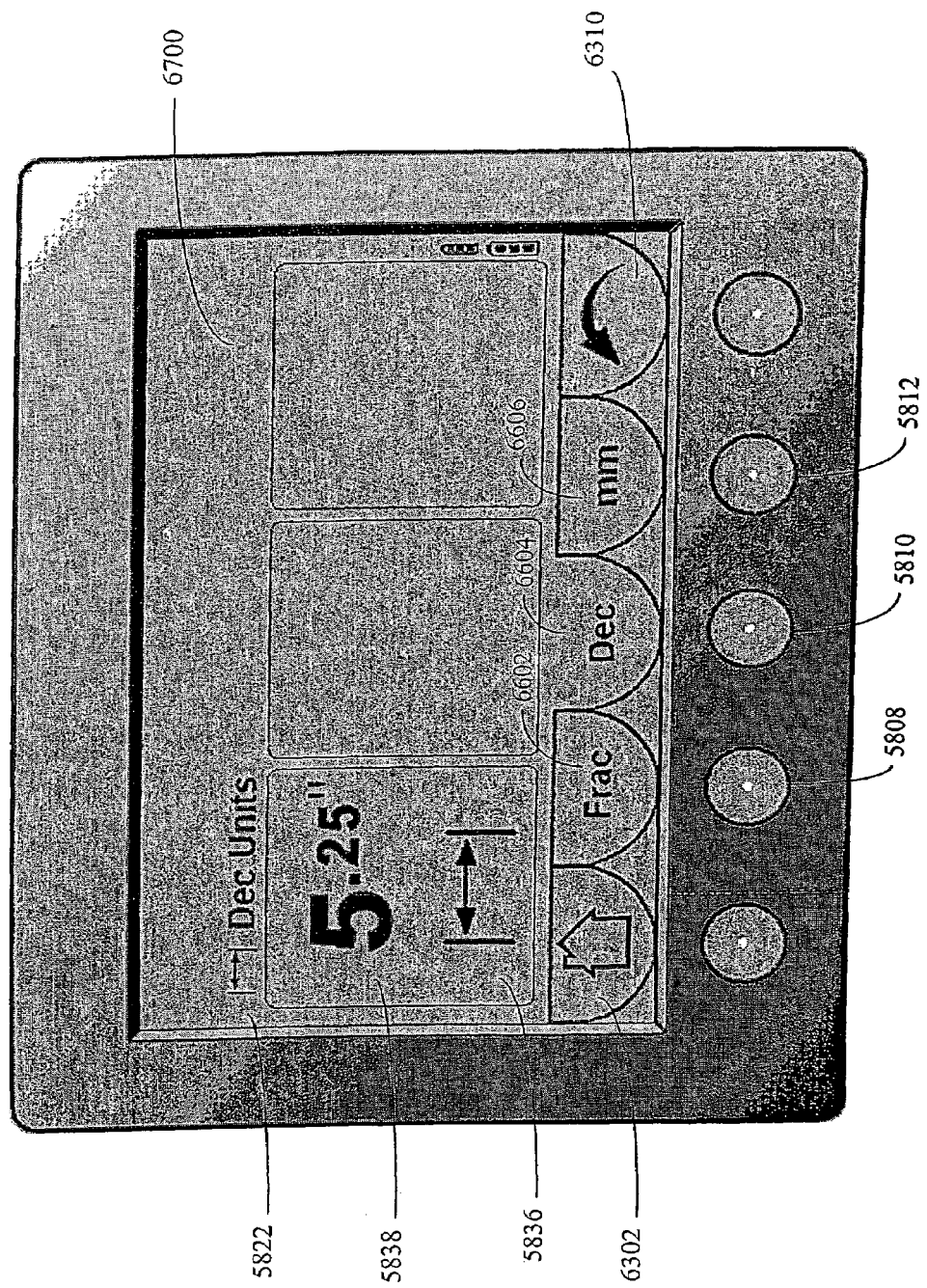
FIG. 67 shows an exemplary distance decimal unit screen in accordance with an exemplary embodiment of the present invention.

From the screen 6600 shown in FIG. 66, when the button 5810 is pushed, the screen 6600 is replaced with a distance decimal unit screen 6700 shown in FIG. 67. As shown in FIG. 67, the screen 6700 has in its current-screen region 5822 a distance icon and words "Dec Units", indicating the current screen 6700 is a distance decimal units screen. The tab 6604 representing a decimal unit option does not have a horizontal line above "Dec", indicating the decimal unit option is chosen. As a result of this option, the number in the distance value 5838 is displayed in a format of a decimal expansion (see, e.g., "5.$^{25}$" in FIG. 67). Using the buttons 5808, 5810, and 5812, a user may toggle among the default distance units (in fraction units) screen 6600 shown in FIG. 66, the distance decimal units screen 6700 shown in FIG. 67, and a distance metric unit screen (not shown).

Figure 68:
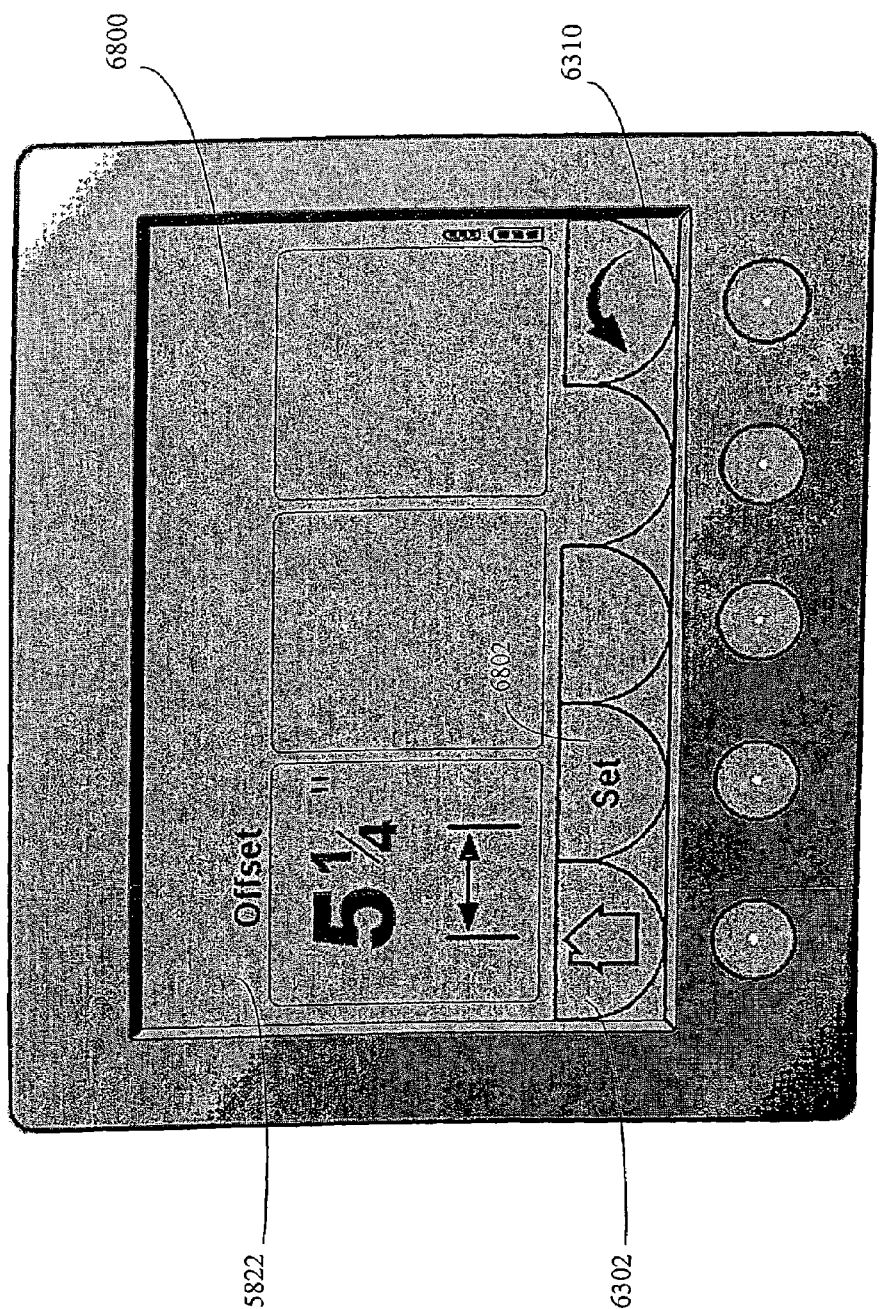
FIG. 68 shows an exemplary distance offset screen in accordance with an exemplary embodiment of the present invention.

When the "Offset" option is chosen (e.g., by pushing the button 5812) from the screen 6400 shown in FIG. 64, the screen 6400 is replaced with a distance offset screen 6800 shown in FIG. 68. As shown in FIG. 68, the screen 6800 has in its current-screen region 5822 a word "Offset", indicating the current screen 6800 is a distance offset screen. The screen 6800 includes a new tab 6802 (Set), representing an option of adding an offset distance.

Figure 69:
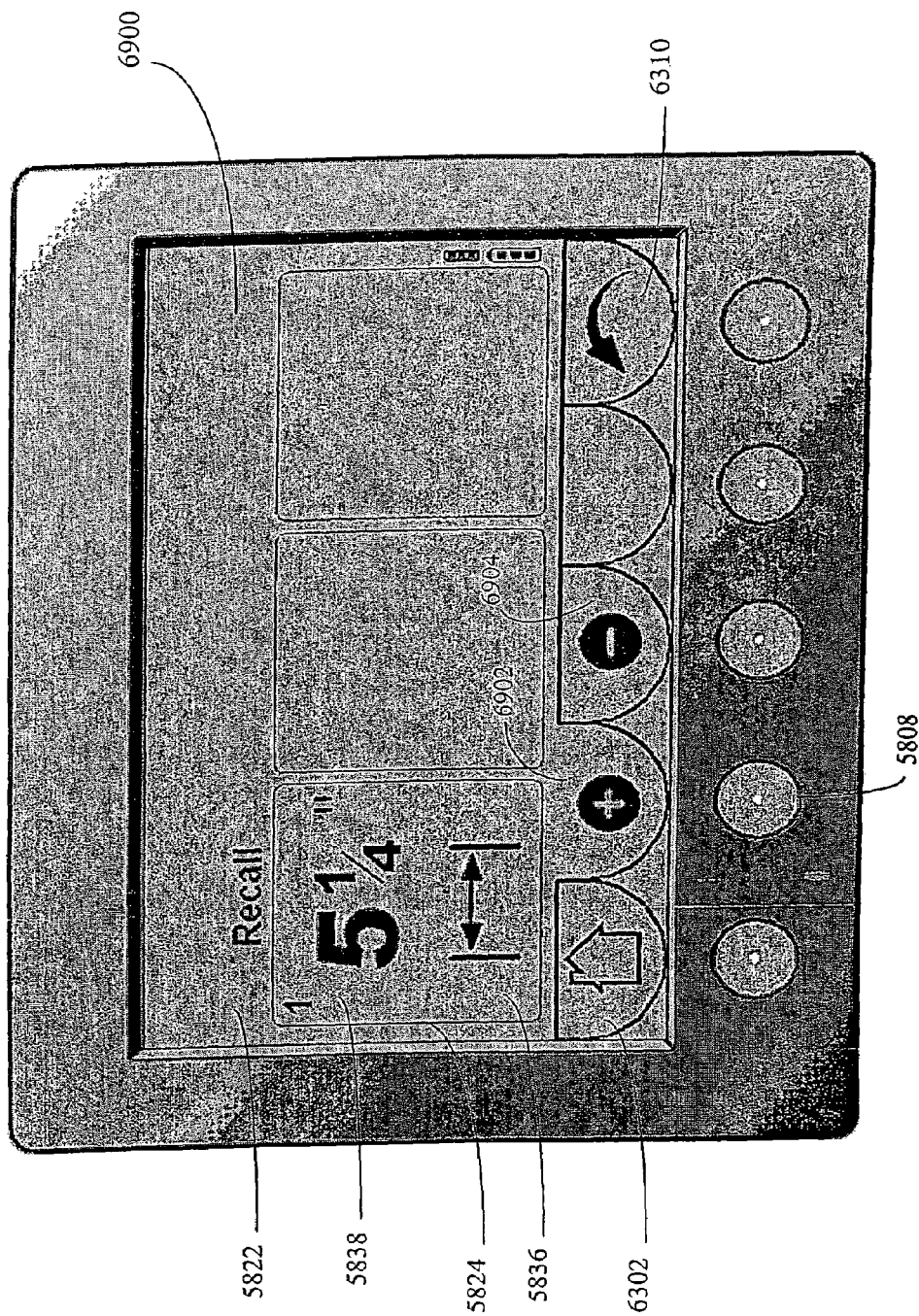
FIG. 69 shows an exemplary distance recall screen in accordance with an exemplary embodiment of the present invention.
Figure 70:
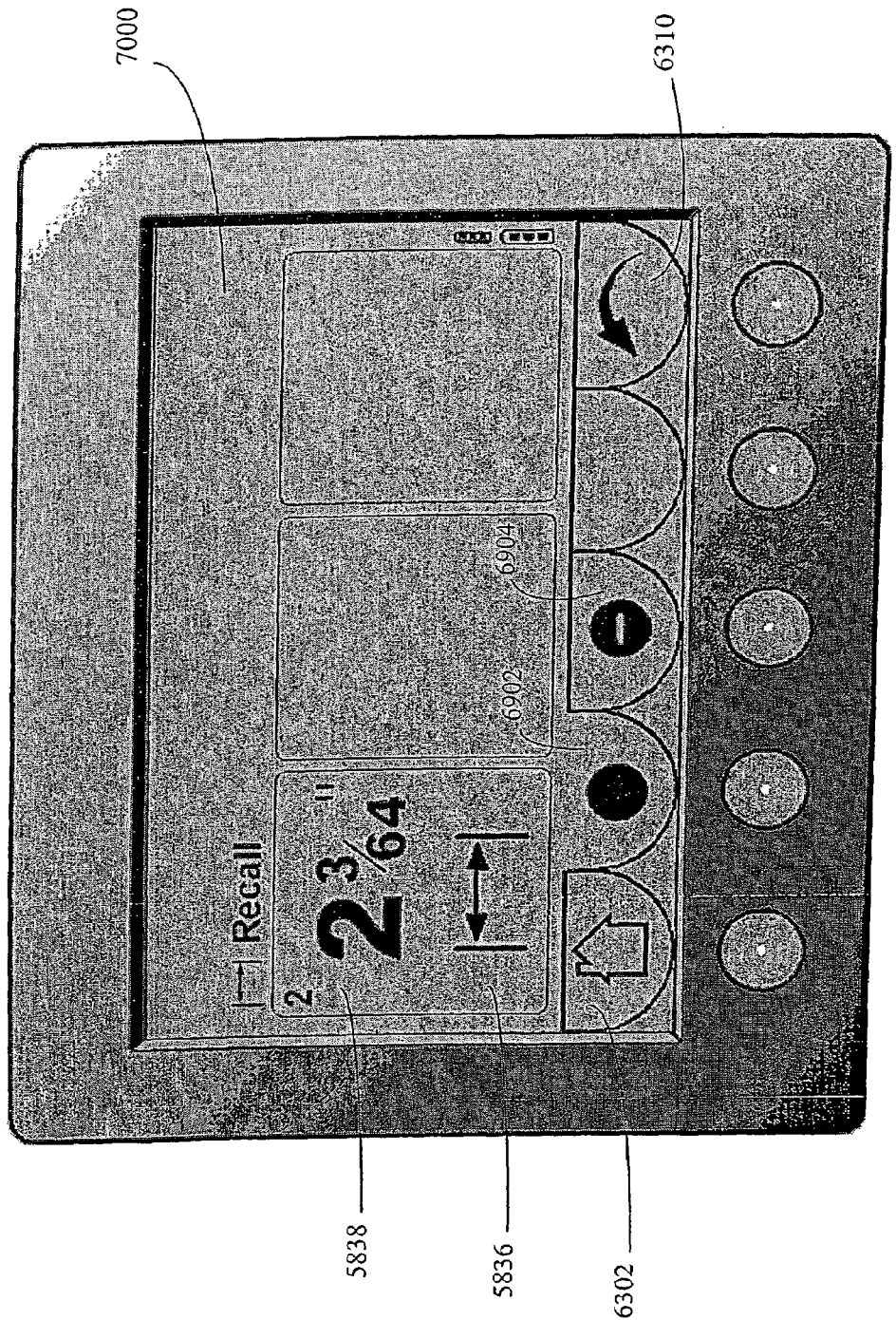
FIG. 70 shows an additional exemplary distance recall screen in accordance with an exemplary embodiment of the present invention.
Figure 71:
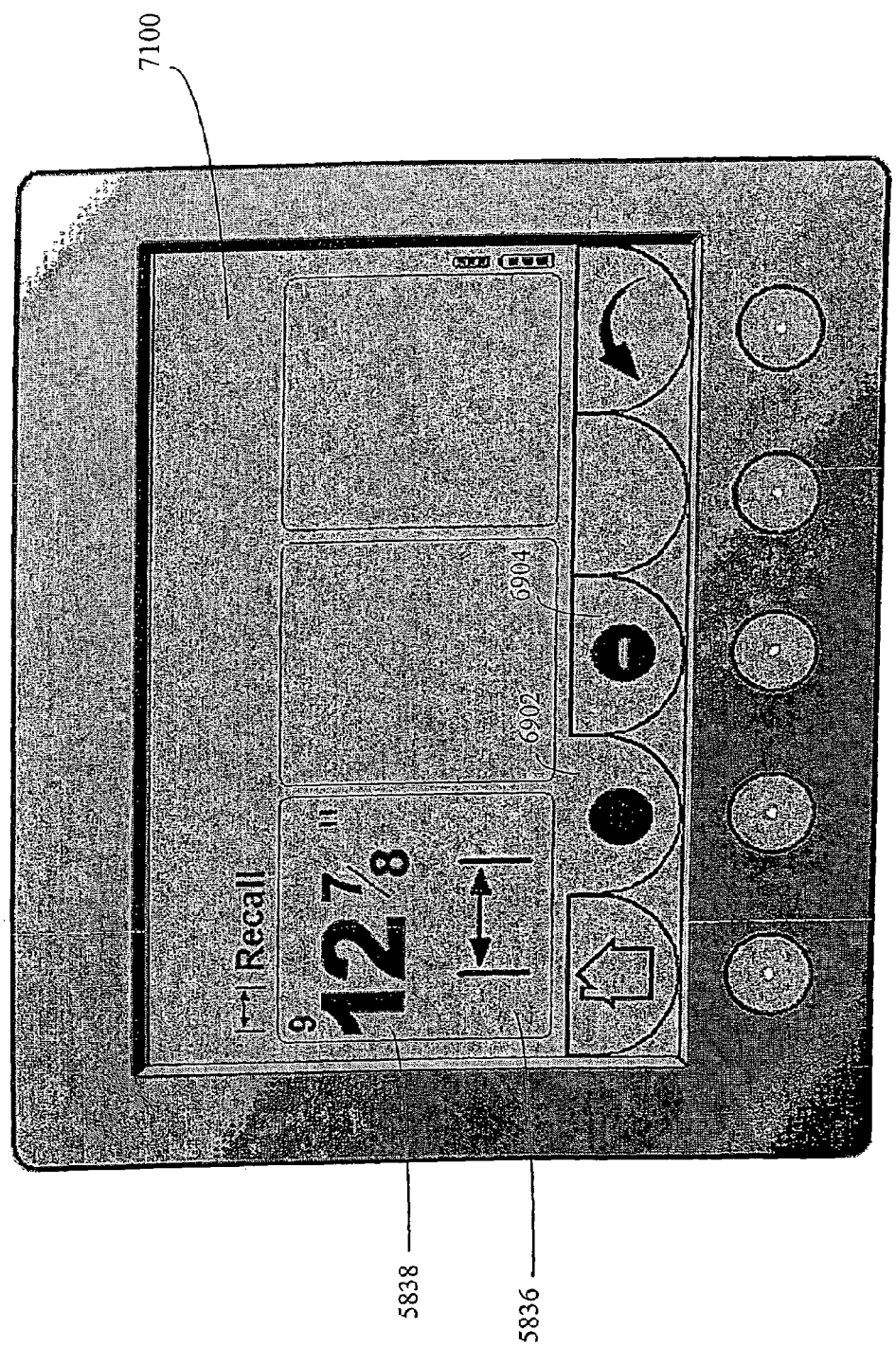
FIG. 71 shows a further exemplary distance recall screen in accordance with an exemplary embodiment of the present invention.
Figure 72:
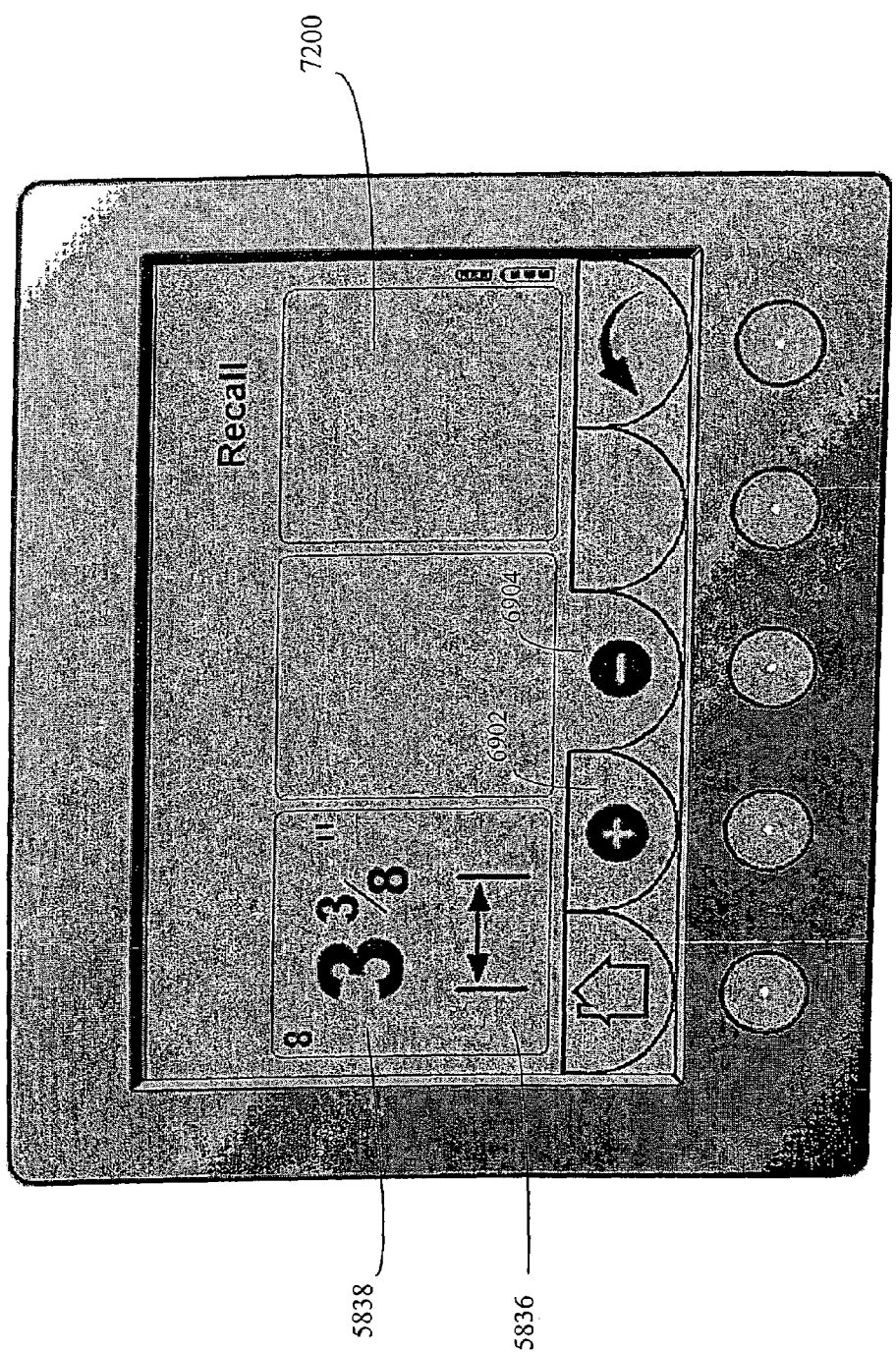
FIG. 72 shows a still further exemplary distance recall screen in accordance with an exemplary embodiment of the present invention.

From the distance screen 6300 shown in FIG. 63, when the button 5810 is pushed, the distance screen 6300 is replaced with a distance recall screen 6900 shown in FIG. 69. As shown, the screen 6900 shows in its current-screen region 5822 a textual representation "Recall", indicating to a user that the current screen is for recalling a saved distance. There may exist at least one saved distance value in a memory of the user interface 5800 or a memory of the laser measurement and alignment device communicatively coupled to the user interface 5800. Each saved distance value may have a label number such as 1, 2, 3, etc. For example, the screen 6900 shows a value 5838 ("5¼"") in its settings region 5824. The number "1" to the left of "5¼"" indicates that the label number for "5¼"" is "1". The screen 6900 includes two new tabs: a tab 6902 for a "+" option of moving to a saved distance value with a higher label number than that shown on the current screen, and a tab 6904 for a "−" option of moving to a saved distance value with a lower label number than that shown on the current screen. For example, from the screen 6900 shown in FIG. 69, when the "+" option (the tab 6902) is chosen, the screen 6900 is replaced with a screen 7000 shown in FIG. 70, where a saved distance value with a higher label number "2" ("2³⁄₆₄"") is shown. Additionally, from the screen 6900 shown in FIG. 69, when the "+" option is repeatedly chosen several times (e.g., by pushing the button 5808 several times), the screen 6900 may be replaced with a screen 7100 shown in FIG. 71, where a saved distance value with a higher label number "9" ("12⅞"") is shown. From the screen 7100 shown in FIG. 71, when the "−" option (the tab 6904) is chosen, the screen 7100 is replaced with a screen 7200 shown in FIG. 72, where a saved distance value with a lower label number "8" ("3⅜"") is shown.

Figure 73:
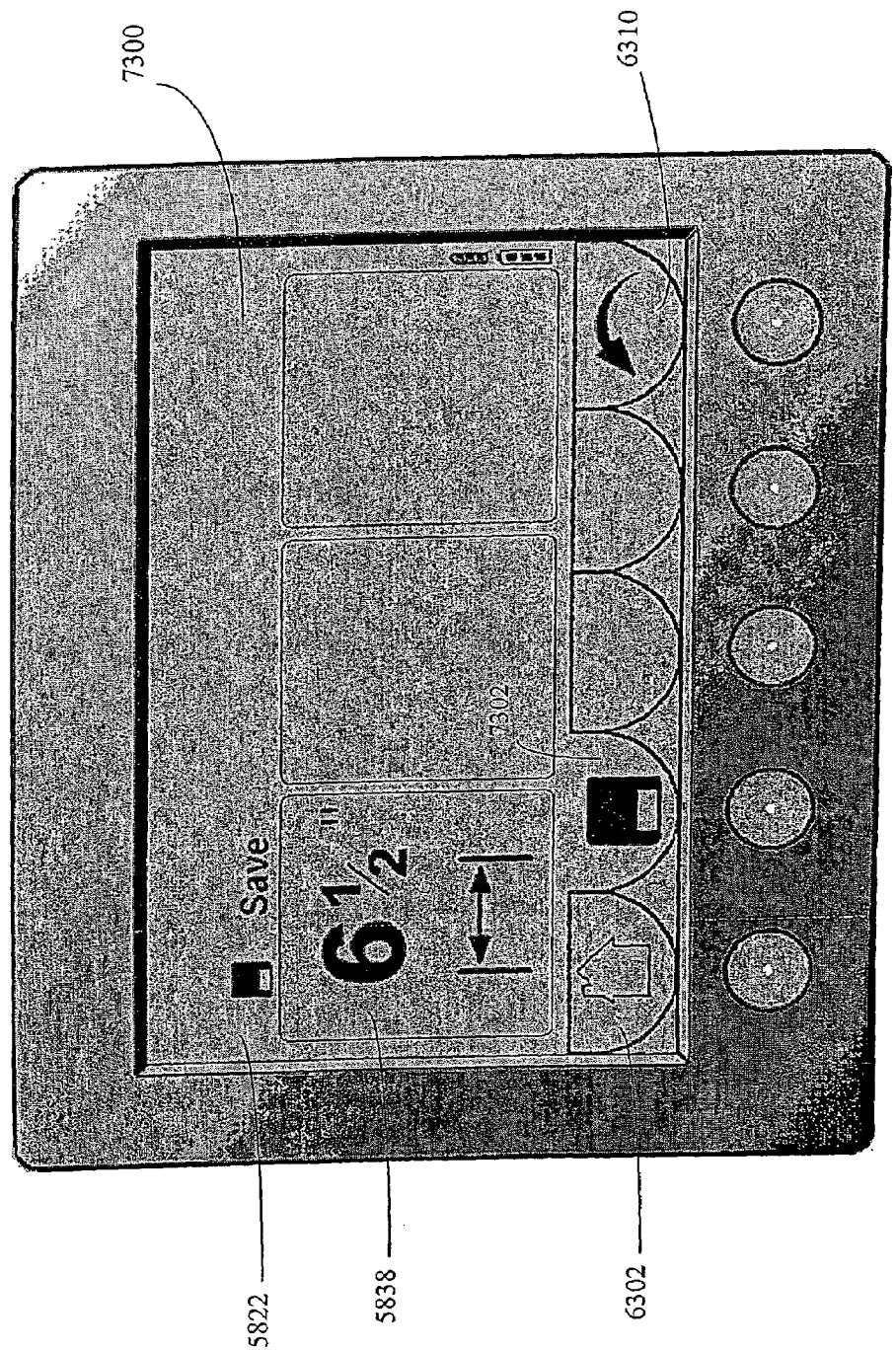
FIG. 73 shows an exemplary distance save screen in accordance with an exemplary embodiment of the present invention.
Figure 74:
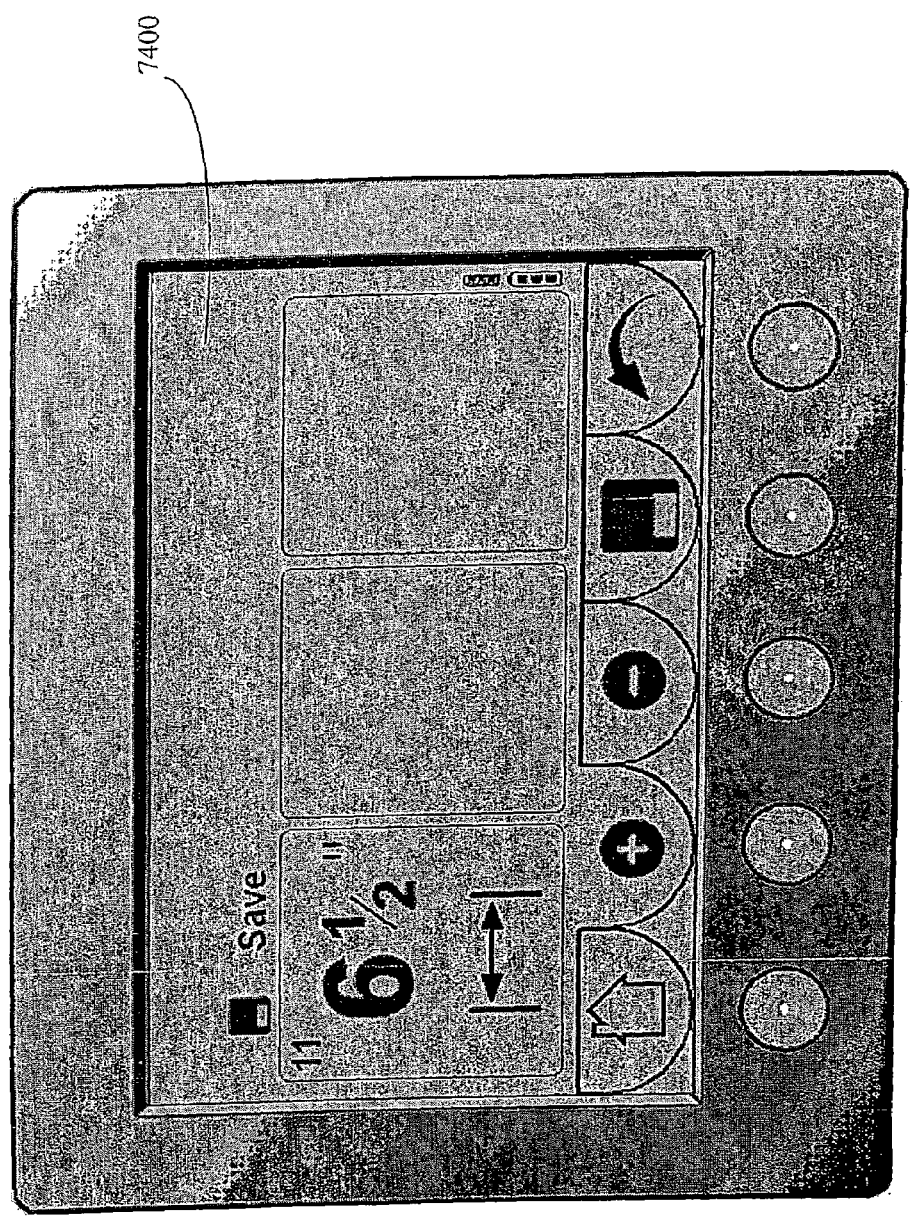
FIG. 74 shows an additional exemplary distance save screen in accordance with an exemplary embodiment of the present invention.

From the distance screen 6300 shown in FIG. 63, when the button 5812 is pushed, the distance screen 6300 may be replaced with a distance save screen 7300 shown in FIG. 73. As shown, the screen 7300 shows in its current-screen region 5822 a diskette icon and a textual representation "Save", indicating to a user that the current screen is for saving a distance value. The screen 7300 includes a "diskette" tab 7302, representing an option of saving the current value 5838 ("6½""). When the tab 7302 is chosen from the screen 7300, the screen 7300 is replaced with the screen 7400 shown in FIG. 74, where the value "6½"" is given a label number (e.g., "11" shown in FIG. 74) and may be saved into a memory of the user interface 5800 or a memory of the laser measurement and alignment device communicatively coupled to the user interface 5800.

It is contemplated that an operator of the user interface may input changes to the distance settings directly. For example, under the distance fine adjustment screen an alternative user input control mode may be included which allows the user to directly affect changes in the distance settings. The user may be enabled to make corrections to the distance in incremental amounts, such as ½ inch or ¼ inch, 0.1" or 0.01", or 10 mm or 5 mm. The user interface may provide "+" and "−" tabs correlated to user input control buttons which allow for this type of adjustment. The direct change of distance setting may be configured in a variety of ways and be within various locations of the height mode as contemplated by one of ordinary skill in the art.

Figure 75:
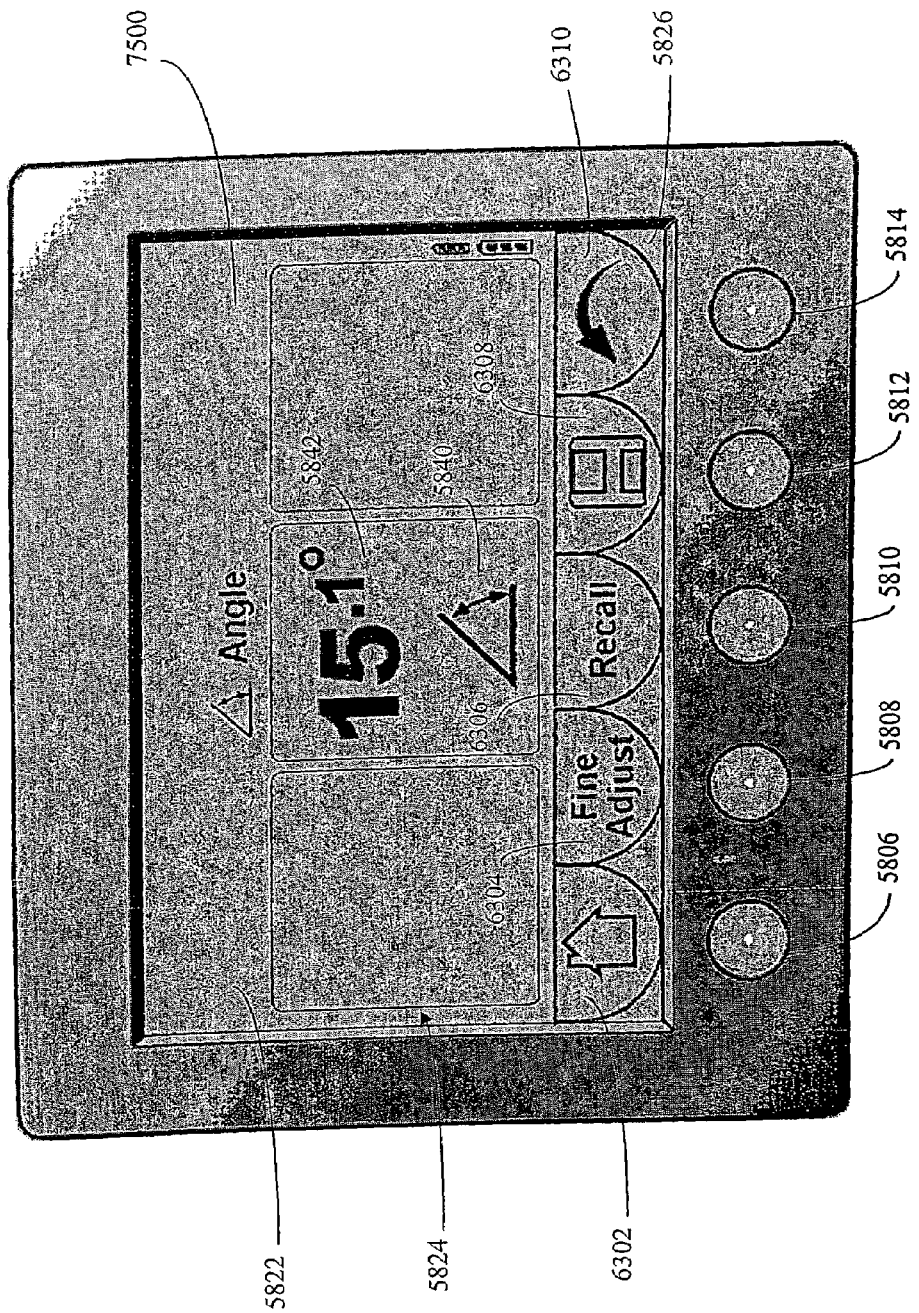
FIG. 75 shows an exemplary angle screen in accordance with an exemplary embodiment of the present invention.

Referring generally now to FIGS. 75 through 83, various exemplary screens 7500 through 8300 of the display 5802 of the user interface 5800 in an angle mode are shown. Referring to FIG. 75, the angle screen 7500 is similar to the home screen 5816 shown in FIG. 58. However, in its settings region 5824 the angle screen 7500 shows the distance mode icon 5840 and its corresponding value 5842 only. In a preferred embodiment, when the user interface 5800 is in an angle mode, only the angle mode icon 5840 and its corresponding value 5842 are shown in the settings region 5824 (see, e.g., FIGS. 75 through 83). Preferably, a user sets only a desired angle between a saw blade and a line perpendicular to the table surface of a table saw through the user interface 5800 when the user interface 5800 is in an angle mode. Because a user does not set a distance or a blade height in an angle mode, the distance and the height mode icons 5836, 5844 and their corresponding values 5838, 5846 do not need to be displayed on the screen in order to save battery power. Moreover, a screen in an angle mode showing only the angle mode icon 5840 and its corresponding value 5842 in the settings region 5824 may help a user to focus attention on setting the angle.

As shown in FIG. 75, the angle screen 7500 shows in its current-screen region 5822 an angle icon and a textual representation "Angle", indicating to a user that the current screen is in an angle mode. As shown, the screen 7500 has in its available-option region 5826 five tabs 6302, 6304, 6306, 6308, and 6310 different from the five tabs shown in FIG. 58. The tab 6302 has a "home" icon unfilled with color representing an option of "returning to home directly" and is correlated to the button 5806 directly below. When the button 5806 is pushed, the angle screen 7500 is replaced with the home screen 5816 shown in FIG. 58. The tab 6304 represents an option of "fine adjustment" and is correlated to the button 5808 directly below. The tab 6306 represents an option of "recall" and is correlated to the button 5810 directly below. The tab 6308 has a "diskette" icon representing an option of "save" and is correlated to the button 5812 directly below. The tab 6310 has a "back arrow" icon representing an option of "back one level" and is correlated to the button 5814 directly below. That is, when the button 5814 is pushed, the interface 5800 goes back one level and the angle screen 7500 is replaced with the home screen 5816 shown in FIG. 58.

Figure 76:
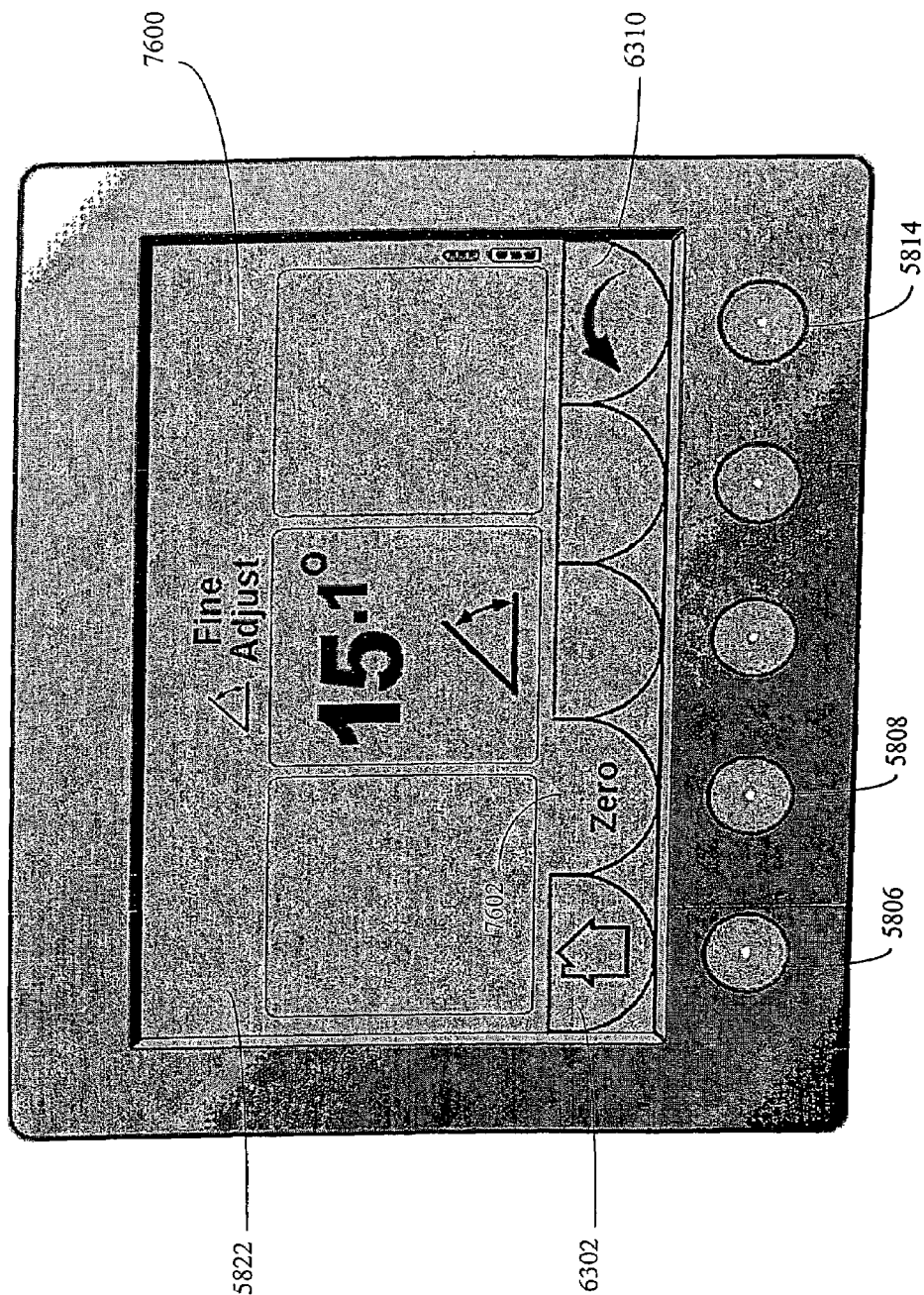
FIG. 76 shows an exemplary angle fine adjustment screen in accordance with an exemplary embodiment of the present invention.

From the angle screen 7500 shown in FIG. 75, when the button 5808 is pushed, the angle screen 7500 is replaced with an angle fine adjustment screen 7600 shown in FIG. 76. As shown, the screen 7600 shows in its current-screen region 5822 an angle icon and a textual representation "Fine Adjust", indicating to a user that the current screen is for fine adjustment of an angle. The screen 7600 includes three tabs: the tabs 6302 and 6310 (as shown in FIG. 75), and a tab 6402 for a "Zero" option correlated to the button 5808. When the tab 6302 is chosen (e.g., by pushing the button 5806) from the screen 7600, the interface 5800 directly returns to home and the screen 7600 is replaced with the home screen 5816 shown in FIG. 58. When the tab 6310 is chosen (e.g., by pushing the button 5814) from the screen 7600, the interface 5800 goes back one level and the screen 7600 is replaced with the angle screen 7500 shown in FIG. 75.

Figure 77:
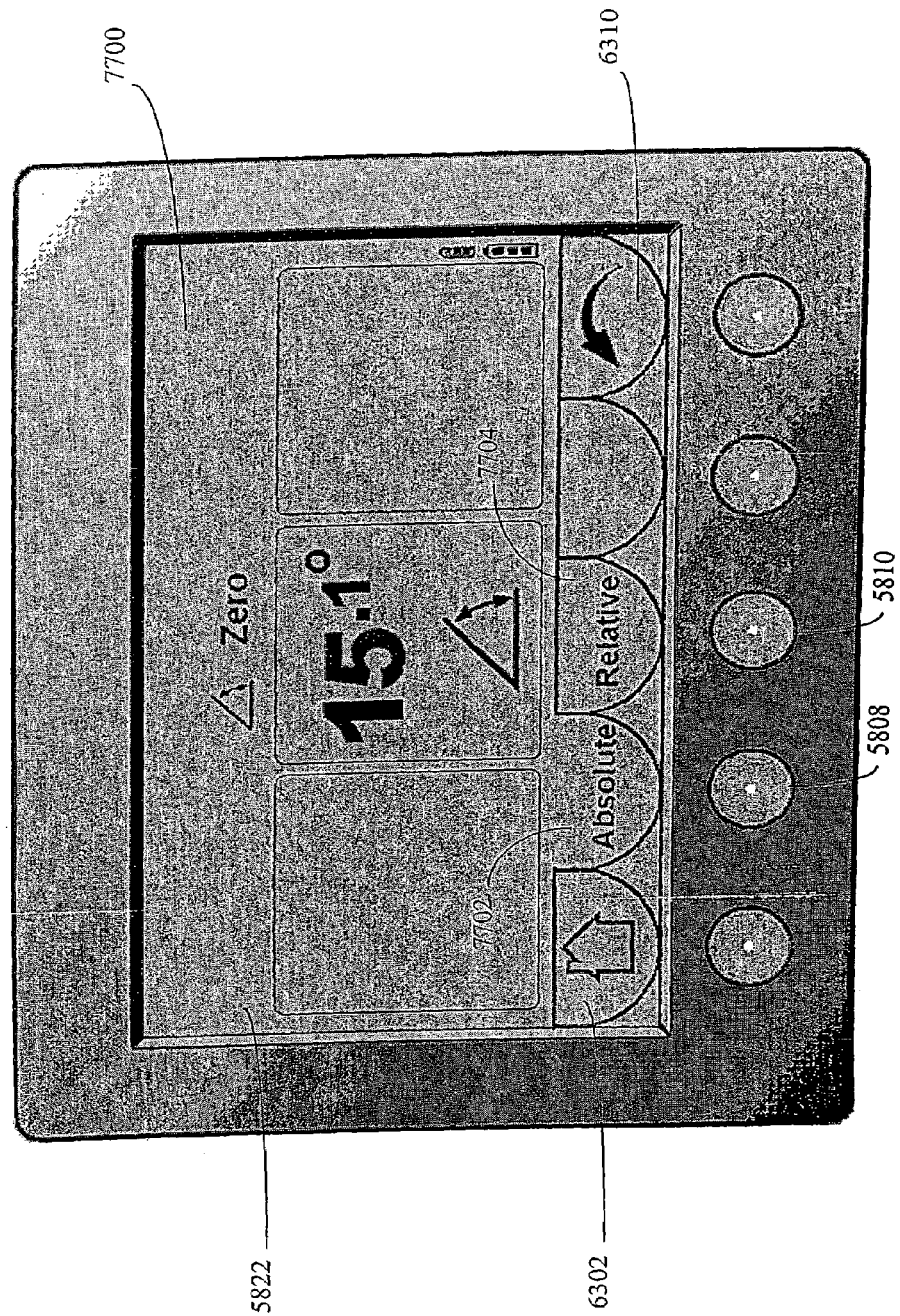
FIG. 77 shows an exemplary angle zero screen in accordance with an exemplary embodiment of the present invention.
Figure 78:
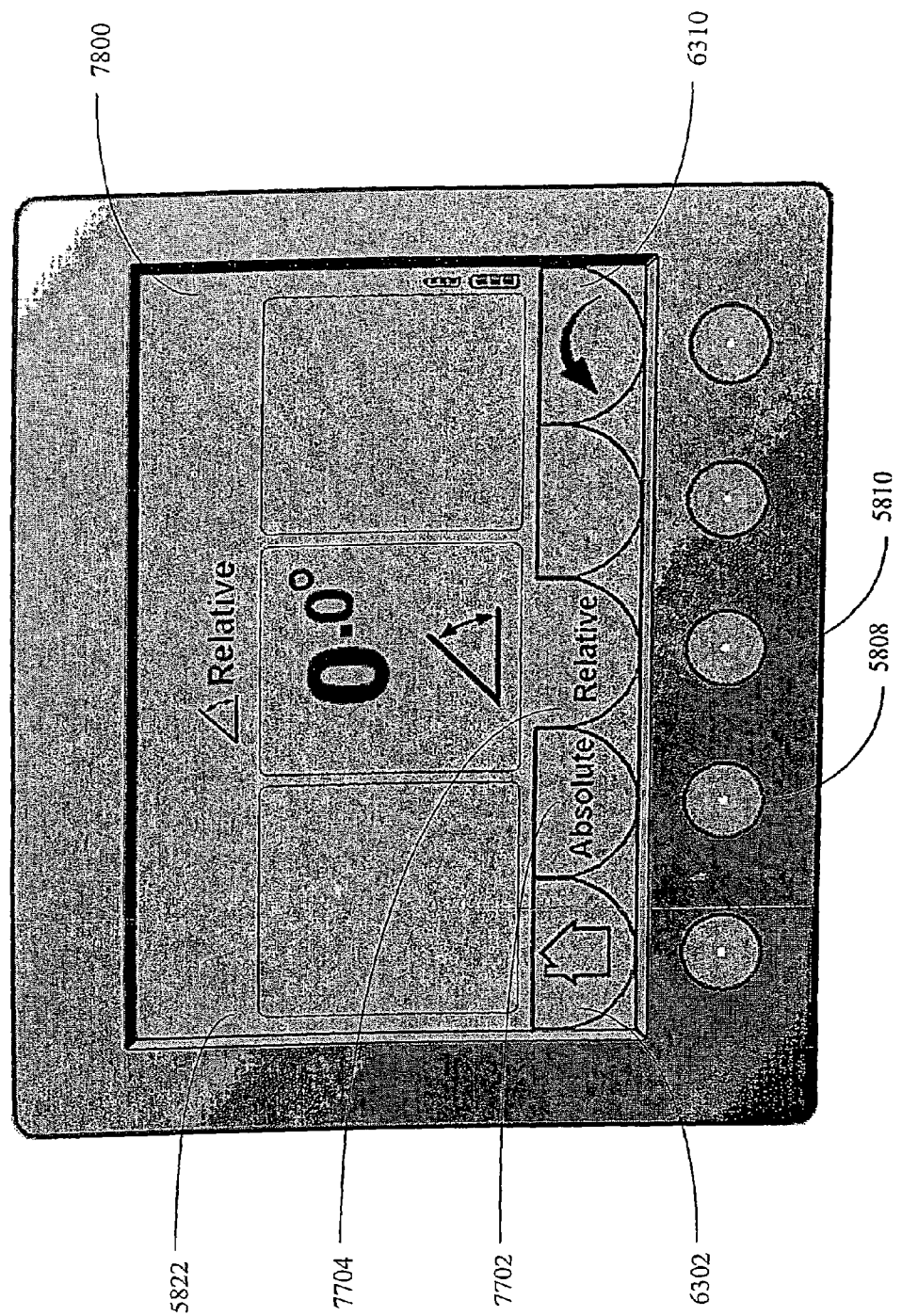
FIG. 78 shows an exemplary angle relative zero screen in accordance with an exemplary embodiment of the present invention.

When the "Zero" option is chosen (e.g., by pushing the button 5808) from the screen 7600 shown in FIG. 76, the screen 7600 is replaced with an angle zero screen 7700 shown in FIG. 77. As shown in FIG. 77, the screen 7700 has in its current-screen region 5822 an angle icon and a word "Zero", indicating the current screen 7700 is an angle zero screen. The screen 7700 includes two new tabs: a tab 7702 representing an angle absolute zero option, and a tab 7704 representing an angle relative zero option. When the tab 7704 option is chosen (e.g., by pushing the button 5810) from the screen 7700 shown in FIG. 77, the screen 7700 is replaced with an angle relative zero screen 7800 shown in FIG. 78. As shown in FIG. 78, the screen 7800 has in its current-screen region 5822 an angle icon and a word "Relative", indicating the current screen 7800 is an angle relative zero screen. Using the buttons 5808 and 5810, a user may toggle between the angle relative zero screen 7800 shown in FIG. 78 and the angle zero screen 7700 shown in FIG. 77.

Figure 79:
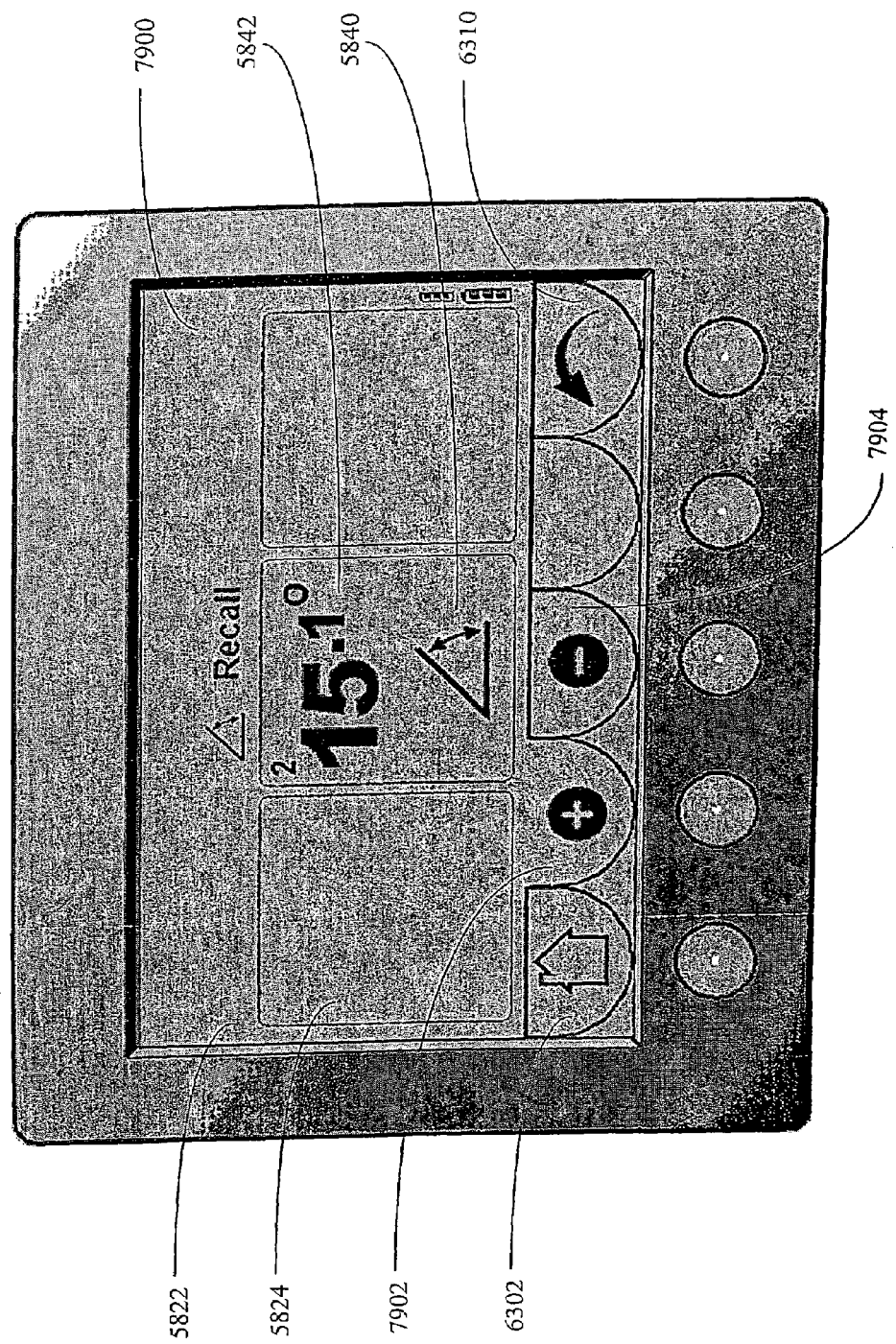
FIG. 79 shows an exemplary angle recall screen in accordance with an exemplary embodiment of the present invention.
Figure 80:
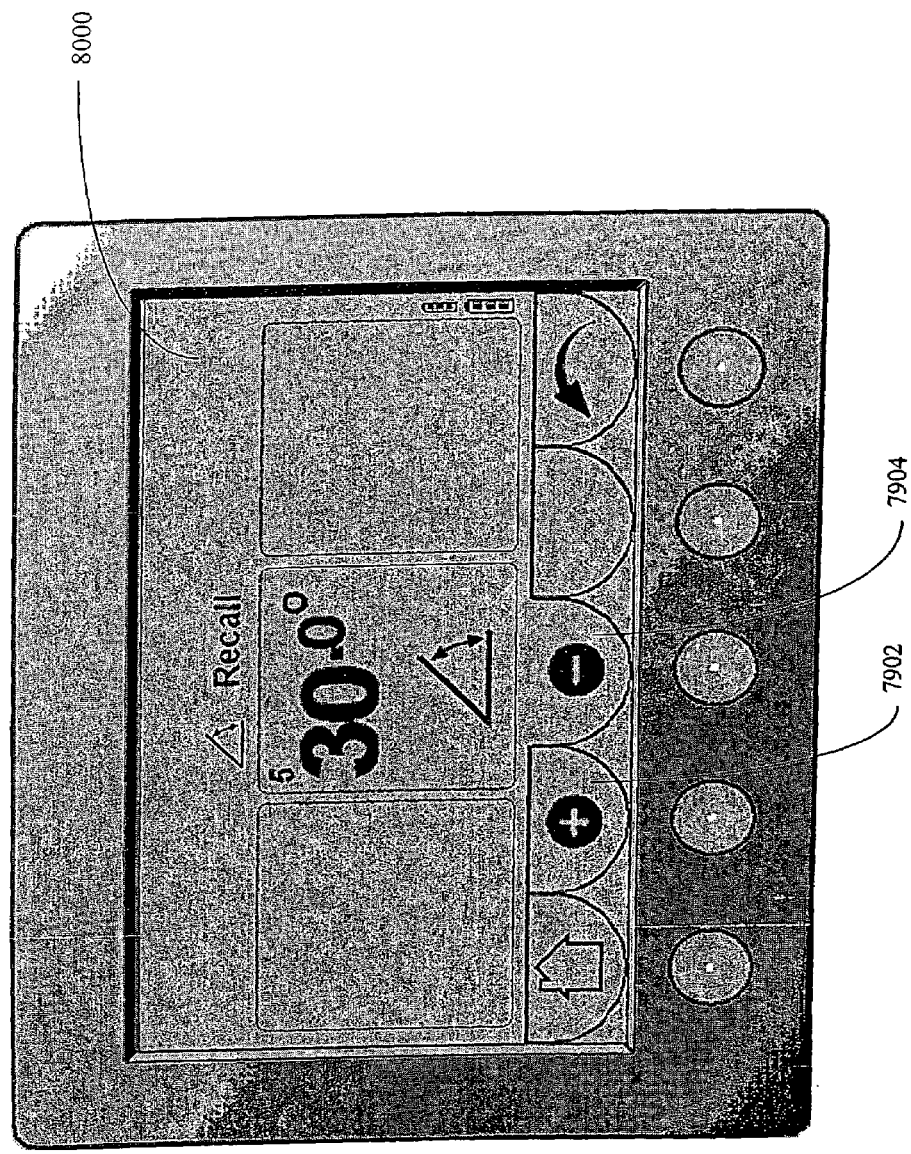
FIG. 80 shows an additional exemplary angle recall screen in accordance with an exemplary embodiment of the present invention.
Figure 81:
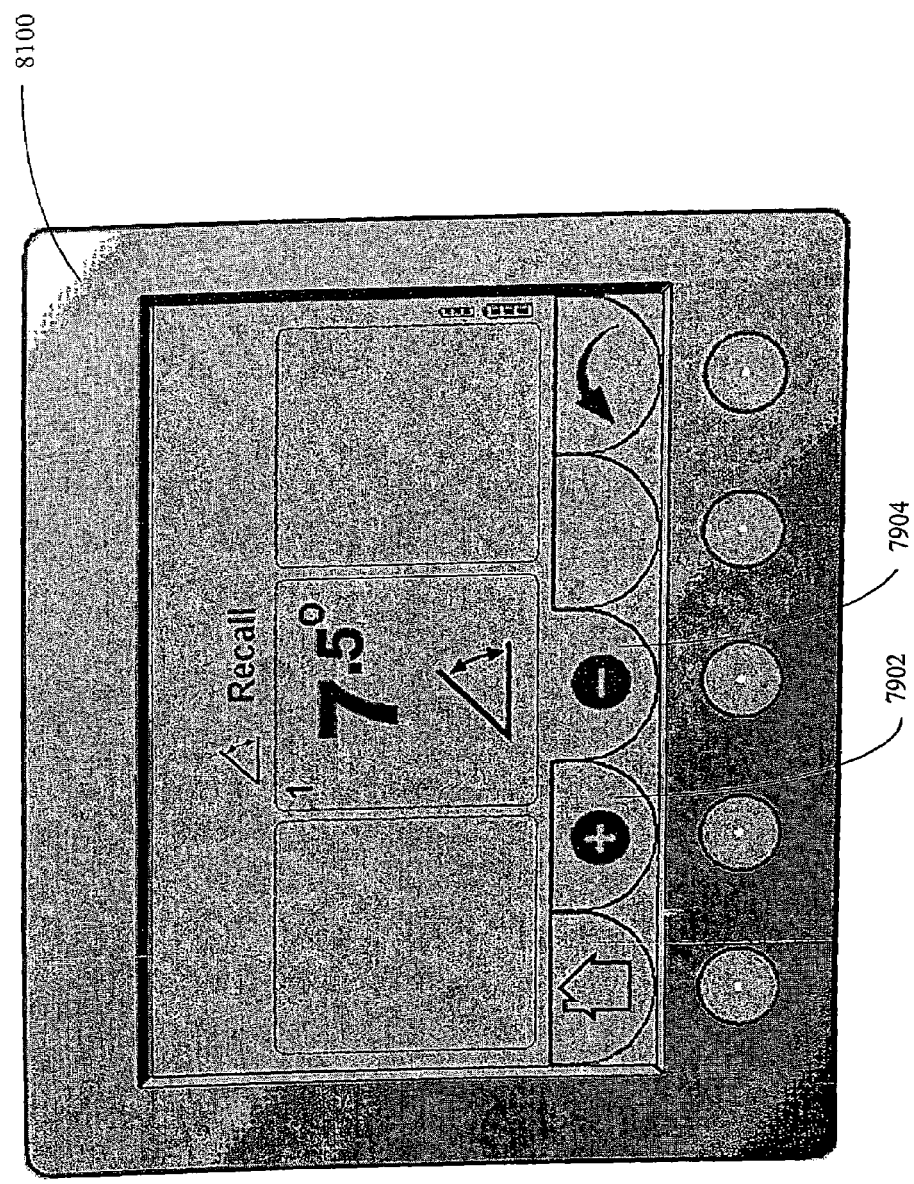
FIG. 81 shows a further exemplary angle recall screen in accordance with an exemplary embodiment of the present invention.

From the angle screen 7500 shown in FIG. 75, when the button 5810 is pushed, the angle screen 7500 is replaced with an angle recall screen 7900 shown in FIG. 79. As shown, the screen 7900 shows in its current-screen region 5822 an angle icon and a textual representation "Recall", indicating to a user that the current screen is for recalling a saved angle. There may exist at least one saved angle value in a memory of the user interface 5800 or a memory of the laser measurement and alignment device communicatively coupled to the user interface 5800. Each saved angle value may have a label number such as 1, 2, 3, etc. For example, the screen 7900 shows a value 5842 ("15.1°") in its settings region 5824. The number "2" to the left of "15.1°" indicates that the label number for "15.1°" is "2". The screen 7900 includes two new tabs: a tab 7902 for a "+" option of moving to a saved angle value with a higher label number than that shown on the current screen, and a tab 7904 for a "−" option of moving to a saved angle value with a lower label number than that shown on the current screen. For example, from the screen 7900 shown in FIG. 79, when the "+" option (the tab 7902) is chosen (several times), the screen 7900 may be replaced with a screen 8000 shown in FIG. 80, where a saved angle value with a label number "5" ("30.0°") is shown. Additionally, from the screen 7900 shown in FIG. 79, when the "−" option (the tab 7904) is chosen, the screen 7900 may be replaced with a screen 8100 shown in FIG. 81, where a saved angle value with a lower label number "1" ("7.5°") is shown.

Figure 82:
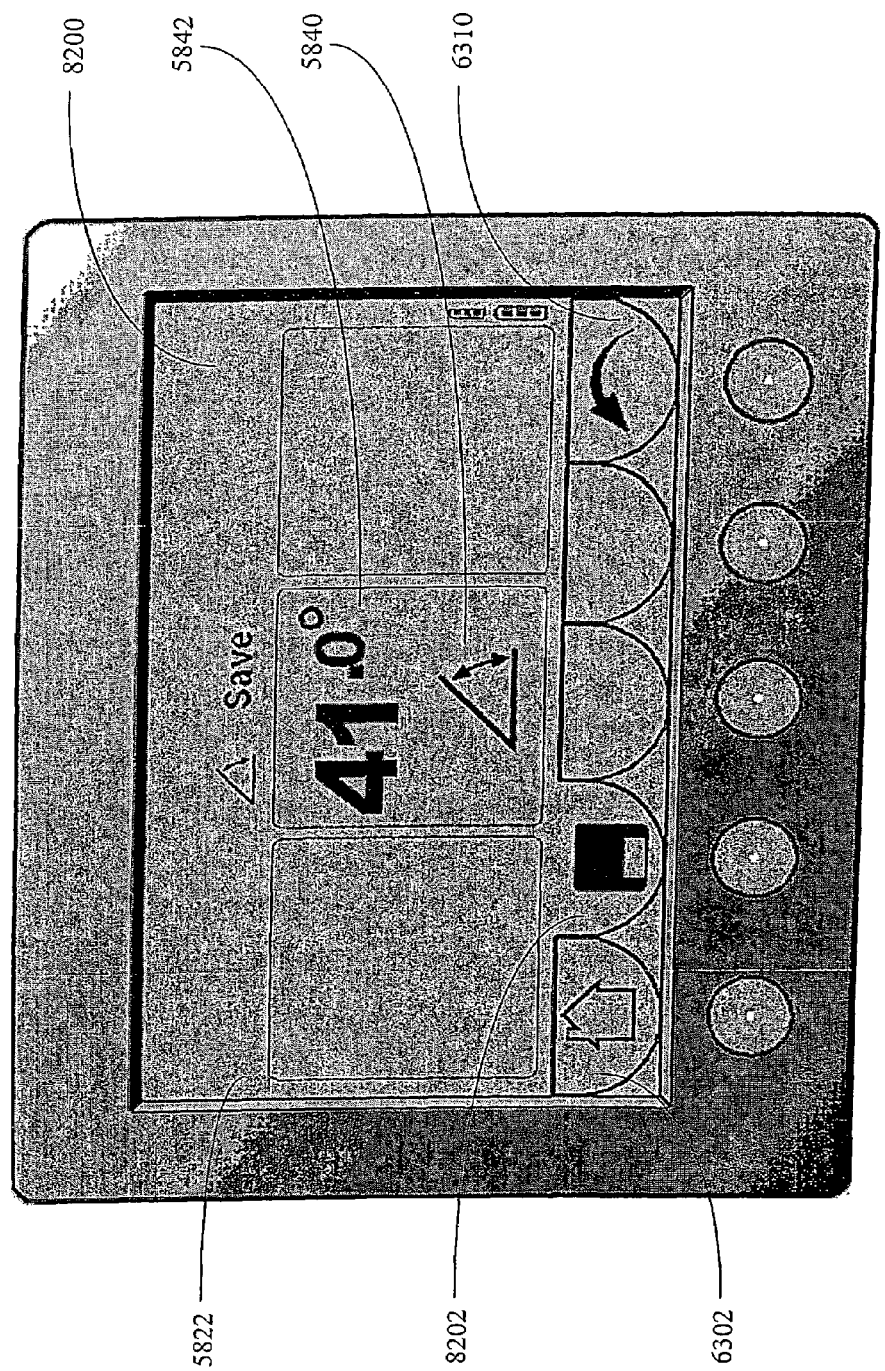
FIG. 82 shows an exemplary angle save screen in accordance with an exemplary embodiment of the present invention.

From the angle screen 7500 shown in FIG. 75, when the button 5812 is pushed, the angle screen 7500 is replaced with an angle save screen 8200 shown in FIG. 82. As shown, the screen 8200 shows in its current-screen region 5822 an angle icon and a textual representation "Save", indicating to a user that the current screen is for saving an angle value. The screen 8200 includes a "diskette" tab 8202, representing an option of saving the current value 5842 ("41.0°"). As mentioned previously, it is contemplated that other removable memory media may be employed with the present invention, such as a DVD, CDR, flash media device, and the like. Therefore, the "diskette" icon may be altered to provide an alternative image more directly reflecting the current memory media being employed. Further, it is understood that the user interface may incorporate the usage of more than one type of memory media and thus include multiple memory media drives.

Figure 83:
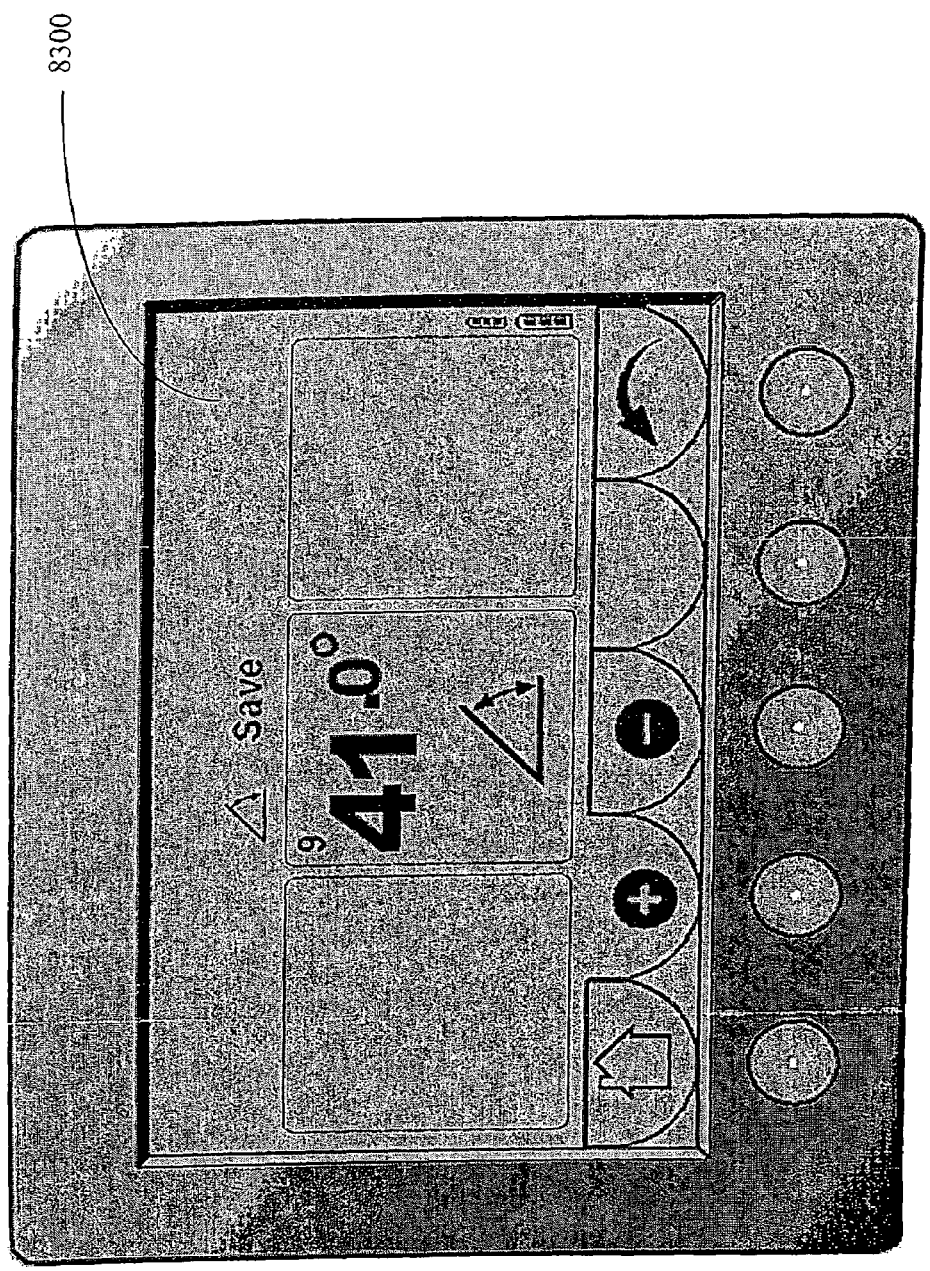
FIG. 83 shows an additional exemplary angle save screen in accordance with an exemplary embodiment of the present invention.

When the tab 8202 is chosen from the screen 8200, the screen 8200 is replaced with a screen 8300 shown in FIG. 83, where the value "41.0°" is given a label number (e.g., "9" shown in FIG. 83) and may be saved into a memory of the user interface 5800 or a memory of the laser measurement and alignment device communicatively coupled to the user interface 5800.

It is contemplated that an operator of the user interface may input changes to the angle settings directly. For example, under the angle fine adjustment screen an alternative user input control mode may be included which allows the user to directly affect changes in the angle settings. The user may be enabled to make corrections to the angle in incremental amounts, such as 0.5 degrees or 1 degree. The user interface may provide "+" and "−" tabs correlated to user input control buttons which allow for this type of adjustment. The direct change of angle setting may be configured in a variety of ways and be within various locations of the angle mode as contemplated by one of ordinary skill in the art.

Figure 84:
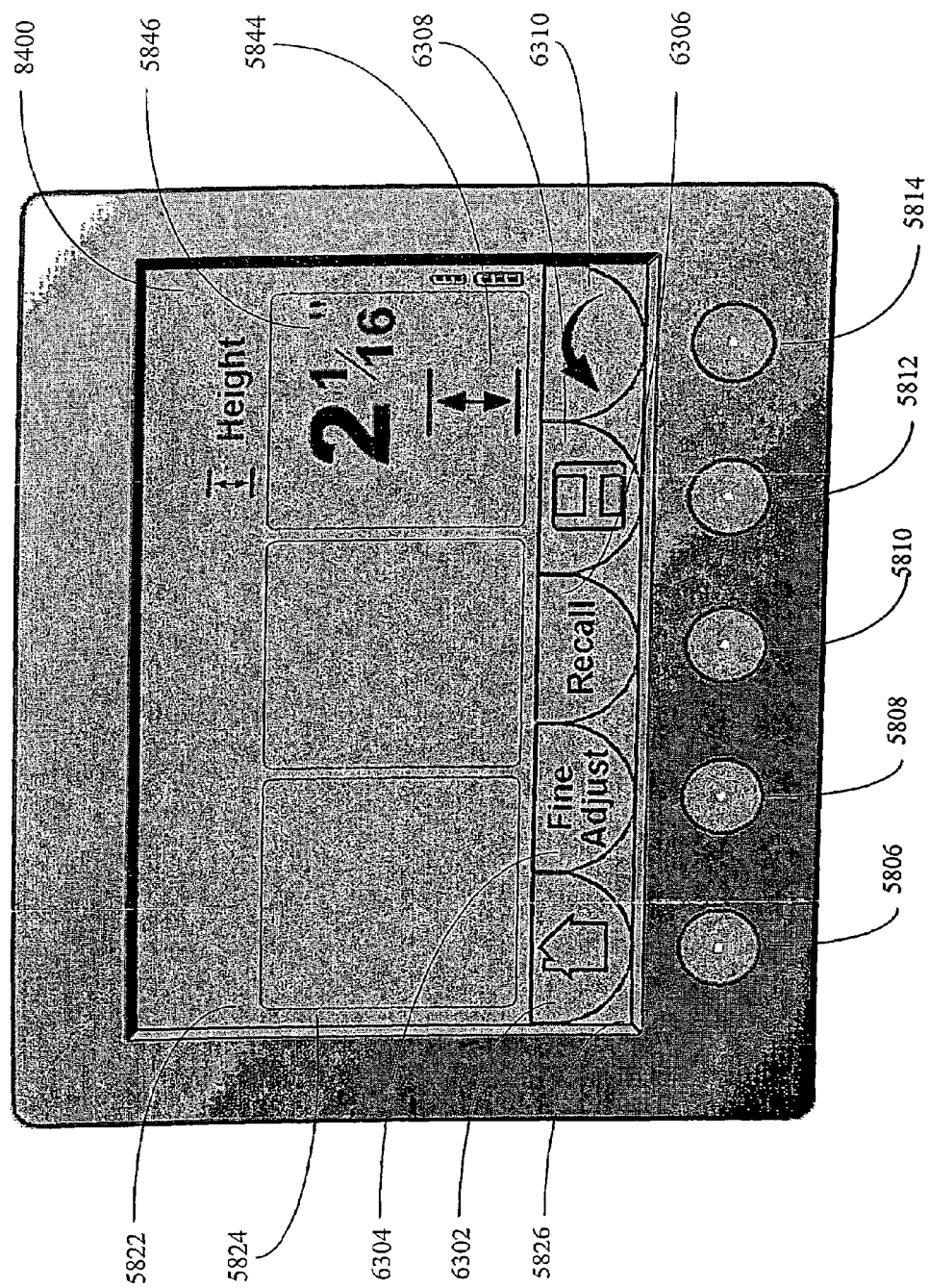
FIG. 84 shows an exemplary height screen in accordance with an exemplary embodiment of the present invention.

Referring generally now to FIGS. 84 through 94, various exemplary screens 8400 through 9400 of the display 5802 of the user interface 5800 in a height mode are shown. Referring to FIG. 84, the height screen 8400 is similar to the home screen 5816 shown in FIG. 58. However, in its settings region 5824 the height screen 8400 shows the height mode icon 5844 and its corresponding value 5846 only. In a preferred embodiment, when the user interface 5800 is in a height mode, only the height mode icon 5844 and its corresponding value 5846 are shown in the settings region 5824 (see, e.g., FIGS. 84 through 94). Preferably, a user sets only a desired height of a saw blade over a table surface of a table saw through the user interface 5800 when the user interface 5800 is in a height mode. Because a user does not set a distance or an angle in a height mode, the distance and angle mode icons 5836, 5840 and their corresponding values 5838, 5842 do not need to be displayed on the screen in order to save battery power. Moreover, a screen in a distance mode showing only the height mode icon 5844 and its corresponding value 5846 in the settings region 5824 may help a user to focus attention on setting the distance.

As shown in FIG. 84, the height screen 8400 shows in its current-screen region 5822 a height icon and a textual representation "Height", indicating to a user that the current screen is in a height mode. As shown, the height screen 8400 has in its available-option region 5826 five tabs 6302, 6304, 6306, 6308, and 6310 different from the five tabs shown in FIG. 58. The tab 6302 has a "home" icon unfilled with color representing an option of "returning to home directly" and is correlated to the button 5806 directly below. When the button 5806 is pushed, the distance screen 6300 is replaced with the home screen 5816 shown in FIG. 58. The tab 6304 represents an option of "fine adjustment" and is correlated to the button 5808 directly below. The tab 6306 represents an option of "recall" and is correlated to the button 5810 directly below. The tab 6308 has a "diskette" icon representing an option of "save" and is correlated to the button 5812 directly below. The tab 6310 has a "back arrow" icon representing an option of "back one level" and is correlated to the button 5814 directly below. That is, when the button 5814 is pushed, the interface 5800 goes back one level and the distance screen 8400 is replaced with the home screen 5816 shown in FIG. 58.

Figure 85:
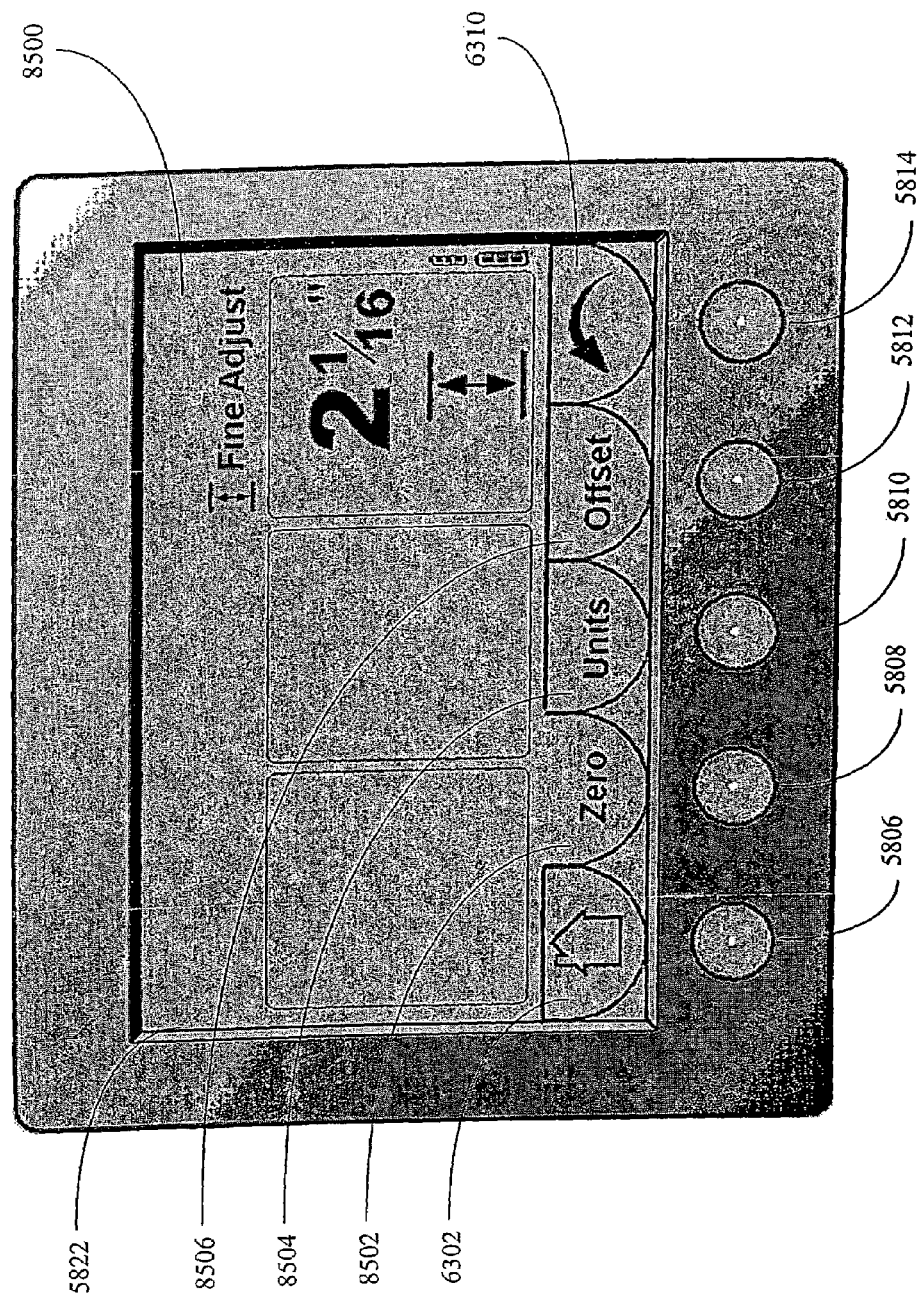
FIG. 85 shows an exemplary height fine adjustment screen in accordance with an exemplary embodiment of the present invention.

From the height screen 8400 shown in FIG. 84, when the button 5808 is pushed, the height screen 8400 is replaced with a height fine adjustment screen 8500 shown in FIG. 85. As shown, the screen 8500 shows in its current-screen region 5822 a height icon and a textual representation "Fine Adjust", indicating to a user that the current screen is for fine adjustment of a height. The screen 8500 has five tabs: the tabs 6302 and 6310 (as shown in FIG. 84), a tab 8502 for a "Zero" option correlated to the button 5808, a tab 8504 for "Units" option correlated to the button 5810, and a tab 8506 for "Offset" option correlated to the button 5812. When the tab 6302 is chosen (e.g., by pushing the button 5806) from the screen 8500, the interface 5800 directly returns to home and the screen 8500 is replaced with the home screen 5816 shown in FIG. 58. When the tab 6310 is chosen (e.g., by pushing the button 5814) from the screen 8500, the interface 5800 goes back one level and the screen 8500 is replaced with the height screen 8400 shown in FIG. 84.

Figure 86:
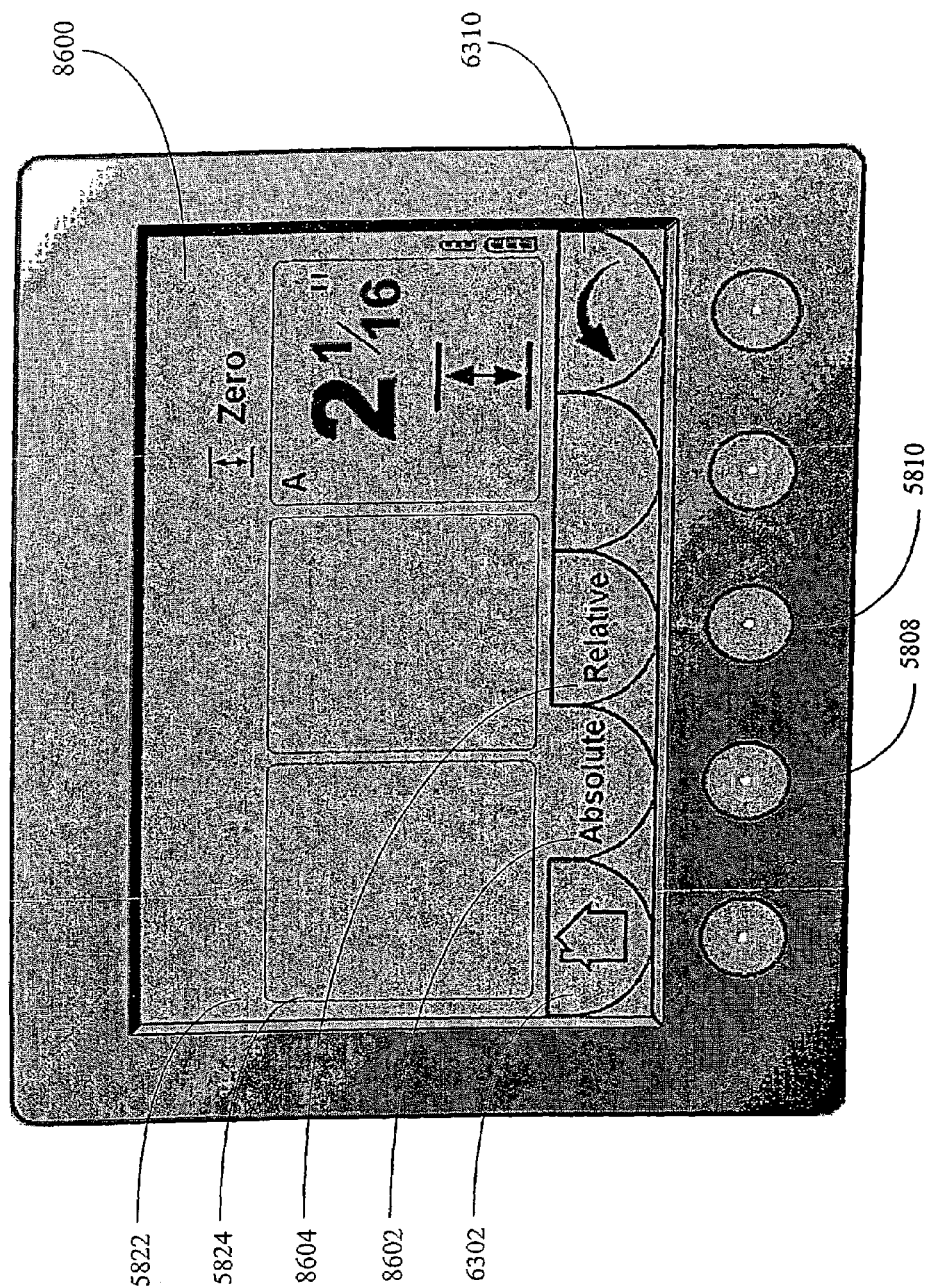
FIG. 86 shows an exemplary height absolute zero screen in accordance with an exemplary embodiment of the present invention.

When the "Zero" option is chosen (e.g., by pushing the button 5808) from the screen 8500, the screen 8500 is replaced with a height absolute zero screen 8600 shown in FIG. 86. As shown in FIG. 86, the screen 8600 has in its current-screen region 5822 a height icon and a word "Zero", indicating the current screen 8600 is a height zero screen. Additionally, the screen 8600 has in its settings region 5824 a letter "A", indicating that the current screen 8600 is a height absolute zero screen. This is further shown by different representations of two new tabs 8602 and 8604 on the screen 8600, where the tab 8602 representing a height absolute zero option does not have a horizontal line above the word "Absolute", indicating the height absolute zero option is chosen. Using the buttons 5808 and 5810, a user may toggle between the height absolute zero screen 8500 shown in FIG. 85 and a height relative zero screen (not shown).

Figure 87:
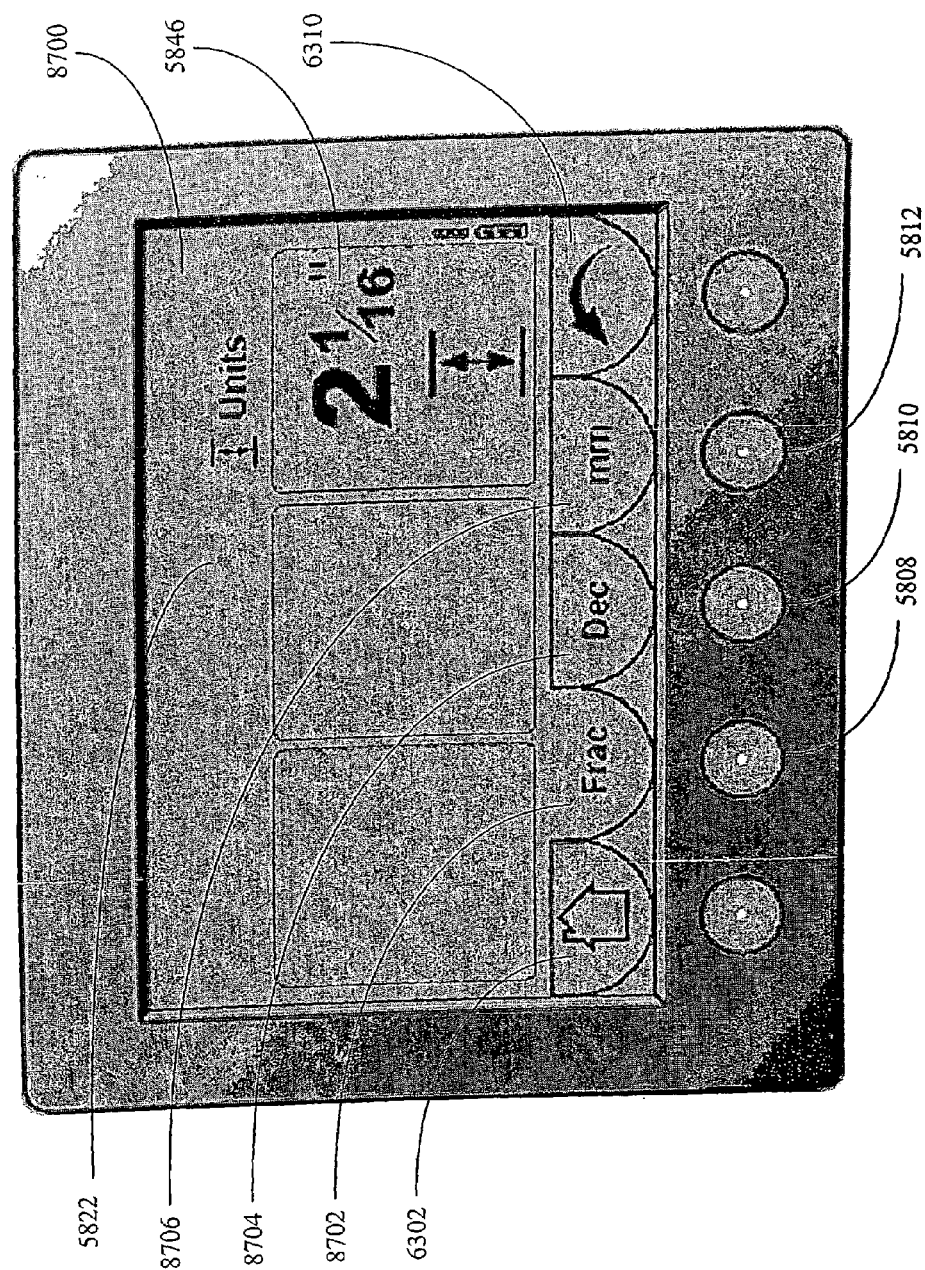
FIG. 87 shows an exemplary default height units screen in accordance with an exemplary embodiment of the present invention.

When the "Units" option is chosen (e.g., by pushing the button 5810) from the screen 8500, the screen 8500 is replaced with a default height units screen 8700 shown in FIG. 87. As shown in FIG. 87, the screen 8700 has in its current-screen region 5822 a height icon and a word "Units", indicating the current screen 8700 is a height units screen. The screen 8700 includes three new tabs 8702 (Frac), 8704 (Dec) and 8706 (mm), which represent a fraction unit option, a decimal unit option, and a metric unit option, respectively. The tab 8702 representing a fraction unit option does not have a horizontal line above "Frac", indicating the fraction unit option is chosen. As a result of this option, the number in the height value 5846 is displayed in a format of "integer+fraction" (see, e.g., "2$\frac{1}{16}$" in FIG. 87).

Figure 88:
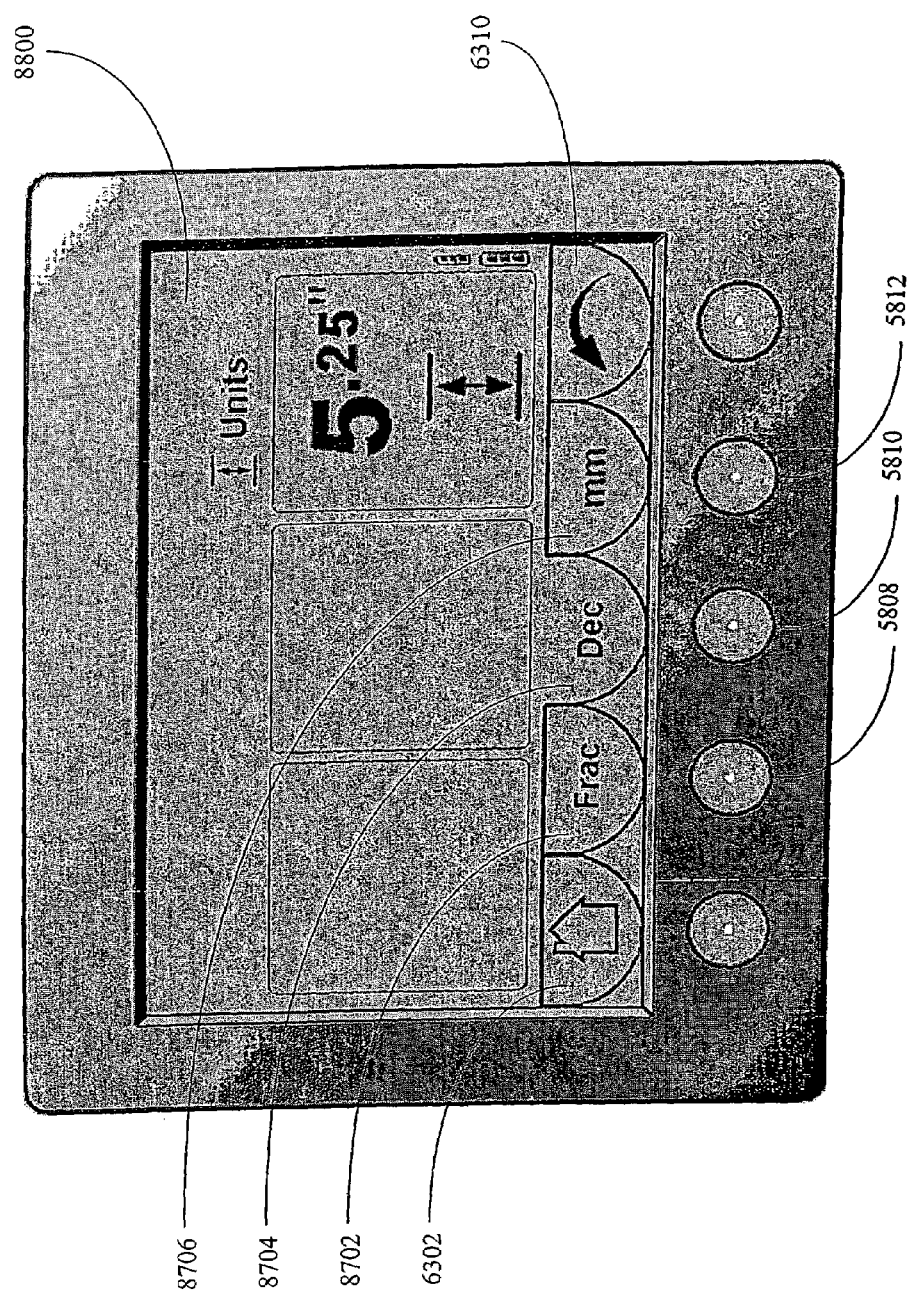
FIG. 88 shows an exemplary height decimal unit screen in accordance with an exemplary embodiment of the present invention.

From the screen 8700 shown in FIG. 87, when the button 5810 is pushed, the screen 8700 may be replaced with a height decimal unit screen 8800 shown in FIG. 88. As shown in FIG. 88, the tab 8704 representing a decimal unit option does not have a horizontal line above "Dec", indicating the decimal unit option is chosen. As a result of this option, the number in the distance value 5838 is displayed in a format of a decimal expansion (see, e.g., "5.$^{25}$" in FIG. 88). Using the buttons 5808, 5810, and 5812, a user may toggle among the default height units (in fraction units) screen 8700 shown in FIG. 87, the height decimal units screen 8800 shown in FIG. 88, and a height metric unit screen (not shown).

Figure 89:
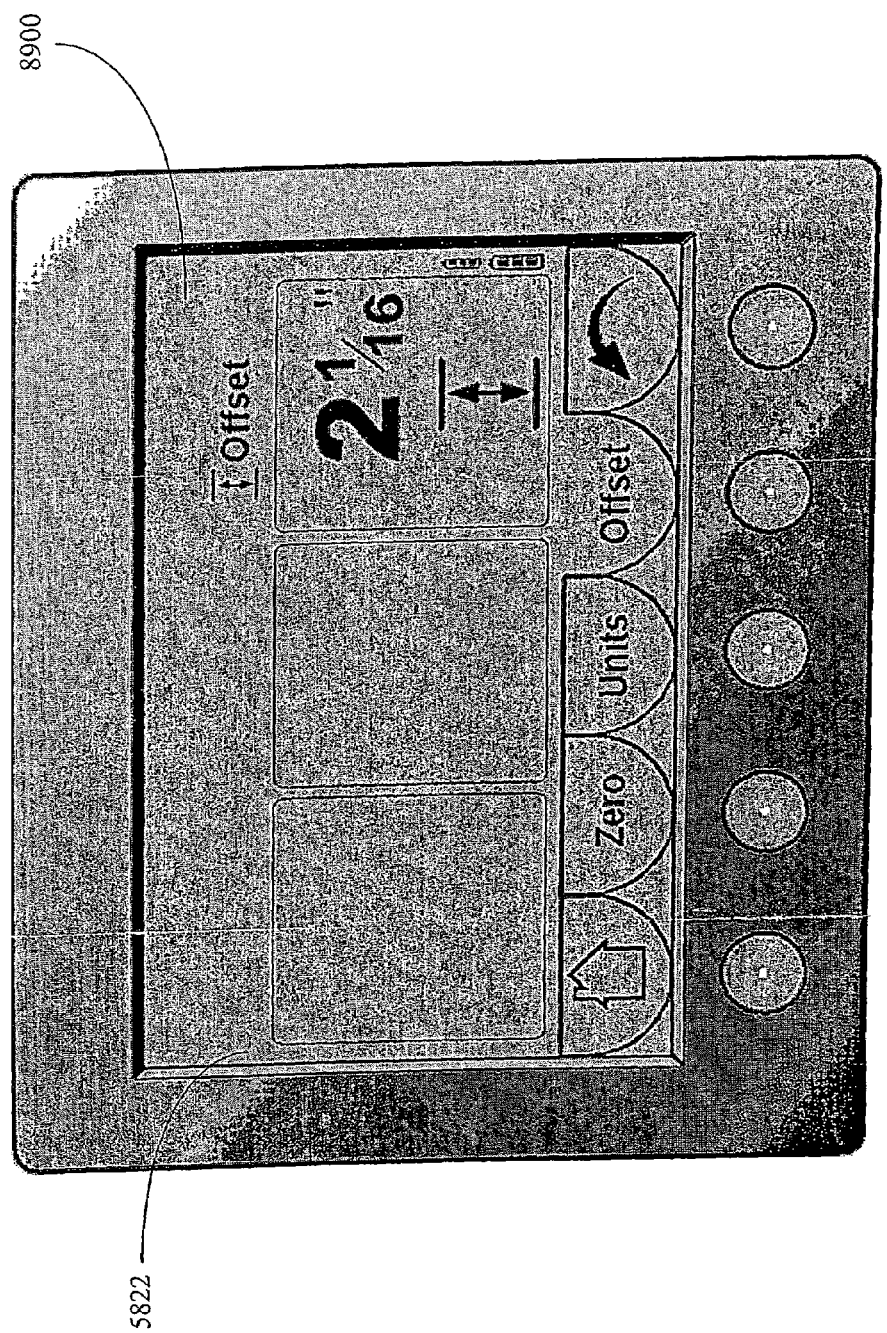
FIG. 89 shows an exemplary height offset screen in accordance with an exemplary embodiment of the present invention.

When the "Offset" option is chosen (e.g., by pushing the button 5812) from the screen 8500 shown in FIG. 85, the screen 8500 is replaced with a height offset screen 8900 shown in FIG. 89. As shown in FIG. 89, the screen 8900 has in its current-screen region 5822 a height icon and a word "Offset", indicating the current screen 8900 is a height offset screen. Through the screen 8900, a user may add an offset height.

Figure 90:
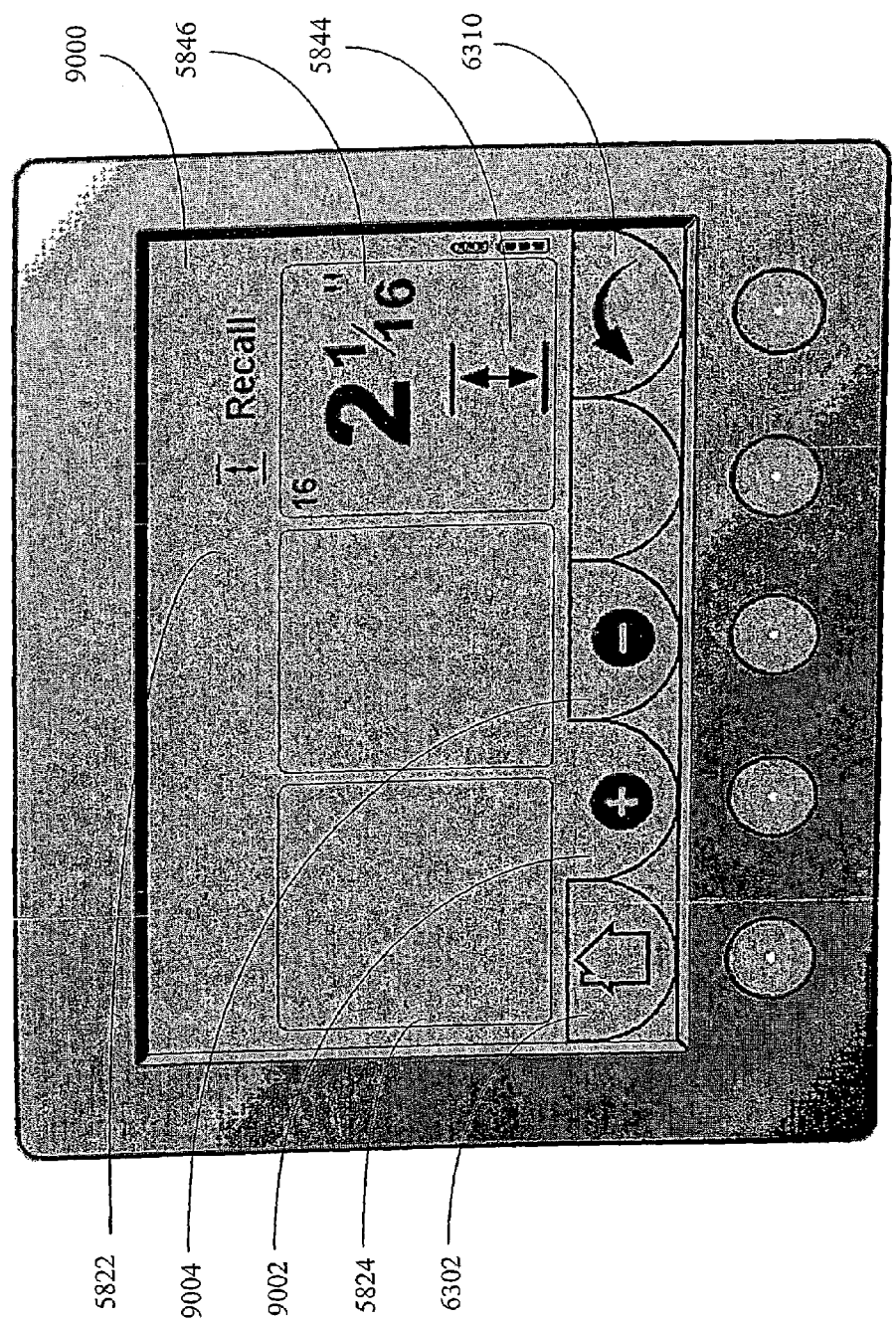
FIG. 90 shows an exemplary height recall screen in accordance with an exemplary embodiment of the present invention.
Figure 91:
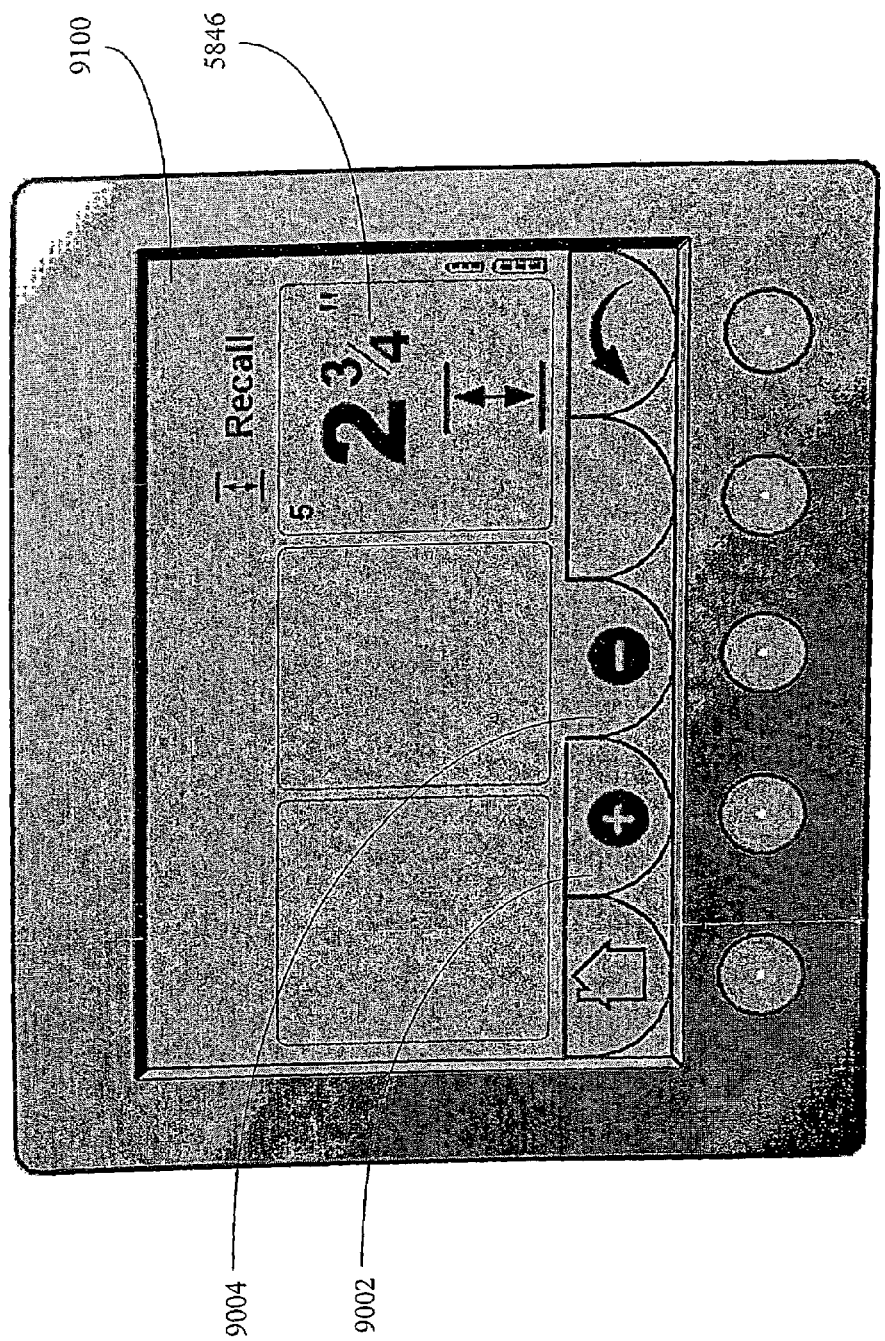
FIG. 91 shows an additional exemplary height recall screen in accordance with an exemplary embodiment of the present invention.
Figure 92:
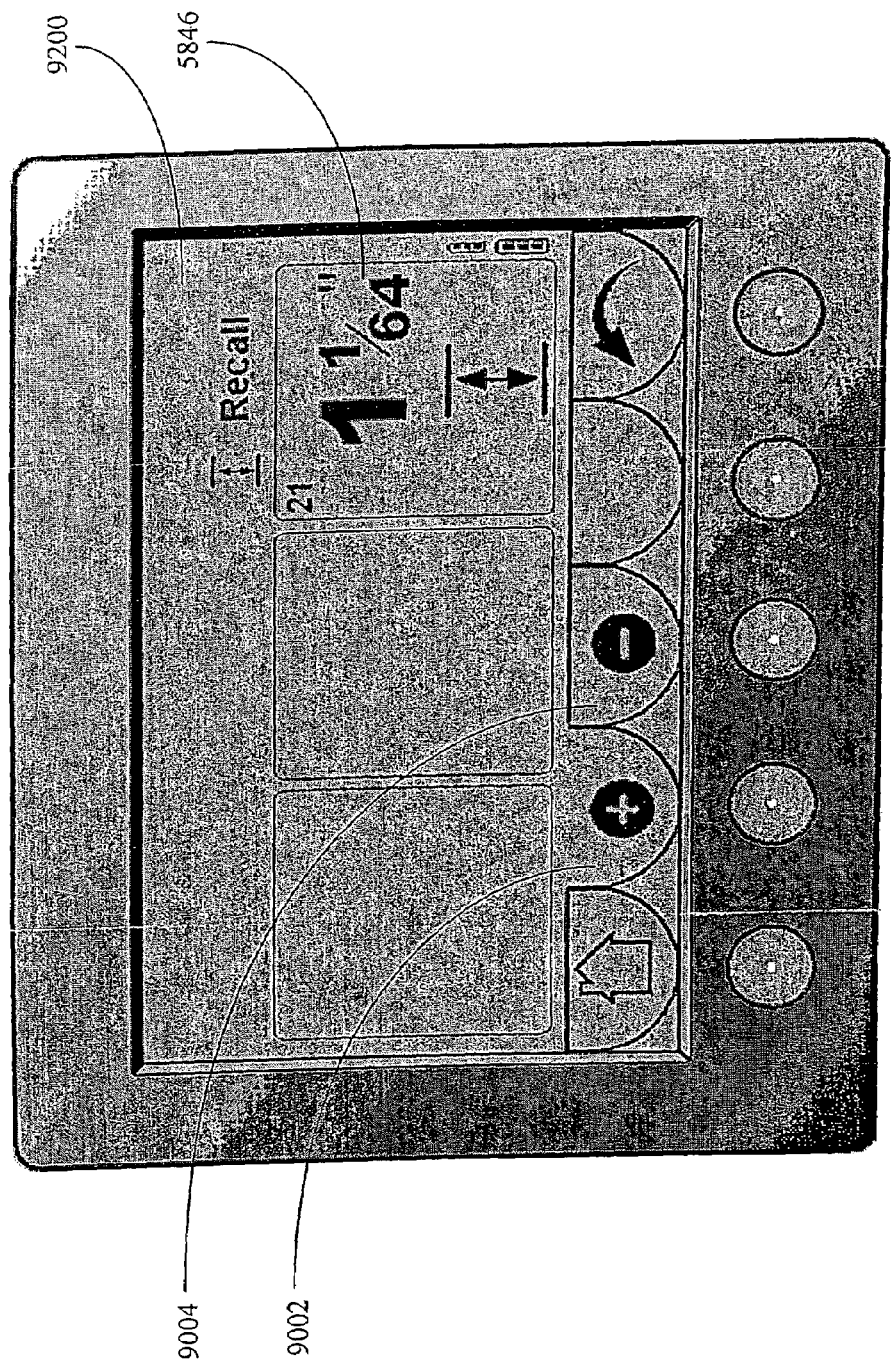
FIG. 92 shows a further exemplary height recall screen in accordance with an exemplary embodiment of the present invention.

From the height screen 8400 shown in FIG. 84, when the button 5810 is pushed (and possibly after some other manipulations of the user interface controls 5804), the height screen 8400 may be replaced with a height recall screen 9000 shown in FIG. 90. As shown, the screen 9000 shows in its current-screen region 5822 a height icon and a textual representation "Recall", indicating to a user that the current screen is for recalling a saved height. There may exist at least one saved height value in a memory of the user interface 5800 or a memory of the laser measurement and alignment device communicatively coupled to the user interface 5800. Each saved height value may have a label number such as 1, 2, 3, etc. For example, the screen 9000 shows a value 5846 ("2¹⁄₁₆''") in its settings region 5824. The number "16" to the left of "2¹⁄₁₆''" indicates that the label number for "2¹⁄₁₆''" is "16". The screen 9000 includes two new tabs: a tab 9002 for a "+" option of moving to a saved height value with a higher label number than that shown on the current screen, and a tab 9004 for a "−" option of moving to a saved height value with a lower label number than that shown on the current screen. For example, from the screen 9000 shown in FIG. 90, when the "−" option (the tab 9004) is chosen repeatedly, the screen 9000 may be replaced with a screen 9100 shown in FIG. 91, where a saved height value with a lower label number "5" ("2¾''",) is shown. Additionally, from the screen 9000 shown in FIG. 90, when the "+" option (the tab 9002) is chosen repeatedly, the screen 9000 may be replaced with a screen 9200 shown in FIG. 92, where a saved height value with a higher label number "21" ("1¹⁄₆₄''") is shown.

Figure 93:
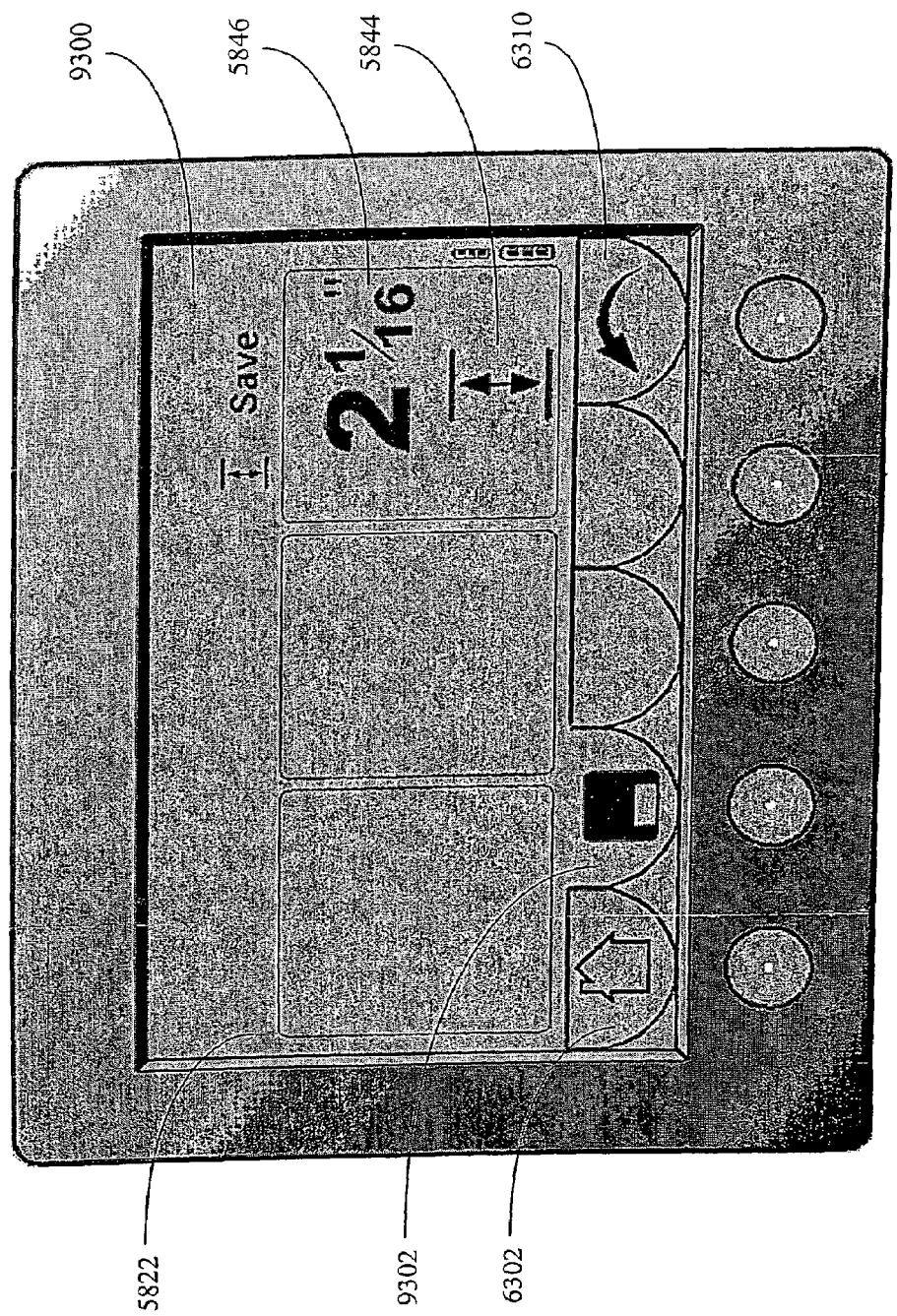
FIG. 93 shows an exemplary height save screen in accordance with an exemplary embodiment of the present invention.

From the height screen 8400 shown in FIG. 84, when the button 5812 is pushed, the height screen 8400 may be replaced with a height save screen 9300 shown in FIG. 93. As shown, the screen 9300 shows in its current-screen region 5822 a height icon and a textual representation "Save", indicating to a user that the current screen is for saving a height value. The screen 9300 includes a "diskette" tab 9302, representing an option of saving the current value 5846 ("2¹⁄₁₆''"). When the tab 9302 is chosen from the screen 9300, the current value "2¹⁄₁₆''" may be given a label number and may be saved into a memory of the user interface 5800 or a memory of the laser measurement and alignment device communicatively coupled to the user interface 5800. As mentioned previously, it is contemplated that other removable memory media may be employed with the present invention, such as a DVD, CDR, flash media device, and the like. Therefore, the "diskette" icon may be altered to provide an alternative image more directly reflecting the current memory media being employed. Further, it is understood that the user interface may incorporate the usage of more than one type of memory media and thus include multiple memory media drives.

Figure 94:
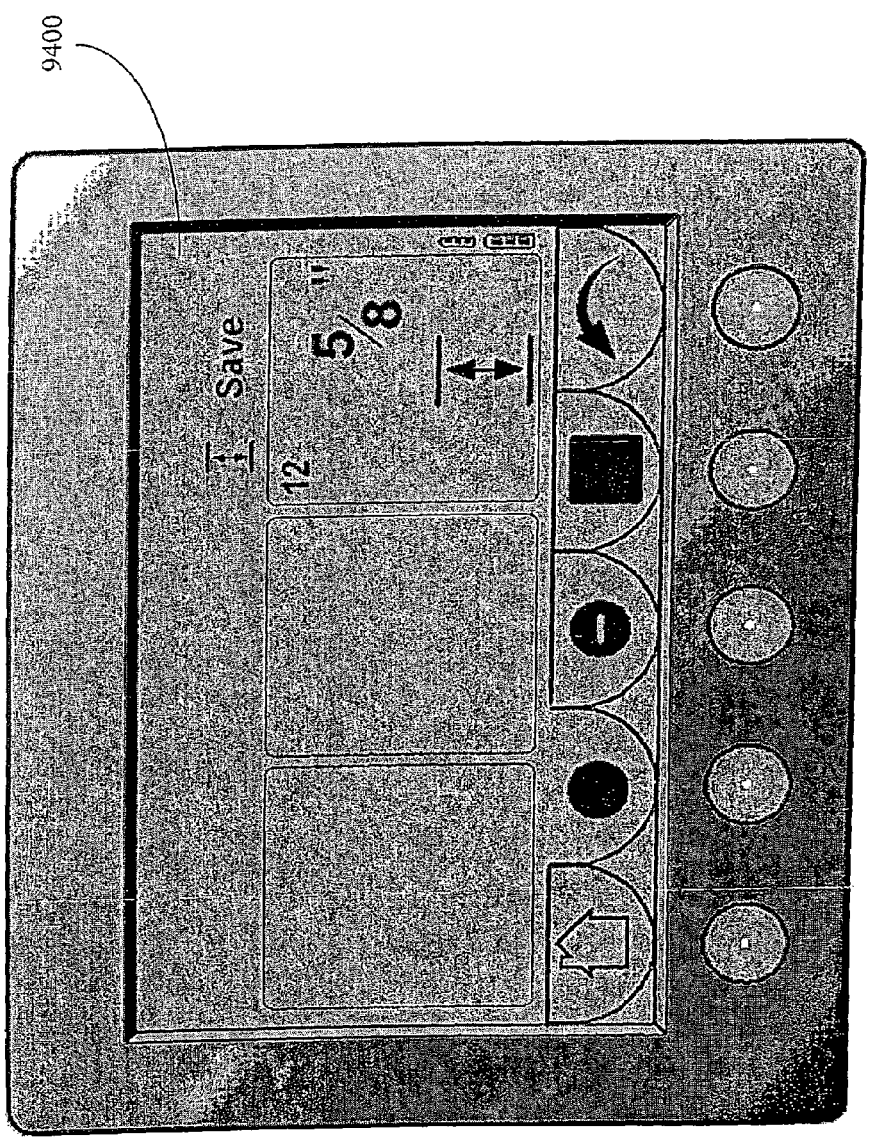
FIG. 94 shows an additional exemplary height save screen in accordance with an exemplary embodiment of the present invention.

FIG. 94 shows another exemplary height save screen 9400, where a current value "⅝''" is given a label number ("12") and may be saved into a memory of the user interface 5800 or a memory of the laser measurement and alignment device communicatively coupled to the user interface 5800.

It is contemplated that an operator of the user interface may input changes to the height settings directly. For example, under the height fine adjustment screen an alternative user input control mode may be included which allows the user to directly affect changes in the height settings. The user may be enabled to make corrections to the height in incremental amounts, such as ½ inch or ¼ inch, 0.1" or 0.01, 5 mm or 10 mm. The user interface may provide "+" and "−" tabs correlated to user input control buttons which allow for this type of adjustment. The direct change of height setting may be configured in a variety of ways and be within various locations of the height mode as contemplated by one of ordinary skill in the art.

Figure 95:
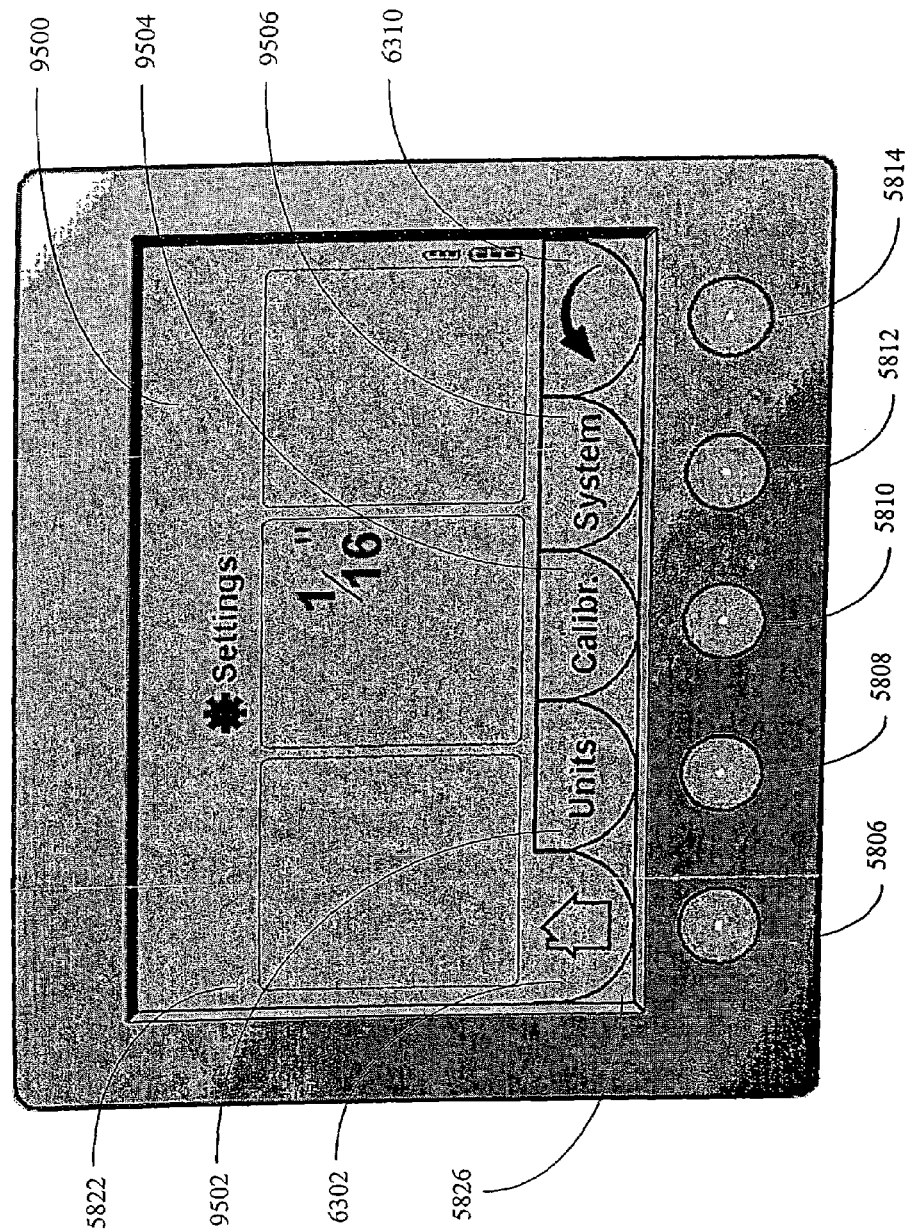
FIG. 95 shows an exemplary settings screen in accordance with an exemplary embodiment of the present invention.

Referring generally now to FIGS. 95 through 101, various exemplary screens 9500 through 10100 of the display 5802 of the user interface 5800 in a settings mode are shown. Referring to FIG. 95, the settings screen 9500 shows in its current-screen region 5822 a settings icon and a textual representation "Settings", indicating to a user that the current screen is in a settings mode. As shown, the settings screen 9500 has in its available-option region 5826 five tabs 6302, 9502, 9504, 9506, and 6310 different from the five tabs shown in FIG. 58. The tab 6302 has a "home" icon unfilled with color representing an option of "returning to home directly" and is correlated to the button 5806 directly below. When the button 5806 is pushed, the settings screen 9500 is replaced with the home screen 5816 shown in FIG. 58. The tab 9502 represents an option of "(global) Units" and is correlated to the button 5808 directly below. The tab 9504 represents an option of "Calibration" and is correlated to the button 5810 directly below. The tab 9506 represents an option of "System" and is correlated to the button 5812 directly below. The tab 6310 has a "back arrow" icon representing an option of "back one level" and is correlated to the button 5814 directly below. That is, when the button 5814 is pushed, the interface 5800 goes back one level and the settings screen 9500 may be replaced with the home screen 5816 shown in FIG. 58.

Figure 96:
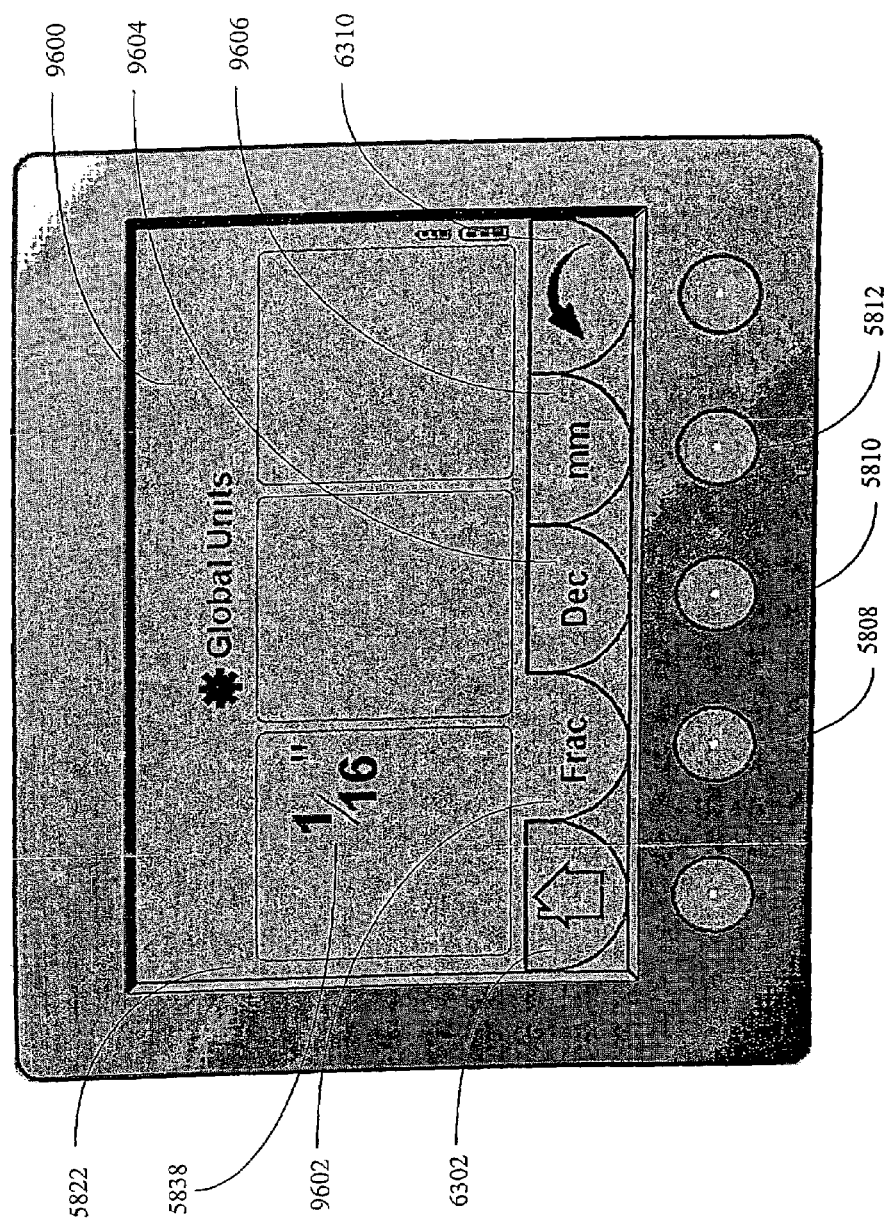
FIG. 96 shows an exemplary default global units screen in accordance with an exemplary embodiment of the present invention.

From the settings screen 9500 shown in FIG. 95, when the "Units" option is chosen (e.g., by pushing the button 5808), the screen 9500 may be replaced with a default global units screen (see, e.g., 9600 shown in FIG. 96). As shown in FIG. 96, the screen 9600 has in its current-screen region 5822 a settings icon and a textual representation "Global Units", indicating the current screen 9600 is a global units screen. The screen 9600 includes three new tabs 9602 (Frac), 9604 (Dec) and 9606 (mm), which represent a global fraction unit option, a global decimal unit option, and a global metric unit option, respectively, for both a distance value 5838 and a height value 5846. The tab 9602 representing a global fraction unit option does not have a horizontal line above "Frac", indicating the fraction unit option is chosen. As a result of choosing this option, the number in a distance value 5838 (and/or a height value 5846) is displayed in a format of "integer+fraction" (see, e.g., "¹⁄₁₆" for a distance value 5838 in FIG. 96, where the integer is not shown because the integer is zero).

Figure 97:
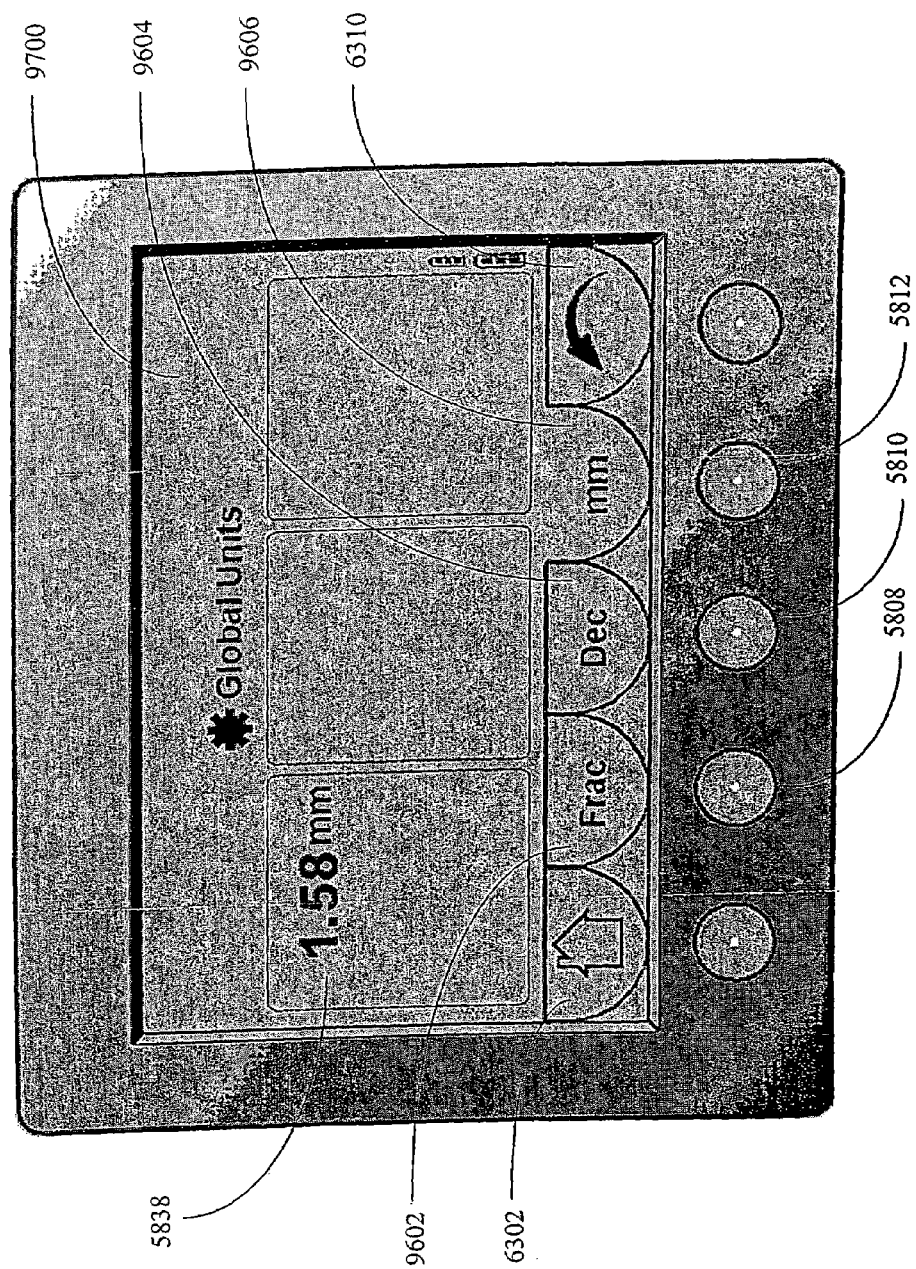
FIG. 97 shows an exemplary global metric units screen in accordance with an exemplary embodiment of the present invention.

From the screen 9600 shown in FIG. 96, when the button 5812 is pushed, the screen 9600 may be replaced with a global metric units screen (see, e.g., 9700 shown in FIG. 97). As shown in FIG. 97, the tab 9606 representing a global metric unit option does not have a horizontal line above "mm", indicating the global metric unit option is chosen. As a result of this option, a distance value 5838 (and/or a height value 5846) is displayed in a metric unit (see, e.g., "1.58 mm" in FIG. 97, where mm is millimeter). Using the buttons 5808, 5810, and 5812, a user may toggle among a default global units (in fraction units) screen (see, e.g., 9600 shown in FIG. 96), a global metric units screen (see, e.g., 9700 shown in FIG. 97), and a global decimal units screen (not shown).

When the "Calibration" option is chosen (e.g., by pushing the button 5810) from the screen 9500 shown in FIG. 95, the screen 9500 may be replaced with a calibration screen (see, e.g., 5600 shown in FIG. 56, and 5700 shown FIG. 57). Through a calibration screen, a user may perform all kinds of calibrations to a height, an angle, and a distance. Additionally, the user interface 5800 may have a drop-down menu (not shown) on the display 5802 to enable a user to select a calibration parameter from the drop-down menu. For example, a drop-down menu may provide kerf information for various kinds of saw blades, fence orientation information (horizontal or vertical), fence type (Unifense, Biesemeyer fence, or the like). Additionally, a saw blade may have a bar code or a RFID (Radio Frequency Identification) number attached to the saw blade body. When a saw blade is scanned by a bar code scanner or a RFID scanner, as the laser source employed by the present invention may be (shown and described previously in FIGS. 15 through 19), the relevant information (e.g., kerf, and the like) may be automatically entered into the user interface 5800 to enable the user interface 5800 to perform the calibration automatically.

Figure 98:
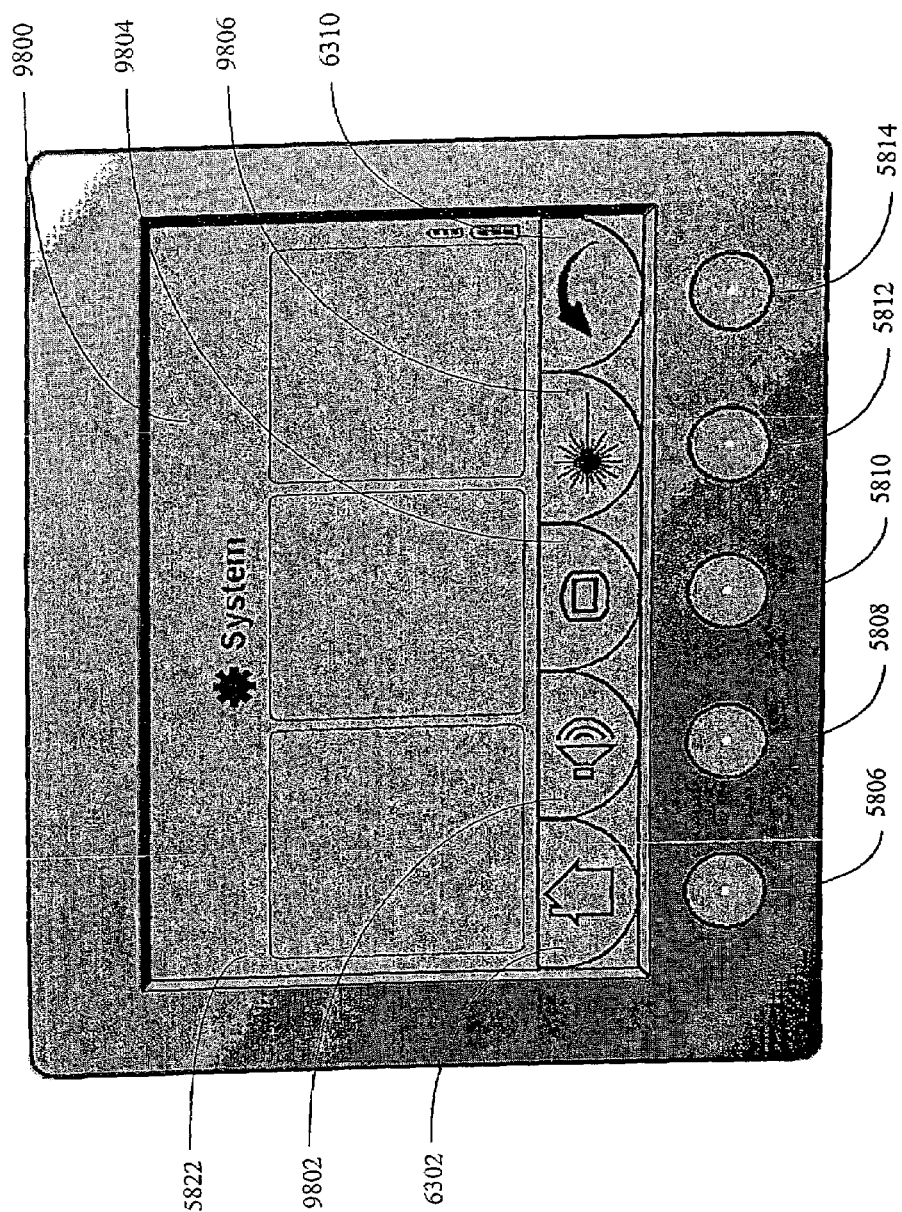
FIG. 98 shows an exemplary system screen in accordance with an exemplary embodiment of the present invention.

From the settings screen 9500 shown in FIG. 95, when the "System" option is chosen (e.g., by pushing the button 5812), the screen 9500 may be replaced with a system screen (see, e.g., 9800 shown in FIG. 98). As shown in FIG. 98, the screen 9800 has in its current-screen region 5822 a settings icon and a textual representation "System", indicating the current screen 9800 is a system screen. The screen 9800 includes three new tabs 9802, 9804 and 9806, which represent a sound option, a brightness option, and a laser time out option, respectively.

Figure 99:
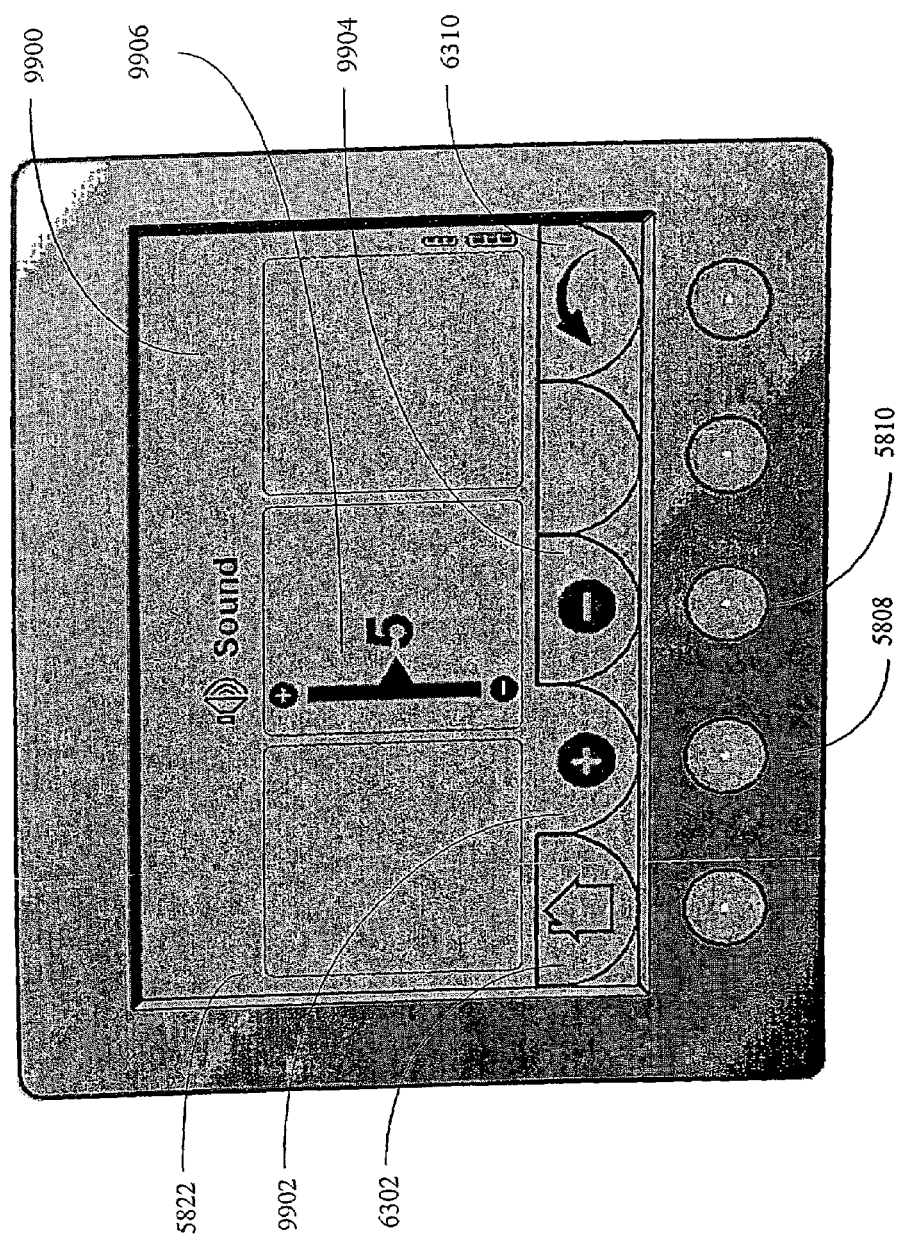
FIG. 99 shows an exemplary sound screen in accordance with an exemplary embodiment of the present invention.

From the system screen 9800 shown in FIG. 98, when the tab 9802 is chosen (e.g., by pushing the button 5808), the screen 9800 may be replaced with a sound screen (see, e.g., 9900 shown in FIG. 99). As shown in FIG. 99, the screen 9900 has in its current-screen region 5822 a sound icon and a textual representation "Sound", indicating the current screen 9900 is a sound screen. The screen 9900 includes two new tabs 9902 ("+") and 9904 ("−"), which represent an option of increasing a sound volume and an option of decreasing a sound volume, respectively. The screen 9900 includes a bar-type scale 9906 showing the current scale of the volume being "5". By pushing the button 5808 from the screen 9900, the tab 9902 is chosen and the sound volume is increased to a scale larger than "5". By pushing the button 5810 from the screen 9900, the tab 9904 is chosen and the sound volume is decreased to a scale smaller than "5". When the scale is decreased to zero ("0"), the sound is turned off.

The sound feedback mechanism provided by the user interface 5800 presents an audible signal to a user when a tool is in the selected position (e.g., when a saw blade has a desired height or angle, when a fence is in a desired distance from a saw blade, or the like). In a variation of this mechanism, the sound feedback mechanism may emit via a microphone/speaker a series of beeps or other noises to a user that guide the user in the positioning of the tool. For example, the beeps may become louder, more frequent, and/or change in pitch the closer the tool is to the desired position.

Alternatively, the user interface 5800 may provide visual feedback mechanism (not shown) which presents a visual signal on its display 5802. For example, this visual signal may be as simple as a light or other symbol being displayed on the display 5802 when the tool is in the desired position. In a variation of the visual feedback mechanism, arrows or other visual direction-guiding signals may be presented on the display 5802 to guide the user to the desired position of the tool.

Figure 100:
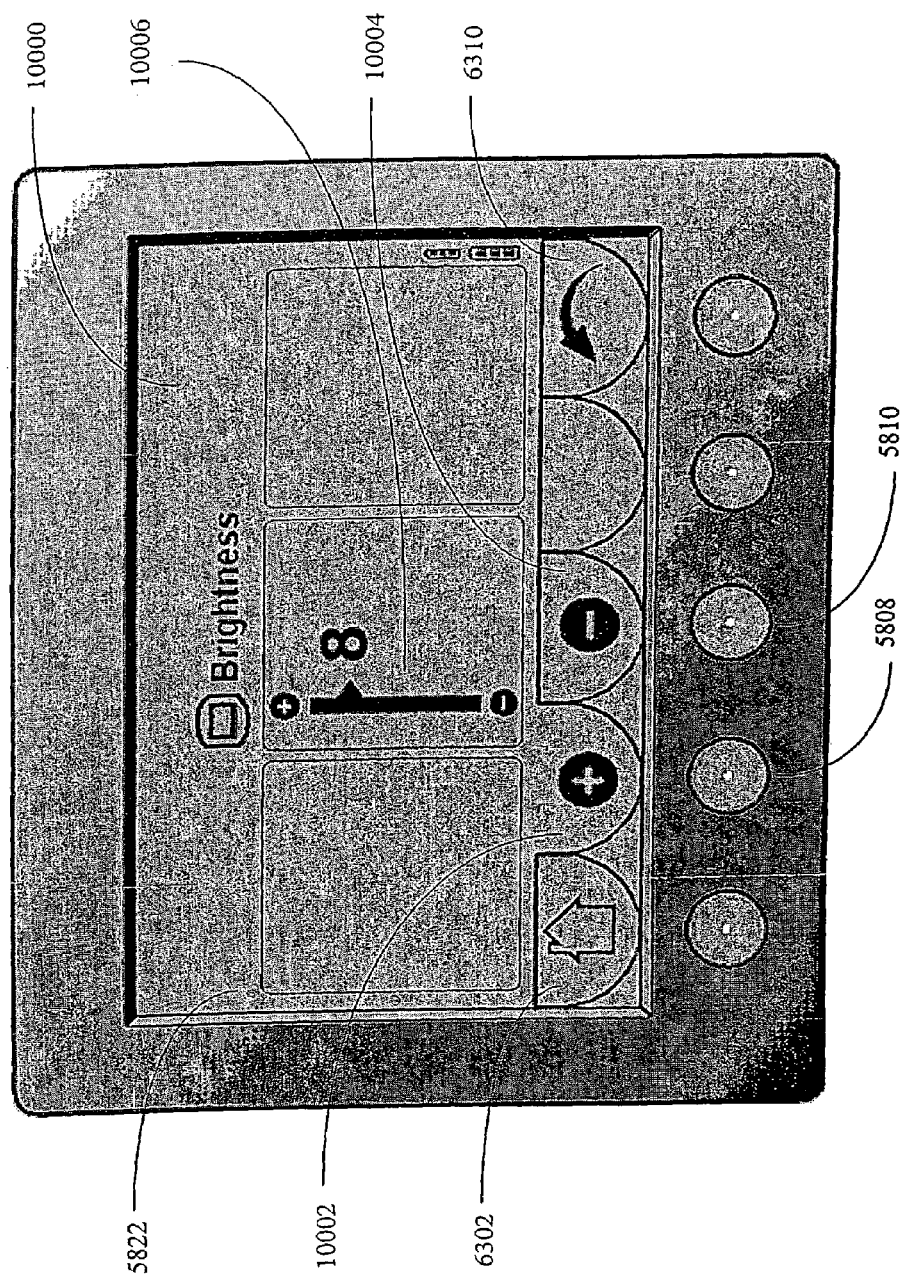
FIG. 100 shows an exemplary brightness screen in accordance with an exemplary embodiment of the present invention.

From the system screen 9800 shown in FIG. 98, when the tab 9804 is chosen (e.g., by pushing the button 5810), the screen 9800 may be replaced with a brightness screen (see, e.g., 10000 shown in FIG. 100). As shown in FIG. 100, the screen 10000 has in its current-screen region 5822 a brightness icon and a textual representation "Brightness", indicating the current screen 10000 is a brightness screen. The screen 10000 includes two new tabs 10002 ("+") and 10004 ("−"), which represent an option of increasing screen brightness and an option of decreasing screen brightness, respectively. The screen 10000 includes a bar-type scale 10006 showing the current brightness scale being "8". By pushing the button 5808 from the screen 10000, the tab 10002 is chosen and the screen brightness is increased to a scale larger than "8". By pushing the button 5810 from the screen 10000, the tab 10004 is chosen and the screen brightness is decreased to a scale smaller than "8".

Figure 101:
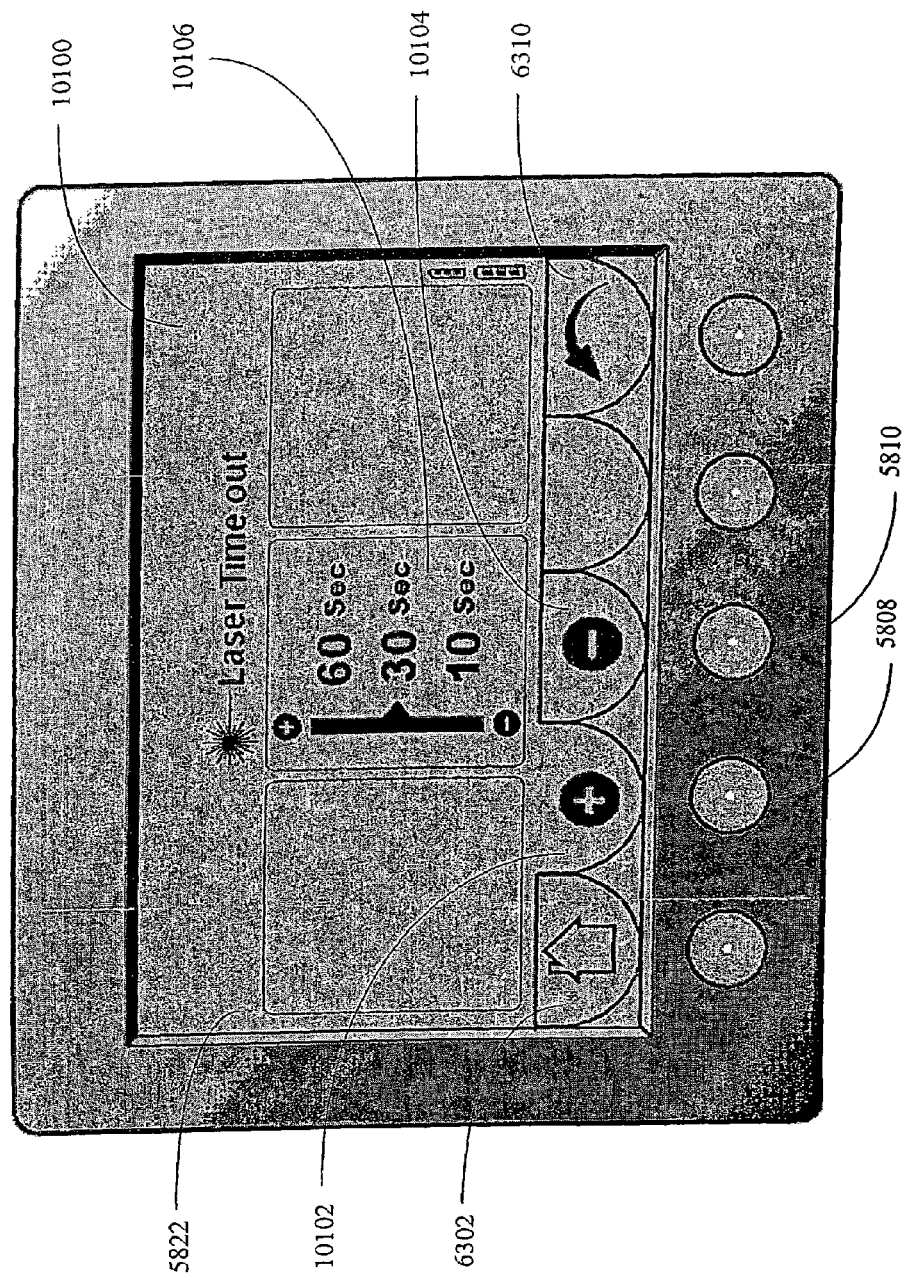
FIG. 101 shows an exemplary laser time out screen in accordance with an exemplary embodiment of the present invention.

From the system screen 9800 shown in FIG. 98, when the tab 9806 is chosen (e.g., by pushing the button 5812), the screen 9800 may be replaced with a laser time out screen (see, e.g., 10100 shown in FIG. 101). As shown in FIG. 101, the screen 10100 has in its current-screen region 5822 a laser time out icon and a textual representation "Laser Time Out", indicating the current screen 10100 is a laser time out screen. The screen 10100 includes two new tabs 10102 ("+") and 10104 ("−"), which represent an option of increasing a time period for laser time out and an option of decreasing a time period for laser time out, respectively. The screen 10100 includes a bar-type scale 10106 showing three time periods for laser time out: 10 seconds, 30 seconds, and 60 seconds. The current time period for laser time out is shown to be "30 seconds" in FIG. 101. That is, the laser measurement and alignment device will be turned off after it is on for 30 seconds. By pushing the button 5808 from the screen 10100, the tab 10102 is chosen and the time period for laser time out is increased to "60 seconds". By pushing the button 5810 from the screen 10100, the tab 10104 is chosen and the time period for laser time out is decreased to "10 seconds". An alternative embodiment of the bar-type scale 10106 is shown in 10100 of FIG. 62, where the current time period for laser time out is shown to be "10 seconds", and a user may use the button 5808 to increase this time period and may use the button 5810 to decrease this time period.

It is understood that the foregoing-described screens shown in FIGS. 55 through 101 are intended as exemplary only and not as a limitation to the present invention. Those of ordinary skill in the art will appreciate that various combinations and arrangements may be employed without departing from the scope and spirit of the present invention.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A non-contact measurement and alignment device for determining at least two settings for operation of a power tool, comprising:
   a graphical user interface for user operation of said power tool for indicating at least two of a power tool setting;
   a wireless networking assembly coupled with the graphical user interface, the wireless networking assembly for establishing a communicative link between the graphical user interface and a second computing system,
   wherein the wireless networking assembly enables a user of the non-contact measurement and alignment device to operate the power tool remotely.

2. The non-contact measurement and alignment device of claim 1, wherein the graphical user interface is configured to provide pictographic display menus.

3. The non-contact measurement and alignment device of claim 1, wherein the graphical user interface comprises a touch screen for user operation of said power tool.

4. The non-contact measurement and alignment device of claim 1, wherein the graphical user interface includes a hand-held graphical user interface.

5. The non-contact measurement and alignment device of claim 1, wherein the non-contact measurement and alignment device is configured to determine at least two of a table saw setting: (i) blade height, (ii) blade angle, and (iii) fence to blade distance.

6. The non-contact measurement and alignment device of claim 1, wherein the graphical user interface is configured to indicate at least two of a table saw setting: (i) blade height, (ii) blade angle, and (iii) fence to blade distance.

7. The non-contact measurement and alignment device of claim 1, wherein the graphical user interface is configured to display both text and graphics.

8. The non-contact measurement and alignment device of claim 1, wherein the graphical user interface includes multiple pages.

9. The non-contact measurement and alignment device of claim 1, wherein the graphical user interface is configured to indicate a saw blade bevel setting.

10. The non-contact measurement and alignment device of claim 1, wherein the graphical user interface is configured to indicate a saw blade height setting.

11. The non-contact measurement and alignment device of claim 1, wherein the graphical user interface is configured to indicate a router bit height setting.

12. The non-contact measurement and alignment device of claim 1, further comprising a touch screen display communicatively coupled with the graphical user interface, the touch screen display being configured for user operation of the graphical user interface.

* * * * *